US012079442B2

(12) United States Patent
Berliner et al.

(10) Patent No.: US 12,079,442 B2
(45) Date of Patent: Sep. 3, 2024

(54) PRESENTING EXTENDED REALITY CONTENT IN DIFFERENT PHYSICAL ENVIRONMENTS

(71) Applicant: Sightful Computers Ltd, Tel Aviv (IL)

(72) Inventors: Tamir Berliner, Tel Aviv (IL); Doron Assayas Terre, Holon (IL); Tomer Kahan, Ramat Hasharon (IL)

(73) Assignee: SIGHTFUL COMPUTERS LTD, Tel Aviv (IL)

( * ) Notice: Subject to any disclaimer, the term of this patent is extended or adjusted under 35 U.S.C. 154(b) by 0 days.

(21) Appl. No.: 18/529,135

(22) Filed: Dec. 5, 2023

(65) Prior Publication Data

US 2024/0111391 A1 Apr. 4, 2024

Related U.S. Application Data

(63) Continuation of application No. PCT/IB2023/059718, filed on Sep. 28, 2023.
(Continued)

(51) Int. Cl.
*G06F 3/04815* (2022.01)
*A63F 13/577* (2014.01)
(Continued)

(52) U.S. Cl.
CPC ........ *G06F 3/04815* (2013.01); *A63F 13/577* (2014.09); *G02B 27/017* (2013.01);
(Continued)

(58) Field of Classification Search
CPC .. G06F 3/04815; G02B 27/017; G06T 19/006
See application file for complete search history.

(56) References Cited

U.S. PATENT DOCUMENTS 5,168,531 A 12/1992 Sigel
5,977,935 A 11/1999 Yasukawa et al.
(Continued)

FOREIGN PATENT DOCUMENTS

CN 110442245 11/2019
CN 110832441 A1 2/2020
(Continued)

OTHER PUBLICATIONS

Abdul Waheed Khan et al. "VGDRA: A Virtual Grid-Based Dynamic Routes Adjustment Scheme for Mobile Sink-Based Wireless Sensor Networks." IEEE Sensors Journal 15.1, pp. 526-534. (Year: 2014).
(Continued)

*Primary Examiner* — Afroza Chowdhury
(74) *Attorney, Agent, or Firm* — Finnegan, Henderson, Farabow, Garrett & Dunner LLP

(57) ABSTRACT

Systems, methods, and computer program products are provided for performing operations for presenting content in three dimensional (3D) environments. Performing operations for presenting content in 3D environments includes: requesting content for virtual presentation in an environment of an extended reality appliance; receiving the content for presentation in the environment; receiving with the content, a plurality of tags, each of the plurality of tags being associated with a portion of the content; capturing, using an image sensor, a layout of the environment; for each tag, selecting, based on the tag, a 3D placement requirement for the content portion associated with the tag; and for each content portion, determining, based on the layout of the environment and the 3D placement requirement selected for the respective content portion, a location in the environment for virtual placement of the respective content portion.

21 Claims, 28 Drawing Sheets

Related U.S. Application Data

(60) Provisional application No. 63/482,341, filed on Jan. 31, 2023, provisional application No. 63/433,565, filed on Dec. 19, 2022, provisional application No. 63/384,650, filed on Nov. 22, 2022, provisional application No. 63/411,748, filed on Sep. 30, 2022.

(51) Int. Cl.
| | |
|---|---|
| *G02B 27/01* | (2006.01) |
| *G06F 3/01* | (2006.01) |
| *G06F 3/0346* | (2013.01) |
| *G06F 3/0484* | (2022.01) |
| *G06F 3/0489* | (2022.01) |
| *G06T 7/73* | (2017.01) |
| *G06T 19/00* | (2011.01) |
| *G06T 19/20* | (2011.01) |
| *H04N 21/45* | (2011.01) |

(52) U.S. Cl.
CPC ............ *G06F 3/012* (2013.01); *G06F 3/0346* (2013.01); *G06F 3/0484* (2013.01); *G06F 3/0489* (2013.01); *G06T 7/73* (2017.01); *G06T 19/00* (2013.01); *G06T 19/006* (2013.01); *G06T 19/20* (2013.01); *H04N 21/4524* (2013.01); *A63F 2300/8082* (2013.01); *G06T 2200/24* (2013.01); *G06T 2219/004* (2013.01); *G06T 2219/2004* (2013.01); *G06T 2219/2016* (2013.01)

(56) References Cited

U.S. PATENT DOCUMENTS

| | | |
|---|---|---|
| 6,023,275 A | 2/2000 | Horvitz et al. |
| 6,215,498 B1 | 4/2001 | Filo et al. |
| 6,388,657 B1 | 5/2002 | Natoli |
| 6,445,364 B2 | 9/2002 | Zwern |
| 7,119,819 B1 | 10/2006 | Robertson et al. |
| 7,225,414 B1 | 5/2007 | Sharma et al. |
| 7,542,040 B2 | 6/2009 | Templeman |
| 8,751,969 B2 | 6/2014 | Matsuda et al. |
| 8,947,322 B1 | 2/2015 | Chi et al. |
| 8,947,323 B1 | 2/2015 | Raffle et al. |
| 8,957,916 B1 | 2/2015 | Hedman et al. |
| 9,007,301 B1 | 4/2015 | Raffle et al. |
| 9,081,177 B2 | 7/2015 | Wong et al. |
| 9,113,032 B1 | 8/2015 | Mey et al. |
| 9,122,321 B2 | 9/2015 | Perez et al. |
| 9,244,533 B2 | 1/2016 | Friend et al. |
| 9,613,448 B1 | 4/2017 | Margolin |
| 9,696,795 B2 | 7/2017 | Marcolina et al. |
| 9,726,896 B2 | 8/2017 | von und zu Liechtenstein |
| 9,779,517 B2 | 10/2017 | Ballard et al. |
| 9,939,900 B2 | 4/2018 | Cruz-Hernandez et al. |
| 9,996,797 B1 | 6/2018 | Holz et al. |
| 10,007,359 B2 | 6/2018 | Chung et al. |
| 10,127,731 B1 | 11/2018 | Ozery |
| 10,317,505 B1 | 6/2019 | Spiko et al. |
| 10,353,532 B1 | 7/2019 | Holz et al. |
| 10,430,018 B2 | 10/2019 | Black et al. |
| 10,438,262 B1 | 10/2019 | Helmer et al. |
| 10,469,804 B1 | 11/2019 | Lyren |
| 10,516,853 B1 | 12/2019 | Gibson et al. |
| 10,553,031 B2 | 2/2020 | Alt et al. |
| 10,706,111 B1 | 7/2020 | Nasserbakht et al. |
| 10,916,057 B2 | 2/2021 | Leppanen et al. |
| 10,917,613 B1 | 2/2021 | Chiarella et al. |
| 10,948,997 B1 | 3/2021 | Victor-Faichney et al. |
| 11,003,307 B1 | 5/2021 | Ravasz et al. |
| 11,014,000 B2 | 5/2021 | Koyama et al. |
| 11,042,028 B1 | 6/2021 | Welch et al. |
| 11,060,858 B2 | 7/2021 | Abovitz et al. |
| 11,061,239 B2 | 7/2021 | Lanman et al. |
| 11,106,328 B1 | 8/2021 | Holland et al. |
| D931,307 S | 9/2021 | Lee et al. |
| 11,120,640 B1 | 9/2021 | Yang et al. |
| 11,144,759 B1 | 10/2021 | Hatfield et al. |
| 11,170,221 B2 | 11/2021 | Sato et al. |
| 11,178,376 B1 | 11/2021 | Tichenor et al. |
| 11,210,851 B1 | 12/2021 | Nussbaum et al. |
| 11,210,863 B1 | 12/2021 | Yan et al. |
| 11,227,445 B1 | 1/2022 | Tichenor et al. |
| 11,245,871 B1 | 2/2022 | Gandhi et al. |
| 11,294,475 B1 | 4/2022 | Pinchon et al. |
| 11,307,968 B2 | 4/2022 | Yerli |
| 11,308,686 B1 | 4/2022 | Boissière et al. |
| 11,317,060 B1 | 4/2022 | Libin |
| 11,334,212 B2 | 5/2022 | Ravasz et al. |
| 11,340,857 B1 | 5/2022 | Smith et al. |
| 11,355,043 B1 | 6/2022 | Choi et al. |
| 11,402,871 B1 | 8/2022 | Berliner et al. |
| 11,475,650 B2 | 10/2022 | Berliner et al. |
| 11,480,791 B2 | 10/2022 | Berliner et al. |
| 11,481,963 B2 | 10/2022 | Berliner et al. |
| 11,496,571 B2 | 11/2022 | Berliner et al. |
| 11,514,656 B2 | 11/2022 | Berliner et al. |
| 11,516,297 B2 | 11/2022 | Berliner et al. |
| 11,638,147 B2 | 4/2023 | Irvin et al. |
| 2003/0058215 A1 | 3/2003 | Yamaji et al. |
| 2003/0063132 A1 | 4/2003 | Sauer et al. |
| 2004/0100556 A1 | 5/2004 | Stromme |
| 2004/0113888 A1 | 6/2004 | De Waal |
| 2005/0019079 A1 | 1/2005 | Griffin et al. |
| 2006/0028400 A1 | 2/2006 | Lapstun et al. |
| 2007/0133788 A1 | 6/2007 | Ladouceur et al. |
| 2007/0223792 A1 | 9/2007 | Morimoto et al. |
| 2008/0184124 A1 | 7/2008 | Agarwal et al. |
| 2008/0270947 A1 | 10/2008 | Elber et al. |
| 2009/0015559 A1 | 1/2009 | Day et al. |
| 2009/0183125 A1 | 7/2009 | Magal et al. |
| 2009/0303984 A1 | 12/2009 | Clark et al. |
| 2010/0034457 A1 | 2/2010 | Berliner et al. |
| 2010/0182340 A1 | 7/2010 | Bachelder et al. |
| 2011/0004481 A1 | 1/2011 | Jones |
| 2011/0216060 A1 | 9/2011 | Weising et al. |
| 2011/0302535 A1 | 12/2011 | Clerc et al. |
| 2012/0068921 A1 | 3/2012 | Jacobsen et al. |
| 2012/0113092 A1 | 5/2012 | Bar-Zeev et al. |
| 2012/0162384 A1 | 6/2012 | Vesely et al. |
| 2012/0192088 A1 | 7/2012 | Sauriol et al. |
| 2012/0194418 A1 | 8/2012 | Osterhout et al. |
| 2012/0202569 A1 | 8/2012 | Maizels et al. |
| 2012/0204133 A1 | 8/2012 | Guendelman et al. |
| 2012/0229425 A1 | 9/2012 | Barrus et al. |
| 2012/0242603 A1 | 9/2012 | Engelhardt et al. |
| 2012/0249587 A1 | 10/2012 | Anderson et al. |
| 2012/0249741 A1 | 10/2012 | Maciocci et al. |
| 2012/0272179 A1 | 10/2012 | Stafford |
| 2012/0326961 A1 | 12/2012 | Bromer |
| 2013/0033483 A1 | 2/2013 | Im et al. |
| 2013/0069985 A1 | 3/2013 | Wong et al. |
| 2013/0106692 A1 | 5/2013 | Maizels et al. |
| 2013/0107021 A1 | 5/2013 | Maizels et al. |
| 2013/0117377 A1 | 5/2013 | Miller |
| 2013/0135344 A1 | 5/2013 | Stirbu et al. |
| 2013/0174213 A1 | 7/2013 | Liu et al. |
| 2013/0194304 A1 | 8/2013 | Latta et al. |
| 2013/0208232 A1 | 8/2013 | Boukli-Hacene |
| 2013/0246955 A1 | 9/2013 | Schwesig et al. |
| 2013/0260822 A1 | 10/2013 | Wu |
| 2013/0278631 A1 | 10/2013 | Border et al. |
| 2013/0283208 A1 | 10/2013 | Bychkov et al. |
| 2013/0293468 A1 | 11/2013 | Perez et al. |
| 2013/0321265 A1 | 12/2013 | Bychkov et al. |
| 2013/0321271 A1 | 12/2013 | Bychkov et al. |
| 2013/0328914 A1 | 12/2013 | Smith et al. |
| 2013/0328925 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002496 A1 | 1/2014 | Lamb et al. |
| 2014/0028548 A1 | 1/2014 | Bychkov et al. |
| 2014/0035819 A1 | 2/2014 | Griffin |

(56) References Cited

U.S. PATENT DOCUMENTS

| | | |
|---|---|---|
| 2014/0062875 A1 | 3/2014 | Rafey et al. |
| 2014/0063055 A1 | 3/2014 | Osterhout et al. |
| 2014/0082526 A1 | 3/2014 | Park et al. |
| 2014/0091857 A1 | 4/2014 | Bernstein |
| 2014/0123077 A1 | 5/2014 | Kutliroff et al. |
| 2014/0132629 A1 | 5/2014 | Pandey et al. |
| 2014/0152552 A1 | 6/2014 | Berliner et al. |
| 2014/0191927 A1 | 7/2014 | Cho |
| 2014/0193047 A1 | 7/2014 | Grosz et al. |
| 2014/0208274 A1 | 7/2014 | Smyth et al. |
| 2014/0258942 A1 | 9/2014 | Kutliroff et al. |
| 2014/0272845 A1 | 9/2014 | Hendriks et al. |
| 2014/0282105 A1 | 9/2014 | Nordstrom |
| 2014/0327611 A1 | 11/2014 | Ono et al. |
| 2014/0380230 A1 | 12/2014 | Venable et al. |
| 2015/0067580 A1 | 3/2015 | Um et al. |
| 2015/0091780 A1 | 4/2015 | Lyren |
| 2015/0121287 A1 | 4/2015 | Fermon |
| 2015/0133193 A1 | 5/2015 | Stotler |
| 2015/0160825 A1 | 6/2015 | Dolbier et al. |
| 2015/0205106 A1 | 7/2015 | Norden |
| 2015/0206349 A1 | 7/2015 | Rosenthal et al. |
| 2015/0215581 A1 | 7/2015 | Barzuza et al. |
| 2015/0235267 A1 | 8/2015 | Steube et al. |
| 2015/0268721 A1 | 9/2015 | Joo |
| 2015/0277560 A1 | 10/2015 | Beaty |
| 2015/0294480 A1 | 10/2015 | Marks et al. |
| 2015/0302665 A1 | 10/2015 | Miller |
| 2015/0302867 A1 | 10/2015 | Tomlin et al. |
| 2015/0324001 A1 | 11/2015 | Yanai et al. |
| 2015/0338886 A1 | 11/2015 | Seo |
| 2015/0379770 A1 | 12/2015 | Haley, Jr. et al. |
| 2016/0005229 A1 | 1/2016 | Lee et al. |
| 2016/0018985 A1 | 1/2016 | Bennet et al. |
| 2016/0026242 A1 | 1/2016 | Burns et al. |
| 2016/0026253 A1 | 1/2016 | Bradski et al. |
| 2016/0027214 A1 | 1/2016 | Memmott et al. |
| 2016/0027216 A1 | 1/2016 | da Veiga et al. |
| 2016/0041625 A1 | 2/2016 | Maizels et al. |
| 2016/0071325 A1 | 3/2016 | Callaghan |
| 2016/0093108 A1 | 3/2016 | Mao et al. |
| 2016/0139787 A1 | 5/2016 | Joo et al. |
| 2016/0147399 A1 | 5/2016 | Berajawala |
| 2016/0191910 A1 | 6/2016 | von und zu Liechtenstein |
| 2016/0209928 A1 | 7/2016 | Kandur Raja et al. |
| 2016/0239080 A1 | 8/2016 | Marcolina et al. |
| 2016/0255748 A1 | 9/2016 | Kim et al. |
| 2016/0259548 A1 | 9/2016 | Ma |
| 2016/0262235 A1 | 9/2016 | Clymer et al. |
| 2016/0282824 A1 | 9/2016 | Smallwood et al. |
| 2016/0306431 A1 | 10/2016 | Stafford et al. |
| 2016/0313868 A1 | 10/2016 | Weng et al. |
| 2016/0313890 A1 | 10/2016 | Walline et al. |
| 2016/0328590 A1 | 11/2016 | Fefferman |
| 2016/0370860 A1 | 12/2016 | Bychkov et al. |
| 2016/0370970 A1 | 12/2016 | Chu et al. |
| 2016/0379409 A1 | 12/2016 | Gavriliuc et al. |
| 2017/0039770 A1 | 2/2017 | Lanier et al. |
| 2017/0083104 A1 | 3/2017 | Namba et al. |
| 2017/0109516 A1 | 4/2017 | Engelhardt et al. |
| 2017/0131964 A1 | 5/2017 | Baek et al. |
| 2017/0132199 A1 | 5/2017 | Vescovi et al. |
| 2017/0132842 A1 | 5/2017 | Morrison |
| 2017/0153866 A1 | 6/2017 | Grinberg et al. |
| 2017/0169616 A1 | 6/2017 | Wiley et al. |
| 2017/0185261 A1 | 6/2017 | Perez et al. |
| 2017/0193706 A1 | 7/2017 | Lo et al. |
| 2017/0195629 A1 | 7/2017 | Wexler et al. |
| 2017/0220134 A1 | 8/2017 | Burns |
| 2017/0221264 A1 | 8/2017 | Perry |
| 2017/0242480 A1 | 8/2017 | Dees et al. |
| 2017/0243403 A1 | 8/2017 | Daniels et al. |
| 2017/0248785 A1 | 8/2017 | Thomas et al. |
| 2017/0262045 A1 | 9/2017 | Rouvinez et al. |
| 2017/0266554 A1 | 9/2017 | Marks et al. |
| 2017/0280090 A1 | 9/2017 | Raskin |
| 2017/0285758 A1 | 10/2017 | Hastings et al. |
| 2017/0287217 A1 | 10/2017 | Kim et al. |
| 2017/0315627 A1 | 11/2017 | Yao |
| 2017/0315722 A1 | 11/2017 | Yao |
| 2017/0322622 A1 | 11/2017 | Hong et al. |
| 2017/0343811 A1 | 11/2017 | Mese et al. |
| 2017/0345457 A1 | 11/2017 | Li |
| 2017/0351097 A1 | 12/2017 | Memmott et al. |
| 2017/0352083 A1 | 12/2017 | Ruck et al. |
| 2018/0011863 A1 | 1/2018 | Xin et al. |
| 2018/0045963 A1 | 2/2018 | Hoover et al. |
| 2018/0075658 A1 | 3/2018 | Lanier et al. |
| 2018/0088663 A1 | 3/2018 | Zhang et al. |
| 2018/0088682 A1 | 3/2018 | Tsang |
| 2018/0089510 A1 | 3/2018 | Li |
| 2018/0089899 A1 | 3/2018 | Piemonte et al. |
| 2018/0090018 A1 | 3/2018 | Gavrilets et al. |
| 2018/0101994 A1 | 4/2018 | Da Veiga et al. |
| 2018/0117470 A1 | 5/2018 | Chiu et al. |
| 2018/0131847 A1 | 5/2018 | Kokonaski et al. |
| 2018/0131907 A1 | 5/2018 | Schmirler et al. |
| 2018/0150997 A1 | 5/2018 | Austin |
| 2018/0167501 A1 | 6/2018 | Peterson et al. |
| 2018/0173323 A1 | 6/2018 | Harvey et al. |
| 2018/0173404 A1 | 6/2018 | Smith |
| 2018/0181626 A1 | 6/2018 | Lyons et al. |
| 2018/0189568 A1 | 7/2018 | Powderly et al. |
| 2018/0197341 A1 | 7/2018 | Loberg et al. |
| 2018/0197624 A1 | 7/2018 | Robaina et al. |
| 2018/0214777 A1 | 8/2018 | Hingorani |
| 2018/0246324 A1 | 8/2018 | Hada et al. |
| 2018/0246328 A1 | 8/2018 | Song et al. |
| 2018/0247431 A1 | 8/2018 | Clark et al. |
| 2018/0253900 A1 | 9/2018 | Finding et al. |
| 2018/0267762 A1 | 9/2018 | Aurongzeb et al. |
| 2018/0276891 A1 | 9/2018 | Craner et al. |
| 2018/0276896 A1 | 9/2018 | Launonen |
| 2018/0300952 A1 | 10/2018 | Evans et al. |
| 2018/0307303 A1 | 10/2018 | Powderly et al. |
| 2018/0314329 A1 | 11/2018 | Bychkov et al. |
| 2018/0314406 A1 | 11/2018 | Powderly et al. |
| 2018/0315248 A1 | 11/2018 | Bastov et al. |
| 2018/0350119 A1 | 12/2018 | Kocharlakota et al. |
| 2018/0350150 A1 | 12/2018 | Powderly et al. |
| 2018/0357472 A1 | 12/2018 | Dreessen |
| 2019/0035234 A1 | 1/2019 | Howard et al. |
| 2019/0073109 A1 | 3/2019 | Zhang et al. |
| 2019/0087015 A1 | 3/2019 | Lam et al. |
| 2019/0102946 A1 | 4/2019 | Spivack et al. |
| 2019/0107944 A1 | 4/2019 | Glass et al. |
| 2019/0107991 A1 | 4/2019 | Spivack et al. |
| 2019/0114802 A1 | 4/2019 | Lazarow |
| 2019/0114991 A1 | 4/2019 | Selan et al. |
| 2019/0114997 A1 | 4/2019 | Okamoto |
| 2019/0174088 A1 | 6/2019 | Kim et al. |
| 2019/0204599 A1 | 7/2019 | Abbott |
| 2019/0229495 A1 | 7/2019 | Pierer et al. |
| 2019/0236842 A1 | 8/2019 | Bennett et al. |
| 2019/0237044 A1 | 8/2019 | Day et al. |
| 2019/0265781 A1 | 8/2019 | Kehoe et al. |
| 2019/0270015 A1 | 9/2019 | Li et al. |
| 2019/0295323 A1 | 9/2019 | Gutierrez et al. |
| 2019/0311460 A1 | 10/2019 | Mandy |
| 2019/0318065 A1 | 10/2019 | Brent et al. |
| 2019/0324277 A1 | 10/2019 | Kohler et al. |
| 2019/0333275 A1 | 10/2019 | Wang et al. |
| 2019/0335083 A1 | 10/2019 | DiGiantomasso et al. |
| 2019/0340816 A1 | 11/2019 | Rogers |
| 2019/0362557 A1 | 11/2019 | Lacey et al. |
| 2019/0362562 A1 | 11/2019 | Benson |
| 2019/0380792 A1 | 12/2019 | Poltaretskyi et al. |
| 2019/0384406 A1 | 12/2019 | Smith et al. |
| 2019/0385376 A1 | 12/2019 | Kim et al. |
| 2020/0004401 A1 | 1/2020 | Hwang et al. |
| 2020/0005026 A1 | 1/2020 | Andersen et al. |
| 2020/0019156 A1 | 1/2020 | Drew et al. |
| 2020/0035203 A1 | 1/2020 | Kosik et al. |
| 2020/0043243 A1 | 2/2020 | Bhushan et al. |

(56) References Cited

U.S. PATENT DOCUMENTS

| | | |
|---|---|---|
| 2020/0051337 A1 | 2/2020 | Reynolds et al. |
| 2020/0051527 A1 | 2/2020 | Ngo |
| 2020/0066030 A1 | 2/2020 | Naik et al. |
| 2020/0074738 A1 | 3/2020 | Hare et al. |
| 2020/0109847 A1 | 4/2020 | Poggio et al. |
| 2020/0110928 A1 | 4/2020 | Al Jazaery et al. |
| 2020/0111232 A1 | 4/2020 | Bleyer et al. |
| 2020/0111255 A1 | 4/2020 | Brodsky et al. |
| 2020/0111256 A1 | 4/2020 | Bleyer et al. |
| 2020/0111257 A1 | 4/2020 | Kim |
| 2020/0111259 A1 | 4/2020 | Sears et al. |
| 2020/0117267 A1 | 4/2020 | Gibson et al. |
| 2020/0117270 A1 | 4/2020 | Gibson et al. |
| 2020/0125322 A1 | 4/2020 | Wilde |
| 2020/0126309 A1 | 4/2020 | Moroze et al. |
| 2020/0135419 A1 | 4/2020 | Nakano et al. |
| 2020/0151965 A1 | 5/2020 | Forbes et al. |
| 2020/0174660 A1 | 6/2020 | Klein et al. |
| 2020/0175759 A1 | 6/2020 | Russell et al. |
| 2020/0193938 A1 | 6/2020 | Estruch Tena et al. |
| 2020/0209628 A1 | 7/2020 | Sztuk et al. |
| 2020/0211207 A1 | 7/2020 | Chen et al. |
| 2020/0213632 A1 | 7/2020 | Goldberg |
| 2020/0258481 A1 | 8/2020 | Woo et al. |
| 2020/0342671 A1 | 10/2020 | Ishihara |
| 2020/0342675 A1 | 10/2020 | Leuze et al. |
| 2020/0363636 A1 | 11/2020 | Karafin et al. |
| 2020/0364915 A1 | 11/2020 | Ruth et al. |
| 2020/0367970 A1 | 11/2020 | Qiu et al. |
| 2020/0387215 A1 | 12/2020 | Smathers et al. |
| 2020/0401805 A1 | 12/2020 | Kotoyori |
| 2020/0404217 A1 | 12/2020 | Yerli |
| 2021/0008413 A1 | 1/2021 | Asikainen et al. |
| 2021/0041951 A1 | 2/2021 | Gibson et al. |
| 2021/0096726 A1 | 4/2021 | Faulkner et al. |
| 2021/0097766 A1 | 4/2021 | Palangie et al. |
| 2021/0121136 A1 | 4/2021 | Dobson et al. |
| 2021/0132683 A1 | 5/2021 | Herling et al. |
| 2021/0135895 A1 | 5/2021 | Cheung |
| 2021/0173480 A1 | 6/2021 | Osterhout et al. |
| 2021/0174570 A1 | 6/2021 | Bleyer et al. |
| 2021/0185471 A1 | 6/2021 | Jot et al. |
| 2021/0191600 A1 | 6/2021 | Lemay et al. |
| 2021/0201581 A1 | 7/2021 | Xie et al. |
| 2021/0227178 A1 | 7/2021 | Lyon et al. |
| 2021/0232211 A1 | 7/2021 | McCall |
| 2021/0235124 A1 | 7/2021 | Seregin et al. |
| 2021/0255458 A1 | 8/2021 | Yoon |
| 2021/0256261 A1 | 8/2021 | Wang et al. |
| 2021/0272373 A1 | 9/2021 | Fradet et al. |
| 2021/0272537 A1* | 9/2021 | Mak ............... G06T 7/70 |
| 2021/0286502 A1 | 9/2021 | Lemay et al. |
| 2021/0295602 A1 | 9/2021 | Scapel et al. |
| 2021/0311320 A1 | 10/2021 | Pike et al. |
| 2021/0349676 A1 | 11/2021 | Sommer et al. |
| 2021/0366440 A1 | 11/2021 | Burns et al. |
| 2021/0373672 A1 | 12/2021 | Schwarz et al. |
| 2021/0407205 A1 | 12/2021 | Canberk et al. |
| 2022/0012920 A1 | 1/2022 | Beith et al. |
| 2022/0035439 A1 | 2/2022 | Holland et al. |
| 2022/0075517 A1 | 3/2022 | Bailey et al. |
| 2022/0084279 A1 | 3/2022 | Lindmeirer et al. |
| 2022/0084288 A1 | 3/2022 | LeBeau et al. |
| 2022/0086203 A1 | 3/2022 | Morris et al. |
| 2022/0092862 A1 | 3/2022 | Faulkner et al. |
| 2022/0101612 A1 | 3/2022 | Palangie et al. |
| 2022/0107632 A1 | 4/2022 | Sinha et al. |
| 2022/0121344 A1 | 4/2022 | Pastrana Vicente et al. |
| 2022/0130077 A1 | 4/2022 | Rajarathnam et al. |
| 2022/0155853 A1 | 5/2022 | Fan et al. |
| 2022/0156998 A1 | 5/2022 | Lee et al. |
| 2022/0172397 A1 | 6/2022 | Herling et al. |
| 2022/0229534 A1 | 7/2022 | Terre et al. |
| 2022/0253093 A1 | 8/2022 | Berliner et al. |
| 2022/0253098 A1 | 8/2022 | Berliner et al. |
| 2022/0253128 A1 | 8/2022 | Berliner et al. |
| 2022/0253130 A1 | 8/2022 | Berliner et al. |
| 2022/0253136 A1 | 8/2022 | Holder et al. |
| 2022/0253139 A1 | 8/2022 | Berliner et al. |
| 2022/0253149 A1 | 8/2022 | Berliner et al. |
| 2022/0253188 A1 | 8/2022 | Berliner et al. |
| 2022/0253194 A1 | 8/2022 | Berliner et al. |
| 2022/0253200 A1 | 8/2022 | Berliner et al. |
| 2022/0253201 A1 | 8/2022 | Berliner et al. |
| 2022/0253263 A1 | 8/2022 | Noam et al. |
| 2022/0253264 A1 | 8/2022 | Berliner et al. |
| 2022/0253266 A1 | 8/2022 | Berliner et al. |
| 2022/0253759 A1 | 8/2022 | Berliner et al. |
| 2022/0254112 A1 | 8/2022 | Berliner et al. |
| 2022/0254118 A1 | 8/2022 | Berliner et al. |
| 2022/0254120 A1 | 8/2022 | Berliner et al. |
| 2022/0255974 A1 | 8/2022 | Berliner et al. |
| 2022/0255995 A1 | 8/2022 | Berliner et al. |
| 2022/0256062 A1 | 8/2022 | Berliner et al. |
| 2022/0261091 A1 | 8/2022 | Berliner et al. |
| 2022/0261149 A1 | 8/2022 | Berliner et al. |
| 2022/0335673 A1 | 10/2022 | Jang et al. |
| 2023/0080905 A1 | 3/2023 | Tomczek et al. |
| 2023/0081717 A1 | 3/2023 | Hoang et al. |
| 2023/0135787 A1 | 5/2023 | Peleg et al. |
| 2023/0139337 A1 | 5/2023 | Noam et al. |

FOREIGN PATENT DOCUMENTS

| | | |
|---|---|---|
| CN | 111782332 | 10/2020 |
| EP | 3188075 | 7/2017 |
| EP | 3584692 | 12/2019 |
| KR | 20190088545 | 7/2019 |
| WO | WO 2019/126175 | 6/2019 |
| WO | WO 2021/239223 | 12/2021 |

OTHER PUBLICATIONS

International Search Report and Written Opinion for International Application No. PCT/US2022/015546, dated Jun. 29, 2022, 16 pages.

International Search Report and Written Opinion for International Application No. PCT/US2022/015547, dated Jul. 1, 2022, 16 pages.

International Search Report and Written Opinion for International Application No. PCT/US2022/015548, dated Jun. 30, 2020, 13 pages.

International Search Report and Written Opinion for International Application No. PCT/US2022/038450, dated Feb. 6, 2023, 13 pages.

International Search Report and Written Opinion for International Application No. PCT/US2023/011401, dated Jul. 7, 2023, 14 pages.

Kimberly Ruth, Tadayoshi Kohno, Franziska Roesner, "Secure Multi-User Content Sharing for Augmented Reality Applications", Aug. 2019, USENIX Association, Proceedings of 28th USENIX Security Symposium (USENIX Security 19), pp. 141-158.

Meta Quest, "Oculus Quest Basics Tutorial Part 02: Play area setup", https://www.youtube.com/watch?v=zh5ldprM5Mg, May 20, 2019 (Year: 2019).

Yehia ElRakaiby, Frederic Cuppens, Nora Cuppens-Boulahia, "Interactivity for Reactive Access Control", 2008, International Conference on Security and Cryptography (SECRYPT), pp. 57-64.

International Search Report and Written Opinion for International Application No. PCT/IB2023/059718, dated Feb. 23, 2024, 19 pages.

* cited by examiner

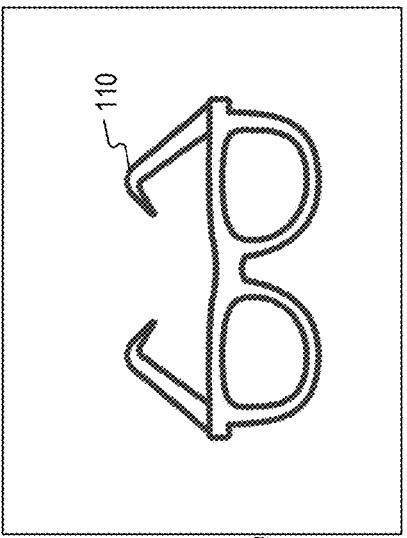
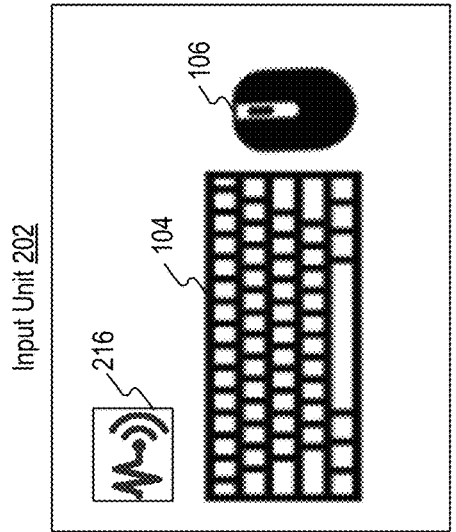
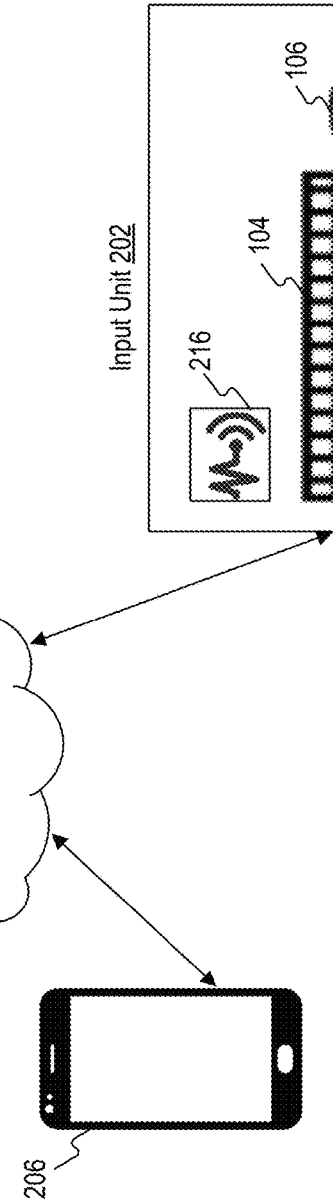
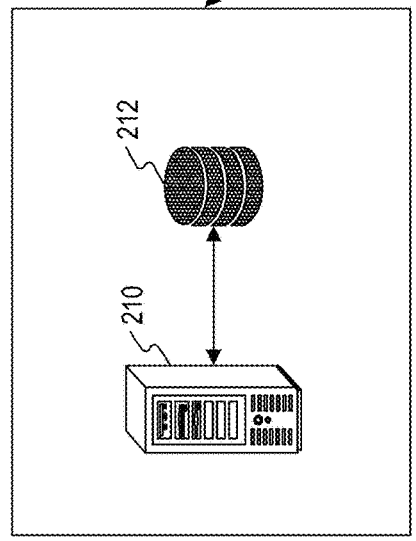
FIG. 2

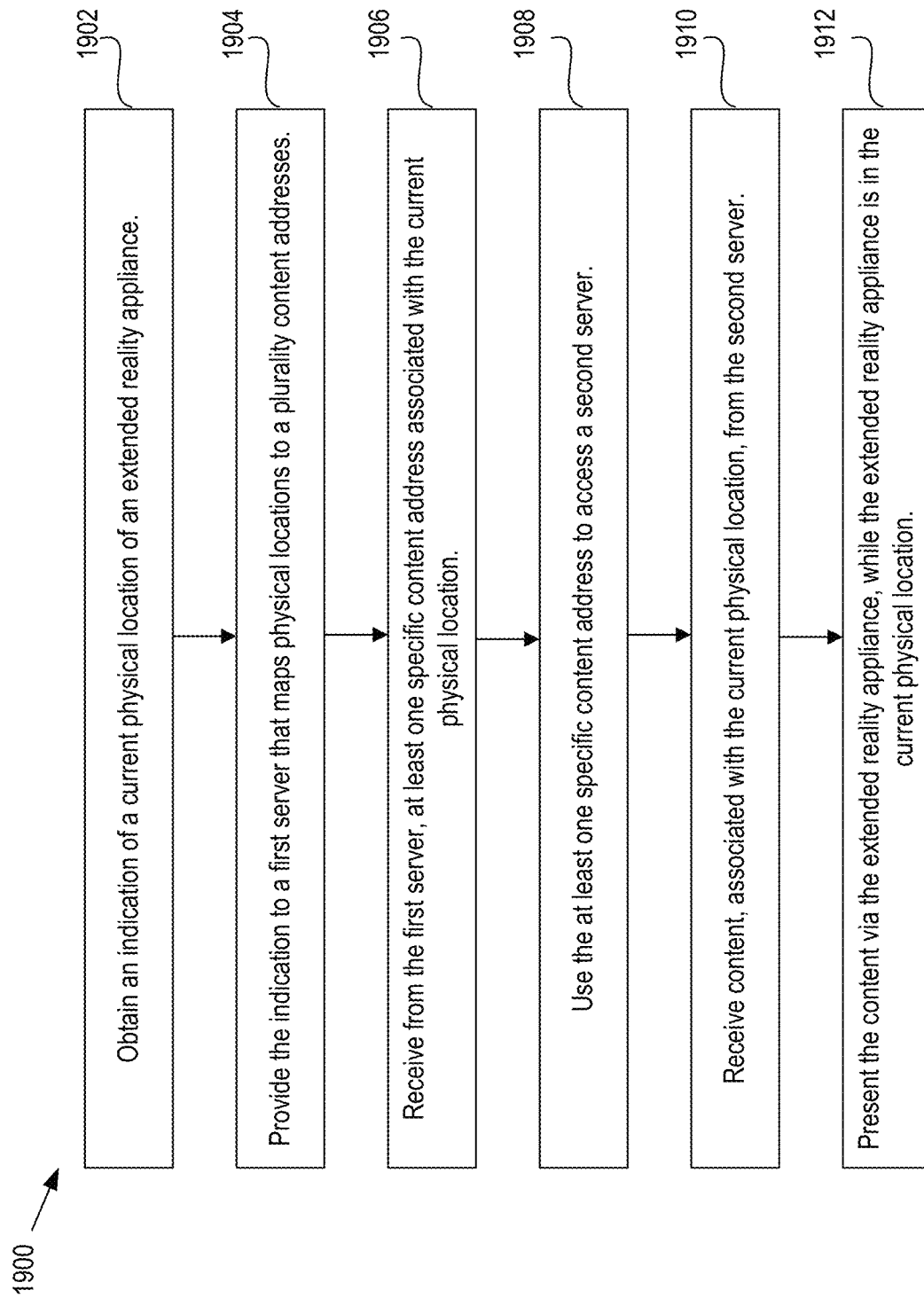

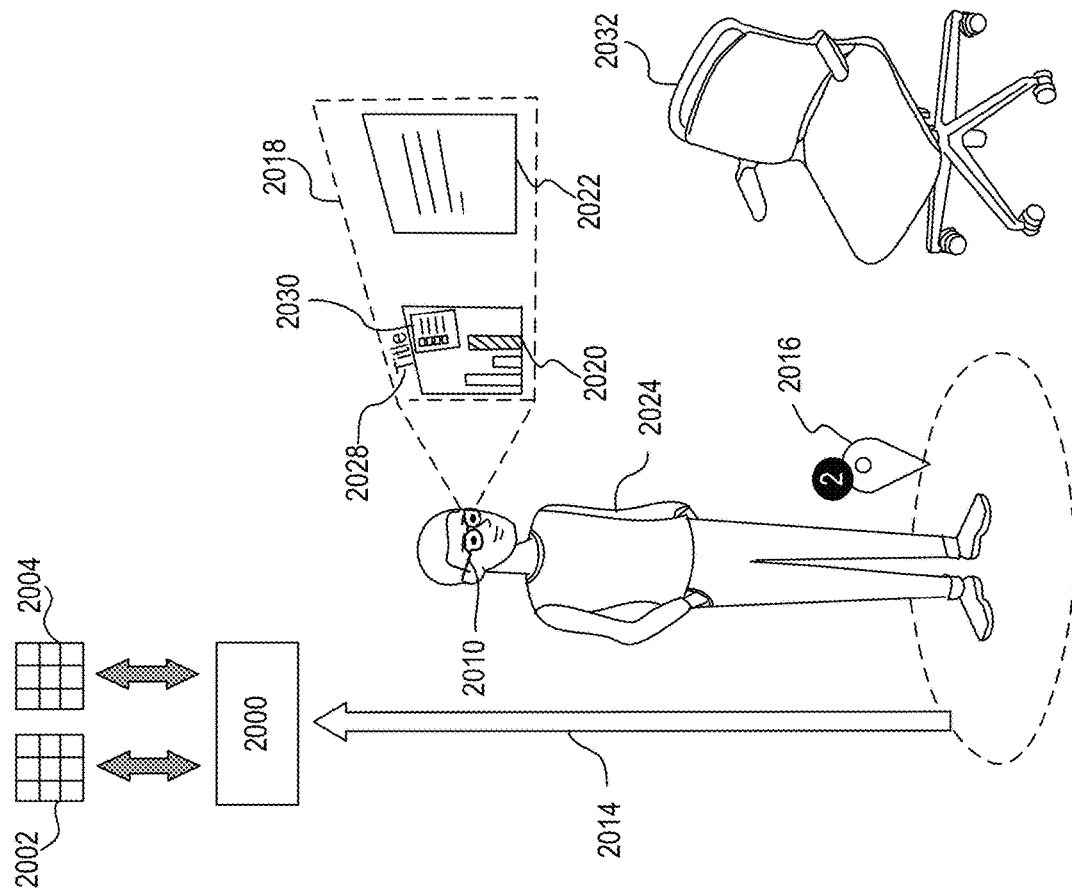
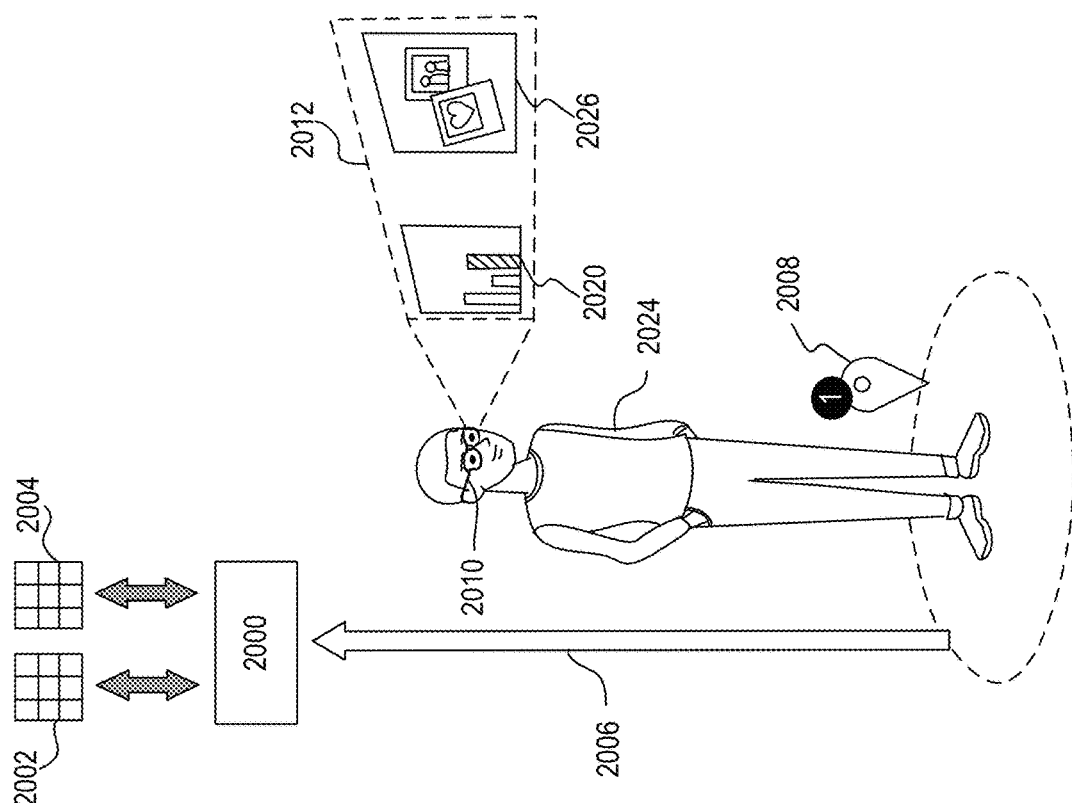
FIG. 20B
FIG. 20A

PRESENTING EXTENDED REALITY CONTENT IN DIFFERENT PHYSICAL ENVIRONMENTS

CROSS REFERENCES TO RELATED APPLICATIONS

This application is a continuation of PCT International Application No. PCT/IB2023/059718, filed Sep. 28, 2023, which claims the benefit of priority of U.S. Provisional Patent Application No. 63/411,748, filed on Sep. 30, 2022, U.S. Provisional Patent Application No. 63/384,650, filed on Nov. 22, 2022, U.S. Provisional Patent Application No. 63/433,565, filed on Dec. 19, 2022, U.S. Provisional Patent Application No. 63/482,341, filed on Jan. 31, 2023, all of which are incorporated herein by reference in their entirety.

BACKGROUND

I. Technical Field

The present disclosure generally relates to the field of extended reality. More specifically, the present disclosure relates to systems, methods, and devices for providing productivity applications using an extended reality environment.

II. Background Information

For many years, PC users were faced with a productivity dilemma: either to limit their mobility (when selecting a desktop computer) or to limit their screen size (when selecting a laptop computer). One partial solution to this dilemma is using a docking station. A docking station is an interface device for connecting a laptop computer with other devices. By plugging the laptop computer into the docking station, laptop users can enjoy the increased visibility provided by a larger monitor. But because the large monitor is stationary, the mobility of the user—while improved—is still limited. For example, even laptop users with docking stations do not have the freedom of using two 32" screens anywhere they want.

Some of the disclosed embodiments are directed to providing a new approach for solving the productivity dilemma, one that uses extended reality (XR) to provide a mobile environment that enables users to experience the comfort of a stationary workspace anywhere they want by providing virtual desktop-like screens.

SUMMARY

Embodiments consistent with the present disclosure provide systems, methods, and devices for providing and supporting productivity applications using an extended reality environment.

Some disclosed embodiments may include systems, methods and non-transitory computer readable media for presenting content in three dimensional (3D) environments. These embodiments may involve requesting content for virtual presentation in an environment of an extended reality device; receiving the content for the virtual presentation in the environment; receiving with the content, a plurality of tags, each tag of the plurality of tags being associated with a portion of the content; capturing, using an image sensor, a layout of the environment; for each tag of the plurality of tags, selecting, based on the respective tag, at least one 3D placement requirement for the portion of the content associated with the respective tag; and for each portion of the content, determining, based on the layout of the environment and the at least one 3D placement requirement selected for the respective portion of the content, a location in the environment for virtual placement of the respective portion of the content.

Some disclosed embodiments may include systems, methods and non-transitory computer readable media for facilitating presentation content in a three dimensional (3D) environment. These embodiments may involve receiving an indication of device settings of an extended reality appliance; receiving an indication of content requested for presentation via the extended reality appliance; based on the received indication of the device settings, selecting 3D placement requirements for the requested content, wherein the 3D placement requirements including at least one of: a 3D physical background, a visual span, virtual object positioning protocols, 3D anchoring requirements, 3D content size requirements, or ambient illumination requirements; transmitting the selected 3D placement requirements to the extended reality appliance; and transmitting the requested content to the extended reality appliance, the transmitted content including at least one tag for associating portions of the content with at least some of the 3D placement requirements to thereby enable the extended reality appliance to display the content in a 3D environment.

Some disclosed embodiments may include systems, methods and non-transitory computer readable media for preventing virtual collisions between virtual items. These embodiments may involve presenting, via an extended reality appliance, a first virtual object docked to a first movable physical object; presenting, via the extended reality appliance, a second virtual object docked to a second movable physical object; tracking movement of the first physical object and movement of the second physical object; determining, based on the tracked movement of the first physical object and the second physical object, an impending collision between the first virtual object and the second virtual object; accessing priority rules establishing that the first physical object has priority over the second physical object; and based on the priority rules, at a time of the impending collision between the first virtual object and the second virtual object, favoring the first virtual object over the second virtual object.

Some disclosed embodiments may include systems, methods and non-transitory computer readable media for presenting location-based content. These embodiments may involve obtaining an indication of a current physical location of an extended reality appliance; providing the indication to a first server that maps physical locations to a plurality content addresses; receiving from the first server, at least one specific content address associated with the current physical location; using the at least one specific content address to access a second server; receiving content, associated with the current physical location, from the second server; and presenting the content via the extended reality appliance, while the extended reality appliance is in the current physical location.

Some disclosed embodiments may include systems, methods and non-transitory computer readable media for customizing location-based content presentation. These embodiments may involve accessing a group of content display mode rules, each content display mode rule in the group of content display mode rules specifying a format impacting 3D presentation; accessing stored selections unique to a wearer of a wearable extended reality appliance, the stored selections associating a first content display mode rule with a first physical location and a second content display mode rule with a second physical location; receiving at a first time, a first indication that the wearable extended reality appliance is at the first physical location; based on the received first indication and the accessed stored selections, causing the wearable extended reality appliance to display first location-based content at the first physical location according to the first content display mode rule; receiving at a second time after the first time, a second indication that the wearable extended reality appliance is at the second physical location; and based on the received second indication and the accessed stored selections, causing the wearable extended reality appliance to display second location-based content at the second physical location according to the second content display mode rule.

Some disclosed embodiments may include systems, methods and non-transitory computer readable media for content localization in moving vehicles. These embodiments may involve receiving, from within a moving vehicle, first acceleration data captured using a first sensor included in a wearable extended reality appliance mountable on a head of a wearer, wherein the first acceleration data includes a first component associated with movement of the head of the wearer with respect to the vehicle and a second component associated with movement of the vehicle; receiving, from within the moving vehicle, second acceleration data captured using a second sensor included in a personal input device, wherein the personal input device is a non-vehicle component configured to be paired with the wearable extended reality appliance; and using the first acceleration data and the second acceleration data to segregate the second component from the first component, thereby isolating the head acceleration with respect to the vehicle from the vehicle acceleration.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of the main components of the example extended reality system of FIG. 1, consistent with some embodiments of the present disclosure.

FIG. 19 illustrates a flowchart of an example process for presenting location-based content, consistent with embodiments of the present disclosure.

FIGS. 20A and 20B illustrate differing configurations of an exemplary system for customizing location-based content presentation, consistent with embodiments of the present disclosure.

DETAILED DESCRIPTION

Figure 1:
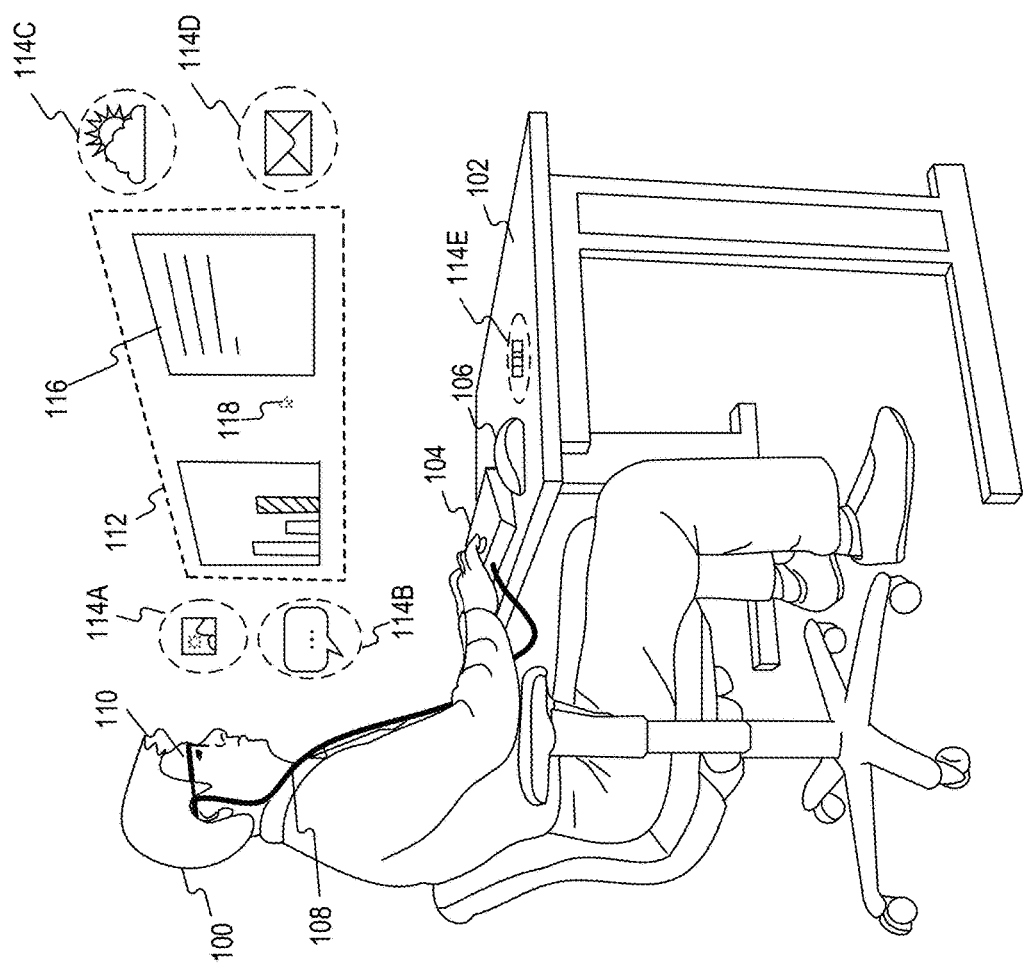
FIG. 1 is a schematic illustration of a user, using an example extended reality system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Moreover, various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

The present disclosure is directed to systems and methods for providing users an extended reality environment. The term "extended reality environment," which may also be referred to as "extended reality," "extended reality space," or "extended environment," refers to all types of real- and-virtual combined environments and human-machine interactions at least partially generated by computer technology. The extended reality environment may be a completely simulated virtual environment or a combined real- and-virtual environment that a user may perceive from different perspectives. In some examples, the user may interact with elements of the extended reality environment. One non-limiting example of an extended reality environment may be a virtual reality environment, also known as "virtual reality" or a "virtual environment." An immersive virtual reality environment may be a simulated non-physical environment which provides to the user the perception of being present in the virtual environment. Another non-limiting example of an extended reality environment may be an augmented reality environment, also known as "augmented reality" or "augmented environment." An augmented reality environment may involve live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both augmented reality environments and mixed reality environments may include a combination of real and virtual worlds, real-time interactions, and accurate 3D registration of virtual and real objects. In some examples, both augmented reality environment and mixed reality environments may include constructive overlaid sensory information that may be added to the physical environment. In other examples, both augmented reality environment and mixed reality environments may include destructive virtual content that may mask at least part of the physical environment.

In some embodiments, the systems and methods may provide the extended reality environment using an extended reality appliance. The term extended reality appliance may include any type of device or system that enables a user to perceive and/or interact with an extended reality environment. The extended reality appliance may enable the user to perceive and/or interact with an extended reality environment through one or more sensory modalities. Some non-limiting examples of such sensory modalities may include visual, auditory, haptic, somatosensory, and olfactory. One example of the extended reality appliance is a virtual reality appliance that enables the user to perceive and/or interact with a virtual reality environment. Another example of the extended reality appliance is an augmented reality appliance that enables the user to perceive and/or interact with an augmented reality environment. Yet another example of the extended reality appliance is a mixed reality appliance that enables the user to perceive and/or interact with a mixed reality environment.

Consistent with one aspect of the disclosure, the extended reality appliance may be a wearable device, such as a head-mounted device, for example, smart glasses, smart contact lens, headsets or any other device worn by a human for purposes of presenting an extended reality to the human. Other extended reality appliances may include holographic projector or any other device or system capable of providing an augmented reality (AR), virtual reality (VR), mixed reality (MR), or any immersive experience. Typical components of wearable extended reality appliances may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality appliance may be a non-wearable extended reality appliance. Specifically, the non-wearable extended reality appliance may include multi-projected environment appliances. In some embodiments, an extended reality appliance may be configured to change the viewing perspective of the extended reality environment in response to movements of the user and in response to head movements of the user in particular. In one example, a wearable extended reality appliance may change the field-of-view of the extended reality environment in response to a change of the head pose of the user, such as by changing the spatial orientation without changing the spatial position of the user in the extended reality environment. In another example, a non-wearable extended reality appliance may change the spatial position of the user in the extended reality environment in response to a change in the position of the user in the real world, for example, by changing the spatial position of the user in the extended reality environment without changing the direction of the field-of-view with respect to the spatial position.

According to some embodiments, an extended reality appliance may include a digital communication device configured to at least one of: receive virtual content data configured to enable a presentation of the virtual content, transmit virtual content for sharing with at least one external device, receive contextual data from at least one external device, transmit contextual data to at least one external device, transmit usage data indicative of usage of the extended reality appliance, and transmit data based on information captured using at least one sensor included in the extended reality appliance. In additional embodiments, the extended reality appliance may include memory for storing at least one of virtual data configured to enable a presentation of virtual content, contextual data, usage data indicative of usage of the extended reality appliance, sensor data based on information captured using at least one sensor included in the extended reality appliance, software instructions configured to cause a processing device to present the virtual content, software instructions configured to cause a processing device to collect and analyze the contextual data, software instructions configured to cause a processing device to collect and analyze the usage data, and software instructions configured to cause a processing device to collect and analyze the sensor data. In additional embodiments, the extended reality appliance may include a processing device configured to perform at least one of rendering of virtual content, collecting and analyzing contextual data, collecting and analyzing usage data, and collecting and analyzing sensor data. In additional embodiments, the extended reality appliance may include one or more sensors. The one or more sensors may include one or more image sensors (e.g., configured to capture images and/or videos of a user of the appliance or of an environment of the user), one or more motion sensors (such as an accelerometer, a gyroscope, a magnetometer, etc.), one or more positioning sensors (such as GPS, outdoor positioning sensor, indoor positioning sensor, etc.), one or more temperature sensors (e.g., configured to measure the temperature of at least part of the appliance and/or of the environment), one or more contact sensors, one or more proximity sensors (e.g., configured to detect whether the appliance is currently worn), one or more electrical impedance sensors (e.g., configured to measure electrical impedance of the user), one or more eye tracking sensors, such as gaze detectors, optical trackers, electric potential trackers (e.g., electrooculogram (EOG) sensors), video-based eye-trackers, infra-red/near infra-red sensors, passive light sensors, or any other technology capable of determining where a human is looking or gazing.

In some embodiments, the systems and methods may use an input device to interact with the extended reality appliance. The term input device may include any physical device configured to receive input from a user or an environment of the user, and to provide the data to a computational device. The data provided to the computational device may be in a digital format and/or in an analog format. In one embodiment, the input device may store the input received from the user in a memory device accessible by a processing device, and the processing device may access the stored data for analysis. In another embodiment, the input device may provide the data directly to a processing device, for example, over a bus or over another communication system configured to transfer data from the input device to the processing device. In some examples, the input received by the input device may include key presses, tactile input data, motion data, position data, gestures based input data, direction data, or any other data for supply for computation. Some examples of the input device may include a button, a key, a keyboard, a computer mouse, a touchpad, a touchscreen, a joystick, or another mechanism from which input may be received. Another example of an input device may include an integrated computational interface device that includes at least one physical component for receiving input from a user. The integrated computational interface device may include at least a memory, a processing device, and the at least one physical component for receiving input from a user. In one example, the integrated computational interface device may further include a digital network interface that enables digital communication with other computing devices. In one example, the integrated computational interface device may further include a physical component for outputting information to the user. In some examples, all components of the integrated computational interface device may be included in a single housing, while in other examples the components may be distributed among two or more housings. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs.

In some embodiments, image data may be captured using one or more image sensors. In some examples, the image sensors may be included in the extended reality appliance, in a wearable device, in the wearable extended reality device, in the input device, in an environment of a user, and so forth. In some examples, the image data may be read from memory, may be received from an external device, may be generated (for example, using a generative model), and so forth. Some non-limiting examples of image data may include images, grayscale images, color images, 2D images, 3D images, videos, 2D videos, 3D videos, frames, footages, data derived from other image data, and so forth. In some examples, the image data may be encoded in any analog or digital format. Some non-limiting examples of such formats may include raw formats, compressed formats, uncompressed formats, lossy formats, lossless formats, JPEG, GIF, PNG, TIFF, BMP, NTSC, PAL, SECAM, MPEG, MPEG-4 Part 14, MOV, WMV, FLV, AVI, AVCHD, WebM, MKV, and so forth.

In some embodiments, the extended reality appliance may receive digital signals, for example, from the input device. The term digital signals refers to a series of digital values that are discrete in time. The digital signals may represent, for example, sensor data, textual data, voice data, video data, virtual data, or any other form of data that provides perceptible information. Consistent with the present disclosure, the digital signals may be configured to cause the extended reality appliance to present virtual content. In one embodiment, the virtual content may be presented in a selected orientation. In this embodiment, the digital signals may indicate a position and an angle of a viewpoint in an environment, such as an extended reality environment. Specifically, the digital signals may include an encoding of the position and angle in six degree-of-freedom coordinates (e.g., forward/back, up/down, left/right, yaw, pitch, and roll). In another embodiment, the digital signals may include an encoding of the position as three-dimensional coordinates (e.g., x, y, and z), and an encoding of the angle as a vector originating from the encoded position. Specifically, the digital signals may indicate the orientation and an angle of the presented virtual content in absolute coordinates of the environment, for example, by encoding yaw, pitch and roll of the virtual content with respect to a standard default angle. In another embodiment, the digital signals may indicate the orientation and the angle of the presented virtual content with respect to a viewpoint of another object (e.g., a virtual object, a physical object, etc.), for example, by encoding yaw, pitch, and roll of the virtual content with respect a direction corresponding to the viewpoint or to a direction corresponding to the other object. In another embodiment, such digital signals may include one or more projections of the virtual content, for example, in a format ready for presentation (e.g., image, video, etc.). For example, each such projection may correspond to a particular orientation or a particular angle. In another embodiment, the digital signals may include a representation of virtual content, for example, by encoding objects in a three-dimensional array of voxels, in a polygon mesh, or in any other format in which virtual content may be presented.

In some embodiments, the digital signals may be configured to cause the extended reality appliance to present virtual content. The term virtual content may include any type of data representation that may be displayed by the extended reality appliance to the user. The virtual content may include a virtual object, inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual promotion content, a virtual representation of a physical object, a virtual representation of a physical environment, a virtual document, a virtual character or persona, a virtual computer screen, a virtual widget, or any other format for displaying information virtually. Consistent with the present disclosure, the virtual content may include any visual presentation rendered by a computer or a processing device. In one embodiment, the virtual content may include a virtual object that is a visual presentation rendered by a computer in a confined region and configured to represent an object of a particular type (such as an inanimate virtual object, an animate virtual object, virtual furniture, a virtual decorative object, virtual widget, or other virtual represen-tation). The rendered visual presentation may change to reflect changes to a status object or changes in the viewing angle of the object, for example, in a way that mimics changes in the appearance of physical objects. In another embodiment, the virtual content may include a virtual display (also referred to as a "virtual display screen" or a "virtual screen" herein), such as a virtual computer screen, a virtual tablet screen or a virtual smartphone screen, configured to display information generated by an operating system, in which the operating system may be configured to receive textual data from a physical keyboard and/or a virtual keyboard and to cause a display of the textual content in the virtual display screen. In one example, illustrated in FIG. 1, the virtual content may include a virtual environment that includes a virtual computer screen and a plurality of virtual objects. In some examples, a virtual display may be a virtual object mimicking and/or extending the functionality of a physical display screen. For example, the virtual display may be presented in an extended reality environment (such as a mixed reality environment, an augmented reality environment, a virtual reality environment, etc.), using an extended reality appliance. In one example, a virtual display may present content produced by a regular operating system that may be equally presented on a physical display screen. In one example, a textual content entered using a keyboard (for example, using a physical keyboard, using a virtual keyboard, etc.) may be presented on a virtual display in real time as the textual content is typed. In one example, a virtual cursor may be presented on a virtual display, and the virtual cursor may be controlled by a pointing device (such as a physical pointing device, a virtual pointing device, a computer mouse, a joystick, a touchpad, a physical touch controller, and so forth). In one example, one or more windows of a graphical user interface operating system may be presented on a virtual display. In another example, content presented on a virtual display may be interactive, that is, it may change in reaction to actions of users. In yet another example, a presentation of a virtual display may include a presentation of a screen frame, or may include no presentation of a screen frame.

Some disclosed embodiments may include and/or access a data structure or a database. The terms data structure and a database, consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, the multiple servers may be owned or operated by the same or different entities. Thus, the term "data structure" as used herein in the singular is inclusive of plural data structures.

In some embodiments, the system may determine the confidence level in received input or in any determined value. The term confidence level refers to any indication, numeric or otherwise, of a level (e.g., within a predetermined range) indicative of an amount of confidence the system has at determined data. For example, the confidence level may have a value between 1 and 10. Alternatively, the confidence level may be expressed as a percentage or any other numerical or non-numerical indication. In some cases, the system may compare the confidence level to a threshold. The term threshold may denote a reference value, a level, a point, or a range of values. In operation, when the confidence level of determined data exceeds the threshold (or is below it, depending on a particular use case), the system may follow a first course of action and, when the confidence level is below it (or above it, depending on a particular use case), the system may follow a second course of action. The value of the threshold may be predetermined for each type of examined object or may be dynamically selected based on different considerations.

System Overview

Reference is now made to FIG. 1, which illustrates a user that uses an example extended reality system consistent with embodiments of the present disclosure FIG. 1 is an exemplary representation of just one embodiment, and it is to be understood that some illustrated elements might be omitted and others added within the scope of this disclosure. As shown, a user 100 is sitting behind table 102, supporting a keyboard 104 and mouse 106. Keyboard 104 is connected by wire 108 to a wearable extended reality appliance 110 that displays virtual content to user 100. Alternatively or additionally to wire 108, keyboard 104 may connect to wearable extended reality appliance 110 wirelessly. For illustration purposes, the wearable extended reality appliance is depicted a pair of smart glasses, but, as described above, wearable extended reality appliance 110 may be any type of head-mounted device used for presenting an extended reality to user 100. The virtual content displayed by wearable extended reality appliance 110 includes a virtual screen 112 (also referred to as a "virtual display screen" or a "virtual display" herein) and a plurality of virtual widgets 114. Virtual widgets 114A-114D are displayed next to virtual screen 112 and virtual widget 114E is displayed on table 102. User 100 may input text to a document 116 displayed in virtual screen 112 using keyboard 104; and may control virtual cursor 118 using mouse 106. In one example, virtual cursor 118 may move anywhere within virtual screen 112. In another example, virtual cursor 118 may move anywhere within virtual screen 112 and may also move to any one of virtual widgets 114A-114D but not to virtual widget 114E. In yet another example, virtual cursor 118 may move anywhere within virtual screen 112 and may also move to any one of virtual widgets 114A-114E. In an additional example, virtual cursor 118 may move anywhere in the extended reality environment including virtual screen 112 and virtual widgets 114A-114E. In yet another example, virtual cursor may move on all available surfaces (i.e., virtual surfaces or physical surfaces) or only on selected surfaces in the extended reality environment. Alternatively or additionally, user 100 may interact with any one of virtual widgets 114A-114E, or with selected virtual widgets, using hand gestures recognized by wearable extended reality appliance 110. For example, virtual widget 114E may be an interactive widget (e.g., a virtual slider controller) that may be operated with hand gestures.

FIG. 2 illustrates an example of a system 200 that provides extended reality (XR) experience to users, such as user 100. FIG. 2 is an exemplary representation of just one embodiment, and it is to be understood that some illustrated elements might be omitted and others added within the scope of this disclosure. System 200 may be computer-based and may include computer system components, wearable appliances, workstations, tablets, handheld computing devices, memory devices, and/or internal network(s) connecting the components. System 200 may include or be connected to various network computing resources (e.g., servers, routers, switches, network connections, storage devices, etc.) for supporting services provided by system 200. Consistent with the present disclosure, system 200 may include an input unit 202, an XR unit 204, a mobile communications device 206, and a remote processing unit 208. Remote processing unit 208 may include a server 210 coupled to one or more physical or virtual storage devices, such as a data structure 212. System 200 may also include or be connected to a communications network 214 that facilitates communications and data exchange between different system components and the different entities associated with system 200.

Consistent with the present disclosure, input unit 202 may include one or more devices that may receive input from user 100. In one embodiment, input unit 202 may include a textual input device, such as keyboard 104. The textual input device may include all possible types of devices and mechanisms for inputting textual information to system 200. Examples of textual input devices may include mechanical keyboards, membrane keyboards, flexible keyboards, QWERTY keyboards, Dvorak keyboards, Colemak keyboards, chorded keyboards, wireless keyboards, keypads, key-based control panels, or other arrays of control keys, vision input devices, or any other mechanism for inputting text, whether the mechanism is provided in physical form or is presented virtually. In one embodiment, input unit 202 may also include a pointing input device, such as mouse 106. The pointing input device may include all possible types of devices and mechanisms for inputting two-dimensional or three-dimensional information to system 200. In one example, two-dimensional input from the pointing input device may be used for interacting with virtual content presented via the XR unit 204. Examples of pointing input devices may include a computer mouse, trackball, touchpad, trackpad, touchscreen, joystick, pointing stick, stylus, light pen, or any other physical or virtual input mechanism. In one embodiment, input unit 202 may also include a graphical input device, such as a touchscreen configured to detect contact, movement, or break of movement. The graphical input device may use any of a plurality of touch sensitivity technologies, including, but not limited to, capacitive, resistive, infrared, and surface acoustic wave technologies as well as other proximity sensor arrays or other elements for determining one or more points of contact. In one embodiment, input unit 202 may also include one or more voice input devices, such as a microphone. The voice input device may include all possible types of devices and mechanisms for inputting voice data to facilitate voice-enabled functions, such as voice recognition, voice replication, digital recording, and telephony functions. In one embodiment, input unit 202 may also include one or more image input devices, such as an image sensor, configured to capture image data. In one embodiment, input unit 202 may also include one or more haptic gloves configured to capture hands motion and pose data. In one embodiment, input unit 202 may also include one or more proximity sensors configured to detect presence and/or movement of objects in a selected region near the sensors.

In accordance with some embodiments, the system may include at least one sensor configured to detect and/or measure a property associated with the user, the user's action, or user's environment. One example of the at least one sensor, is sensor 216 included in input unit 202. Sensor 216 may be a motion sensor, a touch sensor, a light sensor, an infrared sensor, an audio sensor, an image sensor, a proximity sensor, a positioning sensor, a gyroscope, a temperature sensor, a biometric sensor, or any other sensing devices to facilitate related functionalities. Sensor 216 may be integrated with, or connected to, the input devices or it may be separated from the input devices. In one example, a thermometer may be included in mouse 106 to determine the body temperature of user 100. In another example, a positioning sensor may be integrated with keyboard 104 to determine movement of user 100 relative to keyboard 104. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, image based positioning technology, indoor positioning technology, outdoor positioning technology, or any other positioning technology.

In accordance with some embodiments, the system may include one or more sensors for identifying a position and/or a movement of a physical device (such as a physical input device, a physical computing device, keyboard 104, mouse 106, wearable extended reality appliance 110, and so forth). The one or more sensors may be included in the physical device or may be external to the physical device. In some examples, an image sensor external to the physical device (for example, an image sensor included in another physical device) may be used to capture image data of the physical device, and the image data may be analyzed to identify the position and/or the movement of the physical device. For example, the image data may be analyzed using a visual object tracking algorithm to identify the movement of the physical device, may be analyzed using a visual object detection algorithm to identify the position of the physical device (for example, relative to the image sensor, in a global coordinates system, etc.), and so forth. In some examples, an image sensor included in the physical device may be used to capture image data, and the image data may be analyzed to identify the position and/or the movement of the physical device. For example, the image data may be analyzed using visual odometry algorithms to identify the position of the physical device, may be analyzed using an egomotion algorithm to identify movement of the physical device, and so forth. In some examples, a positioning sensor, such as an indoor positioning sensor or an outdoor positioning sensor, may be included in the physical device and may be used to determine the position of the physical device. In some examples, a motion sensor, such as an accelerometer or a gyroscope, may be included in the physical device and may be used to determine the motion of the physical device. In some examples, a physical device, such as a keyboard or a mouse, may be configured to be positioned on a physical surface. Such physical device may include an optical mouse sensor (also known as non-mechanical tracking engine) aimed towards the physical surface, and the output of the optical mouse sensor may be analyzed to determine movement of the physical device with respect to the physical surface.

Consistent with the present disclosure, XR unit 204 may include a wearable extended reality appliance configured to present virtual content to user 100. One example of the wearable extended reality appliance is wearable extended reality appliance 110. Additional examples of wearable extended reality appliance may include a Virtual Reality (VR) device, an Augmented Reality (AR) device, a Mixed Reality (MR) device, or any other device capable of generating extended reality content. Some non-limiting examples of such devices may include Nreal Light, Magic Leap One, Varjo, Quest ½, Vive, and others. In some embodiments, XR unit 204 may present virtual content to user 100. Generally, an extended reality appliance may include all real- and virtual combined environments and human-machine interactions generated by computer technology and wearables. As mentioned above, the term "extended reality" (XR) refers to a superset which includes the entire spectrum from "the complete real" to "the complete virtual." It includes representative forms such as augmented reality (AR), mixed reality (MR), virtual reality (VR), and the areas interpolated among them. Accordingly, it is noted that the terms "XR appliance," "AR appliance," "VR appliance," and "MR appliance" may be used interchangeably herein and may refer to any device of the variety of appliances listed above.

Consistent with the present disclosure, the system may exchange data with a variety of communication devices associated with users, for example, mobile communications device 206. The term "communication device" is intended to include all possible types of devices capable of exchanging data using digital communications network, analog communication network or any other communications network configured to convey data. In some examples, the communication device may include a smartphone, a tablet, a smartwatch, a personal digital assistant, a desktop computer, a laptop computer, an IoT device, a dedicated terminal, a wearable communication device, and any other device that enables data communications. In some cases, mobile communications device 206 may supplement or replace input unit 202. Specifically, mobile communications device 206 may be associated with a physical touch controller that may function as a pointing input device. Moreover, mobile communications device 206 may also, for example, be used to implement a virtual keyboard and replace the textual input device. For example, when user 100 steps away from table 102 and walks to the break room with his smart glasses, he may receive an email that requires a quick answer. In this case, the user may select to use his or her own smartwatch as the input device and to type the answer to the email while it is virtually presented by the smart glasses.

Consistent with the present disclosure, embodiments of the system may involve the usage of a cloud server. The term "cloud server" refers to a computer platform that provides services via a network, such as the Internet. In the example embodiment illustrated in FIG. 2, server 210 may use virtual machines that may not correspond to individual hardware. For example, computational and/or storage capabilities may be implemented by allocating appropriate portions of desirable computation/storage power from a scalable repository, such as a data center or a distributed computing environment. Specifically, in one embodiment, remote processing unit 208 may be used together with XR unit 204 to provide the virtual content to user 100. In one example configuration, server 210 may be a cloud server that functions as the operation system (OS) of the wearable extended reality appliance. In one example, server 210 may implement the methods described herein using customized hard-wired logic, one or more Application Specific Integrated Circuits (ASICs), Field Programmable Gate Arrays (FPGAs), firmware, and/or program logic which, in combination with the computer system, cause server 210 to be a special-purpose machine.

In some embodiments, server 210 may access data structure 212 to determine, for example, virtual content to display user 100. Data structure 212 may utilize a volatile or nonvolatile, magnetic, semiconductor, tape, optical, removable, non-removable, other type of storage device or tangible or non-transitory computer-readable medium, or any medium or mechanism for storing information. Data structure 212 may be part of server 210 or separate from server 210, as shown. When data structure 212 is not part of server 210, server 210 may exchange data with data structure 212 via a communication link. Data structure 212 may include one or more memory devices that store data and instructions used to perform one or more features of the disclosed methods. In one embodiment, data structure 212 may include any of a plurality of suitable data structures, ranging from small data structures hosted on a workstation to large data structures distributed among data centers. Data structure 212 may also include any combination of one or more data structures controlled by memory controller devices (e.g., servers) or software.

Consistent with the present disclosure, communications network or simply network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

The components and arrangements of system 200 shown in FIG. 2 are intended to be exemplary only and are not intended to limit the disclosed embodiments, as the system components used to implement the disclosed processes and features may vary.

Figure 3:
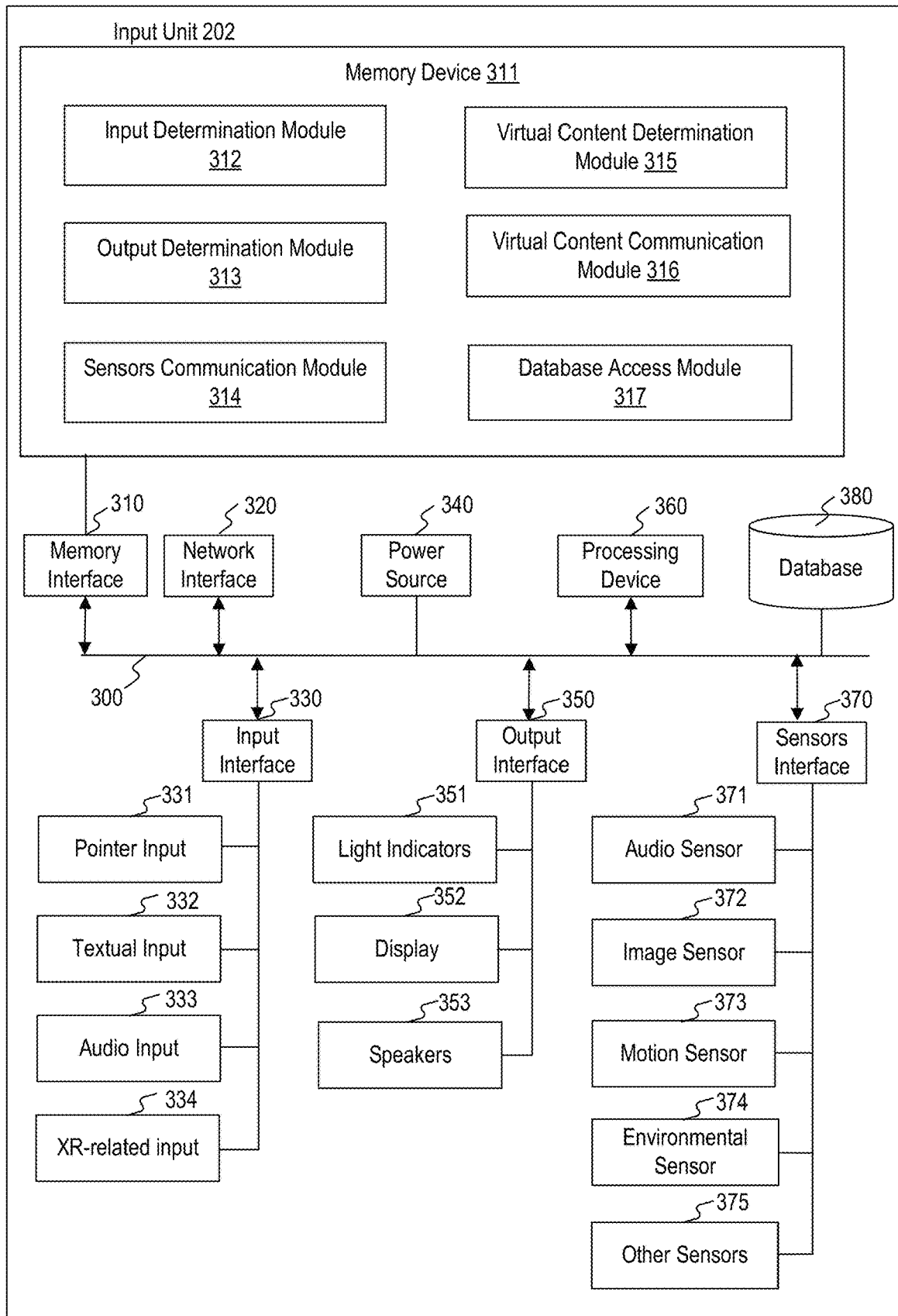
FIG. 3 is a block diagram illustrating some of the components of an input unit, consistent with some embodiments of the present disclosure.

FIG. 3 is a block diagram of an exemplary configuration of input unit 202. FIG. 3 is an exemplary representation of just one embodiment, and it is to be understood that some illustrated elements might be omitted and others added within the scope of this disclosure. In the embodiment of FIG. 3, input unit 202 may directly or indirectly access a bus 300 (or other communication mechanism) that interconnects subsystems and components for transferring information within input unit 202. For example, bus 300 may interconnect a memory interface 310, a network interface 320, an input interface 330, a power source 340, an output interface 350, a processing device 360, a sensors interface 370, and a database 380.

Memory interface 310, shown in FIG. 3, may be used to access a software product and/or data stored on a non-transitory computer-readable medium. As used herein, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals.

In the specific embodiment illustrated in FIG. 3, memory interface 310 may be used to access a software product and/or data stored on a memory device, such as memory device 311. Memory device 311 may include high-speed random-access memory and/or non-volatile memory, such as one or more magnetic disk storage devices, one or more optical storage devices, and/or flash memory (e.g., NAND, NOR). Consistent with the present disclosure, the components of memory device 311 may be distributed in more than units of system 200 and/or in more than one memory device.

Memory device 311, shown in FIG. 3, may contain software modules to execute processes consistent with the present disclosure. In particular, memory device 311 may include an input determination module 312, an output determination module 313, a sensors communication module 314, a virtual content determination module 315, a virtual content communication module 316, and a database access module 317. Modules 312-317 may contain software instructions for execution by at least one processor (e.g., processing device 360) associated with input unit 202. Input determination module 312, output determination module 313, sensors communication module 314, virtual content determination module 315, virtual content communication module 316, and database access module 317 may cooperate to perform various operations. For example, input determination module 312 may determine text using data received from, for example, keyboard 104. Thereafter, output determination module 313 may cause presentation of the recent inputted text, for example on a dedicated display 352 physically or wirelessly coupled to keyboard 104. This way, when user 100 types, he can see a preview of the typed text without constantly moving his head up and down to look at virtual screen 112. Sensors communication module 314 may receive data from different sensors to determine a status of user 100. Thereafter, virtual content determination module 315 may determine the virtual content to display, based on received input and the determined status of user 100. For example, the determined virtual content may be a virtual presentation of the recent inputted text on a virtual screen virtually located adjacent to keyboard 104. Virtual content communication module 316 may obtain virtual content that is not determined by virtual content determination module 315 (e.g., an avatar of another user). The retrieval of the virtual content may be from database 380, from remote processing unit 208, or any other source.

In some embodiments, input determination module 312 may regulate the operation of input interface 330 in order to receive pointer input 331, textual input 332, audio input 333, and XR-related input 334. Details on the pointer input, the textual input, and the audio input are described above. The term "XR-related input" may include any type of data that may cause a change in the virtual content displayed to user 100. In one embodiment, XR-related input 334 may include image data of user 100, a wearable extended reality appliance (e.g., detected hand gestures of user 100). In another embodiment, XR-related input 334 may include wireless communication indicating a presence of another user in proximity to user 100. Consistent with the present disclosure, input determination module 312 may concurrently receive different types of input data. Thereafter, input determination module 312 may further apply different rules based on the detected type of input. For example, a pointer input may have precedence over voice input.

In some embodiments, output determination module 313 may regulate the operation of output interface 350 in order to generate output using light indicators 351, display 352, and/or speakers 353. In general, the output generated by output determination module 313 does not include virtual content to be presented by a wearable extended reality appliance. Instead, the output generated by output determination module 313 include various outputs that relates to the operation of input unit 202 and/or the operation of XR unit 204. In one embodiment, light indicators 351 may include a light indicator that shows the status of a wearable extended reality appliance. For example, the light indicator may display green light when wearable extended reality appliance 110 is connected to keyboard 104, and blinks when wearable extended reality appliance 110 has low battery. In another embodiment, display 352 may be used to display operational information. For example, the display may present error messages when the wearable extended reality appliance is inoperable. In another embodiment, speakers 353 may be used to output audio, for example, when user 100 wishes to play some music for other users.

In some embodiments, sensors communication module 314 may regulate the operation of sensors interface 370 in order to receive sensor data from one or more sensors, integrated with, or connected to, an input device. The one or more sensors may include: audio sensor 371, image sensor 372, motion sensor 373, environmental sensor 374 (e.g., a temperature sensor, ambient light detectors, etc.), and other sensors 375. In one embodiment, the data received from sensors communication module 314 may be used to determine the physical orientation of the input device. The physical orientation of the input device may be indicative of a state of the user and may be determined based on combination of a tilt movement, a roll movement, and a lateral movement. Thereafter, the physical orientation of the input device may be used by virtual content determination module 315 to modify display parameters of the virtual content to match the state of the user (e.g., attention, sleepy, active, sitting, standing, leaning backwards, leaning forward, walking, moving, riding, etc.).

In some embodiments, virtual content determination module 315 may determine the virtual content to be displayed by the wearable extended reality appliance. The virtual content may be determined based on data from input determination module 312, sensors communication module 314, and other sources (e.g., database 380). In some embodiments, determining the virtual content may include determining the distance, the size, and the orientation of the virtual objects. The determination of the position of the virtual objects may be determined based on the type of the virtual objects. Specifically, with regards to the example illustrated in FIG. 1, the virtual content determination module 315 may determine to place four virtual widgets 114A-114D on the sides of virtual screen 112 and to place virtual widget 114E on table 102 because virtual widget 114E is a virtual controller (e.g., volume bar). The determination of the position of the virtual objects may further be determined based on user's preferences. For example, for left-handed users, virtual content determination module 315 may determine placing a virtual volume bar left of keyboard 104; and for right-handed users, virtual content determination module 315 may determine placing the virtual volume bar right of keyboard 104.

In some embodiments, virtual content communication module 316 may regulate the operation of network interface 320 in order to obtain data from one or more sources to be presented as virtual content to user 100. The one or more sources may include other XR units 204, the user's mobile communications device 206, remote processing unit 208, publicly available information, etc. In one embodiment, virtual content communication module 316 may communicate with mobile communications device 206 in order to provide a virtual representation of mobile communications device 206. For example, the virtual representation may enable user 100 to read messages and interact with applications installed on the mobile communications device 206. Virtual content communication module 316 may also regulate the operation of network interface 320 in order to share virtual content with other users. In one example, virtual content communication module 316 may use data from input determination module to identify a trigger (e.g., the trigger may include a gesture of the user) and to transfer content from the virtual display to a physical display (e.g., TV) or to a virtual display of a different user.

In some embodiments, database access module 317 may cooperate with database 380 to retrieve stored data. The retrieved data may include, for example, privacy levels associated with different virtual objects, the relationship between virtual objects and physical objects, the user's preferences, the user's past behavior, and more. As described above, virtual content determination module 315 may use the data stored in database 380 to determine the virtual content. Database 380 may include separate databases, including, for example, a vector database, raster database, tile database, viewport database, and/or a user input database. The data stored in database 380 may be received from modules 314-317 or other components of system 200. Moreover, the data stored in database 380 may be provided as input using data entry, data transfer, or data uploading.

Modules 312-317 may be implemented in software, hardware, firmware, a mix of any of those, or the like. In some embodiments, any one or more of modules 312-317 and data associated with database 380 may be stored in XR unit 204, mobile communications device 206, or remote processing unit 208. Processing devices of system 200 may be configured to execute the instructions of modules 312-317. In some embodiments, aspects of modules 312-317 may be implemented in hardware, in software (including in one or more signal processing and/or application specific integrated circuits), in firmware, or in any combination thereof, executable by one or more processors, alone, or in various combinations with each other. Specifically, modules 312-317 may be configured to interact with each other and/or other modules of system 200 to perform functions consistent with disclosed embodiments. For example, input unit 202 may execute instructions that include an image processing algorithm on data from XR unit 204 to determine head movement of user 100. Furthermore, each functionality described throughout the specification, with regards to input unit 202 or with regards to a component of input unit 202, may correspond to a set of instructions for performing said functionality. These instructions need not be implemented as separate software programs, procedures, or modules. Memory device 311 may include additional modules and instructions or fewer modules and instructions. For example, memory device 311 may store an operating system, such as ANDROID, iOS, UNIX, OSX, WINDOWS, DARWIN, RTXC, LINUX, or an embedded operating system such as VXWorkS. The operating system can include instructions for handling basic system services and for performing hardware-dependent tasks.

Network interface 320, shown in FIG. 3, may provide two-way data communications to a network, such as communications network 214. In one embodiment, network interface 320 may include an Integrated Services Digital Network (ISDN) card, cellular modem, satellite modem, or a modem to provide a data communication connection over the Internet. As another example, network interface 320 may include a Wireless Local Area Network (WLAN) card. In another embodiment, network interface 320 may include an Ethernet port connected to radio frequency receivers and transmitters and/or optical (e.g., infrared) receivers and transmitters. The specific design and implementation of network interface 320 may depend on the communications network or networks over which input unit 202 is intended to operate. For example, in some embodiments, input unit 202 may include network interface 320 designed to operate over a GSM network, a GPRS network, an EDGE network, a Wi-Fi or WiMax network, and a Bluetooth network. In any such implementation, network interface 320 may be configured to send and receive electrical, electromagnetic, or optical signals that carry digital data streams or digital signals representing various types of information.

Input interface 330, shown in FIG. 3, may receive input from a variety of input devices, for example, a keyboard, a mouse, a touch pad, a touch screen, one or more buttons, a joystick, a microphone, an image sensor, or any other device configured to detect physical or virtual input. The received input may be in the form of at least one of: text, sounds, speech, hand gestures, body gestures, tactile information, and any other type of physically or virtually input generated by the user. In the depicted embodiment, input interface 330 may receive pointer input 331, textual input 332, audio input 333, or XR-related input 334. In additional embodiments, input interface 330 may be an integrated circuit that may act as bridge between processing device 360 and any of the input devices listed above.

Power source 340, shown in FIG. 3, may provide electrical energy to power input unit 202 and optionally also power XR unit 204. Generally, a power source included in the any device or system in the present disclosure may be any device that can repeatedly store, dispense, or convey electric power, including, but not limited to, one or more batteries (e.g., a lead-acid battery, a lithium-ion battery, a nickel-metal hydride battery, a nickel-cadmium battery), one or more capacitors, one or more connections to external power sources, one or more power convertors, or any combination of them. With reference to the example illustrated in FIG. 3, the power source may be mobile, which means that input unit 202 can be easily carried by a hand (e.g., the total weight of power source 340 may be less than a pound). The mobility of the power source enables user 100 to use input unit 202 in a variety of situations. In other embodiments, power source 340 may be associated with a connection to an external power source (such as an electrical power grid) that may be used to charge power source 340. In addition, power source 340 may be configured to charge one or more batteries included in XR unit 204; for example, a pair of extended reality glasses (e.g., wearable extended reality appliance 110) may be charged (e.g., wirelessly or not wirelessly) when they are placed on or in proximity to the input unit 202.

Output interface 350, shown in FIG. 3, may cause output from a variety of output devices, for example, using light indicators 351, display 352, and/or speakers 353. In one embodiment, output interface 350 may be an integrated circuit that may act as bridge between processing device 360 and at least one of the output devices listed above. Light indicators 351 may include one or more light sources, for example, a LED array associated with different colors. Display 352 may include a screen (e.g., LCD or dot-matrix screen) or a touch screen. Speakers 353 may include audio headphones, a hearing aid type device, a speaker, a bone conduction headphone, interfaces that provide tactile cues, vibrotactile stimulators, and more.

Processing device 360, shown in FIG. 3, may include at least one processor configured to execute computer programs, applications, methods, processes, or other software to perform embodiments described in the present disclosure. Generally, processing device 360 may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact. It is appreciated that other types of processor arrangements could be implemented to provide the capabilities disclosed herein.

Sensors interface 370, shown in FIG. 3, may obtain sensor data from a variety of sensors, for example, audio sensor 371, image sensor 372, motion sensor 373, environmental sensor 374, and other sensors 375. In one embodiment, sensors interface 370 may be an integrated circuit that may act as bridge between processing device 360 and at least one of the sensors listed above.

Audio sensor 371 may include one or more audio sensors configured to capture audio by converting sounds to digital information. Some examples of audio sensors may include: microphones, unidirectional microphones, bidirectional microphones, cardioid microphones, omnidirectional microphones, onboard microphones, wired microphones, wireless microphones, or any combination of the above. Consistent with the present disclosure, processing device 360 may modify a presentation of virtual content based on data received from audio sensor 371 (e.g., voice commands).

Image sensor 372 may include one or more image sensors configured to capture visual information by converting light to image data. Consistent with the present disclosure, an image sensor may be included in the any device or system in the present disclosure and may be any device capable of detecting and converting optical signals in the near-infrared, infrared, visible, and ultraviolet spectrums into electrical signals. Examples of image sensors may include digital cameras, phone cameras, semiconductor Charge-Coupled Devices (CCDs), active pixel sensors in Complementary Metal—Oxide—Semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. The image data acquired by image sensor 372 may be transmitted by wired or wireless transmission to any processing device of system 200. For example, the image data may be processed in order to: detect objects, detect events, detect action, detect face, detect people, recognize a known person, or any other information that may be used by system 200. Consistent with the present disclosure, processing device 360 may modify a presentation of virtual content based on image data received from image sensor 372.

Motion sensor 373 may include one or more motion sensors configured to measure motion of input unit 202 or motion of objects in the environment of input unit 202. Specifically, the motion sensors may perform at least one of the following: detect motion of objects in the environment of input unit 202, measure the velocity of objects in the environment of input unit 202, measure the acceleration of objects in the environment of input unit 202, detect the motion of input unit 202, measure the velocity of input unit 202, measure the acceleration of input unit 202, etc. In some embodiments, motion sensor 373 may include one or more accelerometers configured to detect changes in proper acceleration and/or to measure proper acceleration of input unit 202. In other embodiments, motion sensor 373 may include one or more gyroscopes configured to detect changes in the orientation of input unit 202 and/or to measure information related to the orientation of input unit 202. In other embodiments, motion sensor 373 may include one or more using image sensors, LIDAR sensors, radar sensors, or proximity sensors. For example, by analyzing captured images the processing device may determine the motion of input unit 202, for example, using ego-motion algorithms. In addition, the processing device may determine the motion of objects in the environment of input unit 202, for example, using object tracking algorithms. Consistent with the present disclosure, processing device 360 may modify a presentation of virtual content based on the determined motion of input unit 202 or the determined motion of objects in the environment of input unit 202. For example, causing a virtual display to follow the movement of input unit 202.

Environmental sensor 374 may include one or more sensors from different types configured to capture data reflective of the environment of input unit 202. In some embodiments, environmental sensor 374 may include one or more chemical sensors configured to perform at least one of the following: measure chemical properties in the environment of input unit 202, measure changes in the chemical properties in the environment of input unit 202, detect the presence of chemicals in the environment of input unit 202, and/or measure the concentration of chemicals in the environment of input unit 202. Examples of such chemical properties may include: pH level, toxicity, and/or temperature. Examples of such chemicals may include: electrolytes, particular enzymes, particular hormones, particular proteins, smoke, carbon dioxide, carbon monoxide, oxygen, ozone, hydrogen, and/or hydrogen sulfide. In other embodiments, environmental sensor 374 may include one or more temperature sensors configured to detect changes in the temperature of the environment of input unit 202 and/or to measure the temperature of the environment of input unit 202. In other embodiments, environmental sensor 374 may include one or more barometers configured to detect changes in the atmospheric pressure in the environment of input unit 202 and/or to measure the atmospheric pressure in the environment of input unit 202. In other embodiments, environmental sensor 374 may include one or more light sensors configured to detect changes in the ambient light in the environment of input unit 202. Consistent with the present disclosure, processing device 360 may modify a presentation of virtual content based on input from environmental sensor 374. For example, automatically reducing the brightness of the virtual content when the environment of user 100 becomes darker.

Other sensors 375 may include a weight sensor, a light sensor, a resistive sensor, an ultrasonic sensor, a proximity sensor, a biometric sensor, or other sensing devices to facilitate related functionalities. In a specific embodiment, other sensors 375 may include one or more positioning sensors configured to obtain positioning information of input unit 202, to detect changes in the position of input unit 202, and/or to measure the position of input unit 202. Alternatively, GPS software may permit input unit 202 to access an external GPS receiver (e.g., connecting via a serial port or Bluetooth). Consistent with the present disclosure, processing device 360 may modify a presentation of virtual content based on input from other sensors 375. For example, presenting private information only after identifying user 100 using data from a biometric sensor.

The components and arrangements shown in FIG. 3 are not intended to limit the disclosed embodiments. As will be appreciated by a person skilled in the art having the benefit of this disclosure, numerous variations and/or modifications may be made to the depicted configuration of input unit 202. For example, not all components may be essential for the operation of an input unit in all cases. Any component may be located in any appropriate part of an input unit, and the components may be rearranged into a variety of configurations while providing the functionality of the disclosed embodiments. For example, some input units may not include all of the elements as shown in input unit 202.

Figure 4:
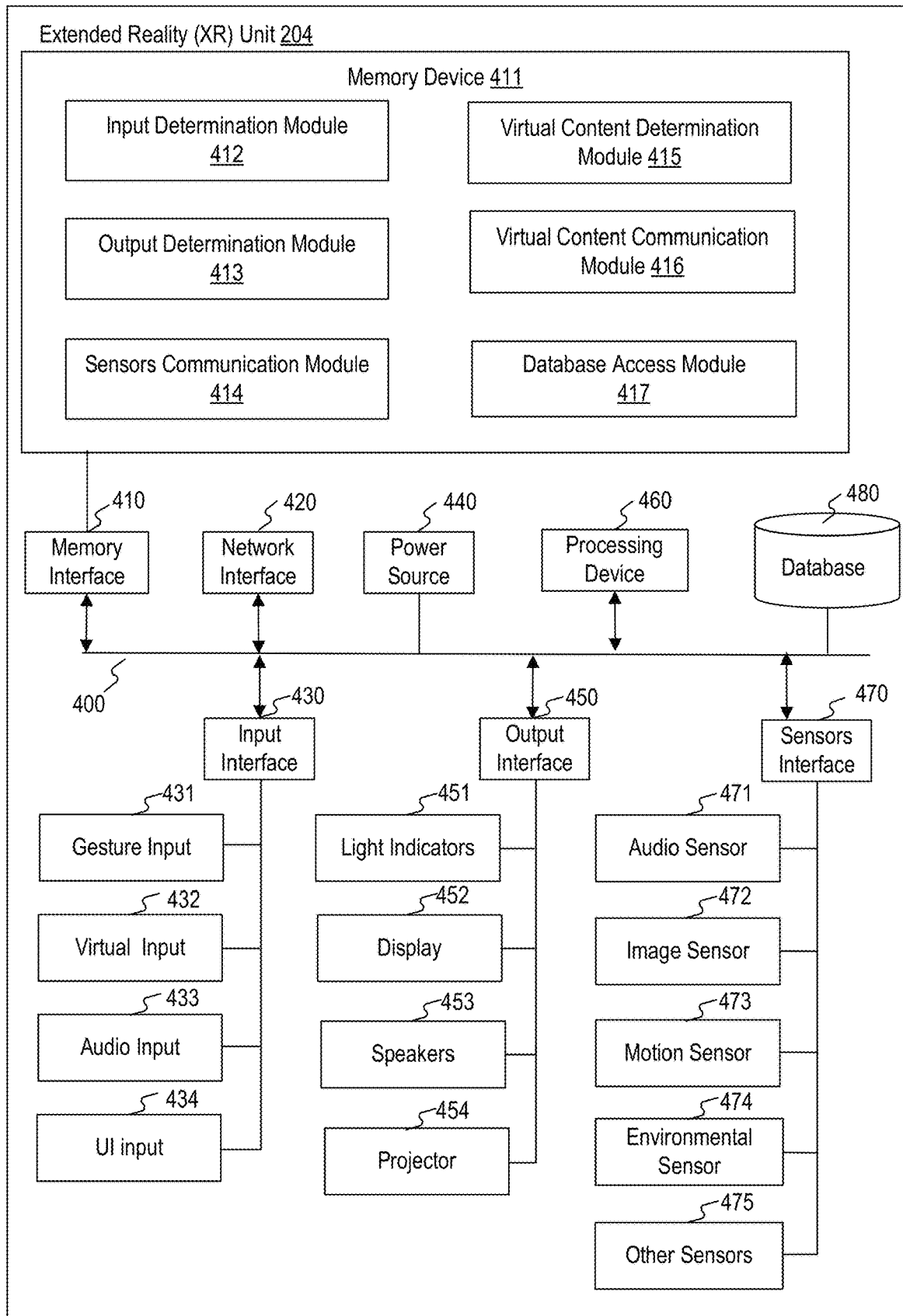
FIG. 4 is a block diagram illustrating some of the components of an extended reality unit, consistent with some embodiments of the present disclosure.

FIG. 4 is a block diagram of an exemplary configuration of XR unit 204. FIG. 4 is an exemplary representation of just one embodiment, and it is to be understood that some illustrated elements might be omitted and others added within the scope of this disclosure. In the embodiment of FIG. 4, XR unit 204 may directly or indirectly access a bus 400 (or other communication mechanism) that interconnects subsystems and components for transferring information within XR unit 204. For example, bus 400 may interconnect a memory interface 410, a network interface 420, an input interface 430, a power source 440, an output interface 450, a processing device 460, a sensors interface 470, and a database 480.

Memory interface 410, shown in FIG. 4, is assumed to have similar functionality as the functionality of memory interface 310 described above in detail. Memory interface 410 may be used to access a software product and/or data stored on a non-transitory computer-readable medium or on memory devices, such as memory device 411. Memory device 411 may contain software modules to execute processes consistent with the present disclosure. In particular, memory device 411 may include an input determination module 412, an output determination module 413, a sensors communication module 414, a virtual content determination module 415, a virtual content communication module 416, and a database access module 417. Modules 412-417 may contain software instructions for execution by at least one processor (e.g., processing device 460) associated with XR unit 204. Input determination module 412, output determination module 413, sensors communication module 414, virtual content determination module 415, virtual content communication module 416, and database access module 417 may cooperate to perform various operations. For example, input determination module 412 may determine User Interface (UI) input received from input unit 202. At the same time, sensors communication module 414 may receive data from different sensors to determine a status of user 100. Virtual content determination module 415 may determine the virtual content to display based on received input and the determined status of user 100. Virtual content communication module 416 may retrieve virtual content not determined by virtual content determination module 415. The retrieval of the virtual content may be from database 380, database 480, mobile communications device 206, or from remote processing unit 208. Based on the output of virtual content determination module 415, output determination module 413 may cause a change in a virtual content displayed to user 100 by projector 454.

In some embodiments, input determination module 412 may regulate the operation of input interface 430 in order to receive gesture input 431, virtual input 432, audio input 433, and UI input 434. Consistent with the present disclosure, input determination module 412 may concurrently receive different types of input data. In one embodiment, input determination module 412 may apply different rules based on the detected type of input. For example, gesture input may have precedence over virtual input. In some embodiments, output determination module 413 may regulate the operation of output interface 450 in order to generate output using light indicators 451, display 452, speakers 453, and projector 454. In one embodiment, light indicators 451 may include a light indicator that shows the status of the wearable extended reality appliance. For example, the light indicator may display green light when the wearable extended reality appliance 110 are connected to input unit 202, and blinks when wearable extended reality appliance 110 has low battery. In another embodiment, display 452 may be used to display operational information. In another embodiment, speakers 453 may include a bone conduction headphone used to output audio to user 100. In another embodiment, projector 454 may present virtual content to user 100.

The operations of a sensors communication module, a virtual content determination module, a virtual content communication module, and a database access module are described above with reference to FIG. 3, details of which are not repeated herein. Modules 412-417 may be implemented in software, hardware, firmware, a mix of any of those, or the like.

Network interface 420, shown in FIG. 4, is assumed to have similar functionality as the functionality of network interface 320, described above in detail. The specific design and implementation of network interface 420 may depend on the communications network(s) over which XR unit 204 is intended to operate. For example, in some embodiments, XR unit 204 is configured to be selectively connectable by wire to input unit 202. When connected by wire, network interface 420 may enable communications with input unit 202; and when not connected by wire, network interface 420 may enable communications with mobile communications device 206.

Input interface 430, shown in FIG. 4, is assumed to have similar functionality as the functionality of input interface 330 described above in detail. In this case, input interface 430 may communicate with an image sensor to obtain gesture input 431 (e.g., a finger of user 100 pointing to a virtual object), communicate with other XR units 204 to obtain virtual input 432 (e.g., a virtual object shared with XR unit 204 or a gesture of avatar detected in the virtual environment), communicate with a microphone to obtain audio input 433 (e.g., voice commands), and communicate with input unit 202 to obtain UI input 434 (e.g., virtual content determined by virtual content determination module 315).

Power source 440, shown in FIG. 4, is assumed to have similar functionality as the functionality of power source 340 described above, only it provides electrical energy to power XR unit 204. In some embodiments, power source 440 may be charged by power source 340. For example, power source 440 may be wirelessly changed when XR unit 204 is placed on or in proximity to input unit 202.

Output interface 450, shown in FIG. 4, is assumed to have similar functionality as the functionality of output interface 350 described above in detail. In this case, output interface 450 may cause output from light indicators 451, display 452, speakers 453, and projector 454. Projector 454 may be any device, apparatus, instrument, or the like capable of projecting (or directing) light in order to display virtual content onto a surface. The surface may be part of XR unit 204, part of an eye of user 100, or part of an object in proximity to user 100. In one embodiment, projector 454 may include a lighting unit that concentrates light within a limited solid angle by means of one or more mirrors and lenses, and provides a high value of luminous intensity in a defined direction.

Processing device 460, shown in FIG. 4, is assumed to have similar functionality as the functionality of processing device 360 described above in detail. When XR unit 204 is connected to input unit 202, processing device 460 may work together with processing device 360. Specifically, processing device 460 may implement virtual machine technologies or other technologies to provide the ability to execute, control, run, manipulate, store, etc., multiple software processes, applications, programs, etc. It is appreciated that other types of processor arrangements could be implemented to provide the capabilities disclosed herein.

Sensors interface 470, shown in FIG. 4, is assumed to have similar functionality as the functionality of sensors interface 370 described above in detail. Specifically sensors interface 470 may communicate with audio sensor 471, image sensor 472, motion sensor 473, environmental sensor 474, and other sensors 475. The operations of an audio sensor, an image sensor, a motion sensor, an environmental sensor, and other sensors are described above with reference to FIG. 3, details of which are not repeated herein. It is appreciated that other types and combination of sensors may be used to provide the capabilities disclosed herein.

The components and arrangements shown in FIG. 4 are not intended to limit the disclosed embodiments. As will be appreciated by a person skilled in the art having the benefit of this disclosure, numerous variations and/or modifications may be made to the depicted configuration of XR unit 204. For example, not all components may be essential for the operation of XR unit 204 in all cases. Any component may be located in any appropriate part of system 200, and the components may be rearranged into a variety of configurations while providing the functionality of the disclosed embodiments. For example, some XR units may not include all of the elements in XR unit 204 (e.g., wearable extended reality appliance 110 may not have light indicators 451).

Figure 5:
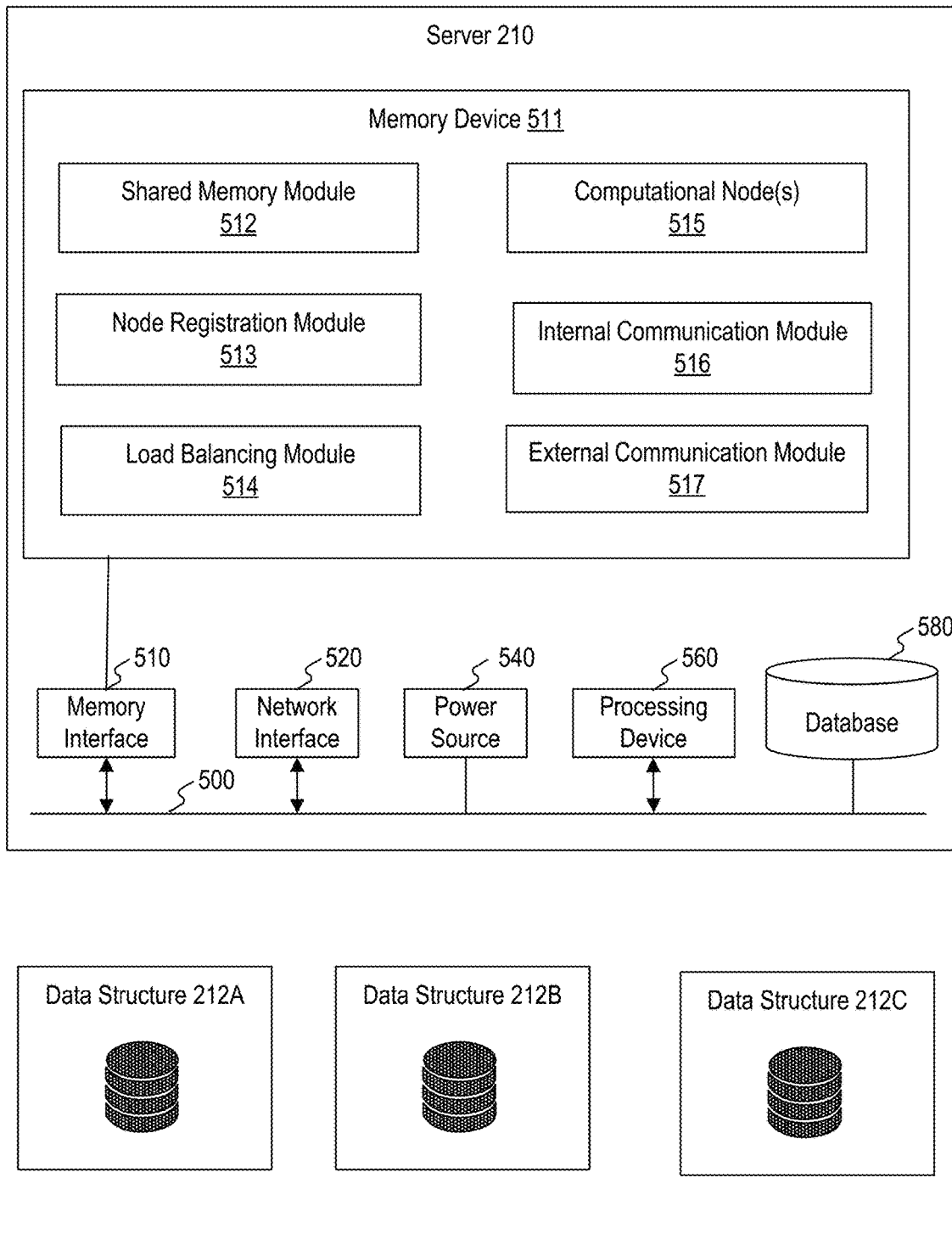
FIG. 5 is a block diagram illustrating some of the components of a remote processing unit, consistent with some embodiments of the present disclosure.

FIG. 5 is a block diagram of an exemplary configuration of remote processing unit 208. FIG. 5 is an exemplary representation of just one embodiment, and it is to be understood that some illustrated elements might be omitted and others added within the scope of this disclosure. In the embodiment of FIG. 5, remote processing unit 208 may include a server 210 that directly or indirectly accesses a bus 500 (or other communication mechanism) interconnecting subsystems and components for transferring information within server 210. For example, bus 500 may interconnect a memory interface 510, a network interface 520, a power source 540, a processing device 560, and a database 580. Remote processing unit 208 may also include a one or more data structures. For example, data structures 212A, 212B, and 212C.

Memory interface 510, shown in FIG. 5, is assumed to have similar functionality as the functionality of memory interface 310 described above in detail. Memory interface 510 may be used to access a software product and/or data stored on a non-transitory computer-readable medium or on other memory devices, such as memory devices 311, 411, 511, or data structures 212A, 212B, and 212C. Memory device 511 may contain software modules to execute processes consistent with the present disclosure. In particular, memory device 511 may include a shared memory module 512, a node registration module 513, a load balancing module 514, one or more computational nodes 515, an internal communication module 516, an external communication module 517, and a database access module (not shown). Modules 512-517 may contain software instructions for execution by at least one processor (e.g., processing device 560) associated with remote processing unit 208. Shared memory module 512, node registration module 513, load balancing module 514, computational module 515, and external communication module 517 may cooperate to perform various operations.

Shared memory module 512 may allow information sharing between remote processing unit 208 and other components of system 200. In some embodiments, shared memory module 512 may be configured to enable processing device 560 (and other processing devices in system 200) to access, retrieve, and store data. For example, using shared memory module 512, processing device 560 may perform at least one of: executing software programs stored on memory device 511, database 580, or data structures 212A-C; storing information in memory device 511, database 580, or data structures 212A-C; or retrieving information from memory device 511, database 580, or data structures 212A-C.

Node registration module 513 may be configured to track the availability of one or more computational nodes 515. In some examples, node registration module 513 may be implemented as: a software program, such as a software program executed by one or more computational nodes 515, a hardware solution, or a combined software and hardware solution. In some implementations, node registration module 513 may communicate with one or more computational nodes 515, for example, using internal communication module 516. In some examples, one or more computational nodes 515 may notify node registration module 513 of their status, for example, by sending messages: at startup, at shutdown, at constant intervals, at selected times, in response to queries received from node registration module 513, or at any other determined times. In some examples, node registration module 513 may query about the status of one or more computational nodes 515, for example, by sending messages: at startup, at constant intervals, at selected times, or at any other determined times.

Load balancing module 514 may be configured to divide the workload among one or more computational nodes 515. In some examples, load balancing module 514 may be implemented as: a software program, such as a software program executed by one or more of the computational nodes 515, a hardware solution, or a combined software and hardware solution. In some implementations, load balancing module 514 may interact with node registration module 513 in order to obtain information regarding the availability of one or more computational nodes 515. In some implementations, load balancing module 514 may communicate with one or more computational nodes 515, for example, using internal communication module 516. In some examples, one or more computational nodes 515 may notify load balancing module 514 of their status, for example, by sending messages: at startup, at shutdown, at constant intervals, at selected times, in response to queries received from load balancing module 514, or at any other determined times. In some examples, load balancing module 514 may query about the status of one or more computational nodes 515, for example, by sending messages: at startup, at constant intervals, at pre-selected times, or at any other determined times.

Internal communication module 516 may be configured to receive and/or to transmit information from one or more components of remote processing unit 208. For example, control signals and/or synchronization signals may be sent and/or received through internal communication module 516. In one embodiment, input information for computer programs, output information of computer programs, and/or intermediate information of computer programs may be sent and/or received through internal communication module 516. In another embodiment, information received though internal communication module 516 may be stored in memory device 511, in database 580, in data structures 212A-C, or other memory device in system 200. For example, information retrieved from data structure 212A may be transmitted using internal communication module 516. In another example, input data may be received using internal communication module 516 and stored in data structure 212B.

External communication module 517 may be configured to receive and/or to transmit information from one or more components of system 200. For example, control signals may be sent and/or received through external communication module 517. In one embodiment, information received though external communication module 517 may be stored in memory device 511, in database 580, in data structures 212A-C, and or any memory device in the system 200. In another embodiment, information retrieved from any of data structures 212A-C may be transmitted using external communication module 517 to XR unit 204. In another embodiment, input data may be transmitted and/or received using external communication module 517. Examples of such input data may include data received from input unit 202, information captured from the environment of user 100 using one or more sensors (e.g., audio sensor 471, image sensor 472, motion sensor 473, environmental sensor 474, other sensors 475), and more.

In some embodiments, aspects of modules 512-517 may be implemented in hardware, in software (including in one or more signal processing and/or application specific integrated circuits), in firmware, or in any combination thereof, executable by one or more processors, alone, or in various combinations with each other. Specifically, modules 512-517 may be configured to interact with each other and/or other modules of system 200 to perform functions consistent with disclosed embodiments. Memory device 511 may include additional modules and instructions or fewer modules and instructions.

Network interface 520, power source 540, processing device 560, and database 580, shown in FIG. 5, are assumed to have similar functionality as the functionality of similar elements described above with reference to FIGS. 4 and 5. The specific design and implementation of the above-mentioned components may vary based on the implementation of system 200. In addition, remote processing unit 208 may include more or fewer components. For example, remote processing unit 208 may include an input interface configured to receive direct input from one or more input devices.

Consistent with the present disclosure, a processing device of system 200 (e.g., processor within mobile communications device 206, a processor within a server 210, a processor within a wearable extended reality appliance, such as, wearable extended reality appliance 110, and/or a processor within an input device associated with wearable extended reality appliance 110, such as keyboard 104) may use machine learning algorithms in order to implement any of the methods disclosed herein. In some embodiments, machine learning algorithms (also referred to as machine learning models) may be trained using training examples. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value for an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs. Some non-limiting examples of such artificial neural networks may include shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

In some embodiments, analyzing image data (for example by the methods, steps and modules described herein) may comprise analyzing the image data to obtain a preprocessed image data, and subsequently analyzing the image data and/or the preprocessed image data to obtain the desired outcome. Some non-limiting examples of such image data may include one or more images, videos, frames, footages, 2D image data, 3D image data, and so forth. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth.

In some embodiments, analyzing image data (for example, by the methods, steps and modules described herein) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples. The training examples may include examples of data instances, and in some cases, a data instance may be labeled with a corresponding desired label and/or result; and more.

In some embodiments, analyzing image data (for example, by the methods, steps and modules described herein) may comprise analyzing pixels, voxels, point cloud, range data, etc. included in the image data.

Consistent with the present disclosure, a processing device of system 200 may analyze image data captured by an image sensor (e.g., image sensor 372, image sensor 472, or any other image sensor) in order to implement any of the methods disclosed herein. In some embodiments, analyzing the image data may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

Consistent with other aspects of the disclosure, a processing device of system 200 may analyze image data in order to implement any of the methods disclosed herein. In some embodiments, analyzing the image may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples. As mentioned above, the training examples may include examples of data instances, and in some cases, a data instance may be labeled with a corresponding desired label and/or result, and more. In some embodiments, analyzing image data (for example by the methods, steps and modules described herein) may comprise analyzing pixels, voxels, point cloud, range data, etc. included in the image data.

A convolution may include a convolution of any dimension. A one-dimensional convolution is a function that transforms an original sequence of numbers to a transformed sequence of numbers. The one-dimensional convolution may be defined by a sequence of scalars. Each particular value in the transformed sequence of numbers may be determined by calculating a linear combination of values in a subsequence of the original sequence of numbers corresponding to the particular value. A result value of a calculated convolution may include any value in the transformed sequence of numbers. Likewise, an n-dimensional convolution is a function that transforms an original n-dimensional array to a transformed array. The n-dimensional convolution may be defined by an n-dimensional array of scalars (known as the kernel of the n-dimensional convolution). Each particular value in the transformed array may be determined by calculating a linear combination of values in an n-dimensional region of the original array corresponding to the particular value. A result value of a calculated convolution may include any value in the transformed array. In some examples, an image may comprise one or more components (such as color components, depth component, etc.), and each component may include a two dimensional array of pixel values. In one example, calculating a convolution of an image may include calculating a two dimensional convolution on one or more components of the image. In another example, calculating a convolution of an image may include stacking arrays from different components to create a three dimensional array, and calculating a three dimensional convolution on the resulting three dimensional array. In some examples, a video may comprise one or more components (such as color components, depth component, etc.), and each component may include a three dimensional array of pixel values (with two spatial axes and one temporal axis). In one example, calculating a convolution of a video may include calculating a three dimensional convolution on one or more components of the video. In another example, calculating a convolution of a video may include stacking arrays from different components to create a four dimensional array, and calculating a four dimensional convolution on the resulting four dimensional array.

To improve user experience, in some disclosed embodiments, virtual content presented by an extended reality appliance may be adjusted based on the layout of the physical environment of the user. Disclosed embodiments describe three-dimensional content that may be tagged in association with one or more 3D placement requirements. The 3D placement requirements may place one or more (e.g., general) constraints and/or considerations on where content may be displayed in the environment. In addition, to meet one or more physical (e.g., specific) constraints and/or considerations for displaying virtual content, a processing device associated with an extended reality appliance may determine a layout of the environment based on an analysis of image data. The processing device may determine locations for virtual placement of 3D content using the both the layout and the one or more 3D placement requirements, thereby meeting one or more general and specific constraints and/or considerations.

Some disclosed embodiments involve presenting content in three dimensional (3D) environments. Content refers to information, data, or media that is stored, displayed, or transmitted by computer systems or software applications. Content can take various forms, including text, images, videos, audio, and more. For example, content may be encoded in digital form. Content may further include 'virtual content' as discussed elsewhere in this disclosure. Content is not limited to a specific form and may instead include any combination of data formatted as text, images, audio, video, haptic, and any other data type for conveying information to a user. In some embodiments, content may be associated with a website and/or a web page. Such content may be stored on a server device, and may be transmitted to a client device via a communications network upon request. In some embodiments, content may include data for presentation and/or metadata defining one or more parameters instructing at least one processing device how to present the data via an extended reality appliance. Such metadata may indicate, for example, a color, transparency, size, location, style, background, foreground, and/or fill color, a playback speed and/or volume (e.g., for multimedia content) and/or any other parameter affecting the display of content. By way of non-limiting example, content (or virtual content) may include synthesized content that may exist wholly within the context of one or more processing devices, for example within an extended reality environment. Virtual content may be distinguished from physical or real-world content that may exist or be generated independent of a processing device. For example, voice data for a synthesized digital avatar may be virtual content, whereas a recorded voice message of a human user may be associated with physical, real-world (e.g., non-virtual) content. By way of another example, virtual content may be a synthesized image, in contrast to a real-world image. In some embodiments, content may include digital content projected by a wearable electronic display (e.g., integrated with a wearable extended reality appliance) for exclusive viewing by a user wearing the wearable electronic display. In some embodiments, content may include digital content displayed to appear as though embedded within the physical (e.g., real) environment surrounding a user. In some embodiments, a display area for virtual content may be constrained by a field of view (FOV) of a user wearing a wearable extended reality appliance (e.g., to contrast with a non-virtual rendition of digital content constrained by a size of an electronic screen).

A three-dimensional (3D) environment refers to a physical or virtual space having, or appearing to have, three spatial dimensions. For example, a three-dimensional environment may include a physical and/or virtual space viewable by and/or surrounding an extended reality appliance. A 3D environment may include three dimensions or degrees of freedom, which may be expressed using Cartesian (e.g., horizontal, vertical, and depth), cylindrical, or spherical coordinate, and/or any other set of 3D coordinates. In some embodiments, a 3D environment may include one or more virtual (e.g., computer-generated) elements simulating a three-dimensional world. Such virtual elements may include, for example, a widget, a document, an avatar, a background, and/or any other type of virtual element. In some embodiments, an environment may include only virtual content. In some embodiments, a 3D environment may include one or more physical elements of the physical world surrounding an extended reality appliance viewable alongside one or more virtual elements. Such physical elements may include, for example, one or more physical walls, a floor and/or ceiling, a desk, a door, a window, a source of ambient light, and/or any other physical element in a space surrounding an extended reality appliance. In some embodiments, the environment may include visual content, audible content, and/or multimedia (e.g., visual and audible) content. In some embodiments, the environment may include tactile content that may be sensed as touch (e.g., using haptic stimulation). In some embodiment a 3D environment may be divided into voxels, which are units in a three-dimensional grid, such that placing an object in the 3D environment involves assigning one or more voxels to the object.

As used herein, presenting content in a 3D environment refers to displaying or rendering the content in a 3D environment as discussed previously. For example, at least one processing device of an extended reality appliance may present content visually, audibly, and/or using a tactile interface. For example, the at least one processing device may present one or more virtual features by activating selected pixels of a screen of an extended reality appliance to display one or more images, and deactivate selected pixels to enable viewing one or more physical objects through transparent sections thereof. In some embodiments, the at least one processing device may enable viewing one or more physical objects by activating selected pixels to render image data of the physical environment. In some embodiments, at least one processing device may activate pixels of a display screen based on one or more 3D wireframe models, polygon rasterization, shading techniques, texture mapping, ray tracing, shadow mapping, and/or any other 3D rendering technique. By way of a non-limiting example, in FIG. 1, user 100 dons wearable extended reality appliance 110 for presenting content in 3D environments.

Some disclosed embodiments involve requesting content for virtual presentation in an environment of an extended reality appliance. An environment of an extended reality appliance refers to the virtual space that the appliance creates or interacts with. For example, it may refer to a digital or augmented space that the appliance enables users to experience. For example, it may include a space in which a user is immersed while using an extended reality appliance, as described earlier. Requesting content refers to asking for, accessing, and/or searching (e.g., querying) for content. For example, in the current context, requesting content may refer to the action of asking for, seeking, or accessing various forms of digital media, information, or experiences related to an extended reality environment. In some embodiments, at least one processing device may request content from one or more content providers. Such content providers may include, for example, an operating system configured to manage a local and/or remote memory, a server (e.g., a remote server), a user, a peripheral device (e.g., a camera and/or microphone), a software application (e.g., a browser and/or content generation software), and/or any other type of content provider. A virtual presentation refers to rendering or displaying at least some content via an electronic interface. For example, a virtual presentation may include one or more of displaying content visually using an electronic display, playing content audibly using one or more speakers, generating tactile output using one or more haptic devices, and/or causing presentation of any other type of content using a suitable interfacing medium In some embodiments, requesting content for virtual presentation in an environment of an extended reality appliance may involve including in the request for the content, information enabling presentation of the content in the environment of the extended reality appliance. The environment of the virtual reality appliance may include physical objects and/or virtual content. Such information may include, for example, a layout of the environment (e.g., as described and exemplified herein below), one or more device settings of the extended reality appliance, one or more preferences associated with a user, and/or any other information for enabling presentation of content in the environment of the extended reality appliance. In some embodiments, at least one processing device may request the content formatted and/or arranged for presenting virtually in the environment of the extended reality appliance. For instance, the at least one processing device may request metadata associated with the requested content, the associated metadata defining one or more parameters associated with presenting the content visual, audible, and/or tactilely (e.g., using haptic stimulation).

As an example, the at least one processing device may request one or more graphic elements and associated visual presentation parameters (e.g., defining a position, size, color, saturation, transparency), one or more audio elements and associated audio presentation parameters (e.g., volume, mono or stereo, and/or direction), and/or one or more tactile elements and associated parameters defining touch-based feedback. By way of another non-limiting example, in FIGS. 2 and 4, at least one processing device 460 may request content from server 210 via network 214. At least one processing device 460 may request the content for virtual presentation in an environment of wearable extendible reality appliance 110.

Some disclosed embodiments involve receiving the content for the virtual presentation in the environment. Receiving the content for the virtual presentation in the environment refers to obtaining content requested for presenting via an extended reality appliance. At least one processing device may receive the content, for example, as packets or a data stream via a communications network, as a file retrieved from memory, a peripheral device, and/or a software application, and/or as data from any other source of content. The requested content may be received with associated metadata including one or more parameter settings defining one or more visual, audio, and/or tactile attributes for presenting the content, as described earlier. For example, a user may receive 3D depictions of furniture positioned in a 3D layout of a room with accompanying information, specifications, and/or videos while perusing a furniture catalog using an extended reality appliance. As another example, a user may receive navigation instructions (e.g., arrows, time of arrival) and/or advertisements overlaid on a 3D layout of a streetscape for a navigation application using an extended reality appliance.

Some disclosed embodiments involve receiving with the content, a plurality of tags, each tag of the plurality of tags being associated with a portion of the content. A portion of content refers to a part, piece, and/or element of content. For example, content retrieved for presenting via an extended reality appliance may include a plurality of elements or portions. Such portions, may include, for example, a calendar widget, a timer widget, a picture-in-picture window, and one or more documents that may be included in content, e.g., for a website. In some embodiments, a portion of content may refer to a spatial region (e.g., half, quarter, or another measure) of the extended reality environment. For instance, returning to the furniture catalog example above, while viewing a 3D layout of a room with virtual furniture, a portion of the room and/or a specific piece of virtual furniture may be a portion of the virtual content in the extended reality space. Returning to the navigation application above, a specific navigation arrow and/or advertisement may be a portion of content. A tag refers to a marker or a label whether visible or invisible. For example, it may refer to one or more of labels, markers, and/or keywords assigned to a piece of content. A tag may be associated with a lexical meaning, and/or an (e.g., digital) code. A tag may include a single descriptive word and/or term, multiple descriptive words and/or terms, an index for obtaining one or more descriptive words and/or terms, and/or a file storing one or more descriptive words and/or terms. At least one processing device may use one or more tags to categorize, organize, and/or present content associated therewith. For example, at least one processing device may query, filter, track, trace, and/or manage content, and/or establish one or more associations and/or relationships between multiple pieces of content based one or more associated tags. Additionally or alternatively, at least one processing device may use one or more tags to determine visual, audio, and/or tactile parameters for presenting content via an extended reality appliance. For instance, a tag may define how a piece of content may be displayed by defining the color, size, transparency, saturation, time and duration, and/or position in a 3D environment of an extended reality appliance. In some embodiments, a tag may be associated with one or more rules and/or constraints governing the presentation of content in a 3D environment of an extended reality appliance. A tag associated with a portion of content refers to a tag linked to, assigned to, or otherwise related to a portion of the content. For example, a tag for a document may indicate display parameters for presenting the document, a tag for a picture-in-picture window may indicate a playback speed and/or volume for rendering a video, a tag for a timer widget may indicate a saturation value for displaying the timer, and/or a volume for sounding an associated alarm, and a tag for a calendar may indicate a gesture-based interface for interacting with a user. Each tag of the plurality of tags being associated with a portion of the content refers to each received tag corresponding to a portion of the content. A portion of content may be associated with a single tag, or with multiple tags. Each tag may be associated with only one portion of content, or with multiple portions of content. For example, a first portion of content may be associated with a first tag and a second tag. The first tag may define the appearance of the first portion of content, and the second tag may define an associated privacy setting as "classified". A second portion of content may be associated with the first tag and a third tag. The first tag may define the appearance of the second portion of content to be similar to that of the first portion of content. However, the third tag may define an associated privacy setting as "public". Receiving content with a plurality of tags refers to obtaining a plurality of tags in association with the content. For example, the tags may be stored in a metadata file provided with the content. In some embodiments, one or more tags may be embedded in a source code for a webpage, e.g., in a metadata portion of a file storing the source code and/or as labels included in one or more definitions for elements of the webpage. For instance, in response to requesting content from a remote server, at least one processing device may receive the requested content with a metadata file. The content may include a plurality of elements (e.g., portions), each of which may be associated with one or more tags defined in the metadata file. The at least one processing device may use the tags to determine how to present each portion of the received content. In some examples, a data-structure and/or a markup language file associating different tags with different portions of the content may be received.

By way of a non-limiting example, in FIGS. 2 and 4, at least one processing device 460 may receive the requested content from server 210 via network 214. At least one processing device 460 may receive the content with a plurality of tags, each tag associated with a portion of the content.

Figure 6:
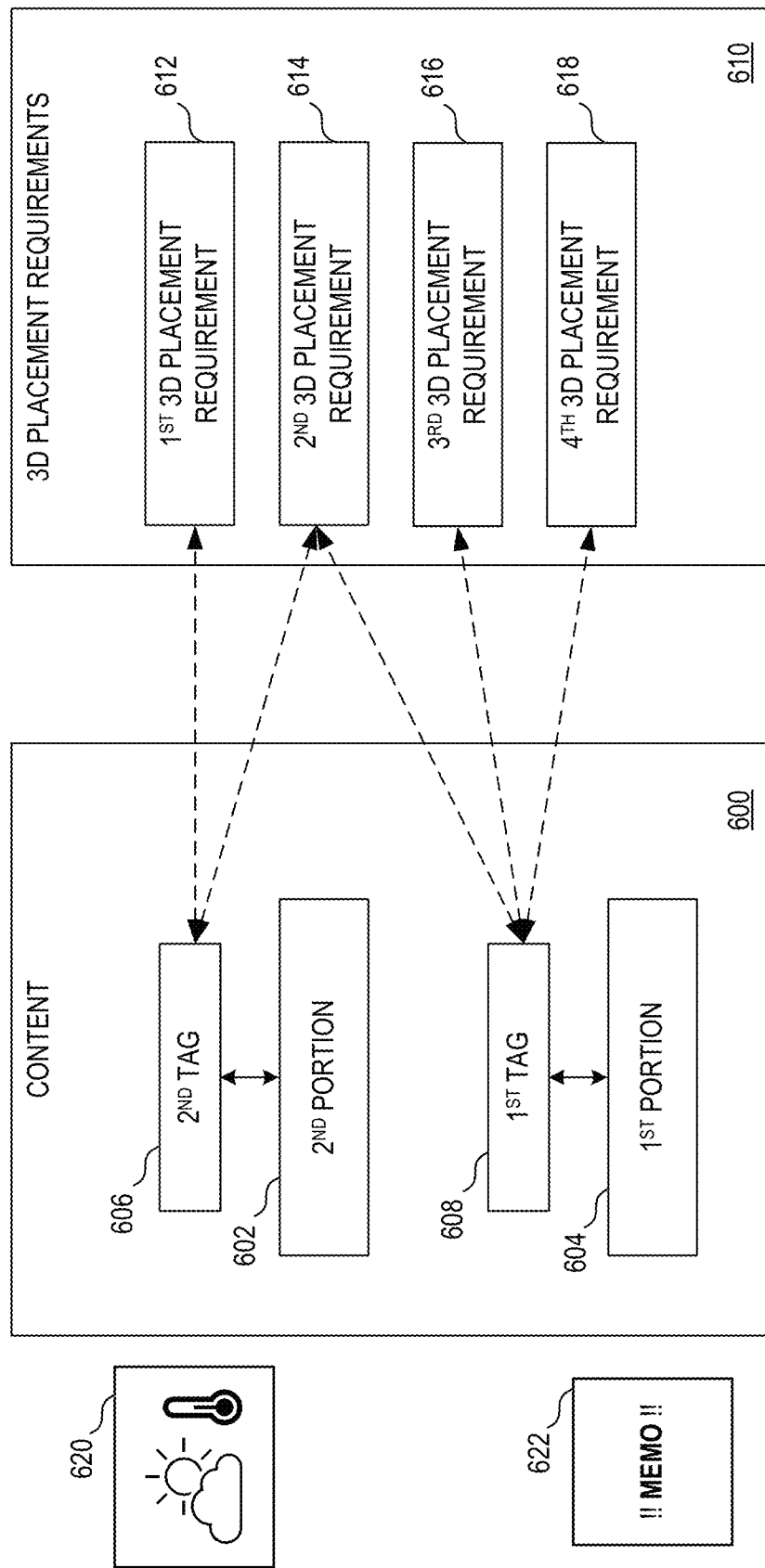
FIG. 6 is a block diagram illustrating an exemplary file storing content, consistent with some embodiments of the present disclosure.

By way of another non-limiting example, reference is made to FIG. 6, which is a block diagram illustrating an exemplary file storing content 600, consistent with some embodiments of the present disclosure. Processing device 460 may receive content 600 from server 210 via network 214. Content 600 may include at least a first portion 604 and a second portion 602. First portion 604 may be associated with a first tag 608 and second portion 602 may be associated with a second tag 606. For example, first portion 604 may include instructions for displaying a memo 622, and second portion 602 may include instructions for displaying an updated weather forecast 620. It is to be noted that the terms "first" and "second" are arbitrary and may be interchanged throughout this disclosure.

Some disclosed embodiments involve capturing, using an image sensor, a layout of the environment. An image sensor refers to any device capable of detecting and converting optical signals in the near-infrared, infrared, visible, and ultraviolet spectrums into electrical signals as described and exemplified elsewhere herein. For example, as previously explained, a digital camera (e.g., an active pixel or CMOS sensor, and/or a charged coupled device or CCD) may be an exemplary image sensor. A layout of the environment refers to an arrangement, and/or organization (e.g., spatial organization) of physical and/or digital objects or elements within a space. Such elements may include, for example, physical and/or virtual objects, structures, a topology, a terrain, one or more barriers (e.g., a ceiling, floor, walls, and/or dividers), light sources (e.g., windows and/or lightbulbs), shadows, an opening or doorway, and/or any other virtual and/or physical feature affecting how content may be presented. A layout of an environment may indicate where elements may be positioned or may not be positioned, types of interfaces enabling user interactions with one or more elements, and/or interactions between different elements. At least one processing device may use a layout of an environment to present content to a user and enable the user to immerse and/or navigate inside the environment of the extended reality appliance. Capturing a layout of an environment using an image sensor involves acquiring one or a plurality of images of an environment using an image sensor and generating a layout of the environment based on the image(s). For example, in an exemplary embodiment, an images sensor of an extended reality appliance may capture a plurality of 2D images of a 3D physical environment surrounding the extended reality appliance, e.g., from different perspectives. At least one processing device may compile the 2D images to create a virtual 3D space representative of the physical environment surrounding the wearable extended reality appliance. In some embodiments, an image sensor may continually capture 2D images of a changing 3D environment surrounding an extended reality appliance (e.g., in motion), and the at least one processing device may stitch the 2D images to continually generate an updated layout of the 3D environment, for example using a Simultaneous Localization and Mapping (SLAM) algorithm. The at least one processing device may use the 2D images to determine locations in three dimensions for one or more physical objects acquired in the 2D images. For example, the at least one processing device may use multiple 2D images of a wall to determine the length, width, height, and/or orientation of the wall relative to other objects in the 3D environment. Similarly, the at least one processing device may use multiple 2D images of a desk adjacent to the wall to determine the length, width, height, and orientation of the desk against the wall. In one example, the captured layout may be a 2D floorplan of the environment. In another example, the captured layout may be a 3D model of the environment. In one example, the captured layout may be a data-structure that includes information related to the layout of objects in the environment, such as measurements (for example, lengths, surface size, volume), spatial positions, spatial orientations, and any other information associated with the layout. In one example, the captured layout may enable presentation of a virtual reality simulation of at least part of the environment, for example using a ray casting algorithm. In one example, the captured layout may enable presentation of a map and/or a model of at least part of the environment. In some examples, a convolution of at least part of the image data may be calculated to obtain a numerical result value. Further, the layout of the environment may be determined based, at least in part, on the numerical result value. For example, when the numerical result value is a first numerical value, a particular item may be included in the determined layout, and when the numerical result value is a second numerical value, a particular item may be excluded from the determined layout. In another example, when the numerical result value is a first numerical value, a particular item may be included in the determined layout at a first position, and when the numerical result value is a second numerical value, the particular item may be included in the determined layout at a second position different from the first position. In yet another example, when the numerical result value is a first numerical value, a length of a particular item in the determined layout may be a first length, and when the numerical result value is a second numerical value, the length of the particular item in the determined layout may be a second length different from the first length.

Figure 7:
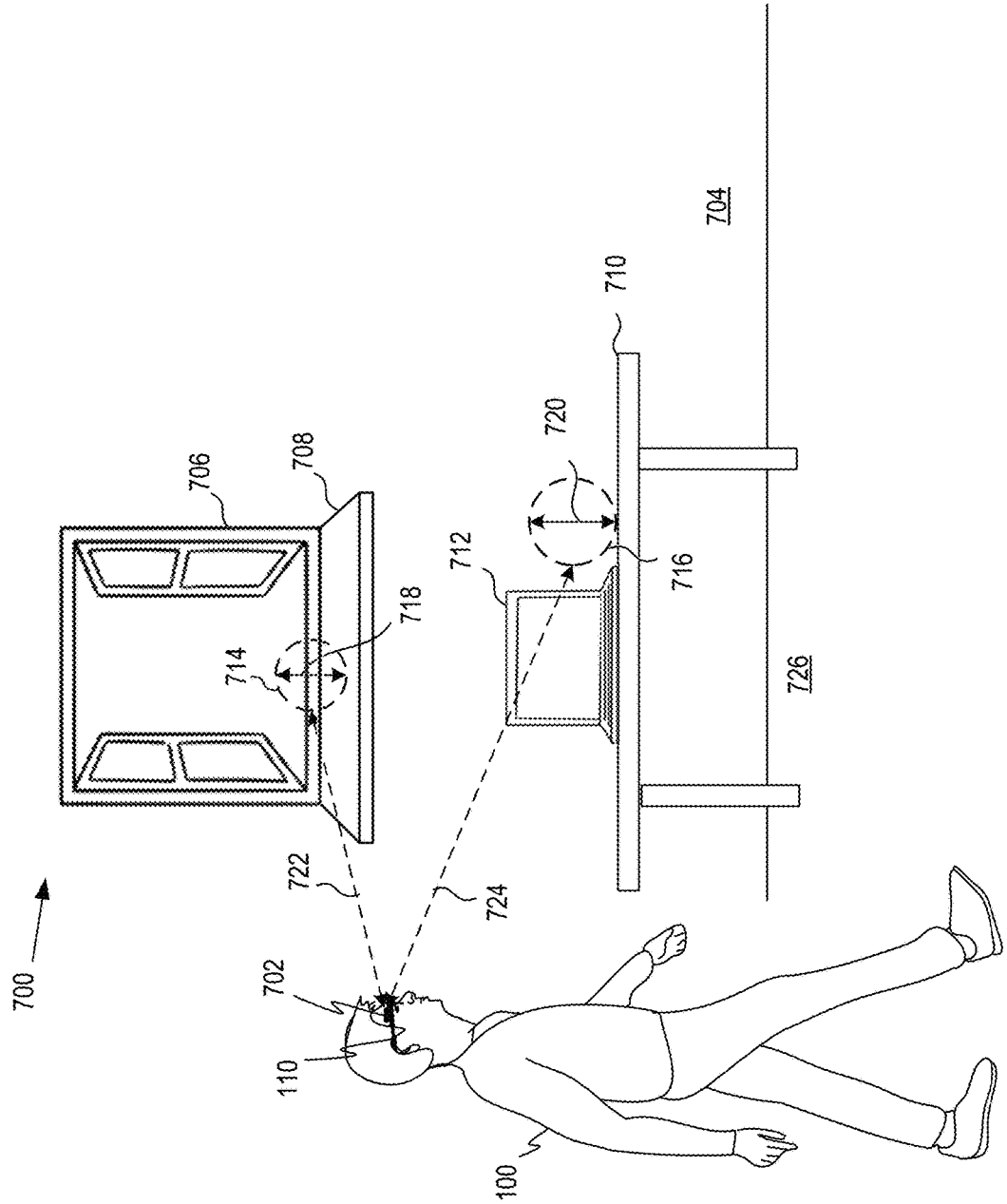
FIG. 7 illustrates an exemplary layout captured by an image sensor of an extended reality appliance, consistent with some embodiments of the present disclosure.

By way of a non-limiting example, in FIGS. 1 and 4, at least one processing device 460 may capture a layout of an environment surrounding user 100 using image sensor 472 of extended reality unit 204 (e.g., including wearable extended reality appliance 110 as shown in FIG. 2). By way of another non-limiting example, reference is made to FIG. 7 illustrating an exemplary layout 700 captured by an image sensor 702 of wearable extended reality appliance 110, consistent with some embodiments of the present disclosure. Image sensor 702 may correspond to image sensor 472 of FIG. 4. At least one processing device 460 may determine layout 700 based on a plurality of images acquired by image sensor 702 of the physical environment surrounding user 100. Layout 700 may describe one or more characteristics of the physical environment. For example, layout 700 may include data descriptive of a physical floor 726, a wall 704 perpendicular to floor 726, a window 706 with a ledge 708, a desk 710, and a computer display 712. Window 706 may provide ambient daylight illuminating the physical space described by layout 700.

Some disclosed embodiments involve, for each tag of the plurality of tags, selecting, based on the respective tag, at least one 3D placement requirement for the portion of the content associated with the respective tag. A placement requirement refers to a constraint and/or rule associated with positioning and/or orienting content or a portion thereof in an environment of an extended reality appliance. For example, a "placement requirement" may include the specific conditions or criteria defining a position or location of a virtual object in the extended reality environment. For example, this may refer to or include spatial alignment for one or more virtual objects so that one virtual object does not overlap with another virtual or real-world object and the virtual objects appear in the correct location and maintain the correct orientation relative to real-world objects. This requirement may ensure that the virtual object appears in the right place, interacts correctly with the real world or other virtual objects, and provides a seamless and realistic user experience. For instance, a placement requirement may be associated with scaling (e.g., increasing or decreasing) a size of a portion of content, filtering and/or cropping a portion of content, and/or modifying a transparency attribute of a portion of content. Additional examples of placement requirements may include rules and/or constraints associated with a minimal and/or maximal margin between a boundary of a field-of-view of a user and displayed content, a minimal and/or maximal distance between one or more physical and/or virtual objects in the environment and/or types thereof, and/or between one or more sources of illumination. Additional examples of placement requirements may include rules and/or constraints associated with prohibiting, restricting, and/or allowing a display one or more portions of content in proximity and/or in association with one or more physical and/or virtual objects in the environment and/or types thereof, and/or any other rule and/or constraint associated with determining a location for displaying content in an environment of an extended reality appliance. For instance, a first placement requirement may require limiting a display of content to within a field-of-view of a user of an extended reality appliance and cropping any portions of content extending beyond the field-of-view. A second placement requirement may require moving a lower priority widget to a peripheral region of a field-of-view of a user when a higher priority application is displayed in a central region. A third placement requirement may require displaying a document against a flat surface of an environment of an extended reality appliance. A 3D placement requirement refers to a placement requirement defined for three dimensions (e.g., three degrees of freedom). A 3D placement requirement may be associated with a volume, a plane, a line, a point, a curved volume, surface, arc, and/or any other constraint in a 3D environment. A 3D placement requirement may be defined for any combination of three dimensions of an environment of an extended reality appliance. For instance, a 3D placement requirement may be defined in three dimensions (e.g., as a specific point), in two dimensions (e.g., anywhere on a plane), or in one dimension (e.g., anywhere along a line), and/or relative to a curved surface of volume (e.g., a manifold or topology) in a 3D environment. Some examples of 3D placement requirements may include a minimal and/or maximal size requirement for an object, a position and/or orientation along at least one dimension of a 3D environment, a minimal and/or maximal distance from a boundary of a field-of-view of a user, a restriction preventing a display of an object over one or more physical objects (e.g., to prevent content from being displayed in a doorway or window). In some embodiments, a 3D placement requirement may be associated with one or more physical and/or virtual objects in a 3D environment. For instance, a first 3D placement requirement may cause a display of a To Do List widget to appear to the right of a virtual text document, a second 3D placement requirement may cause a display of the virtual text document to appear on top of a physical desk, and a third 3D placement requirement may cause a virtual family photo to be displayed on the physical desk, behind and to the left of the virtual text document.

Selecting a 3D placement requirement based on a respective tag, refers to using a tag to choose and/or identify a placement requirement. For example, at least one processing device may use the tag as an index and/or query term to retrieve one or more associated 3D placement requirements stored in memory, and/or retrieve data for computing one or more associated 3D placement requirements. In some embodiments, each tag may be associate with a single 3D placement requirement. In some embodiments, one or more tags may be associated with a plurality of 3D placement requirements. A 3D placement requirement for a portion of content associated with a respective tag refers to a 3D placement requirement for the portion of content determined based on a related tag. For example, at least one processing device may receive content and associated metadata including a plurality of tags. Each of the plurality of tags may be associated with one or more portions of the received content. For instance, a first portion of the content may be associated with a first tag and a second tag, and a second portion of the content may be associated with a third tag. The at least one processing device may select a first and a second placement requirement for the first portion of content based on the first and second tags, and select a third placement requirement for the third portion of data based on the third tag. Subsequently, the at least one processing device may position the first portion of content in a display of an extended reality appliance according to the first and second placement requirements, and position the second portion of content in the display according to the third placement requirement.

For instance, a tag indicating a portion of content corresponds to a virtual window for playing a multimedia file may be associated with a first 3D placement requirement preventing display of the virtual window near a strong light source. As another example, a tag indicating that a portion of content is an editable document may be associated with a minimum size requirement (e.g., a second 3D placement requirement) and a requirement to display the editable document against a flat surface (e.g., a third 3D placement requirement).

In some examples, selecting, based on the respective tag, at least one 3D placement requirement for the portion of the content associated with the respective tag, may include selecting the at least one 3D placement requirement from a plurality of alternative 3D placement requirements. In one example, the plurality of alternative 3D placement requirements may be received together with the content for the virtual presentation. In another example, the plurality of alternative 3D placement requirements may be received separately from the content for the virtual presentation (for example, from a separate file, from a separate communication channel, from a different external device, from a different network address, and so forth). In some examples, the plurality of alternative 3D placement requirements may be generated. In some examples, a data-structure or a markup language file may associate different 3D placement requirements of the plurality of alternative 3D placement requirements with different tags, and the selecting, based on the respective tag, at least one 3D placement requirement for the portion of the content associated with the respective tag may include selecting the 3D placement requirements of the plurality of alternative 3D placement requirements that are associated with the respective tag in the data-structure or the markup language file.

By way of a non-limiting example, in FIG. 6, when responding to the request for content 600, server 210 may additionally send to at least one processing device 460 of wearable extended reality appliance 110, a file 610 containing a first 3D placement requirement 612, a second 3D placement requirement 614, a third 3D placement requirement 616, and a fourth 3D placement requirement 618. First 3D placement requirement 612 may require positioning an associated portion of adjacent to a window in the environment. Second 3D placement requirement 614 may require positioning an associated portion of content in a manner to maintain minimal margins between displayed content and a boundary of the field-of-view of user 100. Third 3D placement requirement 616 may require positioning an associated portion of content in a central region of a field-of-view of user 100 at any given point in time. Fourth 3D placement requirements 618 may require anchoring a portion of content to a computer display. Each of 3D placement requirements 612, 614, 616, and 618 may be associated with one or more tags included in content 600. For instance, second, third, and fourth 3D placement requirements 614 616, and 618 may be associated with first tag 608, and first and second 3D placement requirements 612 and 614 may be associated with second tag 606. At least one processing device 460 of wearable extended reality appliance 110 (see FIGS. 2 and 4) may select second, third, and fourth 3D placement requirements 614, 616, and 618, respectively, for first portion 604 based on first tag 608 associated therewith, and select first and second 3D placement requirements 612 and 614, respectively, for second portion 602 based on second tag 606 associated therewith. In some embodiments, the at least one processing device may override one or more 3D placement requirements in a case of conflict. For instance, the overriding may be performed based on associated tags which may be used to prioritize some portions of content over other portions of content.

Some disclosed embodiments involve, for each portion of the content, determining, based on the layout of the environment and the at least one 3D placement requirement selected for the respective portion of the content, a location in the environment for virtual placement of the respective portion of the content. Virtual placement refers to a position and/or orientation where a digital or virtual object is situated in the extended reality environment. Virtual placement of a portion of content may refer to positioning and/or orienting the portion of content for display via an extended reality appliance. Virtual placement of a portion of content may involve activating and/or deactivating selected pixels and/or voxels to cause a 3D display of the portion of content to appear at a specific location and/or at a specific orientation in a 3D environment of the extended reality appliance. Determining refers to fixing, selecting, and/or deciding. A location refers to a position or a site occupied, or available for occupancy, by, for example, an object or objects. Determining a location in the environment refers to identifying, selecting, and/or calculating a space in the environment. The space in the environment may correspond to selected pixels and/or voxels that when activated to display an object, cause an object to appear as though positioned in the determined location. Based on a layout of an environment and at least one 3D placement requirement selected for a portion of the content refers to using a layout of the environment together with the at least one 3D placement requirement selected based on at least one tag associated with the portion of content. For instance, at least one processing device may determine one or more constraints that comply with the selected 3D placement requirement and with the layout, and apply the one or more constraints when determining where to display the portion of content.

As an example, a selected 3D placement requirement may mandate that a fillable form be displayed to appear as though resting on a flat surface. Based on the layout, the at least one processing device may identify a physical desktop. Using the 3D placement requirement and the layout, the at least one processing device may determine the area immediately above the physical desktop for displaying the fillable form and cause (e.g., activate selected pixels) the fillable form to appear as though resting on the desktop, to meet the 3D placement requirement and a constraint of the layout. As another example, based on the layout the at least one processing device may identify an object (e.g., a coffee mug) resting on a desktop that may interfere with a virtual fillable form. The at least one processing device may shift the fillable form to avoid overlapping with the object, thereby meeting the 3D placement requirement and one or more constraints of the layout.

By way of a non-limiting example, in FIGS. 6 and 7, based on layout 700 and second, third, and fourth 3D placement requirements 614, 616, and 618, respectively, selected for first portion 604, at least one processing device 460 (see FIG. 4) may determine a first location 716 on desk 710 adjacent to computer display 712 for virtual placement of first portion 604. Similarly, based on layout 700 and first and second 3D placement requirements 612 and 614, respectively, selected for second portion 602, at least one processing device 460 may determine a second location 714 on ledge 708 near window 706 in the environment of user 100 for virtual placement of second portion 602. First location 716 may comply with second, third, and fourth 3D placement requirements 614, 616, and 618 associated therewith based on associated first tag 608. Second location 714 may comply with first and second 3D placement requirements 612 and 614 associated therewith based on associated second tag 606.

In some disclosed embodiments, determining the location for virtual placement includes determining a size for a portion of the content based on the at least one 3D placement requirement selected for the portion of the content. A size for a portion of content refers to a scale and/or measure for the portion of content. For example, the size may be a scale and/or a measure for the portion of the content relative to the environment or a location in the environment. In some embodiments, a size for a portion of content may include a proportion and/or comparison between a space allocated for displaying the portion of content relative to the environment. In some embodiments, a size for a portion of content may correspond to a number of voxels occupied by a display of the portion of content (e.g., to occupy 2% of a 3D environment of an extended reality appliance). In some embodiments, a size for a portion of content may be relative to one or more physical and/or virtual objects and/or to an environment (e.g., a document may be sized as one tenth the size of a physical table surface). In some embodiments, a size for a portion of content may be absolute (e.g., a diagonal of 32 cm for a virtual screen displayed 50 cm from a user). Determining a size for a portion of the content based on a 3D placement requirement selected for the portion of the content refers to determining the size for the portion of content using information included in the 3D placement requirement. The 3D placement requirement may include one or more constraints and/or rules for a size for a portion of content, which at least one processing device may use to determine a size for a portion of content. For instance, a 3D placement requirement may mandate that a virtual document be displayed on a desktop without extending over an edge thereof. The at least one processing device may scale the virtual document to enable display thereof entirely on the surface of the desktop.

The displayed content may include a plurality of portions, each associated with differing display criterion. Each portion of the content may be associated with one or more tags for selecting an associated 3D placement requirement, allowing at least one processing device to determine one or more display criterion for each portion separately.

Some disclosed embodiments involve determining a first size for a first portion of the content based on the at least one 3D placement requirement selected for the first portion of the content, and determining a second size for a second portion of the content based on the at least one 3D placement requirement selected for the second portion of the content. A first size for a first portion of content may be different or similar to a second size for a second portion of the content. For example, a first portion of content may include a clock widget associated with a first tag, a second portion of content may include a calendar widget associated with a second tag, and a third portion of the content may include a virtual screen associated with a third tag. The at least one processing device may use the first and second tags to classify the clock and calendar widgets as peripheral features, and select associated first and second 3D placement requirements (e.g., inside an upper banner of the environment). The at least one processing device may determine similar sizes for the clock and calendar widgets according to the first and second 3D placement requirements. The at least one processing device may use the third tag to classify the virtual screen as a central feature, select a third 3D placement requirement (e.g., against a wall in the middle of the field-of-view of a user), and determine a third size for the virtual screen according to the third 3D placement requirement (e.g., sized to occupy 50% of the wall).

By way of a non-limiting example, in FIG. 7, at least one processing device 460 (see FIG. 4) may determine a first size 720 for memo 622 corresponding to first portion 604 of content 600 based on second, third, and fourth 3D placement requirements and 614, 616, and 618, respectively. Similarly, at least one processing device 460 may determine a second size 718 for weather forecast 620 corresponding to second portion 602 of content 600 based on first and second 3D placement requirements 612 and 614, respectively. First size 720 may allow presenting memo 622 on desk 710 adjacent to computer display 712, while maintaining minimal margins to a boundary of the field-of-view of user 100, in compliance with second, third, and fourth 3D placement requirements 614, 616, and 618, respectively. Second size 718 may allow presenting weather forecast 620 on ledge 708, while maintaining minimal margins to a boundary of the field-of-view of user 100, in compliance with first and second 3D placement requirements 612 and 614.

In some disclosed embodiments, determining the location for virtual placement includes determining a virtual distance from the extended reality appliance for a portion of the content based on the at least one 3D placement requirement selected for the portion of the content. A virtual distance refers to a perceived space and/or gap in an environment of an extended reality appliance. For example, virtual distance may refer to the perception of distance between virtual objects or between virtual objects and the viewer within the extended reality environment. At least one processing device may display one or more virtual objects to create an illusion of space and/or depth in the environment. A virtual distance may include an apparent separation between a user and one or more virtual objects, between two or more virtual objects, and/or between at least one virtual object and at least one physical object. A virtual distance may be measured using one or more virtual rulers and/or measuring tapes, virtual grids and/or markers, world-space tracking, voxels, and/or scaled relative to one or more physical objects in the environment.

Some disclosed embodiments involve determining a first virtual distance from the extended reality appliance for a first portion of the content based on the at least one 3D placement requirement selected for the first portion of the content, and determining a second virtual distance from the extended reality appliance for a second portion of the content based on the at least one 3D placement requirement selected for the second portion of the content. "First" and "second" virtual distances refer to two distinct virtual distances that may have the same or different values. Similarly, "first" and "second" portions of the content refer to two distinct portions, regions, or objects of the content. The first virtual distance for a first portion of content may be different or similar to the second virtual distance for a second portion of the content. Returning to the example above, the at least one processing device may determine similar virtual distances for the clock and calendar widgets based on the first and second 3D placement requirements (e.g., in an upper banner positioned at a perceived distance of 70 cm from a user). The at least one processing device may determine a third virtual distance for the virtual screen based on the third 3D placement requirement (e.g., at a perceived distance of 40 cm from the user).

By way of a non-limiting example, in FIGS. 6 and 7, at least one processing device 460 (see FIG. 4) may determine a first virtual distance 724 from extended reality appliance 110 for memo 622 corresponding to first portion 604 of content 600 based on at least second, third, and fourth 3D placement requirements 614, 616, and 618. Similarly, at least one processing device 460 may determine a second virtual distance 722 from extended reality appliance 110 for weather forecast 620 corresponding to second portion 602 of content 600 based on at least first and second 3D placement requirements 612 and 614.

Some disclosed embodiments involve requesting visual information associated with a portion of the content associated with a tag of the plurality of tags from a content provider. A content provider refers to a source of content (as previously discussed). A content provider may create, curate, and/or distribute content on demand. Some examples of content providers may include websites, streaming services, social media, gaming and other online platforms, news services (e.g., television, radio, and/or cable networks), print and/or digital publishing services, educational and/or government services, podcast creators, bloggers and/or vloggers, and/or any other source of content. A content provider may deliver content as packets, streamed data, and/or using any other format and/or protocol via a communications network. Additionally or alternatively, a content provider may include one or more (local and/or remote) memory devices, databases, files, and/or content generating software (e.g., based on artificial intelligence). Visual information refers to data configured for viewing and/or otherwise associated with viewing data. Some examples of visual information may include images, text, charts, graphs, video, and/or graphics, and/or associated metadata configured to enable display of images, text, charts, graphs, video, and/or graphics. For example, at least one processing device may retrieve content from a first content provider. The received content may include source code, that when executed by a browser application, causes content referenced in the source code to be displayed. Some portions of the content (e.g., some text) may be embedded directly in the source code, allowing for direct access from the source code. However, other portions of the content (e.g., additional text, images, and/or multi-media files) may be included in the source code as references (e.g., links) to other (e.g., second and third) content providers hosting those portions. The at least one processing device may use the one or more links in the source code to retrieve the other portions of content from the other content providers, to thereby access all the portions of content referenced in the source code.

Some disclosed embodiments involve requesting visual information associated with a first portion of the content associated with a first tag of the plurality of tags from a first content provider and requesting a second portion of the content associated with a second tag of the plurality of tags from a second content provider. "First" and "second" portion and the "first" and "second" tag may be interpreted as discussed above. For example, content associated with a website code may include visual information associated with a first portion (e.g., a weather widget) and a second portion (e.g., a video player). At least one processing device may request first visual information (e.g., an updated weather forecast) associated with the weather widget from a weather server, and request second visual information (e.g., a multimedia file) associated with the video player from a multimedia server. As another example, content may include first and second images associated with first and second portions, referenced using first and second file paths, respectively. At least one processing device may retrieve the first and second images from local memory using the first and second file paths.

By way of a non-limiting example, in FIGS. 2, 6, and 7, at least one processing device 460 (e.g., see FIG. 4) may request first portion 604 of content 600 associated with first tag 608 from a first content provider (e.g., a first instance of server 210 associated with a social media platform) via network 214. Similarly, at least one processing device 460 may request visual information associated with second portion 602 of content 600 associated with second tag 606 from a second content provider (e.g., a second instance of server 210 corresponding to a weather server) via network 214.

In some disclosed embodiments, the at least one 3D placement requirement selected for a particular portion of the content associated with a particular tag of the plurality of tags includes at least one of: a 3D background, a 3D visual span, virtual object placement protocols, 3D anchoring requirements, or 3D illumination requirements. A 3D background refers to a real or virtual setting and/or surrounding defined in three dimensions. For example, a 3D background may be a real (physical) and/or virtual a setting that is indoors and/or outdoors, a type of terrain, topology, and/or ground surface, one or more stationary and/or moving objects, one or more walls, furniture, fixtures, objects light sources, and/or any other attribute of a real or virtual setting. A 3D background may indicate, for example, if an outdoor terrain is flat or hilly, or covered in grass or dirt, or if an indoor terrain includes walls, stairs and/or a platform. A 3D background may additionally indicate, for example, the presence or absence of trees, buildings, vehicles, and/or people in an outdoor setting, and/or the presence or absence of objects (e.g. furniture, toys, sports gear) and/or people in an indoor setting. In some embodiments, at least one processing device may acquire a 3D background from a plurality of 2D images. In some embodiments, the at least one processing device may acquire information associated with a 3D background from additional sources, such as location information, audio data, ambient temperature and/or illumination, and/or any other data associated with a 3D background. For example, based on image data indicating individuals in motion, location data, an illumination level corresponding to an outdoor setting, and audio data indicating noise above a threshold level, at least one processing device may identify a sports arena as a 3D background. As another example, based on image data indicating shelves with books, location data, an illumination level corresponding to an indoor setting, and audio data indicating noise below a threshold level, the at least one processing device may identify a library as a 3D background.

A 3D visual span refers to a range and/or field-of-view perceivable in a 3D environment. For example, a visual span may indicate how much of a virtual world a user may see via an extended reality appliance without having to move the head or eyes (or with head or eye movement). Different extended reality appliances may have different visual spans. For instance, an extended reality headset providing an immersive experience may have a wider and/or deeper visual span than a pair of extended reality glasses.

Virtual object placement protocols refer to guidelines and/or procedures for positioning computer-simulated or generated elements in an environment of an extended reality appliance. Virtual object placement protocols may ensure that virtual objects appear convincingly and consistently in the environment. For example, virtual object placement protocols may ensure that virtual objects are scaled and aligned with a physical environment and appear at appropriate depths, interact with and/or adhere to physical objects (e.g., tables, walls, and/or floors), avoid occlusion and/or collision with real and/or other virtual objects, and/or cast shadows and/or reflections corresponding to ambient light. Additionally or alternatively, virtual object placement protocols may ensure that virtual objects are located at comfortable heights and/or angles, are displayed consistency across differing extended reality appliances (e.g., for interactive applications), adapt to changes to a user's viewpoint, direction, and/or position, align with a user's gestures and/or electronic control device (e.g., electronic pointer, mouse, joystick, touchpad, and/or keyboard). Additionally or alternatively, virtual object placement protocols may define regions where a user may interact with one or more virtual object, define a direction for audio cues associated with one or more virtual objects, and/or place descriptive labels near one or more virtual objects.

3D anchoring requirements refer to constraints and/or rules for aligning one or more virtual objects with one or more physical objects. For example, a 3D anchoring requirement may define a fixed distance and/or orientation between a virtual object and a physical object in an environment presented via an extended reality appliance. 3D anchoring requirements may ensure that one or more virtual objects are positioned and/or interact with a physical environment (e.g., walls, floors, tables, and/or other surfaces) in a believable, consistent, persistent, and/or accurate manner. 3D anchoring requirements may involve tracking one or more virtual and/or physical objects to determine and/or adapt locations for placing virtual objects, detecting one or more surfaces (e.g., floors, ceilings, and/or walls) that may serve as anchors for virtual objects, ensuring realistic interactions with detected surfaces, and/or avoiding collisions and/or occlusion by other objects. 3D anchoring requirements may additionally involve applying lighting, shadows, scaling, and perspective to virtual objects to enhance realism and avoid distortion, enabling user interactions, providing feedback to user inputs, and maintain consistency across differing extended reality appliances (e.g., for interactive applications).

3D illumination requirements refer to rules and/or constraints for displaying one or more virtual objects in relation to existing ambient lighting conditions. For example, 3D illumination requirements may impose one or more minimum and/or maximum illumination levels, quality, color, and/or color temperature for displaying content. 3D illumination requirements may include applying realistic lighting effects (e.g., shadows, highlights, and/or reflections) according to the direction and/or intensity of ambient light, hiding objects located behind virtual objects, and/or adapting a display to changing light conditions (e.g., due to motion and/or time) and/or mixed sources of light (e.g., sunlight and/or artificial light sources). 3D illumination requirements may additionally include maintaining accurate colors and color temperatures to match ambient light, adapting to changing perspectives, interactions between objects, and/or transitions between indoor and outdoor settings. 3D illumination requirements may additionally include maintaining consistency across differing extended reality appliances (e.g., for interactive applications).

Thus, at least one 3D placement requirement selected by the at least one processing device based on a tag associated with a portion of content may include additional information for displaying the portion of the content in the environment. Such additional information may include one or more of a 3D background, a 3D visual span, virtual object placement protocols, 3D anchoring requirements, and/or 3D illumination requirements, as described and exemplified elsewhere herein. For example, the at least one processing device may use the 3D placement requirement to determine a shadow cast by a virtual screen on a desk based on sunlight shining through a window. As the user moves relative to the window, the at least one processing device may adapt the shadow to maintain consistency with the physical world. As another example, the at least one processing device may use a 3D placement requirement to display a clock widget anchored to a wall, such the clock remains stationary relative to the wall as the user turns his head.

In some disclosed embodiments, the particular 3D placement requirement is associated with the particular portion of the content in a manner enabling the determination of a particular location for virtual placement of the particular portion of the content. In a manner enabling the determination of a particular location for virtual placement of the particular portion of the content refers to a capability to use the 3D placement requirement to identify a position for displaying the particular portion of the content. For instance, the 3D placement requirement may allow at least one processing device to position the portion of content based on context, an association with another physical and/or virtual object, lighting requirements, visibility by the user, to prevent occlusion by and of other objects, and/or any other consideration for displaying the portion of content.

By way of a non-limiting example, in FIGS. 6 and 7, at least one of first and second 3D placement requirements 612 and 614 selected for second portion 602 of content 600 associated with tag 606 includes a 3D illumination requirement and a 3D anchoring requirement. First 3D placement requirement 612 may require positioning weather forecast 620 in proximity to window 706 during the day, to ensure illumination by natural light. Tag 606 associated with second portion 602 of content 600 may enable determination of particular (e.g., second) location 714 for virtual placement of second portion 602 of content 600. For instance, tag 606 may include the words "Near Window".

Some disclosed embodiments involve displaying different portions of the content in various locations in the environment. Various locations in the environment refers to different locations in the environment (e.g., at least partially non-overlapping). Each location may have different coordinates along at least one dimension. In some embodiments, various locations in the environment refers to distinct locations, e.g., to prevent occlusion of one portion of content by another. For example, at least one processing device may position a clock widget above a virtual screen such that the clock widget and the virtual screen do not collide or intersect.

Some disclosed embodiments involve requesting additional content for virtual presentation in the environment of the extended reality appliance. Requesting additional content for virtual presentation refers asking, accessing, and/or searching (e.g., querying) for content, e.g., different than the received content. The at least one processing device may request the additional content from one or more content providers, as described and exemplified elsewhere herein. For example, the at least one processing device may request an updated bulletin from a news server, and/or a revised multimedia file from an operating system. In some embodiments, requesting additional content for virtual presentation in the environment of the extended reality appliance may involve including in the request, information enabling presentation of the additional content in the environment, as described earlier. For example, the request for the additional content may include a layout of the environment, one or more device settings for the extended reality appliance, and/or one or more user preferences.

Some disclosed embodiments involve receiving the additional content and an indication that the additional content is associated with a specific tag of the plurality of tags. Receiving the additional content and an indication that the additional content is associated with a specific tag of the plurality of tags refers to receiving the additional content (as described and exemplified earlier) with information linking the additional content to at least one particular tag of the plurality of tags (e.g., received with the previously requested content). For instance, a portion of the additional content may be classified similarly to a portion of content received previously in association with a specific tag and thus received in association with the same tag. The specific tag may indicate to the at least one processing device to, for example, present the additionally received portion similar to how the previously received portion was presented.

Some disclosed embodiments involve selecting, based on the specific tag, a specific 3D placement requirement of the plurality of 3D placement requirements for the additional content; and based on the specific 3D placement requirement and the various locations, determining a specific location in the environment for a virtual placement of the additional content. Selecting, based on the specific tag, a specific 3D placement requirement of the plurality of 3D placement requirements for the additional content may be understood as described and exemplified earlier for the previously received content. Based on the specific 3D placement requirement and the various locations refers to taking into account the specific 3D placement requirement and the various locations where the different portions of content are displayed. Determining a specific location in the environment for a virtual placement of the additional content may be understood as described and exemplified elsewhere herein as relating to determining a location in the environment for the previously received portion of content. At least one processing device may use both the 3D placement requirement and the locations where other portions of content are currently displayed to determine the location for displaying the additional content. For instance, the at least one processing device may determine a location for the additional content to avoid overlapping content, to maintain a minimal and/or maximal distance from currently presented content, to display the additional content in relation to (e.g., adjacent to or instead of) a currently presented content, and/or according to any other consideration relating to the currently presented content.

As an example, in a first time period, in response to a first request for content, at least one processing device may receive a first multimedia file for playing in a window presented in an environment of an extended reality appliance. The at least one processing device may receive the first multimedia file in associated with a first tag indicating one or more presentation parameters (e.g., a size, resolution, playback speed, volume, subtitles, and/or any other presentation parameters). In a second time period, in response to a second request for additional content, the at least one processing device may receive a second (e.g., updated) multimedia file for playing in the (e.g., same) window. The at least one processing device may receive the second multimedia file in associated with the first tag, allowing the at least one processing device to apply the presentation parameters for the first multimedia file, to the second multimedia file.

Figure 8:
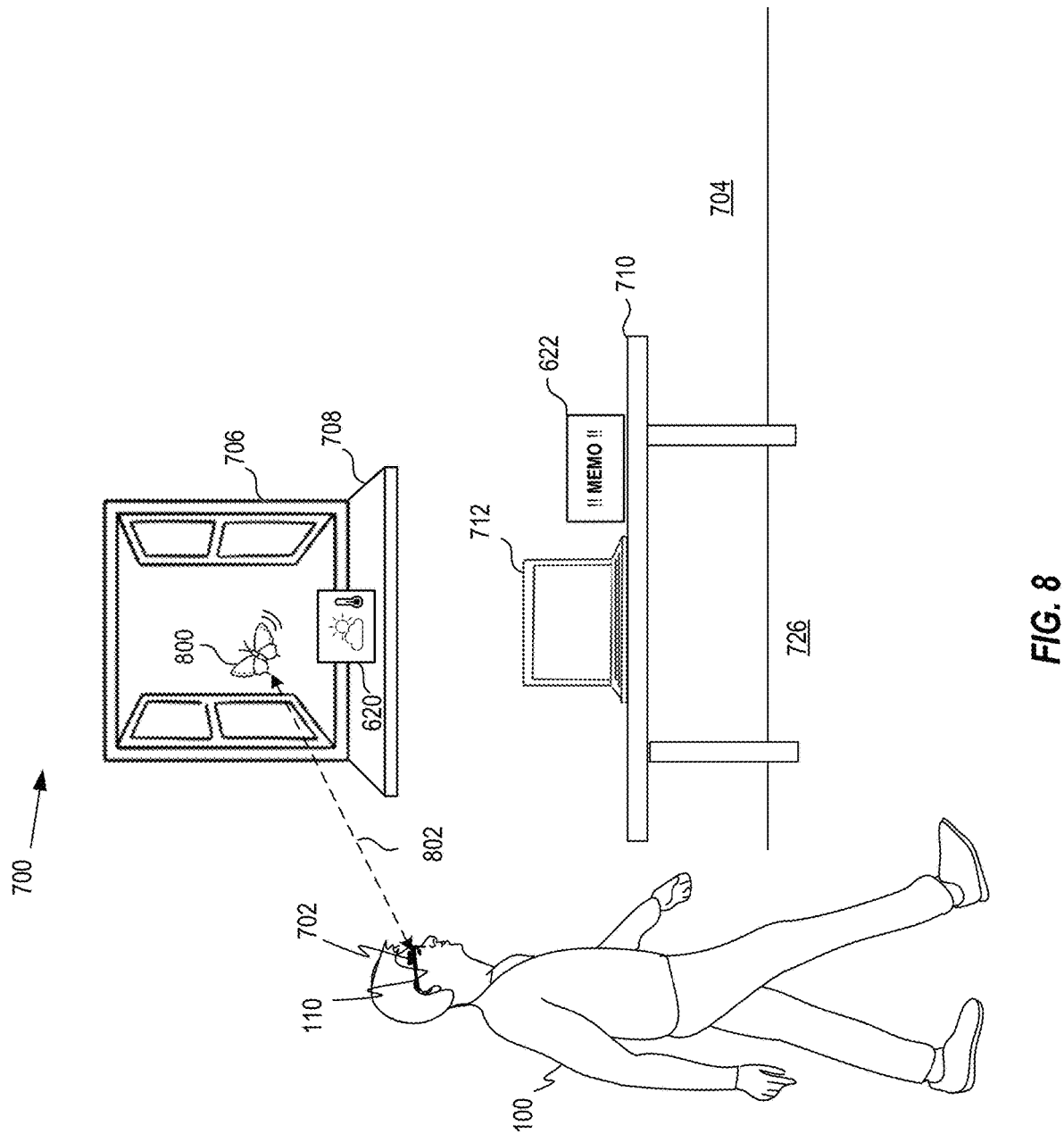
FIG. 8 illustrates another view of the exemplary layout of FIG. 7, consistent with some embodiments of the present disclosure.

By way of a non-limiting example, reference is made to FIG. 8 illustrating another view of exemplary layout 700, consistent with some embodiments of the present disclosure. At least one processing device 460 (see FIG. 4) may display memo 622 and weather forecast 620 and corresponding to first and second portions 604 and 602, respectively, in various locations in the environment. At least one processing device 460 may display memo 622 in first location 716, based on second, third, and fourth 3D placement requirements 614, 616, and 618, respectively, associated with first tag 608, and may display weather forecast 620 in second location 714, based on first and second 3D placement requirements 612 and 614, associated with second tag 606. At least one processing device 460 may request additional content (e.g., a virtual butterfly 800) from server 210 for virtual presentation in the environment of extended reality device appliance 110. At least one processing device 460 may receive virtual butterfly 800 and an indication associating virtual butterfly 800 with second tag 606. At least one processing device 460 may select first 3D placement requirement 612 for virtual butterfly 800 based on second tag 606. Using first 3D placement requirement 612 and first and second locations 716 and 714, at least one processing device 460 may determine a specific location in the environment for a virtual placement of virtual butterfly 800 (e.g., above second location 714, in compliance with first 3D placement requirement 612 associated with second tag 606).

Some disclosed embodiments involve determining, for a particular portion of the content associated with a particular tag of the plurality of tags, a new location in the environment for virtual placement of the particular portion of the content. A particular portion of the content associated with a particular tag of the plurality of tags refers to a specific portion of content with which a specific tag is associated. A new location in the environment for virtual placement of the particular portion of content refers to a different location for displaying the portion of content in the environment. In some embodiments, a new location may include a region in the environment that was not used to display content during a recent time period, and/or that currently is not being used to display content.

Some disclosed embodiments involve capturing, using the image sensor, a change in the environment. A change in an environment refers to an altered and/or modified environment. A change in an environment may be associated with an altered illumination, such as a new source of light, a modified layout, motion by a user and/or other individuals in the environment, and/or any other factor affecting the environment. For example, at least one processing device may use an image sensor to sense removal and/or introduction of a light source, and/or an increase or decrease in intensity of one or more sources of light (e.g., due to the time of day). As another example, at least one processing device may use an image sensor to detect a modified layout, such as removal and/or introduction of one or more physical objects and/or individuals, and/or any other change in the environment. Capturing using an image sensor refers to acquiring one or more images of an environment of an extended reality appliance with an associated image sensor (as described and exemplified elsewhere herein) and providing the one or more images to at least one processing device. Capturing, using an image sensor, a change in an environment refers to acquiring one or more images of the environment that differ in at least one respect from one or more prior images. The changes may be detected, for example, through a comparison. At least one processing device may compare one or more (e.g., recently captured) images of the environment with one or more previously captures images and detect one or more changes. For instance, an indoor environment may have changed to an outdoor environment, one or more light sources and/or objects may have been introduced and/or removed, and/or natural lighting may have changed due to the time of day.

Some disclosed embodiments involve, in response to the change in the environment, determining, for a particular portion of the content associated with a particular tag of the plurality of tags, a new location in the environment for virtual placement of the particular portion of the content. Upon detecting a change in the environment, the at least one processing device may determine a new location for presenting a particular portion of content in the environment. The at least one processing device may determine the new location based on the at least one 3D placement requirement selected for the particular portion of the content and the change identified from the captured images. For instance, the at least one processing device may determine that the change in the environment affects the visibility of the particular portion of content, e.g., due to occlusion by one or more objects, a glare and/or a shadow, and display the particular portion of content in the new location to improve visibility. In some embodiments, the determination is based on the at least one 3D placement requirement selected for the particular portion of the content and the change.

Some disclosed embodiments involve determining a movement of the extended reality appliance. A movement of an extended reality appliance refers to motion, and/or a change in position and/or orientation thereof. Determining a movement of an extended reality appliance may include sensing and/or otherwise detecting a movement using one or more associated sensors. Such sensors may include, for example, one or more of a motion sensor, an image sensor, an ultrasound sensor, an environmental sensor, and/or any other type of sensor for sensing movement. In some embodiments, a movement of an extended reality appliance by be associated with movement of a user wearing and/or otherwise carrying the extended reality appliance. The movement may cause a change in the environment, as described and exemplified earlier. For example, rotation by a user wearing an extended reality appliance may introduce and/or remove one or more objects from a field-of-view. Some embodiments involve, in response to the determined movement of the extended reality appliance, determining, for a particular portion of the content associated with a particular tag of the plurality of tags, a new location in the environment for virtual placement of the particular portion of the content. Upon detecting movement of the extended reality appliance, at least one processing device may determine a new location for presenting a particular portion of content in the environment, e.g., based on the at least one 3D placement requirement selected for the particular portion of content and the movement. For instance, the at least one processing device may determine that the movement affects the visibility of a portion of content, and may display the portion of content in the new location to improve visibility. In some embodiments, the determination is based on the at least one 3D placement requirement selected for the particular portion of the content and the movement.

Figure 9:
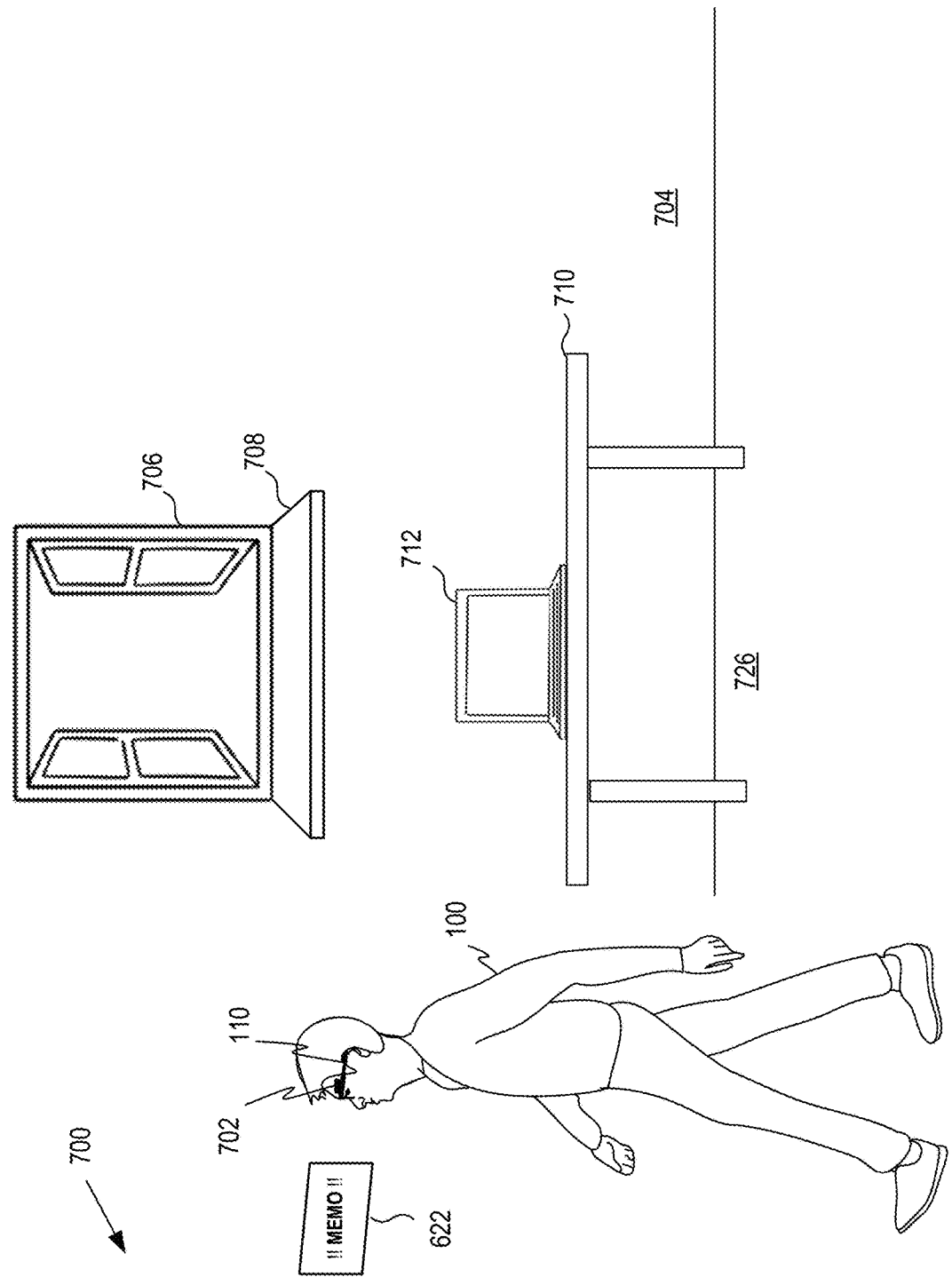
FIG. 9 illustrates an additional view of the exemplary layout of FIG. 7, consistent with some embodiments of the present disclosure.

By way of a non-limiting example, reference is made to FIG. 9 illustrating an additional view of the exemplary layout of FIG. 7, consistent with some embodiments of the present disclosure. At least one processing device 460 (see FIG. 4) may determine a movement of extended reality appliance 110, e.g., by analyzing image data captured by image sensor 472 to determine that user 100 has turned. Additionally or alternative, at least one processing device 460 may receive a notification from motion sensor 473. In response to the determined movement of extended reality appliance 110 and/or to the change in the environment, at least one processing device 460 may determine a new location in the environment for virtual placement of memo 622, corresponding to first portion 604 of content 600 and associated with first tag 608. The new location may comply with third 3D placement requirement 616, requiring positioning of memo 622 in a central region of a field-of-view of user 100. Upon detecting that user 100 is no longer facing computer display 712, at least one processing device 460 may move the location for memo 622 to comply with third 3D placement requirement 616.

In some embodiments, a particular portion of the content associated with a particular tag of the plurality of tags includes an inanimate virtual object. An inanimate virtual object refers to a digital representation of an object or entity that lacks autonomous movement, consciousness, or life-like qualities. For example, it may be a computer-generated entity lacking capability for autonomous movement and/or action. An inanimate virtual object may lack physical presence and may be incapable of real-world interactions outside the environment of an extended reality appliance. An inanimate virtual object may be static and may not interact with their environment or other objects on their own. Some examples of inanimate virtual objects may include virtual structures, backgrounds, and/or landscapes, such as a virtual wall, floor, ceiling, window, hill, valley, and/or tree. Thus, one or more portions of content received by the at least one processing device for virtual presentation in an environment of the extended reality appliance may include one or more inanimate virtual objects, such as a virtual tree, a virtual desk, and/or a virtual toy. The one or more inanimate virtual objects may be associated with one or more tags that may be used by at least one processing device to select one or more associated 3D placement requirements.

In some disclosed embodiments, the at least one 3D placement requirement selected for the particular portion of the content specifies that the inanimate virtual object needs to be displayed adjacent to a particular type of physical object. To specify refers to indicate, describe, and/or stipulate. Adjacent refers to near and/or in proximity to. A type of physical object refers to a category and/or classification for a physical object. A type for a physical object may be associated with one or more physical characteristics of an object, a context and/or expected location for a physical object, and/or any other trait associated with a physical object. For example, a physical object may be classified according to a surface type (e.g., flat, round, rough, or smooth), orientation (e.g., vertical, horizontal), interactions with light (e.g., at least partially transparent, opaque and/or reflective), mobility, and/or any other trait of a physical object. The inanimate virtual object needs to be displayed adjacent to a particular type of physical object refers to a requirement and/or rule mandating to locate the inanimate virtual object next to a specific category of physical objects. The requirement and/or rule may be associated with a context and/or a relationship between the inanimate virtual object and the type of physical object, improving visibility of the inanimate virtual object, and/or any other consideration for displaying an inanimate physical object. For example, one or more 3D placement requirements may specify to display a calendar widget against a physical wall, a virtual messenger adjacent to a mobile communications device, and/or a weather widget adjacent to a physical window. As another example, a 3D placement requirement may restrict display of a virtual object in a region where ambient illumination exceeds a threshold level.

Some disclosed embodiments involve determining the location of the inanimate virtual object based on identification of a physical object of the particular type in the environment of the extended reality appliance. Identification of a physical object of the particular type in the environment of the extended reality appliance refers to detection of a physical object in the environment categorized and/or classified in compliance with the specification of the 3D placement requirement. At least one processing device may identify a physical object of a particular type by analyzing data received from one or more sensor (e.g., image data capture by an image sensor). Determining the location of the inanimate virtual object based on identification of a physical object of the particular type in the environment of the extended reality appliance involves using identified physical object of the particular type to compute a location for the inanimate virtual object in a manner that complies with the associated 3D placement requirement. For instance, the at least one processing device may determine a location for the inanimate virtual object based on the size, position, context, interactivity, reflectance and/or reflectivity of the physical object. As an example, a 3D placement requirement may specify to display a virtual clock adjacent to a smooth vertical-oriented surface. The at least one processing device may analyze one or more images to identify a wall complying with the 3D placement requirement and determine a location adjacent to the physical wall for displaying the virtual clock. As another example, a 3D placement requirement may specify to display a weather app adjacent to a window. The at least one processing device may analyze images of the environment to detect a window for display the weather app adjacent thereto.

By way of a non-limiting example, in FIG. 8, memo 622 and weather forecast 620 associated with first and second portions 604 and 602 of content 600, respectively may be inanimate virtual objects. First 3D placement requirement selected for second portion 602 of content 600 may specify that weather forecast 620 needs to be displayed adjacent to a particular type of physical object (e.g., a window). At least one processing device 460 (see FIG. 4) may determine the location of weather forecast 620 based on identification of a physical object (e.g., window 706) in the environment of extended reality appliance 110.

In some disclosed embodiments, a particular portion of the content associated with a particular tag of the plurality of tags includes an animate virtual object. An animate virtual object refers to a digital or computer-generated representation of an object or entity possessing characteristics associated with a living or moving being (e.g., a person, animal, or robot). Some examples of animate virtual objects may include an avatar, a virtual house pet, a virtual robot, and/or an interactive bot (e.g., chatbot). One or more portions of content received for virtual presentation via an extended reality appliance may include one or more animate virtual objects. The one or more animate virtual objects may be associated with one or more tags that at least one processing may use to select one or more associated 3D placement requirements.

In some disclosed embodiments, the at least one 3D placement requirement selected for the particular portion of the content specifies that the animate virtual object needs to be displayed in a location with at least one illumination condition, An illumination condition refers to a lighting environment affecting the visibility of one or more objects and/or surfaces. An illumination condition may affect an interaction of one or more objects or surfaces with ambient light. An illumination condition may be associated with the intensity, direction, color, and distribution of light sources, lighting quality, brightness, color temperatures, and/or presence and/or absence of glares and/or shadows. Illumination conditions may affect the appearance of objects, such as the perception of color, shadows, reflections, and/or highlights. Content for virtual presentation may include an animate virtual object associated with one or more tags that may be used to select a 3D placement requirement specifying a lighting condition. Displaying the animate virtual object in accordance with the specified lighting condition may enable viewing and/or interactions with a user.

Some disclosed embodiments involve determining the location of the animate virtual object based on results of an analysis of illumination conditions in the environment of the extended reality appliance. An analysis of illumination conditions in an environment of an extended reality appliance refers to an evaluation of how lighting interacts with one or more virtual objects in the environment. At least one processing device may analyze illumination conditions in the environment by, for example, by analyzing image data to determine a location of one or more light sources and one or more virtual and/or physical objects interacting therewith, and/or detect one or more shadows, reflections, and/or glares. Results of an analysis of illumination conditions refers to conclusions and/or evaluations of illumination conditions in the environment. For example, upon determining that an animate virtual object must be displayed under an illumination condition specified according to a 3D placement requirement, the at least one processing device may analyze images of the environment to find a location complying therewith. The at least one processing device may display the animate virtual object at the determine location, to thereby meet the associated 3D placement requirement. Compliance with the 3D placement requirement may enable and/or improve the capability of a user to interact with the animate virtual object, e.g., by removing a glare and/or increasing a contrast. If no location complies with the illumination conditions, the at least one processing device may issue an alert to the user and/or prevent presentation of the animate virtual object.

By way of a non-limiting example, in FIG. 8, a particular portion of content 600 including an animate virtual object (e.g., virtual butterfly 800) may be associated with second tag 606. First 3D placement requirement 612 selected for virtual butterfly 800 may specify that virtual butterfly 800 needs to be displayed in a location with an illumination condition (e.g., in proximity to window 706). At least one processing device 460 (see FIG. 4) may determine the location of virtual butterfly 800 based on results of an analysis of illumination conditions in the environment of extended reality appliance 110, e.g., by analyzing images received from image sensor 472.

In some disclosed embodiments, a particular portion of the content associated with a particular tag of the plurality of tags includes an interactive virtual object configured to respond to inputs from a wearer of the extended reality appliance. An interactive virtual object refers to a digital representation that allows users to engage with and manipulate the representation or its functionality. For example, unlike static or passive objects, interactive virtual objects may respond to user actions, gestures, or commands, allowing the user to control their behavior, trigger actions, and/or influence their properties. It may refer a computer-generated object presented in a virtual environment capable of communicating and/or engaging with a user. Some examples of interactive virtual objects include one or more virtual tools, instruments, characters, avatars, pets, bots, interfacing elements such as a text box, button, entry field, and/or any other display element configured for interacting with a user. A user may interact with an interactive virtual object using gestures, speech, a keyboard, and/or an electronic pointing device (e.g., an electronic mouse, pen, and/or stylus). A wearer of an extended reality appliance refers to a user donning, carrying, holding and/or otherwise physically associated with an extended reality appliance. An extended reality appliance may move with a wearer thereof, allowing the wearer to view an environment of the extended reality appliance while in motion. An interactive virtual object configured to respond to inputs from a wearer of the extended reality appliance refers to an interactive virtual object configured to provide feedback to a user in response to information provided by the user. For example, an interactive virtual avatar may perform an action in response to a gesture by a user, an interactive button may trigger an action in response to a mouse click, and a bot may answer a question vocalized by a user. Content received for virtual presentation may include one or more interactive virtual objects associated with one or more tags. The at least one processing device may use the associated tags to select one or more 3D placement requirements for applying when determining where to locate the one or more interactive virtual objects.

In some disclosed embodiments, the at least one 3D placement requirement selected for the particular portion of the content specifies at least one requirement for a virtual distance of the interactive virtual object from the wearer. A virtual distance may be understood as described and exemplified herein above. A virtual distance of a virtual object from a wearer of an extended reality appliance refers to a separation and/or space perceived by the wearer to a virtual object, as described and exemplified elsewhere herein. A requirement for a virtual distance of the interactive virtual object from the wearer refers to a rule and/or constraint governing a distance perceived by a wearer of an extended reality appliance and an interactive virtual object. For example, such a requirement may cause the interactive virtual object to appear as though reachable by a hand or arm of the wearer.

Some disclosed embodiments involve determining the location of the interactive virtual object based on the at least one requirement for the virtual distance. Determining a location of an interactive virtual object based on a requirement for a virtual distance refers to identifying, deciding on, or calculating a location for the interactive virtual object that causes a wearer of an extended reality appliance to perceive the interactive virtual object at a virtual distance complying with the requirement. For example, at least one processing device may use a tag associated with an avatar to select a 3D placement requirement specifying to display the avatar within arm's length of the wearer. The at least one processing device may use the 3D placement requirement to determine the location of the avatar to appear within arm's length of the wearer, allowing the wearer to interact with the avatar using arm and/or hand gestures. If a location complying with the virtual distance requirement is not found, the at least one processing device may issue an alert to the user and may prevent presentation of the interactive virtual object.

By way of a non-limiting example, in FIG. 8, a particular portion of content 600 associated with second tag 606 includes an interactive virtual object (e.g., virtual butterfly 800) configured to respond to inputs (e.g., gestures) from a wearer (e.g., user 100) of the extended reality appliance 110. A 3D placement requirement selected for virtual butterfly 800 may specify a virtual distance 802 requirement from the wearer (e.g., user 100). At least one processing device 460 may determine the location for virtual butterfly 800 based on the virtual distance 802 requirement such that displaying virtual butterfly 800 within virtual distance 802 allows user 100 to manipulate virtual butterfly 800 using arm gestures.

In some disclosed embodiments, a particular portion of the content associated with a particular tag of the plurality of tags includes a moving virtual object. A moving virtual object refers to a digital or computer-simulated object that is configured to change its location over time in the extended reality environment. Some examples of a moving virtual object may include an avatar, a virtual pet, a virtual ball, and/or any other moveable virtual object. The received content may include one or more moving virtual objects that may be tagged as such, allowing the at least one processing device to select one or more associated 3D placement requirements. The at least one processing device may use the associated 3D placement requirements to determine locations for the one or more virtual objects and/or one more objects interacting therewith, e.g., to avoid interference, collision, occlusion by and/or of one or more other objects.

In some disclosed embodiments, the at least one 3D placement requirement selected for the particular portion of the content specifies that the moving virtual object needs a space free of physical obstacles. In this context, a "physical obstacle" refers to a real-world object or barrier that hinders or obstructs the movement of a virtual object within the extended reality environment. A space free of physical obstacles refers to a region or distance (e.g., length, area, volume, or some other indicator of distance) void of a physical obstacle that may interfere and/or appear to interfere with the motion of a moving virtual object. A 3D placement requirement selected for a particular portion of the content specifying that a moving virtual object needs a space free of physical obstacles refers to a 3D placement requirement selected for a moving virtual object (e.g., based on an associated tag) requiring the at least one processing device to find a region absent any physical obstacle that may interfere with the moving virtual object. Some disclosed embodiments involve determining an area in the environment in which the virtual object is able to move. An area in the environment in which a virtual object is able to move refers to a 3D space within a field-of-view of a user where a virtual object may change a location over time. The at least one processing device may determine such an area in compliance with one or more 3D placement requirements selected based on one or more associated tags. The at least one processing device may display the moving virtual object in the determined area to thereby allow the virtual object to move without encountering any physical obstacles. For example, at least one processing device may use a tag associated with a virtual ball to select a 3D placement requirement for displaying the virtual ball on the floor to roll freely, and display the virtual ball accordingly. If a space free of physical obstacles cannot be found, the at least one processing device may issue an alert to the user and may prevent presentation of the moving virtual object.

By way of a non-limiting example, in FIGS. 6 and 8, a particular portion of content 600 associated with first tag 608 may include a moving virtual object (e.g., virtual butterfly 800). A 3D placement requirement selected for virtual butterfly 800 may specify that virtual butterfly 800 needs a space free of physical obstacles. At least one processing device 460 (see FIG. 4) may determine an area in the environment (e.g., within the space of window 706) in which virtual butterfly 800 is able to move.

Some disclosed embodiments involve capturing, using the image sensor, a physical event in the environment. A physical event refers to a real-word occurrence. Examples of physical events may include a sunrise or sunset, turning on or off a light, opening and/or closing of a window or door, entry and/or exit of one or more individuals, and/or any other real-world occurrence in an environment of an extended reality appliance. Capturing, using an image sensor, a physical event in an environment refers to acquiring one or a plurality of images of the environment and analyzing and/or comparing the plurality of images to detect a change indicating an occurrence of a physical event. For example, an image sensor may capture a person or pet entering and/or exiting the environment, a mobile device falling to the floor, a window opening, and/or any other physical event. Additionally or alternatively, in some embodiments, an audio sensor (e.g., a microphone) may capture an audible physical event in the environment, such as a phone ringing, a person speaking, and/or a horn of a car passing by.

Some disclosed embodiments involve determining, for a particular portion of the content associated with a particular tag of the plurality of tags, a new location in the environment for virtual placement of the particular portion of the content based on the physical event. A new location (as described and exemplified elsewhere herein) based on a physical event refers to a different location that accounts for the physical event. For instance, a physical event may affect a visual presentation of a particular portion of content, e.g., by changing the illumination and/or the location of one or more physical objects. The at least one processing device may apply a 3D placement requirement to determine a new location for presenting the particular portion of content and display the particular portion of content accordingly upon occurrence of the physical event. For example, at least one processing device may use a tag associated with a virtual messaging widget to select a 3D placement requirement specifying to position the virtual messaging widget near a mobile device. In a first time period, the at least one processing device may position the virtual messaging widget in a first location adjacent to the mobile device. In a second time period, based on one or more images, the at least one processing device may detect that the mobile device has moved, and the virtual messaging widget no longer complies with the 3D placement requirement. In response, the at least one processing device may determine a second location for displaying the virtual messaging widget adjacent to the new physical location of mobile device.

By way of a non-limiting example, in FIGS. 6 and 9, at least one processing device 460 (see FIG. 4) may capture a physical event in the environment using image sensor 472 (e.g., user 100 has turned 180°, changing the field-of-view). At least one processing device 460 may determine a new location in the environment for virtual placement of memo 622 associated with first tag 608 based on the physical event. The new location may be in a central region of a field-of-view of user 100, in compliance with third 3D placement requirement 616 associated with memo 622.

Content received for virtual presentation may include multiple portions. Each portion may be configured to be located separately in an environment of an extended reality appliance, in accordance with one or more 3D placement requirements selected based on associated tags. In some disclosed embodiments, a first determined location in the environment for virtual placement of a first portion of the content associated with a first tag is a first location anchored to a physical object. A location anchored to a physical object refers to a position tethered (e.g., digitally), linked, and/or docked to a real-word object. For example, such a location may maintain a set distance from a physical object (e.g., defining a radius, circle, and/or sphere from and/or about the physical object for locating the portion of content). A first 3D placement requirement selected for a first portion of the content based on an associated tag may specify to anchor the first portion to a physical object. For example, a first 3D placement requirement for a messaging widget may anchor a messaging widget to a physical mobile device, such that moving the mobile device causes a corresponding movement of the messaging widget. In some disclosed embodiments, a second determined location in the environment for virtual placement of a second portion of the content associated with a second tag is a second location. A second 3D placement requirement selected for a second portion of the content based on an associated tag may specify a different location, e.g., absent a constraint to anchor the second portion to a physical object. For example, second 3D placement requirement for a calendar widget may locate the calendar widget above the messaging widget in a manner independent of the physical mobile device, such that the calendar widget may remain stationary when the mobile device is moved.

Some disclosed embodiments involve determining an impending collision between the first portion of the content and the second portion of the content due to a movement of the physical object. The term impending collision may be understood as described and exemplified elsewhere in this disclosure. An impending collision between a first portion of content and a second portion of content may refer to simulation of physical contact or impending physical contact between the first and second portions of content. For example, tossing of a virtual ball in response to a tossing gesture may cause a collision between the virtual ball and a virtual paddle. A movement of a physical object refers to a changed location of a physical object. A movement of a physical object may cause a corresponding change in location of a virtual object anchored thereto. An impending collision between the first portion of the content and the second portion of the content due to a movement of the physical object refers to an expected, imminent, approaching encounter, or a physical contact that just occurred between first and second portions of content caused by a change in location of a physical object causing a corresponding change in location of the second portion of content anchored thereto. Determining an impending collision refers predicting and/or detecting that a collision is about to occur or just occurred. At least one processing device may determine an impending collision by tracking different portions of content displayed in an environment at any given point in time, and determining expected trajectories. For example, at least one processing device may determine an impending collision by extrapolating a trajectory for at least one portion of content based on one or more associated 3D placement requirements. Referring to the example above, raising the mobile device may cause the messaging widget anchored thereto to rise accordingly and collide with the stationary calendar widget. The at least one processing device may use the 3D placement requirements for the messaging and calendar widgets to determine that movement of the mobile device may cause a corresponding movement of the messaging widget, leading to an impending collision there between.

Some disclosed embodiments involve using the first tag and the second tag to determine to favor the first portion of the content over the second portion of the content at the time of the impending collision. Favoring the first portion of the content over the second portion of content refers to preferring a display of the first portion of content instead of the second portion of content. For example, the first portion may be displayed overlapping (e.g., obscuring) the second portion. As another example, to avoid a collision, a location of the second portion may be changed and a location of the first portion may be maintained. At the time of the pending collision refers to during and/or just prior to an instant when the first and second portions of content are expected to collide. Using the first tag and the second tag to determine to favor the first portion of the content over the second portion of content may include prioritizing the first portion of content associated with the first tag higher than the second portion of content associated with the second tag. Assigning a higher priority to the first portion of content than to the second portion of content may cause the at least one processing device to satisfy one or more 3D placement requirements associated with the first tag before satisfying one or more 3D placement requirements associated with the second tag. For example, the first portion of content anchored to a physical object may continue to be displayed at a set distance from the physical object, and the at least one processing device may determine a new location for the second portion of content.

By way of a non-limiting example, in FIGS. 6 and 7, determined first location 716 in the environment for virtual placement of memo 622 associated with first tag 608 may be anchored to a physical object (e.g., computer display 712). Determined second location 714 in the environment for virtual placement of weather forecast 620 associated with second tag 606 may be another location. At least one processing device 460 (see FIG. 4) may determine an impending collision between memo 622 and weather forecast 620 due to a movement of computer display 712.

Figure 10:
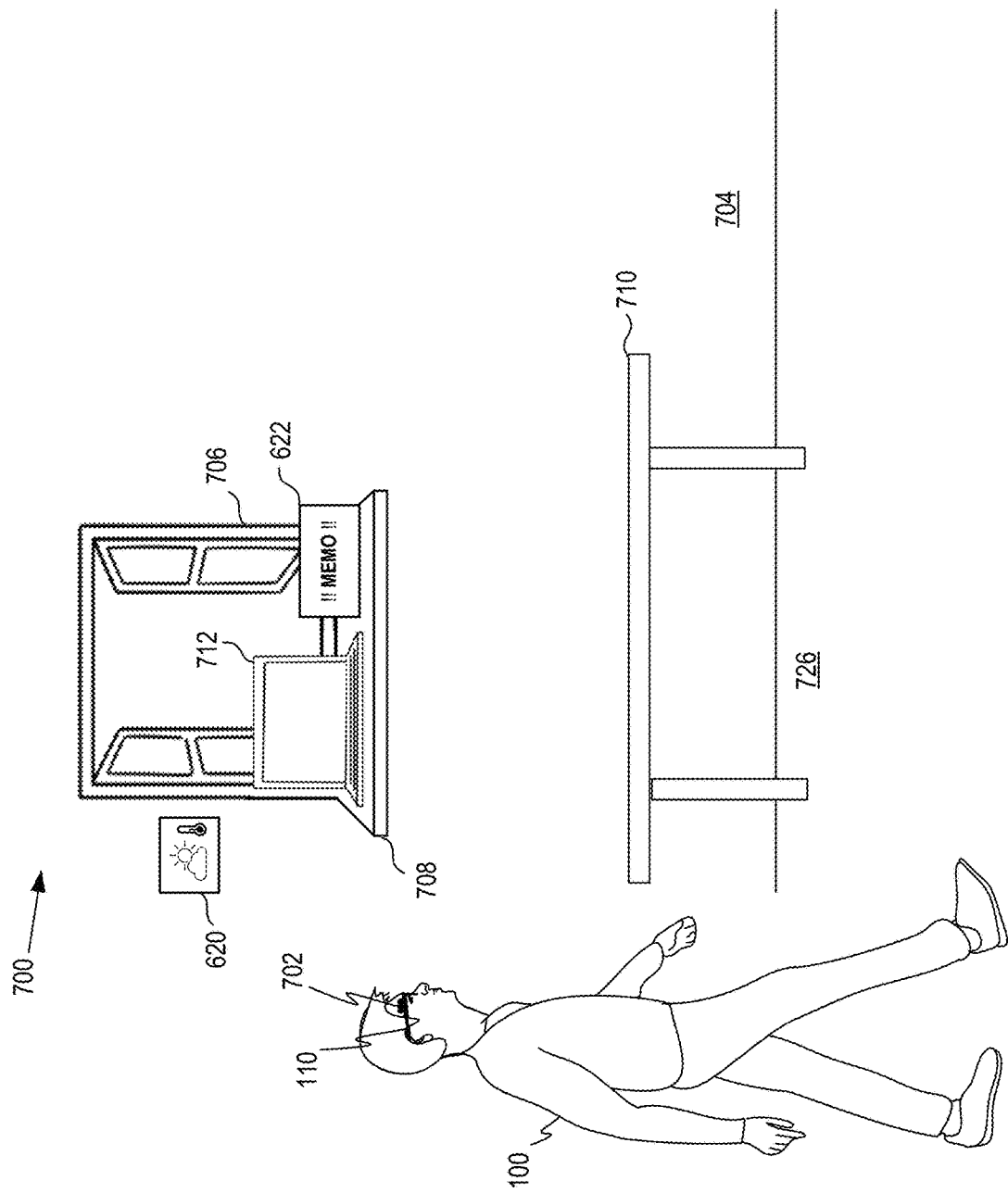
FIG. 10 illustrates a further view of the exemplary layout of FIG. 7, consistent with some embodiments of the present disclosure.

By way of another non-limiting example, reference is made to FIG. 10 illustrates a further view of the exemplary layout of FIG. 7, consistent with some embodiments of the present disclosure. For example, computer display 712 may be moved from desk 710 to ledge 708. At least one processing device 460 may use first tag 608 and second tag 606 to determine to favor memo 622 over weather forecast 620 at the time of the impending collision. For instance, at least one processing device 460 may display memo 622 on ledge 708 anchored to computer display 712, and display weather forecast 620 away from ledge 708, in proximity to window 706, in compliance with first and second 3D placement requirements 612 and 614, respectively.

Figure 11:
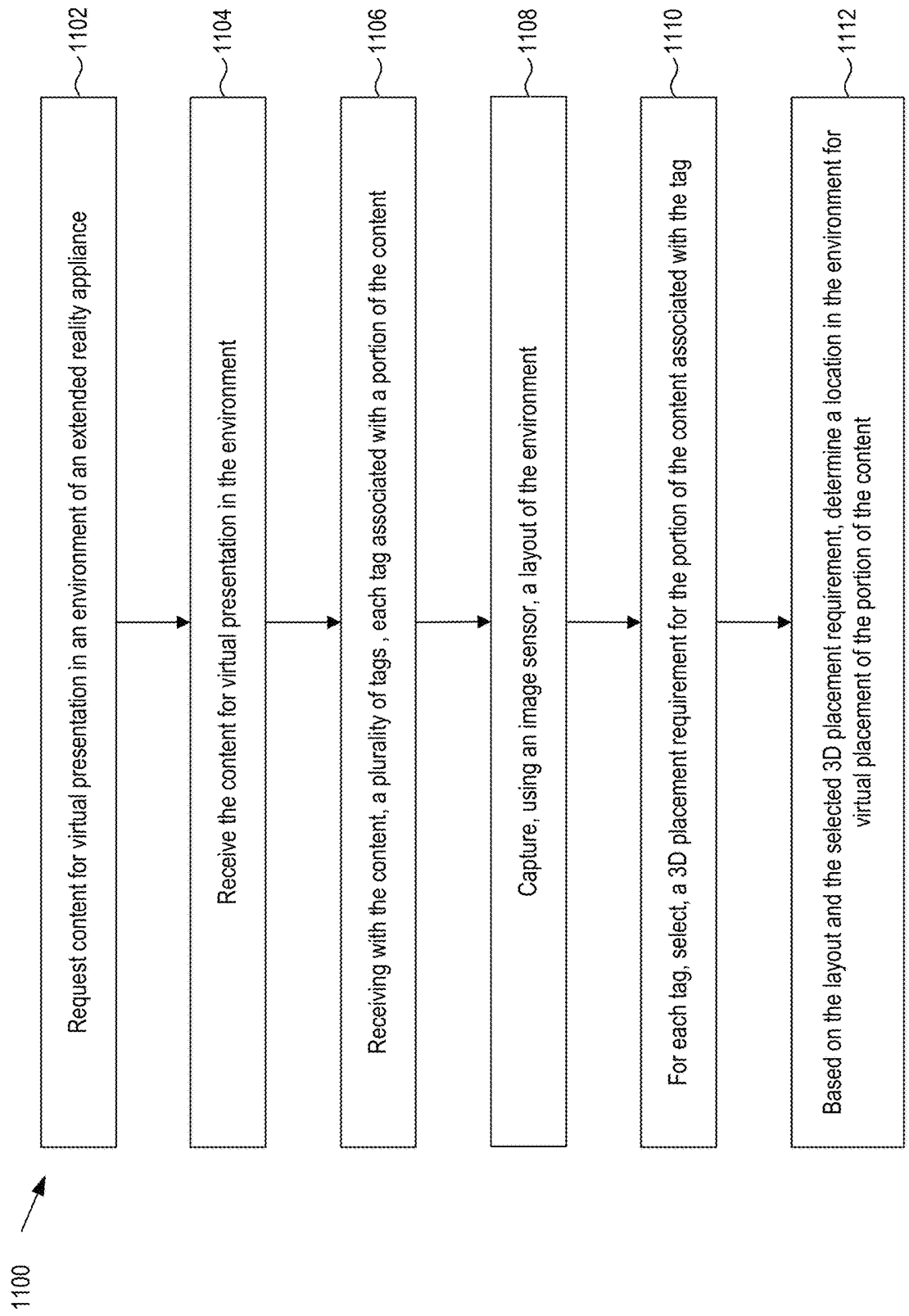
FIG. 11 is a flowchart of an example process for presenting content in three dimensional (3D) environments, consistent with embodiments of the present disclosure.

FIG. 11 illustrates a flowchart of an exemplary process 1100 for presenting content in three dimensional (3D) environments, consistent with embodiments of the present disclosure. In some embodiments, process 1100 may be performed by at least one processing device (e.g., processing device 460) to perform operations or functions described herein. In some embodiments, some aspects of process 1100 may be implemented as software (e.g., program codes or instructions) that are stored in a memory (e.g., memory device 411 of extended reality unit 204, shown in FIG. 4) or a non-transitory computer readable medium. In some embodiments, some aspects of process 1100 may be implemented as hardware (e.g., a specific-purpose circuit). In some embodiments, process 1100 may be implemented as a combination of software and hardware.

Referring to FIG. 11, process 1100 may include a step 1102 of requesting content for virtual presentation in an environment of an extended reality appliance. By way of a non-limiting example, in FIGS. 2 and 4, at least one processing device 460 may request content from server 210 via network 214. At least one processing device 460 may request the content for virtual presentation in an environment of wearable extendible reality appliance 110.

Process 1100 may include a step 1104 of receiving the content for the virtual presentation in the environment. By way of a non-limiting example, in FIGS. 2 and 4, at least one processing device 460 may receive the requested content from server 210 via network 214.

Process 1100 may include a step 1106 of receiving with the content, a plurality of tags, each tag of the plurality of tags being associated with a portion of the content. By way of a non-limiting example, in FIGS. 2 and 4, at least one processing device 460 may receive the content with a plurality of tags, each tag associated with a portion of the content. By way of another non-limiting example, in FIG. 6, processing device 460 may receive content 600 from server 210 via network 214. Content 600 may include at least first portion 604 and second portion 602. First portion 604 may be associated with first tag 608 and second portion 602 may be associated with second tag 606.

Process 1100 may include a step 1108 of capturing, using an image sensor, a layout of the environment. By way of a non-limiting example, in FIGS. 1 and 4, at least one processing device 460 may capture a layout of an environment surrounding user 100 using image sensor 472 of extended reality unit 204. By way of another non-limiting example, in FIG. 7, at least one processing device 460 may determine layout 700 based on a plurality of images acquired by image sensor 702 of the physical environment surrounding user 100. Layout 700 may include data descriptive of a physical floor 726, a wall 704 perpendicular to floor 726, a window 706 with a ledge 708, a desk 710, and a computer display 712. Window 706 may provide ambient daylight illuminating the physical space described by layout 700.

Process 1100 may include a step 1110 of, for each tag of the plurality of tags, selecting, based on the respective tag, at least one 3D placement requirement for the portion of the content associated with the respective tag. By way of a non-limiting example, in FIG. 6, at least one processing device 460 (see FIG. 4) may select second, third, and fourth 3D placement requirements 614, 616, and 618, respectively, for first portion 604 based on first tag 608 associated therewith, and select first and second 3D placement requirements 612 and 614, respectively, for second portion 602 based on second tag 606 associated therewith.

Process 1100 may include a step 1112 of, for each portion of the content, determining, based on the layout of the environment and the at least one 3D placement requirement selected for the respective portion of the content, a location in the environment for virtual placement of the respective portion of the content. By way of a non-limiting example, in FIGS. 6 and 7, based on layout 700 and second, third, and fourth 3D placement requirements 614, 616, and 618, respectively, selected for first portion 604, at least one processing device 460 may determine first location 716 on desk 710 adjacent to computer display 712 for virtual placement of memo 622 corresponding to first portion 604. Similarly, based on layout 700 and first and second 3D placement requirements 612 and 614, respectively, selected for second portion 602, at least one processing device 460 (see FIG. 4) may determine second location 714 on ledge 708 near window 706 in the environment of user 100 for virtual placement of weather forecast 620 corresponding to second portion 602. First location 716 may comply with second, third, and fourth 3D placement requirements 614, 616, and 618 associated therewith based on first tag 608, and second location 714 may comply with first and second 3D placement requirements 612 and 614 associated therewith based on second tag 606.

To improve user experience, in some disclosed embodiments, three-dimensional (3D) content served by a content provider may be adjusted based on one or more device settings of an extended reality appliance. Some disclosed embodiments describe selection of one or more 3D placement requirements based on device settings (e.g., for a particular extended reality appliance) by a content provider. In addition, the content provider may tag the 3D content and transmit the tagged content with the 3D placement requirements, for example to the extended reality appliance. The extended reality appliance may associate one or more of the 3D placement requirements selected by the content provider for applying when presenting content, e.g., based on a layout of an environment.

The 3D placement requirements may place one or more (e.g., general) constraints and/or considerations on where content may be displayed in the environment. In addition, to meet one or more physical (e.g., specific) constraints and/or considerations for displaying virtual content, a processing device associated with an extended reality appliance may determine a layout of the environment based on an analysis of image data. The processing device may determine locations for virtual placement of 3D content using the both the layout and the one or more 3D placement requirements, thereby meeting one or more general and specific constraints and/or considerations.

Some disclosed embodiments involve facilitating presentation of content in a three dimensional (3D) environment. Facilitating refers to assisting, permitting, enabling and/or expediting. Facilitating presentation of content in a three dimensional (3D) environment refers facilitating presentation of content in a 3D environment, as described and exemplified elsewhere herein. For example, a server and/or a processor may assist an extended reality appliance to position 3D virtual content for display in an associated environment.

Some disclosed embodiments involve receiving an indication of device settings of an extended reality appliance. Device settings of an extended reality appliance refers to one or more parameter values affecting the operation of an extended reality appliance. As an example, device settings may be associated with resource management, an environment, and/or a mode of use. Some examples of resources for managing using device settings may include memory, computing power, communications bandwidth, electrical power, time, space in an environment of an extended reality appliance, a field-of-view of a user, a pixel count, a resolution, and/or a color gamut of an electronic display, and/or any other resources associated with operating an extended reality appliance. In some embodiments, device settings may refer to the configurable options and preferences that users can customize to tailor their extended reality experience to their liking or specific needs. These may include, among others— display settings, audio settings, interaction settings, comfort settings, and accessibility settings. Display settings may include options to adjust the brightness, contrast, color saturation, and resolution of the extended reality appliance's display and may enable users to choose between different display modes, such as 2D, 3D, or panoramic, depending on the type of the extended reality experience and the capabilities of the device. Audio settings may enable users to control the volume, spatial audio settings, and audio balance between the real-world sounds and virtual or augmented elements. Interaction settings may enable users to setup the manner in which the users interact with virtual objects (e.g., hand tracking, gesture recognition, voice commands, or external input devices like controllers or gloves). Comfort settings may allow users to adjust parameters related to motion, field of view, and depth perception. Accessibility settings may enable activation of features such as, for example, text-to-speech, speech-to-text, closed captioning. Device settings may be stored in an electronic file. At least one processing device associated with the extended reality appliance may transmit a file storing device settings, and/or a link thereto, to a server configured to provide content for presenting via the extended reality appliance. An indication of device settings refers to information associated with one or more device settings. An indication of device settings may include, for example, data indicative of a device setting (e.g., brightness, display mode, or another setting) or a notification enabling access to one or more device settings, such as a message informing a server that a file storing device settings and/or a link thereto has been received. Receiving an indication of device settings of an extended reality appliance refers to one or more of obtaining, downloading, retrieving, or accessing data indicative of one or more device settings of the extended reality appliance. For example, obtaining data indicative of one or more preset display settings of an appliance may include retrieving such settings from internal memory. In some embodiments, it may refer to obtaining information that one or more device settings of an extended reality appliance may be accessed. For instance, such information may include an address and/or an access credential to a data structure and/or file stored in memory and containing one or more device settings. For instance, at least one processing device may receive such an indication, for example, as a setting for a flag and/or a parameter, in an electronic file, in a data structure, and/or an address and/or link thereto, in a message and/or argument thereof, and/or any other form of communicable information.

In some disclosed embodiments, the indication of the device settings of the extended reality appliance is received from the extended reality appliance. An indication of device settings received from the extended reality appliance refers to information associated with device settings provided by the extended reality appliance. For example, an extended reality appliance may transmit data, an electronic file, a data structure, and/or an argument storing one or more associated device settings and/or a link or address thereto to a server configured to provide content for presentation. The server may use the device settings to format content to accommodate one or more constraints indicated by the device settings. In some embodiments, the indication of device settings of the extended reality appliance is received from a data structure associated with the extended reality appliance. In some embodiments, the indication of device settings of the extended reality appliance is received from a computing device and/or at least one processor associated therewith that is paired with the extended reality appliance, for example from a computing device and/or processor that controls the presentation via the extended reality appliance.

In some disclosed embodiments, the device settings include an indication of whether the extended reality appliance has at least one of virtual reality capabilities or augmented reality capabilities. A capability refers to an ability and/or a capacity to perform an operation and/or provide a service. Virtual reality capabilities include capabilities for immersing a user in a computer-simulated environment. Such a computer-simulated environment may include computer-generated visual, audio, and/or haptic content. The computer-simulated environment may include one or more of AR, VR, XR, or any other form of simulation whether reality is augmented, mixed or completely simulated. An appliance configured with virtual reality capabilities may prevent light reflected off real-world objects from being sensed by a user viewing a virtual environment therethrough. Some examples of virtual reality capabilities may include high resolution display of three-dimensional graphics, a 360° field-of-view, real-time head and/or eye tracking, spatial audio rendition, integration with one or more interfaces (e.g., controllers) enabling user interactions, inclusion of additional users in a virtual environment allowing interactions therewith, and/or scaling a virtual environment to a physical space allowing a user to maneuver in the physical space as though inside the virtual environment. Devices configured with virtual reality capabilities may include headsets (e.g., immersive headsets), and/or goggles.

Augmented reality capabilities include capabilities for combining virtual content in a real world environment. For example, augmented reality capabilities may enable a user to view computer-generated visual and/or audio content alongside (e.g., simultaneously with) a real world environment, thereby enhancing the real world environment. An appliance configured with augmented reality capabilities may permit at least some light reflected off real-world objects from being sensed inside an augmented reality environment, allowing a user to view one or more virtual objects alongside one or more physical objects. In some implementations, such a device may include an at least some partially transparent screen portions allowing light reflected off a physical environment to be sensed directly by a user and at least some non-transparent and/or partially-transparent screen portions for overlaying virtual content on the physical environment (e.g., smart glasses). In some implementations, such a device may display one or more virtual objects overlaid on one or more images of a real world environment captured by a camera, allowing light reflected off the real world environment to be sensed by a user indirectly (e.g., a rear-view mirror for a car). Some examples of augmented reality capabilities may include high resolution display of three-dimensional graphics, a 360° field-of-view, real-time tracking of head and/or eye motion, real-time tracking of physical and/or virtual objects, and/or real-time mapping of virtual objects inside a real world environment. Some additional examples of augmented reality capabilities may include spatial audio rendition, integration with one or more interfaces enabling user interactions, inclusion of additional users, recognition of physical markers for triggering a presentation of digital content, computer-vision and/or artificial intelligence for recognizing physical objects (e.g., to trigger presentation of digital content), and/or any other technique enabling overlay of virtual objects in a physical environment. Devices configured with augmented reality capabilities may include mobile communication devices, tablets, electronic display screens, smart glasses, goggles, and/or headsets. A device setting associated with an extended reality appliance may inform a server configured to provide content if an appliance configured to receive the content is configured for virtual reality (e.g., totally immersion in a digital environment) or augmented reality (e.g., blending virtual content in a physical environment). A device settings including an indication of whether an extended reality appliance has at least one of virtual reality capabilities or augmented reality capabilities may include any information revealing if an extended reality appliance has virtual reality capabilities or augmented reality capabilities. As one example, information revealing whether the display setting of the extended reality appliance is configured to present virtual or augmented reality. For instance, such a device setting may include a flag, a device identifier, a device type, and/or any other type of information indicative of virtual reality and/or augmented reality capabilities for an extended reality appliance.

In some disclosed embodiments, the device settings include an indication of whether the extended reality appliance is wearable or nonwearable. A wearable object refers to an object configured to be donned, at least partially supported, attached, and/or otherwise transferable with a moving body. A wearable extended reality appliance refers to an extended reality appliance that is configured to be donned, at least partially supported, attached, and/or otherwise transferable with a moving body. Wearable extended reality appliances or devices may encompass a wide range of form factors, from headsets and glasses to gloves, suits, and accessories like wristbands or belts. They may include sensors to track movement, gestures, and sometimes physiological data of the user. Additionally, they may incorporate displays or projection systems to present virtual or augmented content to the user. In some embodiments, it may include computer technology embedded in an article configured to be worn and/or otherwise carried with a moving body. A wearable extended reality appliance may be transported with a moving body without engaging muscles of the hands, neck, legs, and/or feet to hold the appliance. Some examples of wearable extended reality appliances may include a headset, glasses, headphones, a watch, jewelry (e.g., a ring, earrings, bracelets, ankle bracelet, necklaces, and/or ear buds), a belt, a strap, an implant, textiles (e.g., clothing), shoes, and/or any other type of wearable article configured with at least one processing device and/or an antenna. A nonwearable object refers to an object that is not configured for donning or being worn on a human body. A nonwearable extended reality appliance may lack association with a wearable article. Transporting a nonwearable extended reality appliance with a moving body may require engagement of one or more muscles of the hands, arms, neck, legs, and/or feet to hold and/or carry the nonwearable extended reality appliance. Some examples of a nonwearable extended reality appliance may include a mobile communications device, a tablet, a display screen, projectors, holographic chambers and display devices, and/or any other non-wearable electronic device configured to display virtual content. A device setting including an indication of whether an extended reality appliance is wearable or nonwearable may include any data or information revealing if an extended reality appliance is wearable or nonwearable. For example, some embodiments of wearable extended reality appliances may include inertial sensors (e.g., accelerometers, gyroscopes) to track head movements while non-wearable devices may not. Data from these sensors may indicate whether the device is wearable or not. As another example, information related to the communication protocol or preset device information (e.g., manufacturer settings) and other preset data may indicate when device is wearable or not. At least one processing device may use an indication if an extended reality appliance is wearable or nonwearable to transmit content in a manner to allow presentation via the extended reality appliance. For example, content for presenting via a wearable extended reality appliance may require additional real-time tracking of physical and/or virtual objects and/or of a position and/or orientation of a user and/or of the wearable extended reality appliance than content for presenting via a nonwearable extended reality appliance. Thus, content for presenting via a wearable extended reality appliance may be associated with a different format and/or different metadata than content for presenting via a nonwearable extended reality appliance. For example, to display a navigation arrow overlaid on a streetscape shown on a car screen, at least one processing device may require location and/or orientation information for the car, whereas to display a navigation arrow overlaid on a streetscape seen through a pair of smart glasses worn by a driver of the car, at least one processing device may additionally require a pose and/or head orientation of the driver.

In some disclosed embodiments, the device settings include an indication of at least one of: image resolution, frame rate, latency, or refresh rate of the extended reality appliance. Image resolution refers to a level of detail and/or definition included in an image (e.g., a photograph, animation, video). For instance, image resolution may be associated with a number of pixels per unit space (e.g., pixels per inch, or PPI), a capability for spatial resolution (e.g., enabling to distinguish similar objects), spectral resolution (e.g., enabling to resolve spectral features), temporal resolution (e.g., enabling to accurately determine a location of an object at a specific point in time), and/or radiometric resolution (e.g., enabling to distinguish differences in intensity). For example, different extended reality devices may include differing hardware components affecting an associated image resolution. Frame rate refers to the frequency at which consecutive images (frames) are displayed in a given timeframe. For example, frame rate may refer to the number of individual frames or images displayed per second in a video or animation. In some instances, a frame rate may be measured in frames per second (fps). For example, a frame rate may be associated with a clock frequency, a memory and/or a bus capacity of a graphics processing unit (GPU) configure to generate one or more frames, and/or with a clock frequency, a memory, and/or a bus capacity of an electronic display configured to present one or more frames. In some embodiments, a higher frame rate may result in smoother motion and may reduce motion blur in visual content. In some exemplary extended reality applications, a higher frame rate may enhance an overall visual quality and reduce latency, a too low frame rate may cause a video to appear jumpy or jerky, and a frame rate that is faster than necessary may result in an inefficient allocation of resources. Refresh rate refers to a rate at which an image may be renewed and/or restored for displaying on an electronic display. In some instances, a refresh rate may be measured in hertz (Hz). A higher refresh rate may allow a display to update an image more frequently, resulting in smoother motion and reducing perceived flickering. XR devices may require higher refresh rates to maintain a smooth and immersive experience. Latency refers to a time delay. In some instances, latency may include a delay from when an input is provided to a processing device until a corresponding action is executed in response. As an example, latency may include the time from when a user performs a gesture to move a virtual object until the virtual object is displayed in a new location to simulate movement of the virtual object by the gesture. Device settings including an indication of at least one of: image resolution, frame rate, latency, or refresh rate of the extended reality appliance may include any data or information revealing and/or associated with an image resolution, frame rate, latency, or refresh rate of the extended reality appliance.

In some disclosed embodiments, the device settings include details of a content rendering software used by the extended reality appliance. Rendering refers to generating and/or presenting content based on a data. For instance, such content may include visual, audio, and/or haptic output. Content rendering software (e.g., a rendering engine) refers to an algorithm or program code configured to convert data and/or instructions to a visual, audio-visual, and/or haptic presentation of content. For instance, content rendering software may convert a source code file for a webpage to one or more images, animations, videos, text, audio, and/or haptic output presented via one or more interfacing devices (e.g., one or more visual displays, speakers, and/or haptic devices). As an example, a content rendering software may create a realistic and/or stylized images of three-dimensional objects by simulating lighting, shadows, reflections, shading, texture mapping, motion blur, and/or other visual effects to produce a lifelike depiction. As another example, a web browser may use web content rendering software to interpret source code (e.g., HTML, CSS, and/or JavaScript) to generate a visual and/or audio-visual representation of a web page. Some exemplary content rendering software packages include 3Delight®, Arnold®, and Artlantis®. At least one processing device may use details of a content rendering software to format and/or generate content in a manner to ensure compatibility with the content rendering software. Content rendering software used by an extended reality appliance refers to content rendering software executed by at least one processing device associated with an extended reality appliance. For instance, such rendering software may be at least partially installed on the extended reality appliance. In some embodiments, a portion of rendering software may be installed locally on the extended reality appliance and a portion of the software may be installed remotely (e.g., on a cloud server). Device settings including details of a content rendering software used by an extended reality appliance may include any information revealing and/or associated with content rendering software (e.g., a name and/or version of the software) used by an extended reality appliance.

By way of a non-limiting example, in FIG. 2, remote processing unit 208 may receive an indication of device settings of extended reality appliance 110 via network 214. For example, remote processing unit 208 may receive the indication of the device settings from extended reality appliance 110. In some embodiments, the device settings include an indication of whether extended reality appliance 110 has at least one of virtual reality capabilities or augmented reality capabilities. In some embodiments, the device settings include an indication of whether extended reality appliance 110 is wearable or nonwearable. In some embodiments, the device settings include an indication of image resolution, frame rate, latency, or refresh rate of extended reality appliance 110. In some embodiments, the device settings include an indication of content rendering software used by extended reality appliance 110.

Some disclosed embodiments involve receiving an indication of content requested for presentation via the extended reality appliance. Content for presentation via an extended reality appliance refers to content generated and/or formatted for viewing via an extended reality appliance. Some examples of such content may include, a webpage, a simulated and/or partially simulated environment (e.g., for surgery, manufacturing, gaming, and/or any other application for a simulated environment), one or more virtual objects for overlaying on a real world view of an environment, and/or any other type of content that may be presented via an extended reality appliance. An indication of content requested for presentation via the extended reality appliance refers to a notification associated with an extended reality appliance seeking, asking, and/or querying for content. Some examples of such indications may include a Get request complying with an HTTP protocol, invocation of a function and/or procedure (e.g., an Application Programming Interface or API) associated with requesting content, an alert to provide content based on a trigger and/or a schedule, and/or any other type of notification indicative of a request for content. For instance, at least one processing device may determine to provide content to an extended reality appliance upon detecting a change in an associated environment (e.g., to update the content), after a time period (e.g., to refresh the content), in response to an event (e.g., a user input and/or an external event), and/or in response to any other type of notification associated with a request for content. Receiving an indication of content requested for presentation via the extended reality appliance refers to obtaining and/or otherwise gaining access to a request for content for presentation.

By way of a non-limiting example, in FIG. 2, remote processing unit 208 may receive an indication of content requested for presentation via extended reality appliance 110. By way of another non-limiting example, in FIGS. 6 and 8, at least one processing device (e.g., processing device 460 of FIG. 4) may detect user 100 entering an environment associated with layout 700. In response, the at least one processing device may request content 600 for presentation via extended reality appliance 110 associated with layout 700. Content 600 may include for example, virtual butterfly 800, weather forecast 620, and memo 622.

Some disclosed embodiments involve, based on the received indication of the device settings, selecting 3D placement requirements for the requested content. Selecting 3D placement requirements refers to choosing and/or identifying 3D placement requirements, as described and exemplified elsewhere in this disclosure. Selecting a 3D placement requirement for the requested content based on a received indication of device settings refers to using the received indication of device settings to choose at least some 3D placement requirements. For example, at least one processing device may use an indication that an extended reality appliance has virtual reality capabilities to select a 3D placement requirement associated with positioning virtual objects in an entirely virtual environment. Similarly, the at least one processing device may use an indication that an extended reality appliance has augmented reality capabilities to select a 3D placement requirement associated with positioning virtual objects in a real world environment. As another example, at least one processing device may use an indication that an extended reality appliance is wearable to select a 3D placement requirement associated with a user's location, pose, orientation, and/or motion, and may use an indication that an extended reality appliance is nonwearable to select a 3D placement requirement associated with a location, orientation, and/or motion of the appliance. As a further example, at least one processing device may use an indication of image resolution, frame rate, latency, and/or refresh rate for an extended reality appliance to select a 3D placement requirement associated with formatting and/or providing content in a manner to accommodate one or more constraints associated with the image resolution, frame rate, latency, and/or refresh rate. As an additional example, at least one processing device may use an indication of a content rendering software to format, organize, label, and/or annotate content to conform to one or more specifications and/or constraints of the content rendering software.

In some disclosed embodiments, the 3D placement requirements include at least one of: a 3D physical background, a visual span, virtual object positioning protocols, 3D anchoring requirements, 3D content size requirements, or ambient illumination requirements. The terms 3D physical background, visual span, virtual object positioning protocols, 3D anchoring requirements, and ambient illumination requirements may be interpreted consistent with the terms 3D background, 3D visual span, virtual object placement protocols, 3D anchoring requirements, and 3D illumination requirements, respectively, described and exemplified elsewhere in this disclosure. 3D content size requirements refers to one or more constraints associated with a scale, proportion, and/or measurement for displaying content. For example, a 3D size requirement may be associated with one or more rules for allocating a number of pixels for displaying a portion of content, scaling a virtual object relative to one or more physical and/or another virtual object, and/or scaling a virtual object relative to an environment. As another example, a 3D size requirement may specify a minimum and/or maximum (e.g., relative or absolute) size for a portion of content. 3D placement requirements including at least one of: a 3D physical background, a visual span, virtual object positioning protocols, 3D anchoring requirements, 3D content size requirements, or ambient illumination requirements refers to 3D placement requirement including any information associated with one or more of 3D physical background, visual span, virtual object positioning protocols, 3D anchoring requirements, 3D content size requirements, or ambient illumination requirements.

For instance, based on an indication that an extended reality appliance is wearable (e.g., and therefore moves with a user) and has augmented reality capabilities, at least one processing device may select one or more 3D placement requirements to ensure that displayed virtual content is consistent with a 3D physical background of the user as the user moves in the environment. As another example, at least one processing device may select a 3D placement requirement to scale a portion of content to accommodate an image resolution of an extended reality appliance, and/or reduce a resolution for an image such that a delay for displaying the image is less than an associated latency threshold. As a further example, at least one processing device may select a 3D placement requirement to annotate and/or tag data to comply with specifications for a specific content rendering software package.

By way of a non-limiting example, in FIG. 2, based on the received indication of the device settings for extended reality appliance 110, remote processing unit 208 may select 3D placement requirements for the requested content. By way of another non-limiting example, FIG. 6 shows 3D replacement requirements 612, 614, 616, and 618. First 3D placement requirement 612 may require positioning an associated portion of adjacent to a window in the environment, and may thus be associated with a virtual object position protocol and/or ambient illumination requirements. Second 3D placement requirement 614 may require positioning an associated portion of content in a manner to maintain minimal margins between displayed content and a boundary of the field-of-view of user 100, and may thus be associated with a visual span. Fourth 3D placement requirement 618 may require anchoring a portion of content to a computer display and may thus be a 3D anchoring requirement.

In some disclosed embodiments, the device settings include an indication of a field of view of the extended reality appliance. Field of view refers to an observable region and/or space. Field of view of the extended reality appliance may refer to the extent of the physical world that a user can see through the device's display or optics at any given moment. It may refer to the angular extent of the visual environment that is visible to the user. In some instance, the field of view may be wedge-shaped, and may be measured as an angle spanning a region inside of which objects may be seen. A field of view of an extended reality appliance refers to a region and/or space that may be seen using the extended reality appliance. As an example, a field of view for a virtual reality appliance may be approximately 100°, and a field of view for an augmented reality appliance may be approximately 30°. Such fields of view are exemplary and may vary from device to device or depending on particular conditions. A user of an extended reality appliance may fail to observe physical and/or virtual objects located outside a field of view. Device settings include an indication of a field of view of the extended reality appliance may include any information revealing and/or associated with a field of view seen using an extended reality appliance. At least one processing device may use an indication of a field of view of an extended reality appliance to position, scale, and/or filter content to ensure that any rendered content fits inside the field of view.

In some disclosed embodiments, when the field of view of the extended reality appliance is less than a threshold, the selected 3D placement requirements specify the requested content for 2D display. A threshold refers to a limit, boundary, baseline, and/or a point, level, or limit at which something begins, ends, or changes. It may signify a boundary or a critical point that, when crossed or reached, leads to a shift or transition in a process, condition, or state. For example, a threshold may be associated with one or more measurements, such as a boundary on a distance, an area, and/or a volume. Less than a threshold refers to under a threshold, and/or not exceeding a threshold. For example, an object located at a distance less than a threshold is closer than an object located at the threshold. When a field of view of an extended reality appliance is less than a threshold refers to a situation where a field of view of an extended reality appliance is smaller than the threshold. For instance, if an extended reality appliance is configured for augmented reality, viewing a physical space through the extended reality appliance too close to a wall and/or in a confined space may block the field of view, thereby causing the field of view to be smaller than a threshold. A 2D display refers to displaying content in two dimensions. For instance, an object displayed in 2D may have a length and a height dimension but may lack a depth dimension. As an example, a flat electronic screen may be configured for 2D display. The selected 3D placement requirements specify the requested content for 2D display refers to the chosen and/or identified 3D placement requirements stipulating to render the requested content in two dimensions as opposed to three dimensions. For example, a depth of the field of view may be too small to render the requested content in three dimensions, and at least one processing device may thus render the requested content in two dimensions. In some embodiments, a threshold may be associated with a near point of a user (e.g., a closest point for seeing a focused image of an object) such that displaying an object closer than the threshold results in a blurred image. In some embodiments, a threshold may be associated with a size constraint for one or more virtual and/or physical objects in an environment of an extended reality appliance, such that displaying an object closer than the threshold results in an overcrowded environment (e.g., there may be too many objects to fit in the field of view), and/or an incomplete view of an object (e.g., the object may be too large to fit in the field of view). In some disclosed embodiments, when the field of view of the extended reality appliance is greater than the threshold, the selected 3D placement requirements specify the requested content for 3D display. Greater than a threshold refers to above and/or exceeding a threshold. For example, an object located at a distance greater than a threshold is further than an object located at the threshold. When the field of view of the extended reality appliance is greater than the threshold refers to a situation where a field of view of an extended reality appliance is larger than the threshold. For instance, in an augmented reality application, viewing an open space through an extended reality appliance may expose a field of view of an unassisted human via the appliance. The selected 3D placement requirements specify the request content for 3D display refers to the chosen and/or identified 3D placement requirements stipulating to render the requested content in three dimensions. For example, a depth of the field of view may be sufficient for rendering the requested content in three dimensions, and at least one processing device may render the requested content in three dimensions in response.

By way of a non-limiting example, in FIG. 2, remote processing unit 208 may receive device settings for extended reality appliance 110 including an indication of an associated field of view. By way of another non-limiting example, in FIG. 1, when the field of view of extended reality appliance 110 is less than a threshold, the selected 3D placement requirements may specify the requested content (e.g., virtual screen 112) for 2D display. By way of a further non-limiting example, in FIG. 8, when the field of view of extended reality appliance 110 is greater than the threshold, the selected 3D placement requirements specify the requested content (e.g., virtual butterfly 800) for 3D display.

In some disclosed embodiments, the device settings include an indication of a minimum focal distance of the extended reality appliance. Focal distance refers to a distance between a lens of an optical instrument and an associated focal point where parallel light rays may converge or diverge. It may refer to a focal length that is associated with, for example, a magnification capability for a lens. It may refer to the distance at which the device's optics are configured to present virtual content most clearly to the user. A longer focal length may be associated with a smaller angle of view and higher magnification (e.g., zoom in), and a shorter focal length may be associated with a larger angle of view and smaller magnification (e.g., zoom out). As an example, a focal distance of 50 mm may correspond to what human eyes see unassisted, a focal distance of 85 mm may be associated with capturing portraits, and a focal distance of 14 mm may be associated with capturing landscapes. A minimal focal distance of an extended reality appliance refers to a focal distance associated with an optical component of an extended reality appliance. Minimum focal distance of an extended reality device may refer to the shortest distance at which the device's optics can focus and still present virtual content clearly to the user. For instance, a minimal focal distance may indicate how close content may be displayed to a wearer of an extended reality appliance, e.g., without causing eye strain and/or to prevent the content from appearing out of focus. A device settings including an indication of a minimum focal distance of an extended reality appliance may include any information revealing and/or associated with minimum focal distance of an extended reality appliance. At least one processing device may use a device setting including an indication of a minimal focal distance of an extended reality appliance to determine a layout, size, and/or scaling for content, e.g., to prevent displayed content from causing eye strain.

In some embodiments, when the minimum focal distance is greater than a threshold, the selected 3D placement requirements include a condition of a minimum font size. When a minimum focal distance is greater than a threshold refers to a situation where a minimal focal distance is larger than a threshold value. For instance, such a threshold may be associated with a capability to view certain types of content, and/or certain sizes and/or scaling of content. In some embodiments, such a threshold may be a preset value. Font size refers to a size for displaying characters. In some instances, a font size may be measured in points (e.g., 0.3528 mm and/or 1/12 picas) and may indicate a height (e.g., a vertical measurement) of a character. A minimum font size refers to a smallest size for a character. For example, since characters smaller than 5 pt may be difficult to read, in some embodiments, a 5 pt font size may be a minimum font size. A condition of a minimum font size refers to a rule and/or a constraint restricting a font size to be greater than or equal to the minimum font size. For instance a condition of a minimum font size may ensure that a font size for regular text is greater than or equal to 10 pts, and a font size for a footnote is greater than or equal to 7 pts. As an example, when a minimum focal distance for an extended reality appliance is greater than a threshold, the extended reality appliance may be associated with a larger angle of view (e.g., zoom out), enabling at least one processing device to display text larger than or equal to a minimum font size without causing eye strain. In such a case, the at least one processing device may select a 3D placement requirement associated with a minimum font size, such that any displayed text is larger than or equal to the minimum font size. Selected 3D placement requirements including a condition of a minimum font size may include any information revealing and/or associated with minimum font size constraint. At least one processing device may use a device setting including an indication of a minimal font size to format and or layout text for display.

In some embodiments, when the minimum focal distance is less than the threshold, the selected 3D placement requirements lacks the condition of the minimum font size. A minimum focal distance s less than a threshold refers to a situation where a minimal focal distance is smaller than a baseline value. For instance, in such a case, an extended reality appliance may be operating in a zoom-in mode to view objects close up. A selected 3D placement requirement lacking a condition of a minimum font size refers to a selected 3D placement requirement absent and/or otherwise unassociated with a minimum font size. As an example, when a minimum focal distance for an extended reality appliance is smaller than a threshold, the extended reality appliance may be associated with a smaller angle of view (e.g., zoom in). In such a case, displaying text larger than or equal to a minimum font size may occupy too much of the field of view, causing eye strain and/or hampering a user from identifying the displayed characters. In such a case, the at least one processing device may select a 3D placement requirement lacking a minimum font size, such that any displayed text may be as small as necessary to enable the user to view the text without eye strain.

By way of a non-limiting example, in FIG. 8, the device settings for extended reality appliance 110 may include an indication of an associated minimum focal distance. For example, when the minimum focal distance is greater than a threshold (e.g., first virtual distance 724), selected 3D placement requirements 612 to 618 (see FIG. 6) may include a condition of a minimum font size (e.g., 18 pts). For instance memo 622 may be displayed using a font size of 18 pts. By way of another non-limiting example, in FIG. 1, when the minimum focal distance is less than the threshold, the selected 3D placement requirements may the condition of the minimum font size, e.g., document 116 may be displayed using a font size of 12 pts.

In some disclosed embodiments, the device settings include an indication of a maximum brightness level of the extended reality appliance. A brightness level refers to an amount of light emitted and/or reflected by an object. For instance, a brightness level may include an amount of light per solid angle radiating (e.g., directly emitted, scattered, and/or reflected) from an illumination source as a photometric quantity measured in candelas, nits (e.g., candelas per square meter), and/or watts. In some instances, a brightness level may be associated with human visual perception of luminance of an object and may be measured as lumens and/or lux. A maximum brightness level of an extended reality appliance refers to the highest degree of brightness that may be perceived using an extended reality appliance. For instance, an extended reality appliance configured to present high dynamic range content (e.g., HDR) may provide up to 5000 nits, whereas human vision may resolve luminance values ranging from over one million to almost zero nits. An indication of a maximum brightness level of an extended reality appliance refers to information associated with a level of peak brightness achievable using an extended reality appliance. For instance, an indication of maximum brightness for an extended reality appliance may include a numerical quantity associated with a number of candelas and/or nits, a relative level on a scale (e.g., low, medium, high), and/or any other measure of brightness. For example, at least one processing device may use a maximum brightness level for an extended reality appliance to determine an associated brightness level for differing portions of content. The associated brightness levels may be determined to ensure sufficient contrast for enabling a user to distinguish between the differing portions of content and an environment of the extended reality appliance.

In some disclosed embodiments, when the maximum brightness level is less than a threshold, the selected 3D placement requirements include a condition of avoiding placement of content in association with a physical window through which light passes. A maximum brightness level less than a threshold refers to a peak brightness level that is lower (e.g., dimmer) than a threshold value. Such a threshold may be associated, for example, with typical outdoor daylight conditions, ambient indoor lighting due to (e.g., direct or indirect) sunlight, ambient indoor lighting due to one or more artificial light sources, and/or any other ambient lighting condition. For instance, a maximum brightness level achievable by an extended reality appliance may be less than a peak brightness level typically expected in an associated environment. Failure to account for a maximum brightness level being less than a threshold may result in insufficient contrast between one or more displayed portions of content and background illumination conditions, which may hamper a capability of a user to discern the one or more displayed portions of content. A physical window through which light passes refers to an at least partially transparent and/or translucent real-world opening permitting photons to travel therethrough. For instance, a physical window may allow direct and/or indirect sunlight to enter an environment of an extended reality appliance. Such a window may be made, for example, of glass, plastic, thin fabric (e.g., mesh), and/or may be an open space. In association with a physical window through which light passes refers to in proximity to a physical window and/or in a manner affected (e.g., directly) by light passing through a physical window. Avoiding placement of content in associated with a physical window through which light passes refers to preventing, averting, and/or obviating positioning content in association with the physical window. For instance, such an avoidance may prevent content from being displayed in regions illuminated at a level exceeding the maximum brightness level of an extended reality appliance where a user may be unable to discern displayed content from a background environment. Selected 3D placement requirements include a condition of avoiding placement of content in association with a physical window through which light refers to the 3D placement requirements chosen based on the indications of device settings containing one or more rules and/or constraints preventing positioning of content in association with a physical window through which light passes. In some embodiments, a condition of avoiding placement of content in association with a physical window through which light passes may be associated with an ambient illumination requirement, as described earlier.

In some disclosed embodiments, when the maximum brightness level is greater than the threshold, the selected 3D placement requirements lacks the condition. When the maximum brightness level is greater than the threshold refers to a peak brightness level that is higher (e.g., brighter) than a baseline value. For instance, a maximum brightness level achievable by an extended reality appliance may be greater than a peak brightness level typically expected in an associated environment. Such a situation may allow sufficient contrast between one or more displayed portions of content and background illumination conditions to enable a user to discern the one or more displayed portions of content. Selected 3D placement requirements lacking the condition (e.g., of avoiding placement of content in association with a physical window through which light passes) refers to the 3D placement requirements chosen based on the indications of device settings lacking one or more rules and/or constraints preventing positioning of content in association with the physical window. For instance, such a situation may occur if an associated environment lacks a physical window, if a physical window faces indoors, during cloudy weather conditions, during the evening and/or night, and/or any other situation where a maximum brightness level of an extended reality appliance may be greater than a threshold.

By way of a non-limiting example, in FIG. 8, the device settings for extended reality appliance 110 may include an indication of an associated maximum brightness level. For example, when the maximum brightness level is less than a threshold, selected 3D placement requirement 612 may include a condition of avoiding placement of content in association with physical window 706 through which light passes. When the maximum brightness level is greater than the threshold, selected 3D placement requirement 612 may lack the condition, e.g., allowing at least one processing device (e.g., processing device 460 of FIG. 4) to place virtual butterfly in association with physical window 706 through which light passes.

Some disclosed embodiments involve transmitting the selected 3D placement requirements. Transmitting refers to sending and/or providing. For example, at least one processing device may transmit data using a wired and/or wireless communications channel. Such data may be streamed and/or transmitted as packets, in compliance with one or more communication protocols. Transmitting the selected 3D placement requirements refers to at least one processing device sending one or more selected 3D placement requirements. The 3D placement requirements may be transmitted as a file (e.g., a metadata file) in associated with requested content, as data (e.g., metadata), references and/or links embedded in a file containing requested content, and/or using any other technique for transmitting information. In some embodiments, the selected 3D placement requirements may be transmitted to the extended reality appliance. It is understood that transmitting the selected placement requirements to the extended reality appliance may be or include transmitting the selected placement requirements to a computing device paired with the extended reality appliance, where the computing device controls the presentation via the extended reality appliance.

Some disclosed embodiments involve transmitting the requested content Transmitting the requested content refers to sending the content that was asked for. For instance, the requested content may be transmitted as an electronic file, as a data structure, and/or as a reference, link, and/or credential, as data packets, and/or in a data stream. In some embodiments, the requested content may be transmitted to the extended reality appliance. It is understood that transmitting the requested content to the extended reality appliance may be or include transmitting the requested content to a computing device paired with the extended reality appliance, where the computing device controls the presentation via the extended reality appliance. In some examples, the transmitting the selected placement requirements and the transmitting the requested content may include transmitting the placement requirements and the content from the same computing device or from different computing devices.

In some disclosed embodiments, the transmitted content includes at least one tag for associating portions of the content with at least some of the 3D placement requirements to thereby enable the extended reality appliance to display the content in a 3D environment. The term tag may be understood as described and exemplified elsewhere in this disclosure. For example, it may refer to one or more of labels, markers, and/or keywords assigned to a piece of content. At least one tag for associating portions of the content with at least some of the 3D placement requirements refers to at least one tag configured to be used to link, assign, or otherwise relate at least some of the 3D placement requirement with a portion of the content. For instance, one or more portions of content may be associated with one or more tags. For each portion of content, at least one processing device may use the one or more associated tags to identify one or more 3D placement requirements for applying when presenting the portion of content, as described earlier. To enable an extended reality appliance to display content in a 3D environment refers to allowing and/or facilitating the extended reality appliance to display content in a 3D environment. For example, the 3D placement requirements associated with the portions of content may ensure that the portions of content are displayed in a manner complying with device settings of the extended reality appliance. For instance, the 3D placement requirements may ensure that the displayed content complies with the virtual and/or extended reality capabilities, the image resolution, frame rate, latency, refresh rate, and/or field of view of the extended reality appliance. As another example, the 3D placement requirements may ensure that the displayed content complies with the extended reality appliance being wearable or nonwearable, and/or with a content rendering software used there with.

By way of a non-limiting example, in FIGS. 2 and 6, remote processing unit 208 may transmit selected 3D placement requirements 612, 614, 616, and 618 to extended reality appliance 110 via network 214. In addition, remote processing unit 208 may transmit content 600 to extended reality appliance 110 via network 214. Content 600 may include first tag 608 and second tag 606 for associating first portion 604 and second portion 602 of content 600 with at least some of the 3D placement requirements to extended reality appliance 110 via network 214. For example first tag 608 may associate first portion 604 with 3D placement requirements 614, 616, and 618, and second tag 606 may associated second portion 602 with 3D placement requirements 612, and 614, to thereby enable extended reality appliance 110 to display content 600 in 3D environment associated with layout 700 (see FIG. 7).

In some disclosed embodiments, the requested content includes a first virtual object and a second virtual object. A virtual object refers to a digital representation of an element and/or item. In the context of an extended reality display, a virtual object may refer to a digital entity or element that is rendered and presented to the user within the extended reality environment. Unlike physical objects, virtual objects may exist purely in the digital realm and may be software generated. In some instances, a virtual object may be a portion of content, as described elsewhere herein. Some examples of virtual objects may include a widget, a chatbot, a virtual background, a virtual document, a virtual marker (e.g., a guiding arrow or boundary), a representation of a physical object or being, and/or any other item of virtual content. A first virtual object and a second virtual object refers to two different and/or distinct virtual objects. For instance, the first and second virtual objects may be different instances of the same type of virtual objects, or distinct instances of different types of virtual objects. For example, at least one processing device associated with an extended reality appliance may request a plurality of different virtual objects for display, such as a virtual calendar, a virtual clock, and/or multiple instances of a virtual document.

Some disclosed embodiments involve selecting a first particular 3D placement requirement for the first virtual object and selecting a second particular 3D placement requirement for the second virtual object. Selecting a particular 3D placement requirement for a virtual object refers to choosing and/or identifying a specific 3D placement requirement for associating with the virtual object. For instance, at least one processing device may apply the particular 3D placement requirement when displaying the virtual object using an extended reality appliance. Selecting a first particular 3D placement requirement for the first virtual object and selecting a second particular 3D placement requirement for the second virtual object refers to selecting different and/or distinct rules, guidelines, and/or specific locations, or categories for 3D placement of each of the first and second virtual objects. For instance, since the first and second virtual objects are distinct, differing constraints and/or considerations may be associated with displaying each virtual object. As an example, a first 3D placement requirement may be selected to anchor a virtual document to a physical surface, and a second 3D placement requirement may be selected to impose an ambient illumination requirement for displaying a virtual clock. As another example, a first 3D placement requirement may be selected to display a first virtual document to the left of a user and a second 3D placement requirement may be selected to display a second virtual document to the right of the user.

In some disclosed embodiments, the at least one tag includes a first tag and a second tag. A first tag and a second tag refers to at least two different and/or distinct labels, markers, codes, or indicators. For instance, the first and second tags may be different types of tags, and/or may include at least one non-overlapping piece of data. As an example, a first tag may be associated with displaying a virtual object in a foreground, and a second tag may be associated with displaying a virtual object in a background of an environment of an extended reality appliance. As another example, a first tag may be associated with an inanimate virtual object (e.g., a virtual houseplant) and a second tag may be associated with an interactive virtual object (e.g., an avatar).

Some disclosed embodiments involve associating the first tag with the first virtual object and associating the second tag with the second virtual object. Associating a tag with a virtual object refers to linking, assigning, or otherwise relating a tag to a virtual object. Associating a first tag with a first virtual object and associating a second tag with a second virtual object refers to linking a first tag to the first virtual object, and linking the second tag to the second virtual object. For instance, different virtual objects may be associated with different tags. As an example, a calendar widget may be associated with a first tag, which may be used to identify a 3D placement requirement causing the calendar widget to be displayed in a background and peripheral region of a field of view, and an avatar may be associated with a second 3D placement requirement causing the avatar to be displayed in a foreground and central region of a field of view of an extended reality appliance.

Some disclosed embodiments involve transmitting the first tag to thereby enable the extended reality appliance to display the first virtual object in a first manner, and transmitting the second tag to thereby enable the extended reality appliance to display the second virtual object in a second manner different from the first manner. Transmitting a tag refers to sending and/or otherwise providing access to a tag. For instance, at least one processing device may transmit one or more tags and/or references thereto in an electronic file as one or more packets or as a data stream via a wired and/or wireless communications link. In some embodiments, at least one processing device may include one or more tags in a file storing source code for content, and may associate different tags with different portions of the content. Transmitting a first tag and a second tag refers to transmitting two different and/or distinct tags. A manner refers to a fashion, mode, and/or format. Enabling an extended reality appliance to display a virtual object in a manner refers to allowing and/or facilitating an extended reality appliance to visually present a virtual object according to a format and/or mode. For instance, a display of a virtual object may be enhanced by applying one or more rules and/or constraints governing one or more display parameters. Such display parameters may include, for example, a position, an orientation, a size, a transparency level, a color, a saturation, an illumination level, a distance from a wearer and/or a physical and/or another virtual object, and/or any other type of display parameter. Displaying a virtual object in compliance with the one or more rules and/or constraints may result in an improved user experience than if one or more of the rules and/or constraints were violated. Enabling the extended reality appliance to display the first virtual object in a first manner, and enabling the extended reality appliance to display the second virtual object in a second manner different from the first manner refers to permitting and/or facilitating the extended reality appliance to display different and/or distinct virtual objects according to differing formats and/or modes. For instance, at least one processing device may use a first tag to display a first virtual object in a first location using a low resolution, and use a second tag to display a second virtual object in a second location using a high resolution. As another example, when a user requests to view a movie, at least one processing device may use a first tag associated with movie content to affix a virtual screen for playing the movie against a physical wall, and use a second tag associated with a virtual remote control to display the virtual remote control within grabbing distance of the user.

By way of a non-limiting example, in FIGS. 6 and 8, requested content 600 may include a first virtual object (e.g., first portion 604 of content 600 corresponding to memo 622) and a second virtual object (e.g., second portion 602 of content 600 corresponding to weather forecast 620). At least one processing device (e.g., processing device 560 of FIG. 5) may select a first particular 3D placement requirement (e.g., any of 3D placement requirements 614, 616, or 618) for memo 622 and select a second particular 3D placement requirement (e.g., any of 3D placement requirements 612 or 614) for weather forecast 620. In some embodiments, the at least one tag includes first tag 608 and second tag 606. At least one processing device may associate first tag 608 with the first virtual object (e.g., memo 622) and associate second tag 606 with the second virtual object (e.g., weather forecast 620). In some embodiments, at least one processing device may transmit first tag 608 to thereby enable extended reality appliance 110 to display memo 622 in a first manner (e.g., anchored to computer display 712), and transmit second tag 606 to thereby enable extended reality appliance 110 to display weather forecast 620 in a second manner different from the first manner, e.g., on ledge 708 adjacent to window 706.

Some disclosed embodiments involve receiving usage data of the extended reality appliance. Usage data refers to data, information, or metrics indicative of data usage such as an extent of usage, time of usage, amount of usage, or any other information. For example, the usage data may be received from the extended reality appliance. In another example, the usage data may be received from a computing device paired with the extended reality appliance, for example from a computing device that controls the presentation via the extended reality appliance. For instance, usage data may include user data and/or statistics associated with how a user and/or computing device interacts with a product, service, and/or technology, and may be collected by tracking and/or scraping data using data analytics tools, sensors, cookies, and/or user input. Usage data may include, for example, a number of times that a webpage is loaded, a number of user interactions with an application, a session duration, a sequence of actions taken by a user, a refresh rate for presenting content, a frequency for using distinct features of an application, a time for loading content, error logs, security and/or privacy data, and/or any other type of data recording data use. Usage data may additionally include, for example, data associated with tracking one or more body parts (e.g., the head, eyes, limbs, and/or digits) of a user, tracking of one or more moving physical and/or virtual objects in an environment, and/or updating a display of one or more virtual objects to accommodate one or more changes. Such changes may be associated with, for example, a change in position, orientation, pose, and/or location of a user and/or body part thereof, a change in illumination brightness, and/or a change in direction of illumination. For instance, upon detecting a change in orientation of an extended reality appliance, at least one processing device may adjust a perspective, size, shading, and/or shadows for one or more virtual objects, hide and/or introduce one or more virtual objects, adjust a size and/or scaling of one or more virtual objects, and/or perform any other adjustment to virtual content to maintain consistency with a perspective associated with the changed orientation. In a similar manner, upon detecting a change in illumination conditions, at least one processing device may adjust a brightness, saturation, color, and/or transparency setting for one or more portions of content. Each of these operations, and any other operation associated with user of data may contribute to the usage data. Usage data may be stored in an electronic file and/or in a data structure in memory. In some embodiments, at least one processing device may classify usage data according to type, level, rate, and/or any other measure. Such classification may be used, for example, to determine which 3D placement requirements to select for specific usage data. Receiving usage data from an extended reality appliance refers to gaining access to and/or otherwise obtaining usage data associated with an extended reality appliance. For instance, at least one processing device associated with an extended reality appliance may transmit a file and/or a data structure containing usage data, and/or an address and/or a credential granting access there to.

Some embodiments involve selecting the 3D placement requirements for the requested content based on the usage data. Selecting 3D placement requirements for requested content based on the usage data refers to using the usage data to choose the 3D placement requirements. For instance, at least one processing device may select differing 3D placement requirements for differing levels of usage data, e.g., based on a classification of the usage data to different categories. As an example, when the usage data is above a threshold, at least one processing device may select a 3D placement requirement associated with consuming less processing and/or memory resources than when the usage data is below the threshold, e.g., by causing images to be displayed using lower resolution to maintain a latency constraint. Alternatively, when the usage data is above a threshold, at least one processing device may select a 3D placement requirement associated with enlisting a graphics processing unit (GPU) in addition to a CPU. As another example, when the usage data is below the threshold, at least one processing device may select a 3D placement requirement associated with providing a functionality (e.g., real-time interaction with an avatar) that may be unavailable when the usage data is above the threshold.

Some disclosed embodiments involve determining from the usage data whether the extended reality appliance operates in a virtual reality mode or in an augmented reality mode. A mode refers to a way and/or manner in which something functions and/or operates. A virtual reality mode refers to a mode of an extended reality appliance for providing virtual reality functionalities. For example, in a virtual reality mode, a screen of an extended reality appliance may entirely cover a field of view of a user and may be entirely opaque permitting only virtual content to be viewed, thereby immersing a user inside a virtual environment. An augmented reality mode refers to a mode of an extended reality appliance for providing augmented reality functionalities. For example, in an augmented reality mode, a user may view virtual content overlaid on the real world. In some instances, a screen of an extended reality appliance operating in an augmented reality mode may cover a field of view of a user, but may include at least some transparent and/or partially transparent sections allowing light reflected off objects in the real world to pass through and be seen by a user. Additionally, or alternatively, an extended reality appliance operating in an augmented reality mode may display one or more images of the real world captured by a camera, and/or may leave a portion of a field of view of a user exposed to the real world. Determining from usage data whether an extended reality appliance operates in a virtual reality mode or in an augmented reality mode refers to assessing and/or estimating from the usage data if the extended reality appliance is operating in a virtual reality or augmented reality mode. For instance, since a user may only see virtual content in a virtual reality mode, but may see virtual content alongside a real world environment in an augmented reality mode, in some embodiments, some parameters or aspects of usage data in a virtual reality mode may be greater than usage data in an augmented reality mode. Additionally or alternatively, in a virtual reality mode, the user may exhibit behaviors like turning around to navigate the virtual environment, while in the augmented reality mode, the user may move around to interact with virtual objects overlaid on the physical world. The type and appearance of virtual objects may also differ between virtual and augmented reality modes. For example, virtual objects in augmented reality mode may include elements like pass-through elements to show the real world in addition to the virtual objects. Further, some applications or experiences may be designed exclusively for either virtual reality or augmented reality, which may provide an indication about the mode. For example, a medical simulation may be more likely to be virtual reality, while a furniture placement application may be more likely augmented reality. At least one processing device may use one or more of such differences to determine if an appliance is operating in a virtual or augmented reality mode based on the usage data at a given point in time. As an example, at least one processing device may compare the received usage data for a given time duration to a threshold value. The at least one processing device may determine that the appliance is operating in an augmented reality mode if the usage data is less than the threshold value, and operating in a virtual reality mode if the usage data is greater than the threshold value.

Some disclosed embodiments involve selecting the 3D placement requirements for the requested content based on the determination. Selecting 3D placement requirements for requested content based on the determination (e.g., whether the extended reality appliance operates in a virtual reality or an augmented reality mode) refers to choosing the 3D placement requirements in association with the determination. For instance, at least one processing device may select a first set of 3D placement requirements if the appliance operates in a virtual reality mode and a second set of 3D placement requirements if the appliance operates in an augmented reality mode. As an example, since an extended reality appliance operating in an augmented reality mode may display virtual content alongside real world objects, one or more of the 3D placement requirements selected for the augmented reality mode may include rules and/or constraints associated with positioning virtual content relative to real world objects. Similarly, one or more of the 3D placement requirements selected for the virtual reality mode may lack rules and/or constraints associated with positioning virtual content relative to real world objects.

Some disclosed embodiments involve determining from the usage data whether the extended reality appliance is currently operating outdoors or indoors. Currently refers to presently, and/or at a present moment or instant. Operating indoors refers to functioning inside a structure configured to provide shelter from at least some environmental elements. Such a structure may include, for instance, at least some walls and a roof configured to shelter a user and/or an appliance from environmental elements, such as rain, wind, direct and/or indirect sunlight, noise (e.g., due to traffic and/or wind), and/or any other type of environmental element. Some examples of a structure for operating indoors may include a house, an office, a shopping mall, an arena, a tent, a vehicle, and/or any other type of structure configured to shelter a user from at least some environmental elements. Operating outdoors refers to functioning in absence of a structure configured to provide shelter from at least some environmental elements. For example operating outdoors may expose a user and/or an appliance to environmental elements, such as rain, wind, direct and/or indirect sunlight, and/or noise. As another example, operating outdoors may require displaying content at a greater brightness level (for visual content), and/or at a higher volume (for audio content) than operating indoors. Determining from the usage data whether the extended reality appliance is currently operating outdoors or indoors may involve gauging the usage data to identify if the extended reality appliance is operating outdoor or indoors. For example, content displayed using a maximum brightness level may affect the usage data and may be indicative that the extended reality appliance is currently operating outdoors. Similarly, content displayed using a low brightness level during the day may affect the usage data and may be indicative that the extended reality appliance is currently operating indoors. In some embodiments, operating indoors may allow at least one processing device associated with an extended reality appliance to send and receive data locally (e.g., using Wi-Fi and/or Bluetooth) and/or access a locally stored data structure, whereas operating outdoors may require at least one processing device associated with an extended reality appliance to send and receive data remotely (e.g., using cellular and/or satellite communications networks) and/or access a data structure stored remotely. In some embodiments, some parameters or aspects of usage data associated with operating indoors may be lower than usage data associated with operating outdoors. For instance, the at least one processing device may determine that the appliance is operating indoors if the usage data is less than the threshold value, and operating outdoors if the usage data is greater than the threshold value.

Some disclosed embodiments involve selecting the 3D placement requirements for the requested content based on the determination. Selecting the 3D placement requirements for the requested content based on the determination (e.g., whether the extended reality appliance is currently operating outdoors or indoors) refers to choosing the 3D placement requirements in association with the determination. For instance, at least one processing device may select a first set of 3D placement requirements if the appliance is currently operating indoors and a second set of 3D placement requirements if the appliance is currently operating outdoors. As an example, 3D placement requirements selected indoor use may be associated lower illumination and/or volume settings than 3D placement requirements selected for outdoor use. As another example, 3D placement requirements selected for indoor use may be associated with a higher resolution and/or refresh rate than 3D placement requirements selected for outdoor use.

In some disclosed embodiments, the usage data includes at least part of an image captured using an image sensor included in the extended reality appliance. At least part of an image refers to some or all of an image, and/or some or all of a plurality of images. In some instances, at least part of an image may include a sequence of images captures as a video. At least part of an image captured using an image sensor included in the extended reality appliance may be understood as described and exemplified elsewhere herein. The usage data includes at least part of an image captured using an image sensor refers to at least part of an image including information indicative of at least some usage data. For instance, an extended reality appliance may use at least a part of an image captured by an associated image sensor to perform one or more operations associated with and/or contributing to usage data, as described earlier. In some disclosed embodiments, the selection of the 3D placement requirements for the requested content is based on an analysis of the at least part of an image. An analysis of at least part of an image refers to an investigation, calculation, scrutiny, and/or study of at least part of an image. For instance, such an analysis may include motion detection, edge detection, feature extraction, contrast enhancement, convolutions, segmentation, filtering, dithering, and/or any other image processing technique. As an example, the analysis may be used to track a user, a wearable extended reality appliance, determine illumination conditions, and/or identify one or more physical objects in an environment thereof. As another example, the analysis may be used to determine if an environment is indoors or outdoors, if the environment includes moving objects and/or people, and/or to determine a view of an environment from a perspective of a user. For instance, at least one processing device may use the analysis to classify the usage data the usage data, as described earlier. A selection of the 3D placement requirements for requested content based on an analysis of at least part of an image refers to using the results of the analysis of the at least part of the image to choose the 3D placement requirements for the requested content. For instance, the analysis may enable at least one processing device to determine the usage data and/or a classification thereof, and select the 3D placement requirements accordingly. As an example, at least one processing device may determine a usage level above a threshold based on an analysis of a sequence of images indicating that a user wearing an extendible reality appliance is actively engaging with a virtual object in an interactive game (e.g., the user is playing virtual ping pong with another user). Based on usage level being above the threshold level, the at least one processing device may select 3D placement requirements associated with a high usage data. For example, the selected 3D placement requirements may prioritize tracking a virtual ball to reduce response latency and may move virtual content located in a trajectory of the virtual ball to a different location to avoid an impending collision. In one example, the analysis of the at least part of the image may include calculating a convolution of the at least part of the image to obtain a numerical result value. Further, the selection of the 3D placement requirements for the requested content may be based on the numerical result value. For example, when the numerical result value is a first value, the selected 3D placement requirements may include a particular 3D placement requirement, and when the numerical result value is a second value, the selected 3D placement requirements may not include the particular 3D placement requirement.

By way of a non-limiting example, in FIG. 2, remote processing unit 208 may receive usage data from extended reality appliance 110. In FIG. 6, at least one processing device 560 (see FIG. 5) may select 3D placement requirements 612, 614, 616, and 618 for requested content 600 based on the usage data. For example, the at least one processing device may determine from the usage data that extended reality appliance 110 operates in an augmented reality mode and not in a virtual reality mode, e.g., based on the usage data being below a threshold associated with the virtual reality mode. Consequently, the at least one processing device may select 3D placement requirements 612, 614, 616, and 618 for requested content 600 based on the determination of the augmented reality mode. As another example, the at least one processing device may determine from the usage data that extended reality appliance 110 is currently operating indoors as opposed to outdoors, e.g., based on usage data associated with an indoor Wi-Fi connection. Consequently, the at least one processing device may select 3D placement requirements 612, 614, 616, and 618 for requested content 600 based on the determination of operating indoors. In some embodiments, the usage data includes at least part of an image captured using image sensor 472 included in extended reality appliance 110. At least one processing device (e.g., processing device 560 of FIG. 5) may receive the at least part of the image via network 214 (see FIG. 2). The at least one processing device may base the selection of 3D placement requirements 612, 614, 616, and 618 for requested content 600 on an analysis of the at least part of the image. For example, the at least one processing device may use the image analysis to generate layout 700 (see FIG. 7) and may select 3D placement requirements 612, 614, 616, and 618 for requested content 600 based on layout 700.

Some disclosed embodiments involve receiving location information of the extended reality appliance. Location information refers to data associated with a current position and/or orientation. For example, the location data may be received from the extended reality appliance. In another example, the location data may be received from a computing device paired with the extended reality appliance, for example from a computing device that controls the presentation via the extended reality appliance. In some instances, location information may be absolute (e.g., relative to the Earth), or relative to one or more physical and/or virtual objects. Location information may be associated with, for example, an identifier of one or more cellular towers, a Wi-Fi and/or Bluetooth connection, one or more RFID tags, a GPS satellite, measurements from an inertial measurement unit (IMU), one or more images captures by an image, an infrared sensor, a radar, LIDAR, and/or sonar sensor, and/or any other source of location information. For instance, location information may indicate if an environment is indoors or outdoors, a location type (e.g., shopping mall, private home, office, sports arena, beach), and/or if an extended reality appliance is in motion (e.g., the location information changes over time). Receiving location information from an extended reality appliance refers to obtaining and/or otherwise gaining access to location information from an extended reality appliance. For instance, an extended reality appliance may transmit location information over a network as an electronic file and/or a data structure and/or a link and/or credential thereto. Some disclosed embodiments involve selecting the 3D placement requirements for the requested content based on the location information. Selecting the 3D placement requirements for the requested content based on the location information refers to using the location information to choose the 3D placement requirements. For instance, at least one processing device may select different 3D placement requirements for different locations. As an example, at least one processing device may select a first set of 3D placement requirements for a quiet indoor setting (e.g., library), a second set of 3D placement requirements for a rowdy indoor setting (e.g., a pub), and a third set of 3D placement requirements for an outdoor setting (e.g., a city street).

By way of a non-limiting example, in FIG. 2, remote processing unit 208 may receive location information from extended reality appliance 110 via network 214. For instance, the location information may be sensed by a GPS sensor included in motion sensor 473. At least one processing device 560 (see FIG. 5) may select 3D placement requirements 612, 614, 616, and 618 for requested content 600 based on the location information. For instance, the location information may be indicative of layout 700 and 3D placement requirements 612, 614, 616, and 618 may be selected based on layout 700.

Some disclosed embodiments involve generating the requested content and determining the 3D placement requirements for the generated content. Generating requested content refer to producing and/or created requested content. At least one processing device may generate content, for example, by executing content rendering software, as described earlier, by employing artificial intelligence to generate text, images, audio, and/or video content, by retrieving content stored in memory, and/or using any other content generation technique. For instance, a natural language engine may generate text content for a chatbot and/or an interactive avatar, and generative adversarial network (e.g., GANs) may generate image and/or video content. Determining 3D placement requirements for generated content refers to using the generated content to choose the 3D placement requirements. For example, upon generating a sequence of images for an interactive avatar, at least one processing device may select 3D placement requirements for locating the interactive avatar in an environment of an extended reality appliance. As another example, upon generating a text for a virtual interactive form, at least at least one processing device may select 3D placement requirements for locating the virtual interactive form within reach of a hand of a user.

By way of a non-limiting example, in FIGS. 6 and 8, at least one processing device (e.g., processing device 560 of FIG. 5) may generate requested content 600 (e.g., memo 622, weather forecast 620, and butterfly 800) and may determine 3D placement requirements 612, 614, 616, and 618 for the generated content.

Figure 12:
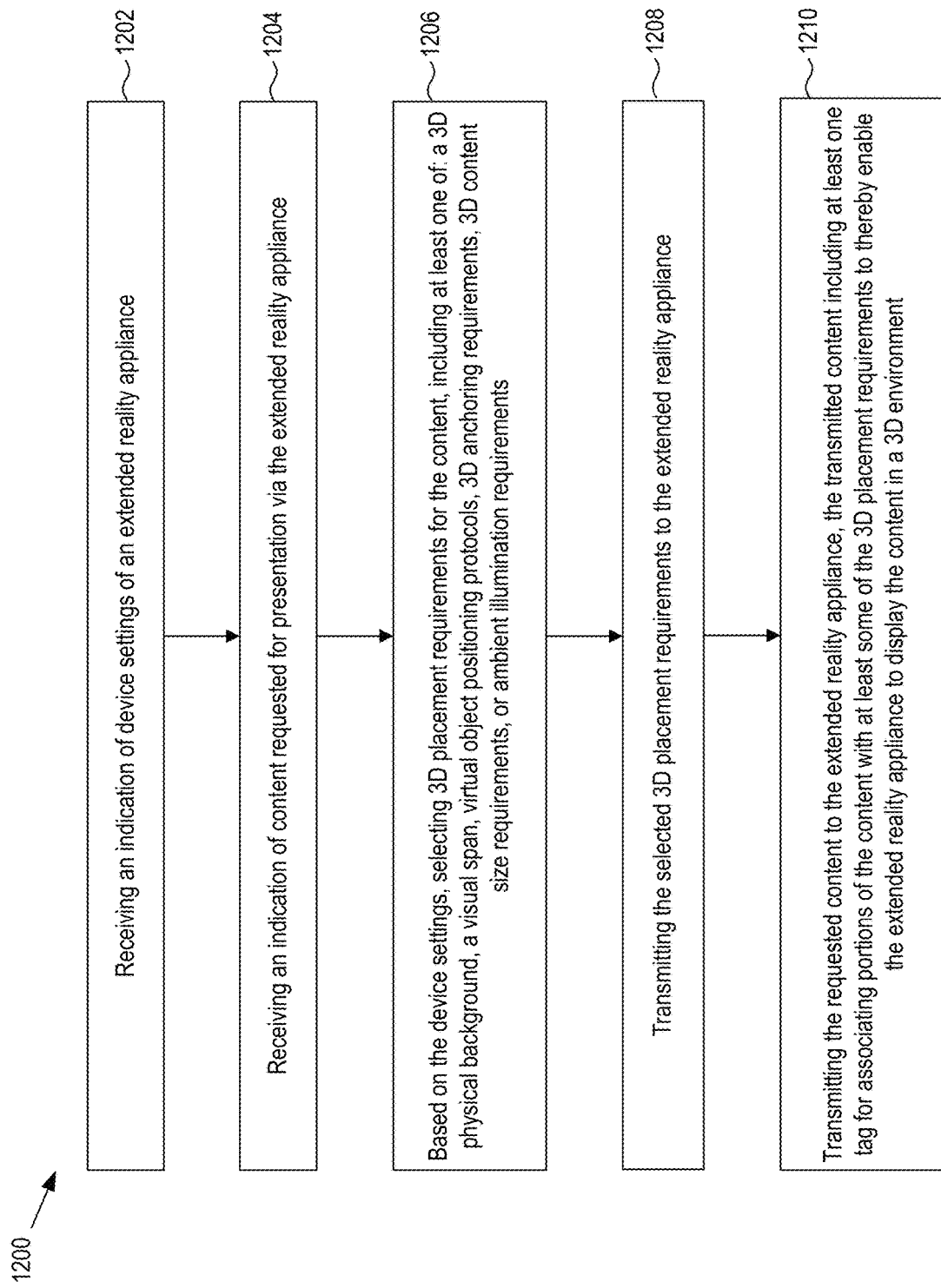
FIG. 12 is a flowchart of an example process for facilitating presentation of content in a three dimensional (3D) environment, consistent with embodiments of the present disclosure.

FIG. 12 illustrates a flowchart of an exemplary process 1200 for presenting content in three dimensional (3D) environments, consistent with embodiments of the present disclosure. In some embodiments, process 1200 may be performed by at least one processing device (e.g., processing device 560) to perform operations or functions described herein. In some embodiments, some aspects of process 1200 may be implemented as software (e.g., program codes or instructions) that are stored in a memory (e.g., memory device 511 of remote processing unit 208, shown in FIG. 5) or a non-transitory computer readable medium. In some embodiments, some aspects of process 1200 may be implemented as hardware (e.g., a specific-purpose circuit). In some embodiments, process 1200 may be implemented as a combination of software and hardware.

Referring to FIG. 12, process 1200 may include a step 1202 of receiving an indication of device settings of an extended reality appliance. By way of a non-limiting example, in FIG. 2, remote processing unit 208 may receive an indication of device settings of extended reality appliance 110 via network 214.

Process 1200 may include a step 1204 of receiving an indication of content requested for presentation via the extended reality appliance. By way of a non-limiting example, in FIG. 2, remote processing unit 208 may receive an indication of content requested for presentation via extended reality appliance 110. By way of another non-limiting example, in FIG. 8, the requested content 600 may include virtual butterfly 800, weather forecast 620, and memo 622.

Process 1200 may include a step 1206 of, based on the received indication of the device settings, selecting 3D placement requirements for the requested content, wherein the 3D placement requirements including at least one of: a 3D physical background, a visual span, virtual object positioning protocols, 3D anchoring requirements, 3D content size requirements, or ambient illumination requirements. By way of a non-limiting example, in FIG. 2, based on the received indication of the device settings for extended reality appliance 110, remote processing unit 208 may select 3D placement requirements for the requested content. By way of another non-limiting example, in FIG. 6 first 3D placement requirement 612 may be associated with a virtual object position protocol and/or ambient illumination requirements, second 3D placement requirement 614 may be associated with a visual span, and fourth 3D placement requirement 618 may be a 3D anchoring requirement.

Process 1200 may include a step 1208 of transmitting the selected 3D placement requirements. For example, the selected 3D placement requirements may be transmitted to the extended reality appliance. By way of a non-limiting example, in FIGS. 2 and 6, remote processing unit 208 may transmit selected 3D placement requirements 612, 614, 616, and 618 to extended reality appliance 110 via network 214.

Process 1200 may include a step 1210 of transmitting the requested content. For example, the requested content may be transmitted to the extended reality appliance. In some instances the transmitted content may include at least one tag for associating portions of the content with at least some of the 3D placement requirements to thereby enable the extended reality appliance to display the content in a 3D environment. By way of a non-limiting example, in FIGS. 2 and 6, remote processing unit 208 may transmit content 600 to extended reality appliance 110 via network 214. Content 600 may include first tag 608 and second tag 606 for associating first portion 604 and second portion 602 of content 600 with at least some of 3D placement requirements 612, 614, 616, and 618 to extended reality appliance 110 via network 214. For example first tag 608 may associate first portion 604 with 3D placement requirements 614, 616, and 618, and second tag 606 may associated second portion 602 with 3D placement requirements 612, and 614, to thereby enable extended reality appliance 110 to display content 600 in 3D environment associated with layout 700 (see FIG. 7).

Extended reality appliances of the current disclosure may be used display virtual content to one or more users in many use scenarios. For example, as described with reference to FIG. 1, virtual content including multiple virtual objects may be displayed by a wearable extended reality appliance 110 to a user 100. In some cases, one or more of the virtual objects may be docked to the user or another movable physical object. In some situations, for example, in shared extended reality experience where multiple people are collaborating (e.g., in a presentation), different virtual objects may be docked to different people or other physical objects. When two such physical objects approach each other, the virtual objects docked to these physical objects may virtually collide with each other. In some embodiments of the current disclosure, one or more priority rules may be used to address such impending virtual collisions between virtual objects.

Some disclosed embodiments involve preventing virtual collisions between virtual items. The term "virtual item" may be interpreted consistent with the previously described and exemplified term "virtual object." A virtual item refers to a digital or computer-generated object or element that may be presented within an extended reality or virtual environment or digital space. A virtual item may refer to any portion or part of the displayed virtual content. For example, the entirety of the displayed virtual content may be referred to as a virtual item, or individual portions (e.g., widgets, windows, or any other part) of the virtual content may be referred to as a virtual item. For example, as described with reference to FIG. 1, the virtual content displayed by extended reality appliance 110 includes a virtual screen 112 and a plurality of virtual widgets 114A-114D. These displayed objects may be collectively or individually referred to as a virtual item. A "collision" refers to an instance of one moving object touching (or striking) against another object. A collision also includes a situation where the objects do not actually touch, but one and/or the other is moving along a path making a collision likely, or where one or more of the objects moves into a predetermined close proximity to the other. For example, collision may refer to two or more moving objects touching each other or crashing into each other. However, the two objects do not have to touch each other for a collision to be deemed to occur. For example, in some embodiments, a collision between two objects may be determined to occur if a moving object comes to within a predetermined distance of another moving or stationary object. The term "virtual" may be interpreted consistent with the description and usage of this term elsewhere in this disclosure. For example, virtual may refer to something that does not physically exist but is made to appear to exist by software simulation. As used herein, virtual collision refers to a collision that does not physically exist but is made to appear to exist by simulation. For example, virtual collision may refer to a simulated collision or interaction between virtual objects. In other words, virtual collision may refer to creating the illusion of object collisions. In this context, preventing virtual collisions refers to implementing technologies and strategies to ensure that two or more virtual objects in the extended reality environment do not collide with each other or get close to each other in unintended ways resulting in an unnatural experience for the user.

Some disclosed embodiments involve presenting, via an extended reality appliance, a first virtual object docked to a first movable physical object. "Extended reality appliance" may be interpreted as described and exemplified elsewhere in this disclosure. "Presenting" refers to making something visibly known in any manner. For example, presenting may refer to displaying something. In the context of extended reality, presenting may refer to the act of showing, displaying, or simulating virtual content to a user using the extended reality appliance. A physical object refers to a collection of matter within a defined contiguous boundary. A physical object may refer to any tangible, real-world item that exists in the environment of the user of the extended reality appliance. A physical object may be anything from a table, a chair, a building, an animal, a plant, a person, a body part of a person, or any other tangible item. A movable physical object refers to a physical object that is capable of being moved (e.g., by someone), or can move (e.g., on its own), from one place to another.

Virtual object "docked" to a physical object, in the context of extended reality, refers to digitally coupling the virtual object to the physical object. It may refer to digitally attaching, connecting, or linking the virtual object to the physical object such that they are operably connected in some manner. For example, the virtual object and the physical object may be digitally connected such that the virtual object aligns with the physical object's position, orientation, and/or other characteristics. When a virtual object is docked with a physical object, the virtual object may appear as if it is naturally interacting with the physical object. As one example, when a physical object moves or is moved from one location to another, a virtual object docked to the physical object may move (or appear to move) with the physical object. As another example, when a person (e.g., the user) gestures with his/her hand, a virtual object docked to the hand may move, for example, corresponding to the gesture.

Some disclosed embodiments involve presenting, via the extended reality appliance, a second virtual object docked to a second movable physical object. A "second" virtual object refers to a virtual object that is distinct from the first virtual object. The first and second virtual objects may be identical virtual objects, but they are two different or distinct virtual objects. Similarly, "second" movable physical object is a movable physical object that is distinct from the first movable physical object. Even if the first and second physical objects are similar or identical physical objects, they are two physically different physical objects. In some disclosed embodiments, the extended reality apparatus may simultaneously present a first virtual object docked to a first physical object and a second virtual object docked to a second physical object.

Figure 13:
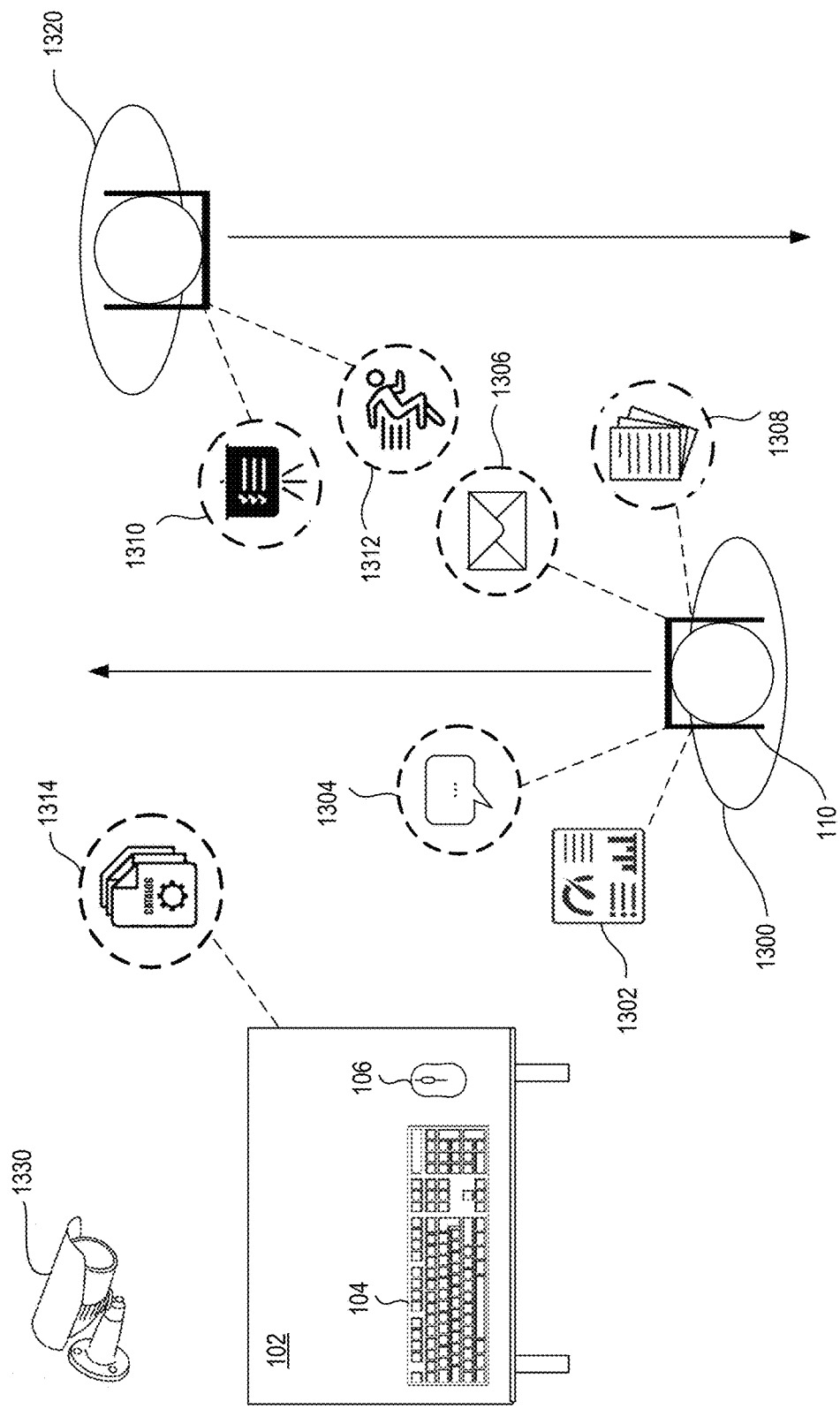
FIG. 13 is a schematic illustration of an exemplary extended reality environment with virtual objects, consistent with some embodiments of the present disclosure.
Figure 14:
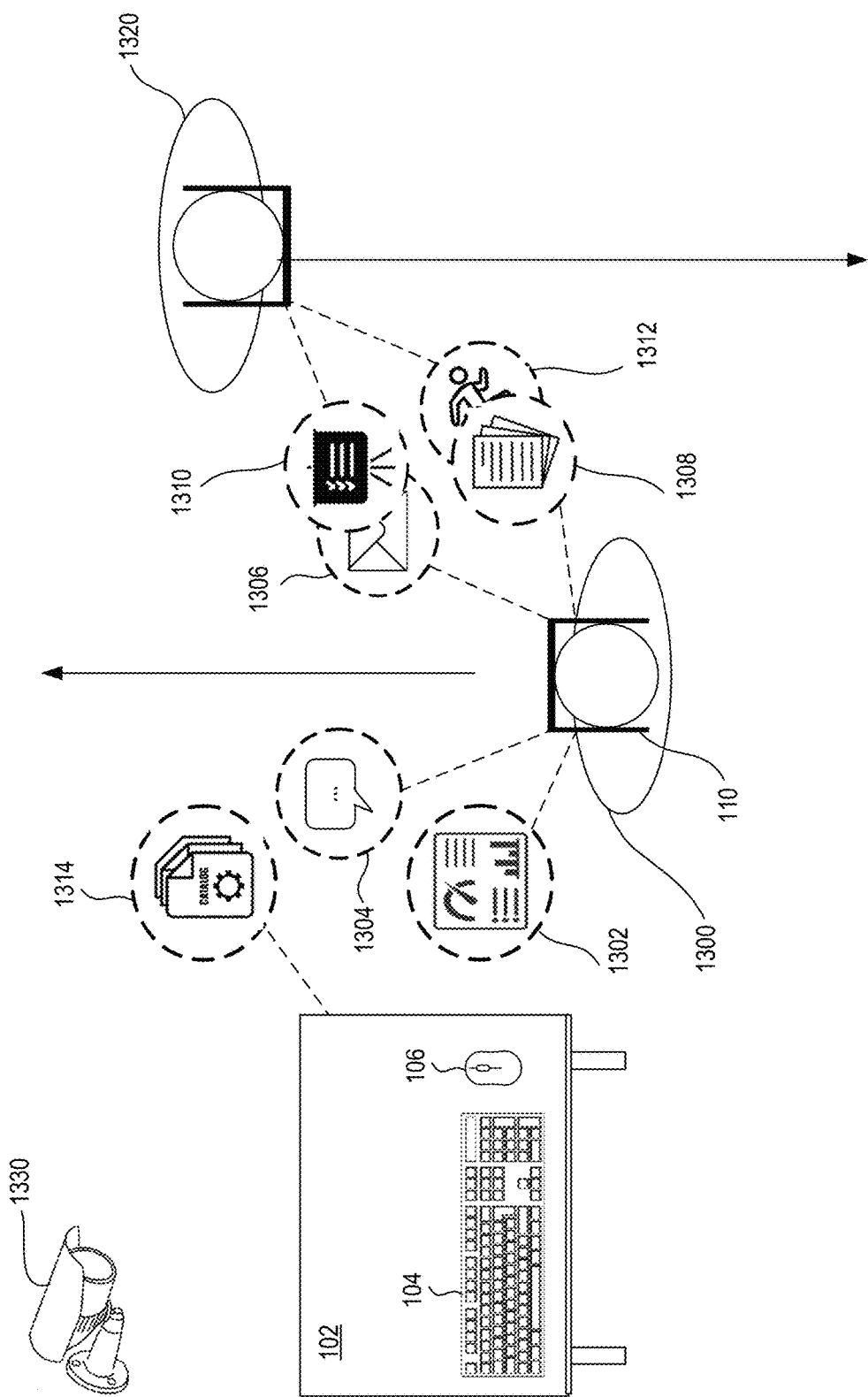
FIG. 14 is a schematic illustration of an exemplary extended reality environment with interacting virtual objects, consistent with some embodiments of the present disclosure.

FIG. 13 illustrates an exemplary extended reality environment with two persons—a user 1300 wearing an extended reality appliance 110 and another user 1320 wearing another extended reality device. Extended reality appliance 110 may display multiple virtual objects or widgets 1302, 1304, 1306, 1308, 1310, 1312, and 1314 (e.g., widgets 1302-1314). As would be recognized by one skilled in the art, virtual objects may be marked as private or public to control their visibility and accessibility within a shared extended reality environment. Some of the displayed widgets may be public virtual objects that may be visible to, and configured to be accessed by, both persons 1300, 1320. As illustrated using dashed lines in FIG. 13, some of the displayed widgets (e.g., widgets 1302-1308) may be docked with user 1300, some of the widgets (widgets 1310, 1312) may be docked with person 1320, and some of the widgets (e.g., widget 1314) may be docked to other physical objects (e.g., table 102) in the physical environment. In some embodiments, the widgets may be docked with each person such that the widgets move (or appear to move) corresponding to a movement of the person (e.g., see FIG. 14). It should be noted that the embodiment described with reference to FIGS. 13 and 14 are merely exemplary and numerous variations are possible. For example, although the widgets were described as being docked with persons, this is not a requirement. In some embodiments, one or more of the widgets may be docked with other physical objects or products (e.g., a table 102, keyboard 104, mouse 106, or another real-world product). As another example, a user may not wear the extended reality apparatus. Instead, a previously described non-wearable extended reality apparatus may display the widgets 1302-1314.

Consistent with some disclosed embodiments, the first movable physical object is a wearer of the extended reality appliance, and the second movable physical object is a person other than the wearer. A "wearer" of an extended reality appliance refers to the person upon whose body the extended reality apparatus is at least partly supported. As explained previously, the extended reality appliance may be a wearable device, such as a head-mounted device, for example, smart glasses, smart contact lens, headsets or any other device worn by a human. A wearer may refer to the individual that wears the extended reality appliance. For example, in the embodiment of FIG. 13, widgets 1302, 1304, 1306, 1308 may be docked with the person who wears extended reality apparatus 110 (e.g., user 1300), and widgets 1310 and 1312 may be docked with another person (e.g., user 1320). As one example, when user 1300 walks in one direction, widgets 1302, 1304, 1306, 1308 may also appear to move in that direction. Similarly, when user 1320 moves in one direction, the widgets docked to that user may also appear to move with user 1320. Docking different virtual objects with different persons in an extended reality environment may enable personalized and contextually relevant information to be provided to each person. For example, in collaborative extended reality environments, different virtual objects may be docked with different persons to provide each person with access to tools, data, and resources that are most relevant to their role or tasks and thereby create personalized workspaces. As another example, in educational or training scenarios, different learners may require various levels of instruction or content and docking customized virtual objects can enable adaptive learning experiences that align with an individual's skill levels and learning styles.

Consistent with some disclosed embodiments, the first movable physical object is a hand of a wearer of the extended reality appliance, and the second movable physical object is an inanimate object. An "inanimate object" refers to an object that has no life. For example, a physical object that has no life of its own is inanimate. An inanimate object may also refer to a physical object that cannot move by its own conscious will. Non limiting examples of inanimate objects include rocks, chairs, books, tables, and other physical items that do not exhibit biological functions or behaviors. These inanimate objects are contrasted with living organisms, which are characterized by their ability to carry out various physiological processes. For example, in the embodiment of FIG. 13, one or more of the displayed widgets (e.g., widget 1308) may be docked to a hand of user 1300 and one or more of the other widgets (e.g., widget 1314) may be docked to an inanimate physical object (such as, for example, table 102). As one example, when user 1300 gestures with his/her hand (e.g., a flinging or swiping motion), widget 1308, docked to the user's hand, may appear to move in a corresponding manner (e.g., slide in the same direction). Virtual objects may be docked with inanimate objects, such as, physical products to provide enhanced visualizations and information. For example, a virtual object that displays or includes, for example, a barcode showing price and other details, user manual, assembly instructions, repair instructions, or other relevant information of the product may be docked with a physical product to display information related to the product.

Consistent with some disclosed embodiments, the first movable physical object is an inanimate object, and the second movable physical object is a person or an animal. An "animal" refers to a living being that can move and react to the world through its senses. Animals may include all living beings including humans. Non-limiting examples of animals include dogs, cats, pets, birds, and other non-human living beings. In the exemplary embodiment of FIG. 13, one or more virtual objects (e.g., widget 1314) may be docked to table 102 (or another physical product) and one or more of the other virtual objects (e.g., widget 1310) may be docked to user 1320 or an animal, such as, for example, a pet dog or cat. Virtual objects may be docked with animals to provide information (e.g., information related to the breed and/or other relevant information) related to the animal.

Some disclosed embodiments involve tracking movement of the first physical object and movement of the second physical object. "Movement" refers to the act or process of changing physical position, orientation, or location. "Tracking movement" refers to the act or process of following, recording, monitoring the movement of someone or something over a period of time. Tracking movement may refer, for example, to monitoring the motion, position, orientation, speed, or direction of motion, of objects, people, or other items within a given space. In general, movement of the first and/or the second physical object may be tracked in any way. In some embodiments, sensors, cameras, or other detection methods may be used to track the movement of the first and/or the second physical object. In some embodiments, tracking the movement of the first and/or second physical objects may include tracking one or more characteristics (position, speed, direction, acceleration, orientation, or another parameter associated with movement) of one or both of the first and second physical objects. For example, in some embodiments, one or more of the distance between the two physical objects, the speed of at least one of the physical objects, and the direction of movement of at least one of the physical objects may be tracked.

For example, in the embodiment of FIG. 13, a camera 1330 may be used to track the movement of users 1300, 1320 and other physical objects in the environment of the users (such as, for example, table 102, keyboard 104, mouse 106, and other movable physical items). In some embodiments, camera 1330 may indicate that users 1300, 1320 are moving towards each other. The camera 1330 may also record the rate at which they are moving, the distance between them, and other relevant characteristics of their movement. In some embodiments, camera 1330 may indicate that one user is stationary and the other user is moving towards the stationary user. In some embodiments, additionally or alternatively, one or more characteristics (position, speed, direction, acceleration, or another parameter associated with movement) of the movement may also be tracked.

Consistent with some disclosed embodiments, the operations further include capturing image data using an image sensor associated with the extended reality appliance. The terms "image sensor" and "image data" may be interpreted consistent with their description elsewhere in this disclosure. For example, an image sensor may refer to a device used to capture visual information and convert it into an electronic signal, and image data may refer to the visual information captured by the image sensor. An image sensor "associated with" the extended reality appliance refers to a connection, relationship, partnership, or link between the image sensor and the extended reality appliance. It may include an image sensor connected with, or included in, the extended reality appliance. It may also include an external image sensor in a collaborative relationship with the extended reality appliance. As explained previously, in some embodiments, extended reality appliance may include one or more image sensors that may capture image data (see, e.g., FIG. 4). The image sensor may capture one or more digital images and/or video of what the wearer of the extended reality appliance sees.

Some disclosed embodiments involve analyzing the image data to track the movement of at least one of the first physical object or the second physical object. The image data from the image sensor associated with the extended reality appliance may be analyzed to determine some characteristic of the movement of the first and/or the second physical object to track its movement, for example using visual odometry algorithms. For example, in some embodiments, successive frames of images captured by the image sensor may be analyzed to determine one or more of the velocity, acceleration, distance moved, trajectory, or other relevant motion related characteristics of the first physical object and/or the second physical object to track its movement. For example, in some embodiments, computer vision techniques and/or algorithms may be used to follow the trajectory of one or more physical objects across a sequence of images or frames to track their movement. For example, the variation or change in one or more specific features of a physical object across a series of images may be recorded and compared to track the movement of the physical object. In one example, a convolution of at least part of the image data may be calculated to obtain a numerical result value. Further, a location of at least one of the first physical object or the second physical object may be determined based on the numerical result value. For example, when the numerical result value is a first numerical value, the location of the object may be determined to be a first location, and when the numerical result value is a second numerical value, the location of the object may be determined to be a second location.

Consistent with some disclosed embodiments, the operations further include obtaining sensor data captured using a sensor external to the extended reality appliance, and analyzing the sensor data to track the movement of at least one of the first physical object or the second physical object. "Sensor data" refers to the data output by a device that detects and responds to some type of input from the physical environment. In some embodiments, one or more sensors (such as, for example, motion detection sensors) may be positioned external to the extended reality application to detect the movement of the first and/or second physical objects. Any type of sensor configured to detect movement of the first and/or second physical objects may be used. In some embodiments, a camera, image sensor, infrared sensor, ultrasonic sensor, optical sensor, vibration sensor, motion capture sensor, GPS sensor, or another suitable device may be used. The data output from the sensor may be analyzed to determine some characteristic of the movement of the first and/or the second physical object to track its movement. Such characteristics may include, for example, one or more of the position, velocity, acceleration, distance moved, trajectory, orientation, or other relevant motion related characteristics of the first physical object and/or the second physical object to track its movement. The type of analysis may depend on the type of sensor used. For example, in the exemplary embodiment of FIGS. 13 and 14, a camera 1330 may be positioned external to the extended reality appliance 110 to record the movements of the physical objects. Successive image frames from the camera output may be analyzed to determine one or more of the velocity, acceleration, distance moved, or other relevant motion related characteristics of the first physical object and/or the second physical object to track its movement. In some embodiments, a sensors (such as, for example, a GPS sensor, an indoor positioning sensor, etc.) may be incorporated or positioned in a physical object to track its movement. For example, a smart watch worn by an individual (e.g., a physical object) may include a GPS sensor or another location detection device that may be used to track the movement of the individual.

Some disclosed embodiments involve determining, based on the tracked movement of the first physical object and the second physical object, an impending collision between the first virtual object and the second virtual object. "Determining" refers to establishing or arriving at a conclusive outcome as a result of a reasoned, learned, calculated, or logical process. For example, determining may include ascertaining or concluding after reasoning, observation, calculation, computing, or any other logical process. The term "impending collision" refers to a situation where two or more objects have just collided or will soon collide if corrective action is not taken. For example, an impending collision may refer to a situation where an object has just collided with another object or one or more objects are on a course such that a collision between the two objects will occur soon if some corrective action is not taken. In other words, impending collision may refer to both a situation of imminent collision and to a situation where collision has already occurred (e.g., the moment of collision, a brief time period after collision). In one example, an impending collision may relate to events occurring in a time period extending from moments before a collision occurs to moments after the collision occurs. In an extended reality environment, an impending collision may refer to an illusion or a simulated situation where two or more objects have just virtually collided or are on a course that will likely lead to a virtual collision if no corrective action is taken. For example, in some embodiments, one or more processors associated with the system may monitor the locations (or speed, direction of movement, acceleration, and/or any other characteristic related to movement) of the physical objects in the environment over time, and based on this information, the processor(s) may determine that two virtual objects (that two real-world physical objects in the environment are docked with) have just virtually collided or about to virtually collide. In some examples, a machine learning model may be used to analyze the tracked movement of the first physical object and the second physical object to determine the impending collision between the first virtual object and the second virtual object. The machine learning model may be a machine learning model trained using training examples to detect impending collisions between virtual objects based on movements of physical objects. An example of such training example may include a sample trajectory of a first sample physical object and a sample trajectory of a second sample physical object, together with a label indicative of whether a collision is impending between a sample virtual object docked to the first sample physical object and a sample virtual object docked to the second sample physical object. In some examples, trajectories of the first and second virtual objects may be determined based on the tracked movement of the first and second physical object, for example based on characteristics of the docking of the virtual objects to the physical objects (such as relative orientation, distance, stickiness, etc.) and/or using a simulation, and the impending collision between the first virtual object and the second virtual object may be determined based on the determined trajectories of the first and second virtual objects. For example, a machine learning model may be used to analyze the determined trajectories of the first and second virtual objects to determine the impending collision between the first virtual object and the second virtual object. The machine learning model may be a machine learning model trained using training examples to detect impending collisions between virtual objects based on their trajectories. An example of such training example may include a sample trajectory of a first sample virtual object and/or a sample trajectory of a second sample virtual object, together with a label indicative of whether a collision is impending between the two sample virtual objects.

In one example, as illustrated in FIGS. 13 and 14, by tracking the movement of users 1300 and 1320 (or the other physical objects that the widgets are docked with), one or more processors of the system may determine an impending collision between, for example, widgets 1308 and 1312 and/or widgets 1306 and 1310. For example, based on the speed, direction of movement, and the distance between users 1300 and 1320, the processor(s) may determine that 1308 and 1312 (and/or and widgets 1306 and 1310) have just collided or are about to collide.

Some disclosed embodiments involve accessing priority rules establishing that the first physical object has priority over the second physical object. Priority rules are guidelines or criteria establishing precedence of one thing over another. "Accessing" in this context refers to obtaining, retrieving, reading, or opening priority rules. For example, the priority rules may be stored in a digital format and may be accessed from a data storage location, such as, for example, a memory and/or a database. In the context of operations performed by one or more processors, accessing information may involve interacting with data and may involve querying one or more data structures, interacting with the data structures, reading files, and fetching information. Thus, for example, when priority rules include one or more of guidelines, principles, and/or algorithms that govern the arrangement, interaction, and behavior of virtual objects in an extended reality environment, accessing the priority rules may involve retrieving such rules from a memory location e.g., solid state memory, a server, etc. In some examples, priority rules ensure smooth interaction between virtual objects in an extended reality environment. When two (or more) virtual objects are present in an extended reality environment, visual glitches, unrealistic visual behavior, and/or user discomfort may occur if the two objects collide, intersecting or overlap improperly. In such situations, priority rules may help manage these potential collisions and interactions to maintain a seamless and immersive extended reality experience. Thus, in some examples, priority rules may help create a coherent and comfortable user experience where virtual objects seamlessly interact with each other and the real world. These rules may contribute to the illusion of a unified extended reality environment where digital and physical elements harmoniously coexist. In some non-limiting examples, priority rules may prescribe an order in which virtual objects are layered or positioned within the extended reality environment. For example, priority rules may establish a hierarchy or depth order for virtual objects that determine (for example) which objects should appear in front or behind others. In some embodiments, priority rules may take into account user interactions such that virtual objects that a user is interacting with (e.g., picking up or manipulating) have a higher priority to ensure a smooth interaction experience. In some embodiments, priority rules may adapt based on the context and environment. For instance, based on some priority rules, virtual objects may respond differently depending on, for example, whether they are placed indoors or outdoors, in bright light or dim light. To some degree or another, priority rules may provide a systematic framework for maintaining a cohesive, seamless, and enjoyable extended reality experience by ensuring that virtual objects behave realistically, interact appropriately, and respond to user actions in a manner that enhances immersion and believability. The priority rules may be accessed from any location, memory, or database. For example, in some embodiments, the priority rules may be stored in a memory or database associated with the input unit (see, e.g., FIG. 3), the extended reality unit (see, e.g., FIG. 4), and/or remote processing unit (see, e.g., FIG. 5), and one or more processors associated with the system may access these priority rules.

In some disclosed embodiments, the priority rules may establish that the first physical object has priority over the second physical object. "Establishing priority" refers to defining, implementing, or embodying a hierarchy or relative level of importance. For example, priority may refer to a state of being regarded or treated as more important. Priority may refer to precedence, primacy, preference, urgency, or order.

By way of example, a priority rule establishing that a first physical object has priority over a second physical object, may include a rule indicating that, in a given situation or context, the first physical object (and/or virtual objects associated with the first physical object) takes precedence or should be given higher importance than the second physical object (and/or virtual objects associated with the second physical object). This priority rule may guide how these physical objects, and/or the virtual objects docked with these physical objects, interact with each another or are perceived in the extended reality environment. In a visual context, such a priority rule may indicate that the first physical object (and/or virtual objects docked with the first physical object) may be displayed more prominently (e.g., in front of, with more clarity, more brightly, or more legibly in another manner) than the second physical object (and/or virtual objects docked with the second physical object). When the first and second objects are moving or are interacting, such a priority rule may indicate that the first object's trajectory or movement should take precedence, potentially influencing how collisions are resolved. In a user interaction scenario, if a user is interacting with virtual objects docked with both physical objects simultaneously, such a priority rule might indicate that the actions related to virtual objects docked with the first physical object may be given more weight or responsiveness. In spatial configurations, such a priority rule may indicate that the first physical object (and/or virtual objects docked with the first physical object) may occupy a specific or more favored position or area than the second physical object (and/or virtual objects docked with the second physical object). Such a priority rule may also establish a temporal sequence, such as processing events related to the first physical object before processing those related to the second physical object. In essence, a priority rule specifying that the first physical object has priority over the second physical object may provide a clear guideline for how interactions, behaviors, rendering, or other aspects of the virtual objects docked with the two physical objects should be managed. It may ensure that the system or environment operates in a consistent and predictable manner, enhancing user experience and maintaining a coherent and logical representation of the virtual objects within the context of the extended reality environment.

Some disclosed embodiments involve, based on the priority rules, at a time of the impending collision between the first virtual object and the second virtual object, favoring the first virtual object over the second virtual object. "Favoring" refers to showing or giving a preference, precedence, favoritism, or special consideration to one option over one or more other options. For example, favoring may include a conscious or a deliberate action to show preference for one option over another. A priority rule that favors the first virtual object over the second virtual object during an impending collision may therefore be considered to give precedence to the first virtual object. Any type of favoritism, preference, precedence, or favorable consideration may be shown. For example, in some embodiments, when the first virtual object collides, or is about to collide with a second virtual object, the first virtual object may be displayed more prominently (e.g., in front of, with more clarity, more brightly, or more legibly in another manner) than the second virtual object. This priority rule may guide how the two virtual objects' interactions and movements are managed to ensure a smooth and realistic user experience with the extended reality environment.

Consistent with some disclosed embodiments, the priority rules define that virtual items docked to the wearer of the extended reality appliance have precedence over virtual items docked to other persons. "Precedence" refers to the condition of being considered more important than something else. For example, the priority rules may indicate that, when a virtual object docked with the wearer of the extended reality appliance collides with, or is about to collide with, a virtual item docked with another person or object, the virtual item docked with the wearer is to be favored, preferred, or considered more important. As explained above, the preference may be shown in any manner. For example, in some embodiments, the first virtual object may be displayed more prominently (e.g., in front of, with more clarity, more brightly, or more legibly in another manner) than the second virtual object. For example, as illustrated in FIGS. 13 and 14, when a widget 1308 docked with user 1300 (the wearer of extended reality appliance 110) collides with widget 1312 docked with another user 1320, widget 1308 may be favored by displaying it in front of (or on top of) widget 1312 (see FIG. 14).

Consistent with some disclosed embodiments, the priority rules define that virtual items docked to the hand of the wearer of the extended reality appliance have precedence over virtual items docked to inanimate objects. As explained previously, an "inanimate object" refers to an object that has no life. The priority rules may indicate that, when a virtual object docked with the hand of user 1300 collides with, or is about to collide with, a virtual item docked with, for example, table 102 (or keyboard 104 or mouse 106), the virtual item docked with the wearer's hand is to be considered more important. In some such embodiments, the virtual object docked to the wearer's hand may be displayed more prominently (e.g., in front of, with more clarity, more brightly, or more legibly in another manner) than the virtual object docked to table 102 when they collide or are about to collide.

Consistent with some disclosed embodiments, the inanimate object is an input device used to interact with content displayed via the extended reality appliance. "Input device" may be interpreted as described and exemplified previously. For example, as previously explained, in some embodiments, the input device may include a keyboard, a computer mouse, a touchpad, a touchscreen, a joystick, a game controller, or another mechanism which may be used to interact with virtual content displayed by extended reality appliance. For example, in the embodiment illustrated in FIGS. 13 and 14, keyboard 104 and mouse 106 may be input devices that a virtual item may be docked with. Consistent with some disclosed embodiments, the priority rules define that virtual items docked to input devices have precedence over virtual items docked to persons or animals. For example, the priority rules may indicate that, when a virtual object docked with, for example, keyboard 104 or mouse 106 collides with, or is about to collide with, a virtual item docked to, for example, user 1320, the virtual item docked with keyboard 104 or mouse 106 is to be considered more important than the virtual items docked to user 1320.

Consistent with some disclosed embodiments, the priority rules establish that the first physical object has priority over the second physical object based on a type of the first movable physical object and a type of the second movable physical object. A type" refers to a category or a classification. For example, a type may refer to a category of people, things, or entities having common characteristics (e.g., gender, material, color, size, use, or any other feature). The type of movable physical object may refer to a category of movable physical objects based on one or more common features between the different members of a category. For example, one category of movable physical objects may include people, another category of movable physical objects may include inanimate objects, and a further category of movable physical objects may include animals. As one example, the priority rules may establish that virtual objects docked to people have priority over virtual objects docked to inanimate objects (or vice versa). As another example, the priority rules may establish that virtual objects docked to items that are the subject of current or recent attention have priority over virtual objects that are not a current or recent focus.

Some disclosed embodiments involve capturing image data using an image sensor associated with the extended reality appliance, and analyzing the image data to identify the type of the first movable physical object and the type of the second movable physical object. The terms "image sensor" and "image data" may be interpreted consistent with their description elsewhere in this disclosure. As explained elsewhere in this disclosure, one or more image sensors associated with the extended reality appliance (see, e.g., FIG. 4) may capture image data corresponding to what the wearer of the extended reality appliance sees. Using the image sensor of the extended reality appliance, image data (e.g., digital images) may be captured and analyzed to identify the types of movable physical objects in the field of view of the user. The type of movable physical objects may be identified from these images in any known manner. For example, in some embodiments, one or more of image processing, computer vision, and machine learning may allow computers to analyze the visual content of an image and determine the type of objects in the image. For example, features of an image (e.g., shapes, colors, textures, and/or other characteristics of the image) may be extracted and compared with a labeled dataset containing images of several types of objects to identify the objects in an image. Thus, in some embodiments, one or more images captured by an image sensor of the extended reality appliance may be analyzed to determine the type of movable physical objects involved and a priority rule relevant to the determined type of physical objects may be selected.

Consistent with some disclosed embodiments, the priority rules establish that the first physical object has priority over the second physical object based on an event associated with the first movable physical object. An "event" refers to a specific occurrence, happening, or incident that takes place. For example, the event may be an incident in the real-world or in the virtual world. In some examples, an event may be an incident (whether it involves a single action or a sequence of actions) that may be observed, experienced, documented, or perceived through sensory input. For example, an exemplary incident may include the wearer talking to (or otherwise interacting with) another individual, providing input using an input device, walking past a table, picking something, or any other incident. For example, in some embodiments, when an individual is talking, the priority rules may establish that virtual objects docked to the speaker may have priority over virtual objects docket to other physical objects. As another example, in an extended reality shopping application where users can interact with a variety of virtual furniture catalogs overlaid over and docked with real-world surfaces, a user picks up a virtual chair to examine it more closely. At that time, a virtual table approaches the user's hand from a different direction. In such a scenario, the priority rule may prioritize the virtual chair (e.g., docked to the user's hand) over the virtual table (e.g., docked to another individual or another physical object) to ensure that the user's interaction with the chair remains uninterrupted and visually clear.

Some disclosed embodiments involve capturing image data using an image sensor associated with the extended reality appliance, and analyzing the image data to identify the event associated with the first movable physical object. As explained previously, in some embodiments, the operations may include capturing image data using an image sensor associated with the extended reality appliance. The event may be determined from the image data in any manner. For example, in some embodiments, one or more of image processing, computer vision, and machine learning may allow computers to analyze the visual content of an image and determine the event from the image. For example, a captured image may be compared with images and associated events stored in a database to identify an event. In some embodiments, detecting events from image data may involve using computer vision and image processing techniques to analyze visual information and identify specific occurrences or changes within an image or a sequence of images. In some embodiments, the captured images may indicate, for example, that the first physical object is a computing device that is active (for example, used by an individual, displaying information, etc.) and that the second physical object is a computing device that is inactive (for example, in a sleep state, in a hibernated state, not in use, etc.), and a priority rule that prioritizes the virtual objects docked to active computing devices over virtual objects docked to inactive computing devices may be applied. In some embodiments, the captured images may indicate, for example, that an individual is speaking and a priority rule that prioritizes the virtual objects docked to the speaker over other virtual objects may be applied. In some embodiments, the captured images may indicate, for example, that the first physical object is a first individual engaged in conversation with a wearer of the extended reality appliance and that the second physical object is a second individual engaged in conversation with a person other than the wearer, and a priority rule that prioritizes virtual objects docked to people speaking with the wearer over virtual objects docked to people talking with people other than the wearer may be applied. In one example, a convolution of at least part of the image data may be calculated to obtain a numerical result value, and the identification of the event may be based on the numerical result value. For example, when the numerical result value is a first numerical value, an event of a first category of events may be identified, and when the numerical result value is a second numerical value, an event of a second category of events may be identified. In another example, when the numerical result value is a first numerical value, an event associated with the first movable physical object may be identified, and when the numerical result value is a first numerical value, no event associated with the first movable physical object may be identified.

Consistent with some disclosed embodiments, the priority rules include prioritizing physical items based on docking time, such that physical items associated with recently docked virtual items have precedence over physical items associated with previously docked virtual items. "Docking time" refers to an instant or a time frame in which a virtual object was docked to a physical object. The docking time of different virtual objects may be stored in a memory or database associated with the system. In some embodiments, recently docked virtual objects may be prioritized and given precedence over previously docked virtual objects. Prioritizing recently docked virtual objects over previously docked virtual objects in extended reality priority rules may serve several practical purposes and enhance user experience. This approach may be particularly relevant in scenarios where users are interacting with multiple virtual objects in a session. Recent actions may tend to be more relevant to users than past actions, and therefore, prioritizing recently docked objects may reflect the user's current focus and intentions, thereby ensuring that the extended reality environment responds promptly to the user's immediate interactions. For example, continuing with the exemplary extended reality shopping application discussed previously, if the user picks up a virtual shelf catalog to review after first reviewing the virtual chair catalog, the priority rules may prioritize the recently docked shelf catalog over the previously docked chair catalog so that the user can view the shelf catalog without disruption.

Consistent with some disclosed embodiments, the priority rules include prioritizing virtual items based on functionality, such that interactive virtual objects have precedence over non-interactive virtual objects. "Functionality" refers to one or more capabilities, features, or operations. "Interactive" virtual objects refers to an ability to engage with, manipulate, or influence the virtual objects. Interactivity may be accomplished, for example, using one or more .input methods. In some examples, interactive virtual objects may be enabled to provide real-time feedback and responses thereby enabling dynamic engagement. Users may interact with interactive virtual objects, for example, through gestures, voice commands, controllers, touch, gaze, or other input methods. In some embodiments, users may be able to move, rotate, resize, or otherwise manipulate interactive virtual objects within the extended reality environment. In some embodiments, interactive virtual objects may exhibit dynamic animations, changes, or reactions based on user interactions or predefined triggers. In contrast, "non-interactive" virtual objects refer to virtual objects that users cannot engage with, manipulate, or influence. These objects may be used for visual or informational purposes, without offering real-time responsiveness to user actions. In some embodiments, non-interactive virtual objects may remain fixed in their appearance and behavior, regardless of user actions or input. In some embodiments, user may be able to observe and examine non-interactive virtual objects, but may not be able to actively change or interact with them. In some embodiments, non-interactive virtual objects may be used to provide narrative elements, create ambiance, or set the mood within the XR environment. In some extended reality applications, both interactive and non-interactive virtual objects may have distinct roles in shaping the overall experience. Interactive virtual objects may empower users to actively participate and engage, while non-interactive virtual objects may contribute to the atmosphere, storytelling, and visual context of the virtual environment. In some embodiments, priority rules may prioritize interactive virtual objects over non-interactive virtual objects because interactive virtual objects provide direct user engagement and thereby contribute to a more engaging and user-centric extended reality environment. For example, interactive objects may actively involve users and thereby encourage them to explore, interact, and manipulate the virtual environment.

Consistent with some disclosed embodiments, the priority rules include prioritizing physical items based relevancy levels, such that physical items with higher relevancy levels have precedence over physical items with lower relevancy levels. "Relevancy level" refers to a degree to which something, such as information, content, or data, is directly applicable, meaningful, important, significant, or suitable or pertinent to a particular context, task, interaction, or goal. For example, a relevancy level may relate to the degree to which something is relevant in the context of a current matter. Relevancy level of objects in different extended reality environments may vary based on the specific context, user goals, and interactions. What is considered more or less relevant depends on the user's needs and the intended purpose of the extended reality application. For example, in an extended reality navigation app, more relevant objects may include directional markers, distance information, points of interest along the user's route, real-time traffic updates, and other tools that aid in navigation. And less relevant objects may include static background scenery, general geographic information unrelated to the user's route, advertisements, and general information unrelated to navigation.

Consistent with some disclosed embodiments, the priority rules include prioritizing physical items based on item movement, such that physical items with higher velocity have precedence over physical items with lower velocity. In some embodiments, priority rules may prioritize faster (higher velocity, higher speed, higher acceleration, or another characteristic that indicates higher speed) objects over slower objects. For example, a stationary or static object may have the lowest priority and the fastest objects may have the highest priority. Prioritizing higher velocity (or higher speed) objects when managing collisions and interactions may enhance user intuition and comprehension, leading to more natural and predictable interactions because it aligns more with real-world behavior. For example, in the physical world, faster-moving objects tend to have more momentum and are less likely to be affected by slower-moving objects during collisions. By replicating this behavior in extended reality, the virtual environment may become more realistic and intuitive.

Consistent with some disclosed embodiments, favoring the first virtual object over the second virtual object at the time of the impending collision includes avoiding presenting the second virtual object. For example, in some embodiments, the first virtual object may be favored over the second virtual object by not presenting the second virtual object at the time when the two objects actually collide. In other words, when two virtual objects are on a course that collision is imminent, the first virtual object may be favored over the second virtual object by not displaying the second virtual object at the time when the two objects are expected to collide. When implementing collision handling in extended reality environments, higher priority virtual objects may be prioritized over lower priority virtual objects to reduce visual clutter and direct the user's attention to the higher priority virtual object by visually highlighting it. In some embodiments, the higher priority virtual object may be highlighted to the user by not presenting the lower priority virtual object at the time of collision. For example, in the embodiment of FIG. 13, when one or more processors determine than an impending collision may soon occur between widget 1308 and widget 1314, at the time of the collision, widget 1314 may not be displayed. Instead, only widget 1308 may be displayed at that location so that the user can focus his/her attention on widget 1308 without being distracted by widget 1314.

Consistent with some disclosed embodiments, favoring the first virtual object over the second virtual object at the time of the impending collision includes presenting the second virtual object with opacity lower than the first virtual object. "Opacity" refers to transparency. For example, opacity may include an extent to which light or the virtual presentation of light) is blocked, absorbed, or scattered by an object preventing or reducing the visibility of objects behind or through it. Opacity may include, for example, how much an object obscures the view of what is behind it. A lower opacity may therefore be considered to correspond to a higher transparency. For example, an object having an opacity of 50% is more transparent than an object having an opacity of 70%. In some embodiments of the current disclosure, favoring the first virtual object over the second virtual object may include presenting the second virtual object at a lower opacity (or as more transparent) than the first virtual object at the time of collision to highlight the first virtual object to the user. Since the second virtual object is presented as being more transparent than the first virtual object, the user's eyes may be instinctively directed to the first virtual object. It should be noted that, in addition to or as an alternative to presenting the second virtual object at a lower opacity, the first virtual object may be presented using a different color than the second virtual object to favor the first virtual object by visually highlighting it to the user. In some embodiments, the second visual object may be presented as blurred or fuzzy to favor the first virtual object over the second virtual object.

Consistent with some disclosed embodiments, favoring the first virtual object over the second virtual object at the time of the impending collision includes moving the second virtual object to a virtual plane behind the first virtual object. As used herein, "virtual plane" refers to a digital surface within the extended reality environment used as a reference point or a surface for placing virtual objects. Moving the second virtual object to a virtual plane behind the first virtual object may provide a depth perception to the displayed virtual objects and thereby contribute to a more immersive extended reality experience. For example, a user may perceive the first virtual object as being closer and the second virtual object as being farther away, thereby highlighting the first virtual object to the user. In some embodiments, moving the second virtual object to a virtual plane behind the first virtual object may create a sense of occlusion. For example, the first virtual object may partially or completely hide the second virtual object from the user's view when the second virtual object is displayed on a virtual plane behind the first object.

Consistent with some disclosed embodiments, favoring the first virtual object over the second virtual object at the time of the impending collision includes changing a location of the second virtual object relative to the second movable physical object. As used herein, "location" refers to the spatial coordinates or position within the digital environment that the user experiences. For example, a location may include the spatial coordinates or position where virtual objects, scenes, or interactions are situated in the extended reality environment in relation to the user's viewpoint and the real world. In some embodiments, the first virtual object may be favored over the second virtual object by changing the location of the second virtual object at the time of collision. For example, the location of the second virtual object may be changed such that the user's attention is, or remains, focused on the first virtual object. In general, the second virtual object may be moved to any location. In some embodiments, the second virtual object may be moved in a manner that reflects a real-world situation so that users perceive a natural and instinctive effect. For example, the second virtual object may bounce or reflect off the first virtual object. Changing the location of the second virtual object may involve altering the second virtual object's trajectory, velocity, orientation, or position to simulate a realistic interaction.

Consistent with some disclosed embodiments, a degree of the change to the location of the second virtual object relative to the second movable physical object is based on an exclusivity region associated with the first virtual object. "Degree" refers to the amount, level, or extent to which something happens. For example, a degree may relate to the relative intensity of something. As used herein, "exclusivity region" refers to a designated area around a virtual object where collisions or interactions with other objects are either allowed, restricted, or permitted according to prescribed rules. For example, boundaries may be defined within which interactions can occur or where certain interaction-related rules apply. In some embodiments, exclusivity region of a virtual object may refer to the space around the virtual object where other virtual objects can make contact and trigger collision interactions. For example, when the second virtual object moves and contacts the boundary of the exclusivity region of the first virtual object a collision interaction is triggered. Conversely, in some embodiments, an exclusivity region may refer to an area where interactions or collisions are restricted or disallowed. For instance, a virtual object's exclusivity region may be an area around the virtual object where other virtual objects are prevented from entering or contacting. In some embodiments, different virtual objects in the extended reality environment may have an exclusivity region associated with or attached to it. And the extent of the change to the location of the second virtual object relative to the second movable physical object may be based on the exclusivity region of the first virtual object. For example, the greater the exclusivity region of the first virtual object, greater may be the change in location of the second virtual object.

Consistent with some disclosed embodiments, an additional priority rule establishes precedence for items in motion over stationary items. An additional priority rule in this context refers to another rule for determining how interactions and collisions are managed between moving virtual objects and stationary virtual objects within the extended reality environment. This additional priority rule may help define, for example, which virtual objects take precedence when they come into contact to ensure a consistent and intuitive user experience. In other words, an additional priority rule may establish a hierarchy or order of importance for virtual objects based on their state, such as whether they are in motion or stationary. In some embodiments, moving virtual objects might be given higher priority than stationary ones. For example, if a moving virtual object collides with a stationary one, the rule may determine that the moving virtual object's motion takes precedence, causing the stationary virtual object to react according to the collision (e.g., move to a lower virtual plane, become more transparent, change in location, blur, or another reaction configured to de-highlight the stationary object to the user). Such a priority rule may help align user expectations with how objects should behave. For example, users may generally expect moving objects to have a stronger influence on stationary ones during collisions, and the priority rule may ensure that interactions of virtual objects follow this intuitive logic.

Some disclosed embodiments involve determining, based on the tracking of the movement of the first physical object and the movement of the second physical object, that the second virtual object is stationary and the first virtual object is in motion and on an impending collision course with the second virtual object. As used herein, "collision course" in this context refers to a situation where two or more virtual objects within the extended reality environment are moving or are positioned in such a way that they are on a path to intersect or collide with each other. A collision course in extended reality may include, for example, the projected paths of virtual objects that indicate the possibility of them coming into contact or interacting within the virtual environment. In some embodiments, a collision course involves a situation where the trajectory and relative motion of virtual objects may result in a virtual interaction or collision if their paths are not altered. Two virtual objects are on a collision course may imply the path of movement of one or both of the virtual objects are such that they are heading toward each other over time. This trajectory may be determined based on the current and previous positions, velocities, and directions of the physical objects that the virtual objects are docked to. As explained previously, one or more processors of the system may determine an impending collision between the first and second virtual objects based on the tracked movements of the first and second physical objects. In some embodiments, based on tracking the movement of the first and second physical object, the processor(s) may determine that the second virtual object (docked to the second physical object) is stationary and the first virtual object (docked to the first physical object) is in motion and on an impending collision course with the second virtual object.

Some disclosed embodiments involve favoring the first virtual object over the second virtual object based on the additional priority rule. As explained previously, in some embodiments, an additional priority rule may indicate that virtual objects in motion have priority over stationary virtual objects. Thus, when processor(s) determine that the second virtual object is stationary and the first virtual object is in motion and on an impending collision course with the second virtual object, may give priority to and favor the first virtual object over the stationary second virtual object.

Consistent with some disclosed embodiments, an additional priority rule establishes precedence for stationary items over items in motion, wherein the operations further comprise determining, based on the tracking of the movement of the first physical object and the movement of the second physical object, that the first virtual object is stationary and the second virtual object is in motion and on an impending collision course with the first virtual object, and favoring the second virtual object over the first virtual object based on the additional priority rule. As explained previously, an additional priority rule may establish a hierarchy or order of importance for virtual objects based on whether they are in motion or stationary. In some embodiments, stationary virtual objects might be given higher priority than moving virtual objects. For example, if a moving virtual object collides with a stationary one, the rule may determine that the stationary virtual object has priority and cause the moving virtual object to react according to the collision (e.g., move to a lower virtual plane, become more transparent, change in location, blur, or another reaction configured to de-highlight the moving virtual object to the user). As also explained previously, one or more processors of the system may determine an impending collision between the first and second virtual objects based on the tracked movements of the first and second physical objects. In some embodiments, based on tracking the movement of the first and second physical objects, the processor(s) may determine that the first virtual object is stationary and the second virtual object is in motion and on an impending collision course with the first virtual object, and based on the additional priority rule may give priority to and favor the stationary first virtual object over the moving second virtual object.

The above described operations for preventing virtual collisions between virtual items may occur via a system, computer readable media, or a method. For example, in some embodiments, a system (e.g., system 200 of FIG. 2) for preventing virtual collisions between virtual items may include at least one processor (e.g., processing device 360 of FIG. 3, processing device 460 of FIG. 4, processing device 560 of FIG. 5) configured to present, via an extended reality appliance, a first virtual object docked to a first movable physical object; present, via the extended reality appliance, a second virtual object docked to a second movable physical object; track movement of the first physical object and movement of the second physical object; determine, based on the tracked movement of the first physical object and the second physical object, an impending collision between the first virtual object and the second virtual object; access priority rules establishing that the first physical object has priority over the second physical object; and based on the priority rules, at a time of the impending collision between the first virtual object and the second virtual object, favor the first virtual object over the second virtual object. The terms used with reference to the above described system may be interpreted as described and exemplified previously in this disclosure.

Figure 15:
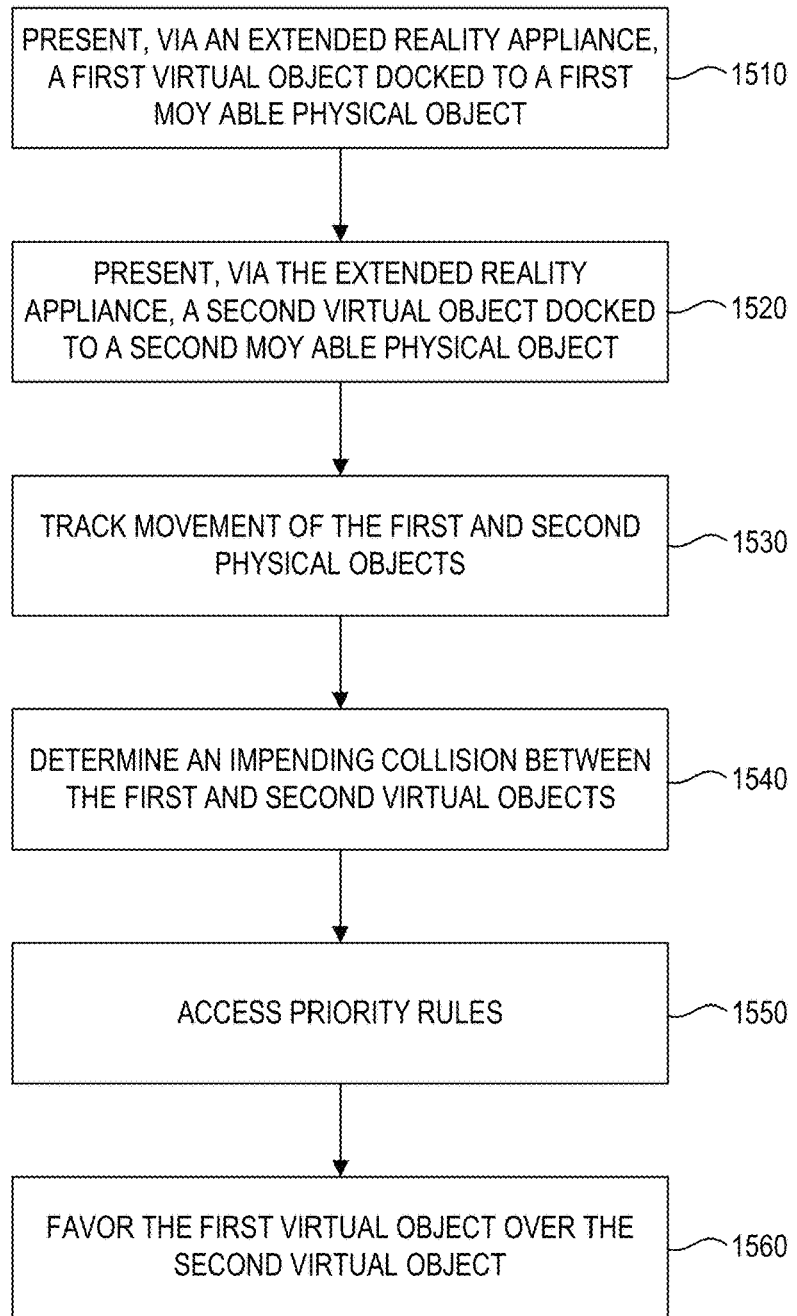
FIG. 15 is a flow chart of an exemplary method of preventing virtual collisions between virtual objects, consistent with some embodiments of the present disclosure.

Some disclosed embodiments involve a method for preventing virtual collisions. A flow chart of an exemplary method 1500 is illustrated in FIG. 15. Method 1500 may include presenting, via an extended reality appliance, a first virtual object docked to a first movable physical object (step 1510); presenting, via the extended reality appliance, a second virtual object docked to a second movable physical object (step 1520); tracking movement of the first physical object and movement of the second physical object (step 1530); determining, based on the tracked movement of the first physical object and the second physical object, an impending collision between the first virtual object and the second virtual object (step 1540); accessing priority rules establishing that the first physical object has priority over the second physical object (step 1550); and based on the priority rules, at a time of the impending collision between the first virtual object and the second virtual object, favoring the first virtual object over the second virtual object (step 1560). The terms used with reference to the above described method may be interpreted as described and exemplified previously in this disclosure.

An extended reality appliance may be provided for gaining access to content associated with a specific physical location (e.g., a meeting room) by communicating with at least two servers: a location identifying server and a content server. For example, the extended reality appliance may retrieve from a location-identifying server, a location-dependent IP address based on the physical location of the extended reality appliance, and use the location-dependent IP address to retrieve location-based content from the content server.

Figure 16:
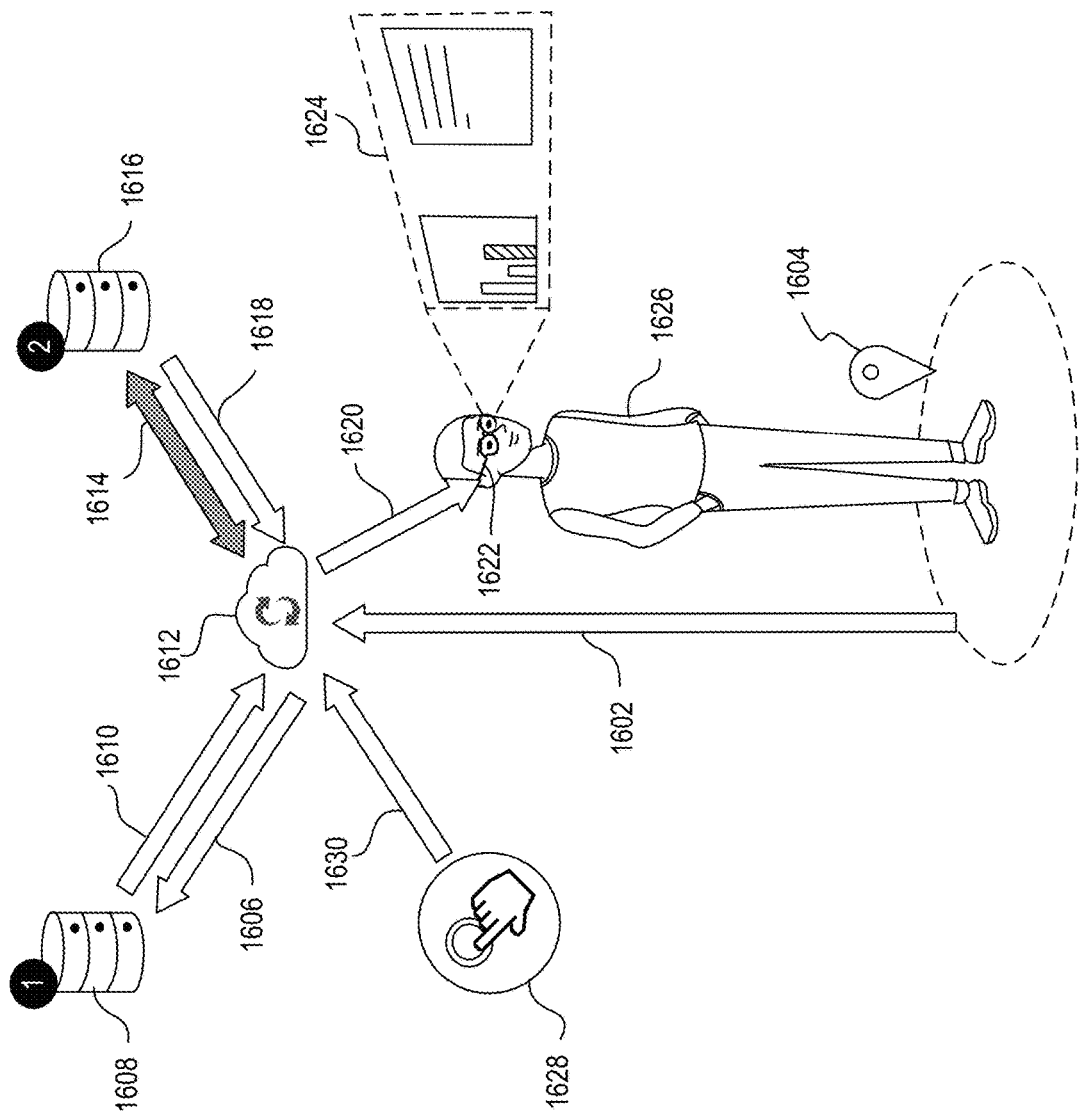
FIG. 16 illustrates an exemplary system for presenting location-based content, consistent with embodiments of the present disclosure.

Some disclosed embodiments involve presenting location-based content. Location-based content refers to any information or content associated with a location or group of locations. Non-limiting examples of location-based content include one or more of a picture of a building, movie played in a basement of a home, video about a museum, music for an elevator, program at an event, multimedia at an exhibition, game in a room, document inside an office room, advertisement within a store, or window for browsing online information related to a building. Presenting location-based content refers to displaying, producing, showing, suggesting, exposing, or otherwise conveying the content such that it is perceivable by a user. Non-limiting examples of presenting location-based content include displaying visual indications of the content, playing audible indications of the content, and/or causing tactile indications of the content. The presenting may be performed using any device capable of conveying audible, visual, and/or tactile content, including a screen, speaker, or vibration motor. For example, as illustrated in FIG. 16, location-based content 1624 is shown as a chart and a document. The location-based content 1624 may be shown as a chart and document because that content may be relevant for that location, such as a home or an office, where a user may want to view that content. In this example, location-based content 1624 is displayed via an extended reality appliance 1622 in the form of glasses.

Some disclosed embodiments involve obtaining an indication of a current physical location of an extended reality appliance. An extended reality appliance may be understood as previously described and exemplified. For example, in FIG. 16, an extended reality appliance 1622 is shown in the form of glasses worn by a user 1626. A current physical location of an extended reality appliance may include a geographic or spatial point, coordinates, or other position indicating where the extended reality appliance is situated at a given moment. Examples of a current physical location include an address, area, neighborhood, point, region, section, venue, or locality. In some instances, a current physical location may be defined by a single point. In other instances, a current physical location may be defined by a larger area. In the example shown in FIG. 16, a current physical location 1604 of an extended reality appliance 1622 may be the position where a user 1626 wearing the extended reality appliance 1622 is standing. An indication of the current physical location may include any information related, corresponding, or relevant to, caused by, or otherwise associated with the current physical location. Examples of an indication of the current physical location include a sign, symbol, mark, alert, signal, or notice of the current physical location. In the example shown in FIG. 16, an indication 1602 of the current physical location 1604 of the extended reality appliance 1622 is shown as a signal. Signal 1602 may contain any information relevant to the current physical location 1604, such as the name of a building where user 1626 is standing or coordinates of location 1604. Obtaining the indication refers to collecting, fetching, or otherwise receiving the indication. The obtaining may be performed by any of the computing or processing devices described herein. Examples of obtaining the indication include receiving the indication through manually (i.e., through a user input) or automatically (i.e., through a sensor input). Examples of obtaining the indication include receiving coordinates from global positioning system sensors, velocity and position from an accelerometer, orientation from a gyroscope, heading from a magnetometer, distance from an object or surface from an ultrasonic sensor, distance and position from a light detection and ranging system, identification and tracking information from Radio Frequency Identification tags, visual features and position from a camera or image sensor, distance or proximity to objects from an infrared sensor, altitude from a pressure sensor, and/or rotational speed and position from a tachometer. The indication may be obtained at a device, such as any of the computing or processing devices described herein, include using any form of information transmission, such as wired transmission, wireless transmission, or optical transmission. Examples of obtaining the indication through such transmission include infrared, cellular, visible light, or acoustic transmission, magnetic induction, and/or near field communication. In the example shown in FIG. 16, the obtaining is performed by a cloud server 1612, which wirelessly receives an indication 1602 of the current physical location 1604 of the extended reality appliance 1622.

Consistent with some disclosed embodiments, the indication of the current physical location includes at least part of an image captured by an image sensor included in the extended reality appliance. An image sensor included in the extended reality appliance may be understood as previously described and exemplified. For example, an image sensor may include image sensor 372, image sensor 472, image sensor 1736 included in extended reality appliance 1740 or any other image sensor. An image may include any digital representation of light or color information captured by the image sensor. Examples of images include a photograph, picture, or video. In the example shown in FIG. 17, a processor 1700 may receive a picture 1738 from image sensor 1736 included in extended reality appliance 1740 to obtain an indication of the current physical location. The indication of the current physical location may include at least part of an image captured by an image sensor by combining, incorporating, managing, or otherwise using at least part of the image alone or in combination with other information to determine the indication. A name of a location combined with a picture of the location, analyzing image data from the image to determine a location, and/or determining or confirming a determined location by cross-referencing the location with the image in a database correlating images to locations are some examples of an indication of the current physical location including at least part of an image captured by an image sensor. For example, an image analysis algorithm may be applied to examine the image to extract image data, such as distinctive features, shapes, and patterns in the current physical location, comparing those features to a database of names of physical locations and their corresponding features, and matching the features extracted from the image to the current physical location in the database. In this example, the matched image may be used to identify a name of the current physical location as the indication.

Some disclosed embodiments involve providing the indication to a first server that maps physical locations to a plurality of content addresses. A server may be understood similar to a cloud server, as previously described and exemplified, more generally to hardware and/or software that provides services, resources, or data to other computers or devices, known as clients, over a network. For example, in FIG. 16, a first server 1608 is shown as a database server, which may use a database application that provides database services to other computer programs or to computers in a client-server model. A plurality of content addresses may include two or more of any unique identifier, such as a name or symbol, configured to identify entities, objects, variables, elements, or other data associated with specific content. Examples of content addresses include a memory address, IP address, Uniform Resource Locator (URL), file path, database row address, storage block address, file system cluster address, geographic coordinates, barcode, Quick-Response (QR) code, Media Access Control (MAC) code, Bluetooth device address, docket container name, or disk partition address. For example, a content address may be a hostname of a server configured to store data related to content XX, such as "webserver." Mapping physical locations to a plurality of content addresses refers to establishing or maintaining a relationship or connection between physical locations and a plurality of content addresses. Examples of mapping physical locations to a plurality of content addresses include defining foreign keys (i.e., a set of attributes in a table that refers to a primary key of another table to link the two tables) in a database of physical locations to establish relationships with specific content addresses in a database of content addresses, referencing lookup tables or linked lists, using graphs to represent and create relationships between various nodes indicative of physical locations and content addresses, using shared identifiers, such as unique codes, to link records between data sets associated with physical locations and content addresses, applying semantic linking to create relationships between physical locations and content addresses based on shared concepts or attributes, creating relationships between physical locations and content addresses based on geographic proximity or spatial attributes, using machine learning algorithms to match and link records between physical locations and content addresses based on similarities, and/or extracting relationships from unstructured text data using natural language processing techniques to identify connections and associations between physical locations and content addresses. For example, mapping physical locations to a plurality of content addresses may involve linking locations of clothing stores to hostnames of servers closest to those clothing stores. Providing the indication to a first server that maps physical locations to a plurality of content addresses refers to sending, transmitting, transferring, presenting, or otherwise delivering the indication to the first server. Examples of providing the indication to the first server include using a HTTP POST method to send the indication from a client processor implementing the disclosed functions to the first server as part of an HTTP request, using Application Programming Interfaces (APIs) to send the indication to the first server, sending the indication to the first server via email using a Simple Mail Transfer Protocol (SMTP), transferring the indication from a client processor to the first server using a file transfer protocol, updating data in a database of the first server by executing Structured Query Language (SQL) queries from a client processor to the first server, sending the indication to the first server through a message queue system, or sending the indication to the first server through push notifications. For example, in FIG. 16, cloud server 1612 may provide the indication 1602 of the current physical location 1604 of the extended reality appliance 1622 to a first server 1608 that maps physical locations to a plurality of content addresses via a database update 1606.

Some disclosed embodiments involve receiving from the first server, at least one specific content address associated with the current physical location. At least one specific content address associated with the current physical location refers to one or more content addresses that are linked, affiliated, correlated, or otherwise related to the current physical location. Examples of specific content addresses associated with the current physical location include addresses of servers located near the current physical location, addresses having a relationship with the current physical location, or addresses most convenient for accessing in the current physical location. For example, a current physical location may be a clothing store in a city and the city may have a plurality of servers with corresponding content addresses located throughout the city. In this example, a specific content address associated with the clothing store may be the hostname of the server closest in proximity to the clothing store out of the plurality of servers. Receiving the at least one specific content address from the first server refers to accepting, collecting, or otherwise obtaining the at least one specific content address from the first server. Examples of receiving the at least one specific content address from the first server include obtaining the at least one specific content address from the first server in response to HTTP requests from a client processor, long polling by sending a request to the first server via a client processor, sending push notifications regarding the at least one specific content address from the first server to a client processor, retrieving query results regarding the at least one specific content address from the first server to a client processor, or downloading the at least one specific content address from the first server to a client processor. For example, in FIG. 16, the cloud server 1612 may receive the at least one specific content address 1610 from the first server 1608 as a download. In this example, the at least one processor receives the at least one specific content address from the first server. In other examples, the extended reality appliance (e.g., extended reality appliance 1622) may directly receive the at least one specific content address from the first server, using any of the described techniques.

In some examples, a cache of content addresses associated with different physical locations may be maintained. Further, it may be determined whether any content address in the catch is associated with the current physical location. In one example, when no content address in the catch is associated with the current physical location, the indication of the current physical location may be provided to the first server, and the at least one specific content address associated with the current physical location may be received from the first server, as described herein. Further, when a particular content address in the catch is associated with the current physical location, providing the indication of the current physical location to the first server and the receiving of the at least one specific content address from the first server may be forewent, and the particular content address may be the at least one specific content address associated with the current physical location.

Consistent with some disclosed embodiments, the at least one specific content address varies based on time of day. A time of day refers to any period or point within a day. Examples of a time of day include a second, minute, hour, time, morning, afternoon, evening, night, midnight, noon, dawn, dusk, lunchtime, coffee break, work shift, commuting time, nap time, exercise time, mealtime, or bedtime. Varying the at least one specific content address based on time of day refers to changing, adjusting, modifying, or otherwise altering at least one aspect of the at least one specific content address at different times of the day. Examples of varying the at least one specific content address based on time of day include changing the address type based on the time of day, changing the content of the address based on the time of day, and/or changing a location associated with the address based on the time of day. For example, a user of the extended reality appliance may enter a restaurant, and content associated with that restaurant, such as a menu, may change depending on the time of day so that customers can be presented with appropriate menus for breakfast, lunch, or dinner. In this example, the at least one specific content address may include different addresses associated with a breakfast menu from 9 AM to noon, a lunch menu from noon to 4 PM, and a dinner menu from 4 PM to 10 PM. As another example, a user of the extended reality appliance may be located in a meeting room and the user may have a meeting schedule for several meetings throughout the day. In this example, based on the time of day, the at least one specific content address may be associated with content for the scheduled meeting for the time of day, so that content relevant to a current meeting may be used throughout the day by using a content address that varies based on time of day.

Consistent with some disclosed embodiments, the current physical location is associated with a brand, and the at least one specific content address is associated with the brand. A brand refers to any distinctive or recognizable identity, image, or reputation associated with a particular company, product, service, individual, or organization. Examples of a brand include a brand name, logo, type of product, and a person or entity associated with a company. For example, a brand may be Company X. As another example, a brand may be granny smith apples. Another example of a brand is a specific type of shoe worn by a particular celebrity. The current physical location being associated with a brand refers to the location being linked, connected, applicable, or otherwise related to the brand. Examples of the current physical location being associated with a brand include the location being the storefront of the brand, the location being a fulfillment center for the brand, or the location being a manufacturing location for the brand. For example, the current physical location may be a headquarters of Company X. The at least one specific content address being associated with the brand refers to the address being linked, connected, applicable, or otherwise related to the brand. Examples of the at least one specific content address being associated with the brand include an address of a server closest to a headquarters of the brand, an address of a server owned by the brand, or an address of a server storing advertisements for the brand. For example, the at least one specific content address may be the hostname of a server owned by Company X.

Figure 18:
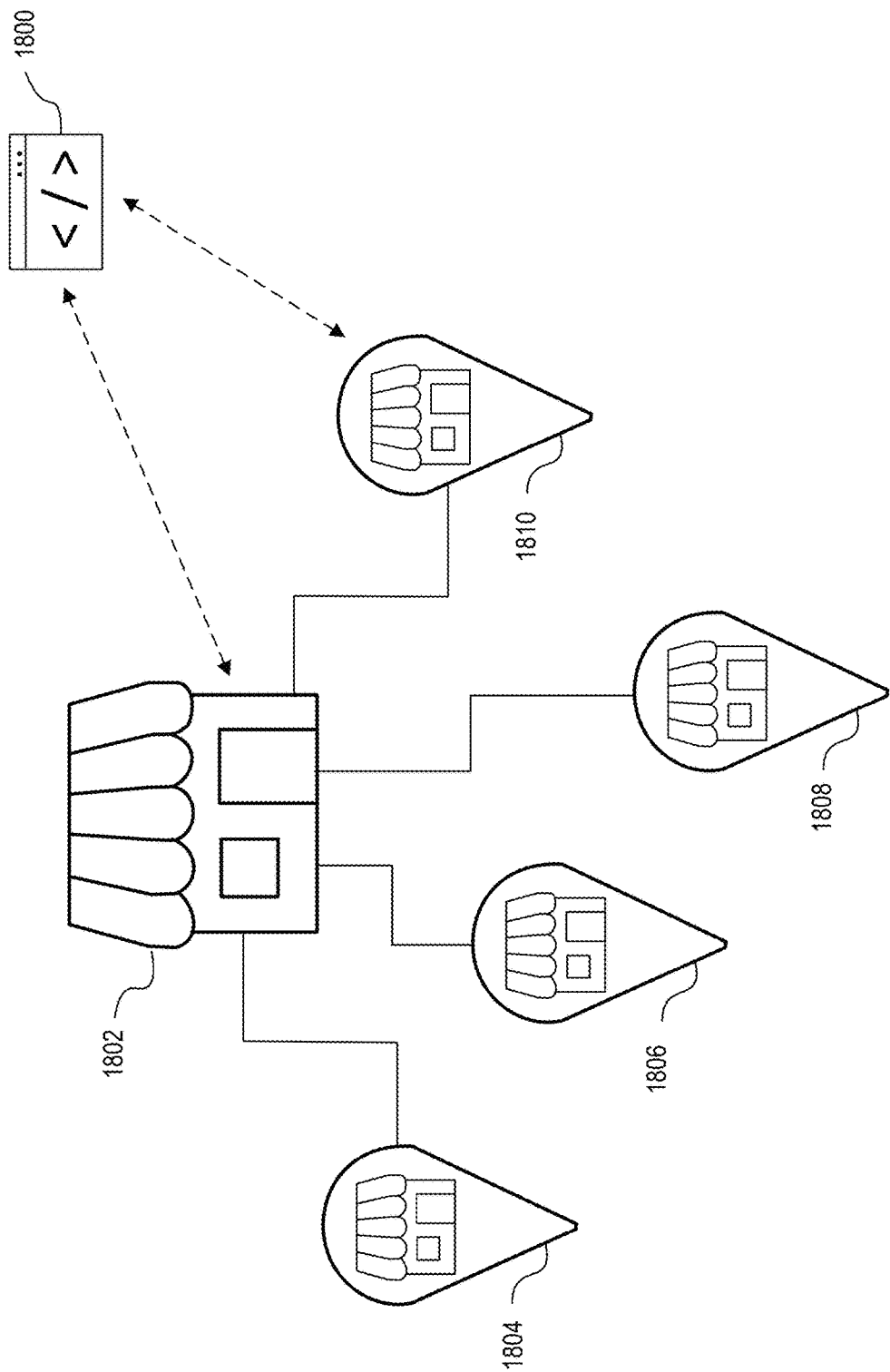
FIG. 18 illustrates an exemplary use of a content address with a chain store, consistent with embodiments of the present disclosure.

Consistent with some disclosed embodiments, the current physical location includes a chain store, and the at least one specific content address is associated with the chain store. A chain store refers to one or more facilities in a group of retail outlets or stores that are owned and/or operated by the same company or organization, or share a common brand, name, or business model. Examples of a chain store as the current physical location include the extended reality appliance being located near, in, outside, around, or within a range of a chain store. For example, in FIG. 18, the current physical location may be inside a chain store 1802. The at least one specific content address being associated with the chain store refers to an address being linked, connected, applicable, or otherwise related to the chain store. Examples of the at least one specific content address being associated with the chain store include an address of a server closest to a headquarters of the chain store, an address of a server owned by the chain store, and an address of a server storing advertisements for the chain store, or an address of a server located in the chain store. For example, in FIG. 18, the at least one specific content address 1800 may be the hostname of a server storing advertisements for chain store 1802.

Consistent with some disclosed embodiments, the current physical location includes a particular branch of the chain store, and the at least one specific content address is associated with the chain store and the particular branch. A particular branch of the chain refers to an individual retail outlet or store location that is part of a larger network. Each branch may share a common brand identity, name, or business model with the rest of the chain, while also having its own physical presence and serving customers within a specific geographic area. In the example shown in FIG. 18, the current physical location may include any of the particular branches 1804, 1806, 1808, and 1810 of the chain 1802. The at least one specific content address being associated with the chain store and the particular branch refers to the address being linked, connected, applicable, or otherwise related to both the chain store and the particular branch. The at least one specific content address may be associated with the chain store and the particular branch in the same way or in different ways. Examples of the at least one specific content address being associated with the chain store and the particular branch include an address of a server located between the particular branch and another branch of the chain, an address of a server storing information associated with both the chain store and the particular branch, and an address of a server linking communications between the chain store and its branches including the particular branch, or an address of a server located in the particular branch of the chain store. For example, in FIG. 18, the at least one specific content address 1800 may be the hostname of a server enabling communication between chain store 1802 and one or more of particular branches 1804, 1806, 1808, and 1810.

Some disclosed embodiments involve using the at least one specific content address to access a second server. A second server may include a single server or group of servers functionally or positionally different from the first server. A second server may have a construct similar to the servers discussed in connection with the first server. Examples of a second server include a server located in a position different from the first server, a server configured to perform a different function that the first server, and/or a server with an address different from the first server. In the example shown in FIG. 16, second server 1616 may be configured as a database server like first server 1608, but located in a different position that first server 1608. Accessing a second server refers to connecting to, establishing a relationship with, or interacting with a second server. Examples of accessing a second server include establishing a connection with a second server, retrieving information from a second server, sending information to a second server, or using services provided by a second server. For example, in FIG. 16, accessing a second server 1616 may involve establishing a two-way connection 1614, over a network such as a local area network, between cloud server 1612 and second server 1616 to send and receive information between cloud server 1612 and second server 1616. Using the at least one specific content address to access the second server refers to applying or otherwise employing the at least one specific content address to access the second server. Examples of using the at least one specific content address to access the second server include linking the at least one specific content address to the second server, querying a plurality of servers to retrieve the second server based on the at least one specific content address, and/or referring to a database containing correlations between content addresses and servers to determine that the second server is correlated to the at least one specific content address. For example, in FIG. 16, using the at least one specific content address 1610 to access the second server 1616 may involve performing a search function in a database of servers to determine a server 1616 identified by the at least one specific content address 1610. In this example, the at least one processor uses the at least one specific content address received from the first server to access the second server. In other examples, the extended reality appliance (e.g., extended reality appliance 1622) may directly receive the at least one specific content address from the first server and use the at least one specific content address to access the second server, using any of the techniques described.

Consistent with some disclosed embodiments, the at least one specific content address is a domain name, and the operations further include using the domain name to access a name server to obtain an IP address, and using the IP address to access the second server. A domain name refers to any label configured to identify or locate specific resources on the Internet, such as websites, servers, and other online devices and servers. Examples of the at least one specific content address being a domain name include a website URL associated with a location or a server URL associated with a server near a location. For example, the at least one specific content address may be domain name "serverXX.example.com" associated with server XX located near the current physical location. A name server may include a server configured to translate domain names into IP addresses. Name servers may store and organize records that correlate a domain with one or more IP addresses. Examples of name servers include recursive resolvers, root nameservers, top-level domain nameservers, or authoritative nameservers. For example, a name server may include a top-level domain server configured to store information related to all domain names that share a common domain extension, such as ".com." Using the domain name to access a name server to obtain an IP address refers to applying or otherwise employing the domain name to connect to, establish a relationship with, or interact with a name server to receive or determine an IP address. Examples of using the domain name to access a name server to obtain an IP address include checking whether an IP address is stored in a cache of a recursive resolver, identifying a top-level domain name and fetching an IP address that is related to the top-level domain nameserver, storing information about domain extensions, sending an IP address to an authoritative nameserver for fetching a complete IP address, and/or generating a final IP address at an authoritative nameserver that is understandable by a user, device, or service. For example, a processor may send a domain name "www.storeXX.com" to a nameserver and the nameserver may generate a corresponding IP address of 192.168.1.1. Using the IP address to access the second server refers to applying or otherwise employing the IP address to access the second server. Examples of using the IP address to access the second server include linking the IP address to the second server, querying a plurality of servers to retrieve the second server based on the IP address, and/or referring to a database containing correlations between IP addresses and servers to determine that the second server is correlated to the IP address. For example, in FIG. 16, using an IP address 1610 to access the second server 1616 may involve performing a search function in a database of servers to determine a server 1616 identified by the IP address 1610.

Consistent with some disclosed embodiments, the at least one specific content address is an IP address of the second server. An IP address refers to any numerical label assigned to a device (e.g., the second server) that uses the Internet Protocol for communication. Examples of IP addresses include a sequence of numbers separated by periods or a sequence of numbers separated by colons. For example, the at least one specific content address may be an address 192.168.1.1 of the second server. As another example, the at least one specific content address may be an address 2001:0db8:85a3:0000:0000:8a2e:0370:7334 of the second server.

Some disclosed embodiments involve receiving content, associated with the current physical location, from the second server. Content associated with the current physical location refers to any information or content linked, pertinent, analogous, relevant, affiliated, or otherwise related to the current physical location. Examples of such content include one or more of a picture, movie, video, music, program, multimedia, game, document, advertisement, or window (e.g., browser or program window). For example, in FIG. 16, the current physical location 1604 may be an office or workplace of the user 1626 and content 1624 associated with the current physical location 1604 may be shown as a chart and a document that are part of the user's 1626 work duties. Receiving content, associated with the current physical location, from the second server refers to accepting, collecting, or otherwise obtaining content, associated with the current physical location, from the second server. Examples of receiving content, associated with the current physical location, from the second server include obtaining the content from the second server in response to HTTP requests from a client processor, long polling by sending a request to the second server via a client processor, sending push notifications regarding the content from the second server to a client processor, retrieving query results regarding the content from the second server to a client processor, and/or downloading the content from the second server to a client processor. For example, in FIG. 16, the cloud server 1612 may receive content 1618, associated with the current physical location 1604, from the second server 1616 by long polling. As another example, the content 1620, associated with the current physical location 1604, may be downloaded from the second server 1616 to the extended reality appliance 1622 via the cloud server 1612.

Some disclosed embodiments involve presenting the content via the extended reality appliance, while the extended reality appliance is in the current physical location. Presenting the content via the extended reality appliance refers to displaying, producing, showing, exposing, or otherwise conveying the content using or through the extended reality appliance. Examples of presenting location-based content via the extended reality appliance include displaying visual indications of the content through a virtual display of the extended reality appliance, playing audible indications of the content from an earphone of the extended reality appliance, and/or causing tactile indications of the content through motors disposed on the extended reality appliance. For example, in FIG. 16, content 1624 is displayed via a virtual display of an extended reality appliance 1622. Presenting the content while the extended reality appliance is in the current physical location refers to presenting the content during a portion, portions, or entirety of a time period in which the extended reality appliance is exactly at or within a range of the current physical location. Examples of presenting the content while the extended reality appliance is in the current physical location include playing an advertisement for a clothing store while the extended reality appliance is within the store, presenting a list of chores while the extended reality appliance is near or inside a home of the wearer of the extended reality appliance, or changing a display of the extended reality appliance depending on a section or room of a building in which the extended reality appliance is located. For example, in FIG. 16, the current physical location 1604 may be an office or workplace of the user 1626 and content 1624 associated with the current physical location 1604 may be shown as a chart and a document that are part of the user's 1626 work duties while user 1626 is still at work. In this example, once user 1626 leaves the office 1604, the presentation of content 1624 may cease or change.

Some disclosed embodiments involve receiving image data captured by an image sensor included in the extended reality appliance, and analyzing the image data to determine the indication of the current physical location of the extended reality appliance. An image sensor included in the extended reality appliance may be understood as previously described and exemplified. For example, an image sensor may include image sensor 372, image sensor 472, image sensor 1736 included in extended reality appliance 1740 or any other image sensor. Image data may be understood as previously described and exemplified. In the example shown in FIG. 17, the operations may include receiving image data 1738 captured by an image sensor 1736 included in the extended reality appliance 1740 in the form of an image. Analyzing the image data to determine the indication of the current physical location of the extended reality appliance refers to considering, evaluating, manipulating, or otherwise using the image data to estimate or pinpoint the physical location. Examples of analyzing the image data to determine the indication of the current physical location of the extended reality appliance may include geotagging, image matching, machine learning, and/or object recognition. Geotagging may involve using embedded information in an image's metadata, such as latitude and longitude coordinates of the location where the image was captured. Image matching may involve collecting reference image data that are associated with known locations and comparing the image data with the reference image data to determine the location of the image. Machine learning techniques may involve training a machine learning engine on a dataset of reference images associated with known locations and their corresponding visual features. Once trained, the machine learning engine may be used to predict the location of an image based on the visual features of the image. Object recognition may involve identifying specific objects, landmarks, or features within an image and using that information to predict the image's location. For example, processor 1700 may be configured to train a machine learning algorithm on a dataset of geotagged images to learn patterns and associations between image features and specific locations. Training may involve using a pre-trained convolutional neural network as a base model and fine-tuning the model on the dataset of geotagged images, such that the machine learning algorithm learns to recognize the features of the locations associated with the geotagged images. The neural network may extract the features, such as patterns, shapes, and textures, which are unique to each location from the geotagged images. In this example, processor 1700 may determine the indication of the current physical location of the extended reality appliance 1740 using the trained algorithm by comparing image features 1738 from image sensor 1736 to its learned patterns and associations to predict an indication of a location associated with the image features 1738, such as by outputting a probability of that location. If the machine learning algorithm predicts a high probability for that location, the processor 1700 may determine an indication that it is highly likely that the extended reality appliance 1740 is at that location. In some examples, a convolution of at least part of the image data may be calculated to obtain a numerical result value. Further, the determination of the indication of the current physical location of the extended reality appliance may be based on the numerical result value. For example, when the numerical result value is a first numerical result value, it may be determined that the current physical location is a first physical location, and when the numerical result value is a second numerical result value, it may be determined that the current physical location is a second physical location different from the first physical location.

Some disclosed embodiments involve receiving a wireless signal captured by a receiver included in the extended reality appliance, and analyzing the wireless signal to determine the indication of the current physical location of the extended reality appliance. A wireless signal refers to any electromagnetic wave configured to carry information without the need for physical wires or cables. Examples of a wireless signal include a Wi-Fi, Bluetooth, or radio frequency signal. In the example shown in FIG. 17, processor 1700 may receive a Bluetooth signal 1734. A receiver included in the extended reality appliance may include any device or component placed, inserted, installed, integrated, or otherwise incorporated in the extended reality appliance and configured to capture wireless signals. Examples of a receiver included in the extended reality appliance include a radio frequency, Bluetooth, Wi-Fi, radar, or Near Field Communication receiver. In the example shown in FIG. 17, Bluetooth signal 1734 may be captured and transmitted to processor 1700 via a Bluetooth receiver 1732. Analyzing the wireless signal to determine the indication of the current physical location of the extended reality appliance refers to considering, evaluating, manipulating, or otherwise using the wireless signal to determine the indication of the current physical location of the extended reality appliance. Examples of analyzing the wireless signal to determine the indication of the current physical location of the extended reality appliance include W-Fi positioning, Bluetooth positioning, cellular-based positioning, or GPS positioning. For example, Bluetooth signals may be transmitted from devices, such as beacons, near or in the current physical location and a Bluetooth receiver may measure the strength and known locations of the beacons using those signals to perform triangulation and estimate the current physical location. In the example shown in FIG. 17, a Bluetooth receiver 1732 may be configured to perform triangulation and estimate the current physical location.

Some disclosed embodiments involve receiving, from the first server, a temporal limitation associated with the at least one specific content address; and stopping using the at least one specific content address when the temporal limitation is reached. A temporal limitation refers to any restriction, qualification, or other condition associated with a time or time period. Examples of a temporal limitation include a time of day, a time-related threshold, or a given time point or time period within, during, before, or after an action or event occurs. For example, a temporal limitation may include a threshold of two hours that must be reached, such as by the extended reality appliance remaining in the current physical location for two or more hours, before an action or event may be triggered. As another example, an action or even may only occur in the morning. As another example, an action or event may occur only between 12 PM and 2 PM. Stopping using the at least one specific content address when the temporal limitation is reached may include halting or preventing use of the at least one specific content address when the temporal limitation is reached. Examples of stopping using the at least one specific content address when the temporal limitation is reached include blocking, pausing, closing, or ending use of the at least one specific content address during a specific time of day, after a given amount of time has passed, or at a specific point in time. For example, in FIG. 16, a user 1626 of extended reality appliance may be in his office 1604 for several hours a day and it may be desirable to only present work-related content 1624 for eight hours of the workday to ensure that the user is not overworked or takes a break. In this example, a temporal limitation associated with the content address 1610 may be eight hours, after extended reality appliance 1622 has been in the office 1604 for eight hours, the cloud server 1612 may stop accessing 1614 the second server 1616 using the content address 1610, such that the presentation of work-related content 1624 is ceased.

Some disclosed embodiments involve, prior to presenting the content, receiving user data, and presenting the content in the current physical location based on the user data. User data refers to any information associated with a user. Examples of user data include a category, permission, mode, restriction, or preference associated with a user. For example, a user may be in a category of human resources employees at an office, while another user may be in a category of sales employee at that office. Receiving user data prior to presenting the content refers to accepting, collecting, or otherwise obtaining user data before or preceding presenting the content. The user data may be received manually (e.g., by input into an input device) or automatically (e.g., by sensor input). Examples of receiving user data prior to presenting the content include receiving an input via a user typing their category into a keyboard, receiving a signal from a proximity sensor indicating a proximity of a user to a room associated with a category, and/or recognizing a user as belonging to a given category by analyzing the user's association with another user belonging to that category. For example, the operations may include requiring a user to click a button indicating whether they are a human resources employee or a sales employee in an office before presenting the content in the office. Presenting the content in the current physical location based on the user data refers to presenting the content depending or conditional on, incorporating, or otherwise using the user data. Examples of presenting the content in the current physical location based on the user data include triggering, modifying, or adapting, adjusting, correcting, customizing, revising, or otherwise displaying the content based on the user data while the extended reality appliance or a user is located within, inside, or near the current physical location. In the example shown in FIG. 16, the cloud server 1612 may receive user data 1630 indicating a sales employee category from the user 1626 clicking a button 1628 indicating that the user is a sales employee. In this example, the content 1624 may only be presented after the cloud server 1612 receives that user data 1630 to ensure that the user 1626 is only presented with information relevant to the user's category (e.g., sales data or charts) while user 1626 is in that office location 1604. As another example, the cloud server 1612 may receive user data 1630 indicating a marketing employee category from the user 1626 clicking a button 1628 indicating that the user is a marketing employee. In this example, user 1626 may be presented with marketing data (e.g., slide decks and advertisements) while user 1626 is in that office location 1604.

Consistent with some disclosed embodiments, the user data includes a permission to present the content. Some disclosed embodiments involve presenting the content based on the permission. A permission to present the content refers to any authorization to present the content. Examples of a permission to present the content include a consent, acceptance, agreement, approval, or license. The permission may include one or more of a presence or absence of permission, a type of permission (e.g., permission to view, permission to edit), a source of permission (e.g., identity or characteristic of a user requesting or granting a permission), or a duration of permission. For example, the user data may include consent to present an advertisement when a user of the extended reality appliance is in a store. Presenting the content based on the permission refers to presenting the content depending or conditional on, incorporating (e.g., including in a determination to present the content), or otherwise using the permission. Examples of presenting the content based on the permission include triggering a video, modifying an image, adapting a chart, adjusting a size of a virtual object, correcting the color of the content, customizing a resolution of the content, revising a document, or otherwise displaying the content using the permission. In the example shown in FIG. 16, user data 1630 may include a consent to present advertisements for a store location 1604, and extended reality appliance 1622 may present an advertisement in content 1624 based on the received consent.

Consistent with some disclosed embodiments, the user data includes a presentation mode for the content. Some disclosed embodiments involve presenting the content based on the presentation mode. A presentation mode for the content refers to any visual manner or type of display for presenting the content. Examples of a presentation mode for the content include a style (e.g., minimal, modern, collapsed, or expanded), form (e.g., picture, video, or document), quality (e.g., resolution or clarity), design (e.g., layout and highlighting), appearance (e.g., color, height, or depth of objects), character (e.g., complexity or simplicity), look (e.g., font or color palette), feature (e.g., readability or accessibility), or shape (e.g., rectangular or amorphous). For example, the user data may include a collapsed mode, in which only pertinent information is displayed, such as headings of a document. As another example, the user data may include an expanded mode, in which all information is displayed, such as an entirety of the document. Presenting the content based on the presentation mode refers to presenting the content depending or conditional on, incorporating, or otherwise using the presentation mode. Examples of presenting the content based on the presentation mode include triggering, modifying, or adapting, adjusting, correcting, customizing, revising, or otherwise displaying the content using the presentation mode. In the example shown in FIG. 16, user data 1630 may include a collapsed mode, and extended reality appliance 1622 may present only headings and titles in content 1624 based on the received user data 1630.

Consistent with some disclosed embodiments, the user data includes at least one content presentation restriction. Some embodiments involve presenting the content based on the at least one content presentation restriction. At least one content presentation restriction refers to any limiting condition or measure for constraining the presentation of the content. Examples of at least one content presentation restriction include a regulation, rule, condition, or any other limitation. For example, the user data may include an age restriction that may be a presentation restriction, requiring a modification to the presentation to ensure age-inappropriate content is not presented. Presenting the content based on the at least one content presentation restriction refers to presenting the content depending or conditional on, incorporating, or otherwise using the at least one content presentation restriction. Examples of presenting the content based on the at least one content presentation restriction include triggering, modifying, or adapting, adjusting, correcting, customizing, revising, or otherwise displaying the content using the at least one content presentation restriction. For example, the content may include an image that is not appropriate for user under eighteen years of age. In this example, when a processor receives user data indicating that the user is sixteen years old, the content may be presented with the image blurred to provide age-appropriate content based on the user's age. As another example, the content may include a video that is private to a family of users. In this example, when a processor receives user data indicating that the user is part of that family, the content may be presented with the video played fully, while when a processor receives user data indicating that the user is not part of that family, the content may be presented with only a thumbnail of the video.

Consistent with some disclosed embodiments, the user data includes at least one content presentation preference. Some disclosed embodiments involve personalizing the content based on the at least one content presentation preference. At least one content presentation preference refers to any characteristic of presenting the content that a user may want or desire. Examples of at least one content presentation preference include color, font, size, orientation, brightness, contrast, tint, resolution, scale, tone, and/or distance. For example, the user data may include a brightness of the content displayed. Presenting the content based on the at least one content presentation preference refers to presenting the content depending or conditional on, incorporating, or otherwise using the presentation preference. Examples of presenting the content based on the at least one content presentation preference include triggering, modifying, or adapting, adjusting, correcting, customizing, revising, or otherwise displaying the content using the presentation preference. For example, a user may select a desired brightness of displayed content by interacting with a slider, such as on a touchscreen device. In this example, when a processor receives the desired brightness, the content may be presented in that desired brightness to accommodate for visual preferences of the user.

Figure 17:
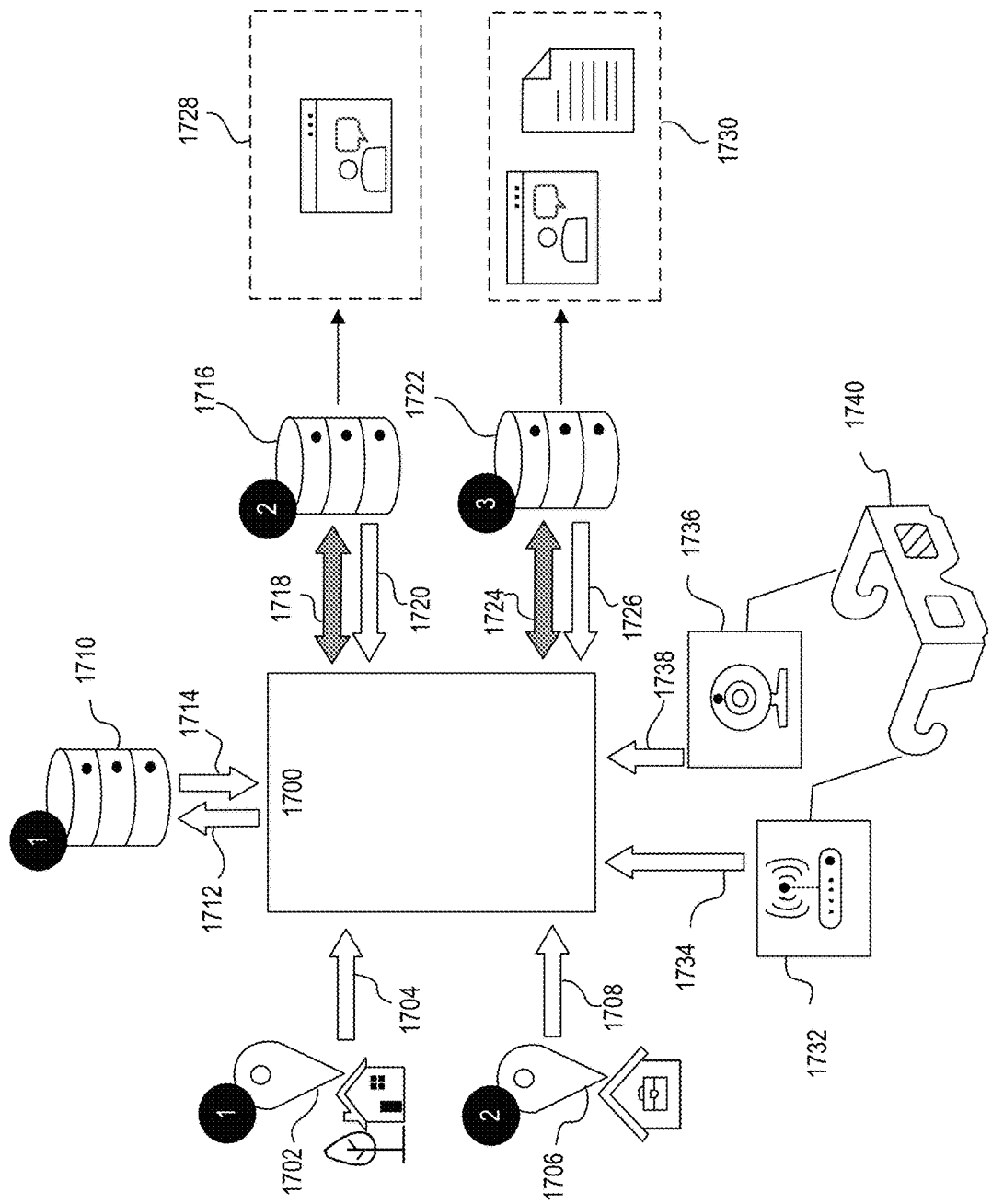
FIG. 17 illustrates examples of content presented via an extended reality appliance at different physical locations, consistent with embodiments of the present disclosure.

Some disclosed embodiments involve receiving an additional indication of a new physical location of the extended reality appliance; providing the additional indication to the first server; receiving from the first server a new content address associated with the new physical location; using the new content address to access a third server; receiving additional content, associated with the new physical location, from the third server; and presenting the additional content via the extended reality appliance, while the extended reality appliance is in the new physical location. In one example, the additional indication of the new physical location may be received after the content is presented via the extended reality appliance. A new physical location of the extended reality appliance refers to any location different from the current physical location. Examples of a new physical location include another building, another group of locations, or another room within the same building as the current physical location. For example, as shown in FIG. 17, the current physical location may be a home 1702 of the user, while a new physical location may be an office 1706 of the user. Receiving an additional indication of a new physical location of the extended reality appliance refers to obtaining that indication, as previously described and exemplified. For example, processor 1700 may be configured to receive an indication 1704 of a current physical location 1702 of an extended reality appliance 1740 and an additional indication 1708 of a new physical location 1706 of the extended reality appliance 1740 through an HTTP request. Providing the additional indication to the first server refers to sending, transmitting, transferring, presenting, or otherwise delivering that indication to the first server, as previously described and exemplified. For example, processor 1700 may send the additional indication 1708 to the first server 1710 via a database update 1712 by establishing Application Programming Interface endpoints on the first server 1710 configured to receive data, such as the additional indication, through HTTP requests. Receiving from the first server a new content address associated with the new physical location refers to accepting, collecting, or otherwise obtaining the new content address from the first server, as previously described and exemplified. For example, processor may obtain a new content address 1714 from the first server 1710 as a download. A third server may include a single server or group of servers functionally or positionally different from the first server or the second server. For example, a second server 1716 may be located at current physical location 1702 and a third server 1722 may be located at new physical location 1706. Using the new content address to access a third server may include applying or otherwise employing the new content address for connecting to, establishing a relationship with, or interacting with that server, as previously described and exemplified. For example, processor 1700 may be configured to perform a search function in a database of servers to determine a third server 1722 identified by the new content address 1714. In this example, processor, which is configured to access second server 1716 by establishing a two-way connection 1718, over a network such as a local area network, between processor 1700 and second server 1716, may further be configured to access the third server 1722 using the search results by establishing another two-way connection 1724 between processor 1700 and third server 1722. Receiving additional content, associated with the new physical location, from the third server may include accepting, collecting, or otherwise obtaining the content, associated with that physical location, from the server, as previously described and exemplified. For example, content 1720, associated with the current physical location 1702, may be downloaded from the second server 1716 to the extended reality appliance 1740 via the processor 1700, and additional content 1726, associated with the new physical location 1706, may be downloaded from the third server 1722 to the extended reality appliance 1740 via the processor 1700. Presenting the additional content via the extended reality appliance, while the extended reality appliance is in the new physical location refers to displaying, producing, showing, suggesting, exposing, or otherwise conveying the content using or through the extended reality appliance during a portion, portions, or entirety of a time period in which the extended reality appliance is exactly at or within a range of the physical location, as previously described and exemplified. For example, the current physical location 1702 may be a home of a user 1626 of the wearable extended reality appliance 1740, and content 1628 associated with the current physical location 1702 may be shown as a messaging application while wearable extended reality appliance 1740 is located at home. In this example, once wearable extended reality appliance 1740 is moved to a new physical location 1706, such as an office of the user, the presentation of content 1628 may be modified to also include additional content 1730, such as a document.

Some disclosed embodiments involve receiving with the content at least one tag associating portions of the content with 3D positioning requirements to thereby enable the extended reality appliance to display the content in the current physical location according to the 3D positioning requirements. At least one tag associating portions of the content with 3D positioning (i.e., placement) requirements to thereby enable the extended reality appliance to display the content in the current physical location according to the 3D positioning requirements may be understood as described and exemplified elsewhere in this disclosure. For example, presenting location-based content may include receiving with the content in the form of a document, four tags associated with the four corners of the document, to enable the extended reality appliance to display the content in the current physical location such that the information contained within those four corners is displayed.

Some disclosed embodiments involve capturing a layout of an environment of the extended reality appliance, and determining based on the layout of the environment and the at least one tag, a region in the current physical location for presenting the content. Capturing a layout of an environment of the extended reality appliance may be understood as described and exemplified elsewhere in this disclosure. For example, image sensor 1736 in the example shown in FIG. 17 may be configured to capture a layout of an environment of the extended reality appliance 1740 by taking a picture of the layout. Determining based on the layout of the environment and the at least one tag, a region in the current physical location for presenting the content may be similar to determining, based on the layout of the environment and the at least one 3D placement requirement selected for the respective portion of the content, a location, as described and exemplified elsewhere in this disclosure. Continuing from the previous example, presenting location-based content may include determining based on the layout of the environment and four tags associated with the four corners of the document, a blank wall in the current physical location for presenting the document, so that a user may read the document without obstructions in that location.

Consistent with some disclosed embodiments, the 3D positioning requirements are associated with device settings of the extended reality appliance. The 3D positioning (i.e., placement) requirements may be associated with device settings of the extended reality appliance by selecting the requirements based on the device setting, as described and exemplified elsewhere in this disclosure. For example, the fit of a document presented via the extended reality appliance may be associated with a field of view of the extended reality appliance. As another example, the quality of a video presented via the extended reality appliance may be associated with a resolution or frame rate of the extended reality appliance.

Consistent with some disclosed embodiments, the at least one specific content address includes a plurality of alternative content addresses associated with the current physical location. Alternative content addresses associated with the current physical location include a range, variety, or substitute of content addresses which are available and are linked, connected, applicable, or otherwise related to the current physical location. Examples of alternative content addresses include addresses that vary in name, type, or the server location to which they are linked. For example, alternative content addresses may include addresses with different names such as "www.serverXX1.example.com" and "www.serverXX2.example.com," which are both linked to the same server. As another example, alternative content addresses may include addresses that link to different servers, such as "www.serverXX.example.com," which links to one server and "www.serverYY.example.com," which links to another server.

Some disclosed embodiments involve selecting at least one of the plurality of alternative content addresses to balance a load of a plurality of second servers. Selecting at least one of the plurality of alternative content addresses refers to picking, choosing, or otherwise determining at least two of the alternative content addresses. Examples of selecting at least one of the plurality of alternative content addresses may include choosing addresses linking to the same server or choosing one address linked to one server and another address linked to another server. For example, selecting the addresses may include determining that the two servers closest to a physical location may be used for presenting location-based content. A load of a plurality of servers may include a collective demand, utilization, or activity imposed on the servers. Examples of load include the utilization of a processor, consumption of memory, level of read and write operations, amount of data traffic flowing through a network of servers, disk usage, database demand, the number of users or devices accessing the servers simultaneously, or the total tasks, processes, or jobs running on the servers. For example, a load of a plurality of second servers may include the number of second servers simultaneously communicating with a processor. Balancing a load of a plurality of servers refers to distributing incoming network traffic or workloads across the plurality of servers to optimize performance, prevent overloading, and ensure high availability. Examples of balancing load include sending the same amount of traffic to each server, reducing the disk usage of one or more of the servers, and shifting tasks from one server to another server. For example, if one server reaches a threshold of X tasks, balancing load may involve shifting additional tasks to another server. Selecting the content addresses to balance a load of a plurality of second servers may involve choosing the addresses that, when used to access a plurality of second servers, are configured to distribute tasks or processes over the plurality of second servers. Balancing the load may be desirable to make the overall processing of the second servers more efficient, optimize a response time of the second servers, and reduce individual load of each second server by avoiding unevenly overloading some second servers while other second servers are left idle. Examples of selecting the content addresses to balance a load of a plurality of second servers include weighted round robin load balancing, least connection load balancing, weighted least connection load balancing, resource based (i.e., adaptive) load balancing, fixed weight load balancing, weighted response time load balancing, source IP hash load balancing, or URL hash load balancing by routing requests for servers based on the content addresses associated with specific servers. For example, if there are three servers (A, B, and C) in a plurality of second servers, a first content address associated with server A is selected for a first time period so that server A is used first while presenting location-based content, a second content address associated with server B is selected for a second time period following the first time period so that server B is used second while presenting location-based content, and a third content address associated with server C is selected for a third time period following the second time period so that server C is used third while presenting location-based content.

Some disclosed embodiments involve selecting at least one of the plurality of alternative content addresses based on a user of the extended reality appliance. Selecting at least one of the plurality of alternative content addresses based on a user of the extended reality appliance refers to selecting the addresses depending or conditional on, incorporating, or otherwise using information associated with the user, such as a user input or user history. Examples of selecting at least one of the plurality of alternative content addresses based on a user of the extended reality appliance include picking, choosing, or otherwise determining the addresses closest to a user, owned by a user, known by a user, associated with a user, or indicated by a user (such as by user input). For example, selecting the addresses may involve referring to a database of content addresses historically associated with the user and choosing the addresses that are relevant to the current physical location and the user. In this example, the relevant addresses may be the addresses linked to servers closest to the current physical location that the user has previously used.

Some disclosed embodiments involve selecting at least one of the plurality of alternative content addresses based on a state of the physical location. A state of the physical location refers to a condition, quality, situation, status, or other circumstance of the physical location. Examples of a state of the physical location include a temperature, operating status, occupancy, or organization of objects or people within the physical location. For example, a state of a physical location such as a store may include the store being open or closed. Selecting at least one of the plurality of alternative content addresses based on a state of the physical location refers to selecting the addresses depending or conditional on, incorporating, or otherwise using information associated with the state. Examples of selecting at least one of the plurality of alternative content addresses based on a state of the physical location include picking, choosing, or otherwise determining the addresses best suited for a given state, historically used for a given state, and/or recommended for a given state (such as by user input or based on historical patterns). For example, selecting the addresses may involve referring to a database of content addresses associated with open and closed states of a store, and choosing the addresses that are associated with the open state when the store is open. Some content addresses, such as those associated with presenting sale or discount information for particular products in the store, may be selected when the store is open. Other content addresses, such as those associated with displaying a temperature within the store, may be selected when the store is open.

Some disclosed embodiments involve a method for presenting location-based content. FIG. 19 illustrates a flowchart of an exemplary process 1900 for presenting location-based content, consistent with embodiments of the present disclosure. Consistent with some disclosed embodiments, process 1900 may be performed by at least one processor (e.g., processor 1700 shown in FIG. 17) to perform operations or functions described herein. Consistent with some disclosed embodiments, some aspects of process 1900 may be implemented as software (e.g., program codes or instructions) that are stored in a memory (e.g., memory device 311 in FIG. 3) or a non-transitory computer readable medium. Consistent with some disclosed embodiments, some aspects of process 1900 may be implemented as hardware (e.g., a specific-purpose circuit). Consistent with some disclosed embodiments, process 1900 may be implemented as a combination of software and hardware.

Referring to FIG. 19, process 1900 includes a step 1902 of obtaining an indication of a current physical location of an extended reality appliance. Process 1900 includes a step 1904 of providing the indication to a first server that maps physical locations to a plurality of content addresses. Process 1900 includes a step 1906 of receiving from the first server, at least one specific content address associated with the current physical location. Process 1900 includes a step 1908 of using the at least one specific content address to access a second server. Process 1900 includes a step 1910 of receiving content, associated with the current physical location, from the second server. Process 1900 includes a step 1912 of presenting the content via the extended reality appliance, while the extended reality appliance is in the current physical location. It should be noted that the order of the steps illustrated in FIG. 19 is only exemplary and many variations are possible. For example, the steps may be performed in a different order, some of the illustrated steps may be omitted, combined, and/or other steps added. Furthermore, in some embodiments, process 1900 may be incorporated in another process or may be part of a larger process.

Some disclosed embodiments involve a system for presenting location-based content, the system comprising: at least one processor configured to: obtain an indication of a current physical location of an extended reality appliance; provide the indication to a first server that maps physical locations to a plurality of content addresses; receive from the first server, at least one specific content address associated with the current physical location; use the at least one specific content address to access a second server; receive content, associated with the current physical location, from the second server; and present the content via the extended reality appliance, while the extended reality appliance is in the current physical location. The terms system and processor may be interpreted as described and exemplified elsewhere in this disclosure.

The embodiments discussed above for providing presenting location-based content may be implemented through non-transitory computer-readable medium such as software (e.g., as operations executed through code), as methods (e.g., method 1900 shown in FIG. 19), or as a system (e.g., system 200 shown in FIG. 2). When the embodiments are implemented as a system, the operations may be executed by at least one processor (e.g., remote processing unit 208 shown in FIG. 2 or processor 1700 shown in FIG. 17).

Some disclosed embodiments involve customizing location-based content presentation. Location-based content presentation refers to displaying, producing, showing, suggesting, exposing, or otherwise conveying any information associated with a location or group of locations, as previously described and exemplified. Information associated with a location may include information that is relevant to a location (e.g., a menu may be relevant to a restaurant), or information that is specific to a location (e.g., a list of specific products sold at a store). FIGS. 20A and 20B illustrate different configurations of an exemplary system for customizing location-based content presentation, consistent with embodiments of the present disclosure. Customizing location-based content presentation refers to any manner of modifying, changing, altering, varying, or converting the location-based content presentation to suit a particular want or need. Examples of customizing location-based content presentation include highlighting, coloring, moving, flashing, emphasizing, displaying or hiding certain content or types of content based on location, or making any other change in the manner of appearance of the content. For example, in FIG. 20A, customizing location-based content presentation includes presenting a chart 2020 associated with a first location 2008. In FIG. 20B, the location-based content presentation is customized by incorporating a display of a document 2022 associated with a second location 2016. Content presentation at first location 2008 may be customized to include information in a chart form, such as chart 2020 because charts may be relevant to a user's activities at first location 2008 or desired by a user at first location 2008. Similarly, content presentation at second location 2016 may be customized to include information in a textual form, such as document 2022 because textual information may be relevant to a user's activities at second location 2016 or desired by a user at second location 2016.

Some disclosed embodiments involve accessing a group of content display mode rules, each content display mode rule in the group of content display mode rules specifying a format impacting 3D presentation. A content display mode refers to any aspect of a display of content. Examples of a content display mode include a color, font, size, positioning, format, or proportion. For example, a content display mode may include using Times New Roman font for all text. Content display mode rules refer to commands, criteria, models, programs, or other principle configured to affect or control any aspect of a display of content. Examples of content display mode rules include rules configured to define what, when, where, or how to display content, such as text, symbols, images, and other display objects that should be displayed, a style of the displayed content, and how long content should be displayed. For example, one content display mode rule may specify that the content is displayed in color, while another content display mode rule may specify that the content is displayed in black and white. Another example of a content display rule is that advertisements are turned on when a certain condition, such as being in a particular location, is met. A group of content display mode rules refers to one or more content display mode rules. A group of content display mode rules may be grouped together based on common characteristics. Examples of common characteristics may include similar or related fonts, colors, positions, orientations, or sizes. The group may include content display mode rules of the same type or content display mode rules of different types. For example, a group of content display mode rules may include three rules associated with a font of content displayed, such as underlining, bold, and italics. As another example, a group of content display mode rules may include three rules associated with different aspects of displayed content, such as a position, size, and color. A format impacting 3D presentation refers to any arrangement, composition, configuration, or setup associated with a visual representation of information, ideas, or concepts in a three-dimensional space. Examples of a format impacting 3D presentation include spatial depth, width, height, volume, perspective, rotation, viewpoint, lighting, shadow, and/or texture. For example, a format impacting 3D presentation may include a texture of a displayed object, such as a piece of clothing, like a ribbing of the piece of clothing. Each content display mode rule in the group of content display mode rules specifying a format impacting 3D presentation refers to each rule in the group establishing, indicating, limiting, characterizing, or otherwise defining a format impacting 3D presentation. Examples of each content display mode rule in the group of content display mode rules specifying a format impacting 3D presentation include each rule defining one type of format impacting 3D presentation and each rule defining different types of formats impacting 3D presentation. For example, the group of content display mode rules may include three rules associated with dimension, such as depth, width, and height of a displayed object. As another example, the group of content display mode rules may include a rule associated with perspective, another rule associated with lighting, and another rule associated with volume. In another example, the group of content display mode rules may include a rule that specifies both magnification and coloring of content. Accessing a group of content display mode rules refers to retrieving data or information associated with the group of content display mode rules, such as from a disk, database, or other source or location. Examples of accessing a group of content display mode rules include array access of one or more rules from an array, reading a file containing rules, database query to a database storing one or more rules, network communication to access networks storing rules, receiving sensor data used to group rules, and/or virtual memory paging memories storing rules. For example, in FIGS. 20A and 20B, a processor 2000 accesses a group of content display mode rules from a database 2002. In this example, processor 2000 may access the group of content display mode rules by sending a query to a server storing the database 2002, the server may process the query and retrieve the database 2002 from its storage, and the processor 2000 may receive the database 2002 from the server. The processor 2000 may then access the group of content display mode rules in database 2002 by searching the database 2002 for the group of content display mode rules.

Consistent with some disclosed embodiments, at least some of the content display mode rules in the group of content display mode rules are based on user profile information. User profile information refers to data or details indicating characteristics, properties, features, parameters, and/or preferences associated with a user or with an account associated with the user. Examples of user profile information include identifying information, demographic information, personal preferences, interests and hobbies, past behavior and history, account settings, social connections, biographical information, subscription or membership details, device and platform preferences, privacy settings, and/or payment and billing information. Identifying information may include, for example, a user's name, username, email address, and/or contact information. Demographic information may include, for example, age, gender, or languages spoken. Personal preferences may include, for example, a preferred language, communication settings, notification preferences, and/or time zone of a user. Past behavior and history may include, for example, a user's interactions and activities with a system, such as purchase history, search history, browsing behavior, and/or past interactions with other users. Account settings may include, for example, password and authentication settings and/or account-level preferences. Social connections may include, for example, information about a user's friends, followers, and/or contacts. Biographical information may include, for example, a narrative, profile picture, and/or avatar of the user. Subscription or membership details may include, for example, information related to subscription plans, membership levels, and/or premium features a user has access to. Data and platform preferences may include, for example, information about a user's preferred devices, operating systems, and/or other platform-related preferences. Privacy settings may include, for example, preferences for sharing information and/or visibility of certain information. Payment and billing information may include, for example, information related to payment methods, billing addresses, and/or transaction history. For example, user profile information may include a user's preference to display information in color as opposed to black and white. At least some of the content display mode rules in the group of content display mode rules being based on user profile information refers to the rules being dependent on, caused by, modified by, or otherwise associated with user profile information. Examples of at least some of the content display mode rules in the group of content display mode rules being based on user profile information include selecting rules based on user profile information, changing rules based on user profile information, and/or replacing rules based on user profile information. For example, a content display mode rule for a location may define a black and white display of content, but that rule may be modified based on a user's preference to display information in color as opposed to black and white. As another example, a content display mode rule for a location may be created to increase the size of displayed content to a specific size in response to a user's display setting specifying a specific size for displayed content.

Some disclosed embodiments involve accessing stored selections unique to a wearer of a wearable extended reality appliance, the stored selections associating a first content display mode rule with a first physical location and a second content display mode rule with a second physical location. A wearable extended reality appliance may be a head-mounted device, for example, smart glasses, smart contact lens, headsets or any other device worn by a human for purposes of presenting an extended reality to the human, as previously described and exemplified. By way of non-limiting example, in FIGS. 20A and 20B, wearable extended reality appliance 2010 may be a pair of glasses. A wearer of a wearable extended reality appliance may be a person who may wear the wearable extended reality appliance. Examples of a wearer of a wearable extended reality appliance include a person who holds, puts on, carries, dons, or bears a wearable extended reality appliance. For example, in FIGS. 20A and 20B, the wearer 2024 of wearable extended reality appliance 2010 may be a person wearing glasses on their head. Stored selections unique to a wearer of a wearable extended reality appliance refer to any information or data exclusive, particular, restricted, or otherwise chosen for a particular wearer of a wearable extended reality appliance that is collected, saved, or gathered in a database, list, or other data structure. Examples of stored selections unique to a wearer of a wearable extended reality appliance include a profile, setting, history, and preference. For example, a wearer may create a setting of selections by entering information into a database. As another example, a processor may store historical information associated with a wearer as the stored selections, for example, in a data structure. A physical location may be understood as previously described and exemplified, similar to a current physical location. For example, a wearer 2024 of a wearable extended reality appliance 2010 may be standing at a first physical location 2008, then walk to a second physical location 2016. The stored selections associating a first content display mode rule with a first physical location and a second content display mode rule with a second physical location refers to correlating, linking, grouping, or otherwise creating or maintaining a relationship between a first content display mode rule and a first physical location, and between a second content display mode rule and a second physical location. Examples of the stored selections associating a content display mode rule with a physical location include maintaining a database of rules associated with physical locations, adding metadata or tags to files or documents associated with physical locations, and linking a rule with a physical location using foreign keys in relational databases, structured query language, and hyperlinks or cross-references. For example, a database may contain rows of rules and columns of locations associated with each row. These rows and columns may have been stored in the database by user input, such a user typing entries for each row and column into the database. The rows and columns may also have been stored in the database automatically by a processor configured to extract and combine information related to rules and locations from sources such as other devices, historical patterns, and machine learning algorithms trained on that information. In this example, a first rule may define a presentation of house chores while a wearer of a wearable extended reality appliance is at a home location. Additionally, a second rule may define a presentation of a work document while the wearer of the wearable extended reality appliance is at an office location. Accessing the stored selections refers to retrieving data or information associated with the stored selections, such as from a disk, database, or other source or location. Examples of accessing the stored selections include array access of one or more rules from an array, reading a file containing rules, database query to a database storing one or more rules, network communication to access networks storing rules, receiving sensor data used to group rules, and/or virtual memory paging memories storing rules. For example, in FIGS. 20A and 20B, a processor 2000 accesses the stored selections from a database 2004. In this example, processor 2000 may access the stored selections by sending a query to a server storing the database 2004, the server may process the query and retrieve the database 2004 from its storage, and the processor 2000 may receive the database 2004 from the server. The processor 2000 may then access the stored selections in database 2004 by searching the database 2004 for the stored selections.

Figure 21A:
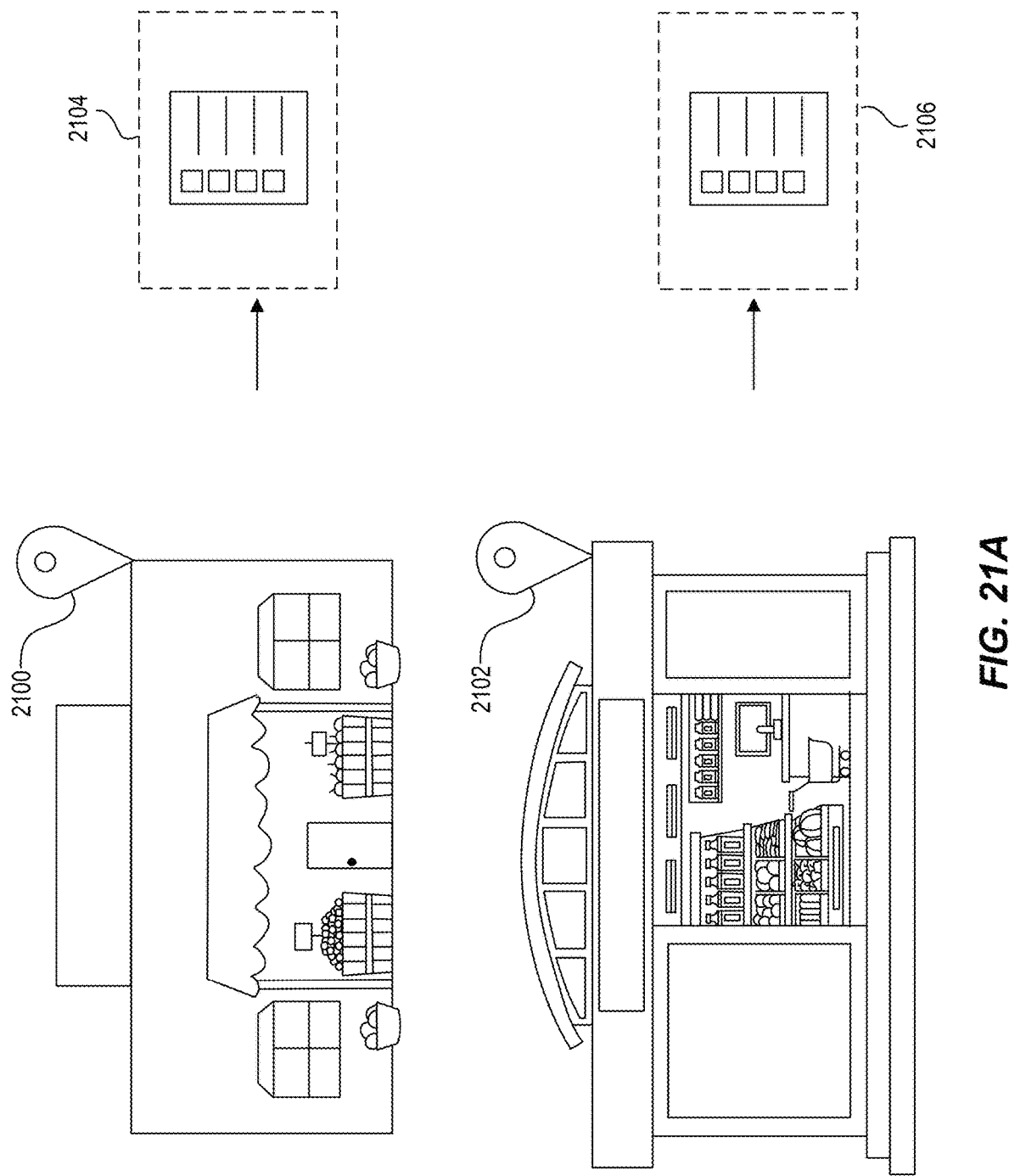
FIG. 21A illustrates examples of content presented via an extended reality appliance at a first group of physical locations, consistent with embodiments of the present disclosure.

Consistent with some disclosed embodiments, at least some of the stored selections associate more than one content display mode rule with a single physical location. At least some of the stored selections associating more than one content display mode rule with a single physical location refers to connecting, linking, or otherwise creating a relationship between more than one content display mode rule and a single physical location such that each of those content display mode rules is configured to specify a format impacting 3D presentation for that single physical location. It may be desirable to associate more than one content display mode rule with a single physical location to modify content display in more than one way using the multiple rules. Examples of at least some of the stored selections associating more than one content display mode rule with a single physical location include a database listing of a plurality of content display mode rules applicable to a single physical location, a data structure correlating a plurality of content display mode rules applicable with a single physical location, and/or computer instructions configured to combine a plurality of content display mode rules (e.g., based on user input or historical patterns) relevant to a single physical location. For example, one stored selection may associate rules for presenting some or all content in a particular color (e.g., red) and particular font (e.g., bolded titles) for location A. Similarly, another stored selection may associate rules for presenting some or all content in a particular size or presenting a particular type of content (e.g. text or video) with location B. FIG. 21A illustrates examples of content presented via an extended reality appliance, consistent with embodiments of the present disclosure. In one example shown in FIG. 21A, a stored selection may associate two content display mode rules to present content (1) in a text form and (2) inside a rectangular shape in a presentation 2104 with a grocery store location 2100, since rectangular textual content like a grocery list might be relevant when a user is in a grocery store.

Consistent with some disclosed embodiments, customizing location-based content presentation further includes associating user authorization levels with different types of content, and the stored selections account for the user authorization levels. User authorization levels refer to any category, tier, characterization, or other classification configured to define an extent of access, permission, or actions that different users or groups of users are granted. Examples of user authorization levels include a type of user granted access to certain information, a type of access or information available to a certain user, and tiers of access or information available to a user or group of users. For example, user authorization levels may include different levels of users that have access to certain information, such as administrator, manager, user, editor, viewer, and guest, where each level receives access to less information from administrator to guest. Associating user authorization levels with different types of content refers to correlating, linking, grouping, or otherwise creating or maintaining a relationship between user authorization levels and different types of content. Examples of associating user authorization levels with different types of content include maintaining a database of user authorization levels associated with different types of content, adding metadata or tags related to user authorization levels to files or documents associated with different types of content, and linking user authorization levels with different types of content using foreign keys in relational databases, structured query language, and hyperlinks or cross-references. For example, a database may contain rows of user authorization levels and columns of different types of content associated with each row. The stored selections accounting for the user authorization levels refers to information or data exclusive, particular, restricted, or otherwise chosen for a particular wearer of a wearable extended reality appliance and considering or taking into account the user authorization level associated with that wearer when storing the selections of the rules. The selections being stored accounting for the user authorization levels refers to the storage of the selections being based on or caused by the user authorization levels. Examples of the stored selections accounting for the user authorization levels include storing or accessing the selections based on the user authorization levels. For example, the stored selections may include two content display mode rules configured to display (1) a wearer's personal information with (2) a maximum display resolution. In this example, user authorization levels may include different levels of permission to view a wearer's personal information, including (1) wearer (who can view all of the personal information), (2) family member (who can view all of the personal information except for passwords), and (3) other user (who can only view the wearer's name out of all of the wearer's personal information). The stored selections may account for these user authorization levels by reducing the display resolution such that information the user is not permitted to view is successively blurred at each lower user authorization level from wearer to other user.

Consistent with some disclosed embodiments, customizing location-based content presentation further includes associating user authorization levels with differing physical locations, and the stored selections account for the user authorization levels. Differing physical locations refer to physical locations that are not the same as or unlike each other in any way. Examples of differing physical locations include separate or distinct locations, types of locations, and/or groups of locations. For example, differing physical locations may include a first store and a second store. As another example, different physical locations may include a first group of buildings owned by person A and a second group of buildings owned by person B. Associating user authorization levels with differing physical locations refers to correlating, linking, grouping, or otherwise creating or maintaining a relationship between user authorization levels and differing physical locations. Examples of associating user authorization levels with differing physical locations include maintaining a database of user authorization levels associated with differing physical locations, adding metadata or tags related to user authorization levels to files or documents associated with differing physical locations, and linking user authorization levels with differing physical locations using foreign keys in relational databases, structured query language, and hyperlinks or cross-references. For example, a database may contain rows of user authorization levels and columns of differing physical locations associated with each row. In this example, a store location may have user authorization levels of manager, employee, and customer, while an office location may have user authorization levels of administrator, editor, and viewer. The stored selections accounting for the user authorization levels refers to the stored selections considering or taking into account the user authorization levels. Examples of the stored selections accounting for the user authorization levels include storing or accessing the selections based on the user authorization levels. For example, the stored selections may include two content display mode rules configured to display (1) a location's confidential information with (2) a minimum display opacity. In this example, a user may be inside a store location, where the store location may have user authorization levels of manager, employee, and customer. The stored selections may account for these user authorization levels by reducing the display opacity such that information the user is not permitted to view is successively obscured at each lower user authorization level from manager to customer. For example, a manager may be able to view information at a maximum opacity so that the information is fully visible to the manager. An employee may be able to view the information at a medium opacity so that the information is partially visible to the employee. A customer may be able to view the information at minimum opacity so that the information is minimally visible to the customer. As another example, a user may be inside an office location, where the office location may have user authorization levels of administrator, editor, and viewer. The stored selections may account for these user authorization levels by reducing the number of editing features available for a document such that information the user is permitted to edit in a document is successively reduced at each lower user authorization level from administrator to viewer. For example, an administrator may be able to remove, modify, and view information. An editor may be able to modify and view information. A viewer may be able to view information.

Consistent with some disclosed embodiments, the user authorization level for the differing physical locations is based on physical objects in the physical locations. Physical objects refer to any tangible or material entities or things configured to occupy space and possess physical attributes such as size, shape, weight, texture, or color. Examples of physical objects include inanimate object such as furniture, clothes, toys, food, signs, and jewelry or animate objects such as animals and people. A physical object may be a particular physical object or a class of physical object. For example, a physical object may be a banana. As another example, a physical object may be painting, such that different types of paintings are all recognized under the grouping of paintings. The physical objects in the physical locations may be determined using user input or sensor measurements. For example, a user may type into a keyboard or click a button to indicate information regarding a physical object's presence or absence in a physical location. As another example, a sensor may be configured to sense information regarding a physical object's presence or absence in a physical location. Such information may include force data, image data, ultrasonic data, sound data, or radio frequency data measured by a respective a force, image, ultrasonic, sound, or radio frequency sensor. The user authorization for the differing physical locations being based on physical objects in the physical locations refers to the user authorization for the differing physical locations being dependent on, caused by, modified by, or otherwise associated with physical objects in the physical locations. Examples of the user authorization for the differing physical locations being based on physical objects in the physical locations include selecting user authorization for the differing physical locations based on physical objects in the physical locations, changing user authorization for the differing physical locations based on physical objects in the physical locations, and replacing user authorization for the differing physical locations based on physical objects in the physical locations. The user authorization for the differing physical locations may be based on a presence, type, or period of presence or absence of the physical objects in the physical locations. For example, a processor may determine that a user is in a store location, and thus use user authorization levels associated with that store location, based on the presence of store-related objects, such as a cash register, products, and advertisement boards in a physical location. Using user authorization levels for the differing physical locations based on physical objects in the physical locations may be desirable to tailor user authorization levels to physical locations which are similar in some ways, but different in others. For example, a processor may determine that a user is in a store whether that user is in a grocery store or a clothing store. Using physical items such as food products or shoes in the store may help identify the type of store the user is in to tailor user authorization levels for a specific store. For example, the user may have authorization to purchase any grocery item from a grocery store, but not certain clothing items from a clothing store.

Some disclosed embodiments involve receiving at a first time, a first indication that the wearable extended reality appliance is at the first physical location. A first time refers to any instance, event, point, or period when something occurs. Examples of a first time include a date, day, hour, second, minute, cycle, duration, span, or term. For example, a first time may include a time of day, such as 9 AM. As another example, a first time may include a period of time, such as the morning. An indication refers to any sign, icon, symbol, image, text, notification, alert, or other information. The term "at the first physical location" refers to being located inside, within, near, or around the first physical location. A first indication that the wearable extended reality appliance is at the first physical location refers to any sign, icon, symbol, image, text, notification, alert, or other information related to the wearable extended reality appliance being located inside, within, near, or around the first physical location. Examples of a first indication that the wearable extended reality appliance is at the first physical location include a notification that the appliance is inside a region, a signal indicating that the appliance has arrived at a building, and an alert that the appliance is near an address. For example, in FIG. 20A, a first indication 2006 that the wearable extended reality appliance 2010 is at the first physical location 2008 may include a signal. Receiving at a first time, a first indication that the wearable extended reality appliance is at the first physical location refers to accepting, securing, accessing, gathering, or otherwise obtaining the first indication at the first time. The first indication may be received from any source, such as a sensor configured to sense information related to the appliance being at the first physical location or from a user input of information related to the appliance being at the first physical location. Examples of receiving at a first time, a first indication that the wearable extended reality appliance is at the first physical location include wired or wireless (e.g., Wi-Fi, Bluetooth, or radio) transmission of the indication from a sensor (e.g., GPS sensors, magnetometers, ultrasonic sensors, visual sensors, and RFID systems) or a user input (e.g., a user typing location information into a keyboard or clicking a button associated with a specific location). For example, in FIG. 20A, processor 2000 may wirelessly, such as over a Bluetooth network, receive at 9 AM, a first indication 2006 in the form of a Bluetooth transmission that the wearable extended reality appliance 2010 is at the first location 2008 from a GPS sensor incorporated into the wearable extended reality appliance 2010.

Consistent with some disclosed embodiments, customizing location-based content presentation further includes receiving image data captured by an image sensor included in the wearable extended reality appliance, and analyzing the image data to determine the first indication of the first physical location of the wearable extended reality appliance. Receiving image data captured by an image sensor included in the wearable extended reality appliance may be understood as previously described and exemplified. By way of non-limiting example, an image sensor may include image sensor 372, image sensor 472, image sensor 1736 included in wearable extended reality appliance 1740 or wearable extended reality appliance 2010 or any other image sensor. In the example shown in FIG. 17, the operations may include receiving image data 1738 captured by an image sensor 1736 included in the wearable extended reality appliance 1740 (similar to wearable extended reality appliance 2010) in the form of an image by transferring the image data 1738 using a Bluetooth connection between image sensor 1736 and processor 1700. Analyzing the image data to determine the first indication of the first physical location of the wearable extended reality appliance may be understood similar to analyzing the image data to determine the indication of the current physical location of the extended reality appliance, as previously described and exemplified. By way of non-limiting example, processor 2000 may be configured to train a machine learning algorithm on a dataset of geotagged images to learn patterns and associations between image features and specific locations. In this example, processor 2000 may determine the first indication of the first physical location of the wearable extended reality appliance 2010 using the trained algorithm by comparing image data, such as image data 1738 from an image sensor 1736, to its learned patterns and associations. In one example, a convolution of at least part of the image data may be calculated to obtain a numerical result value. Further, when the numerical result value is a first numerical value, it may be determined that the first physical location is one physical location, and when the numerical result value is a second numerical value, it may be determined that the first physical location is another physical location.

Consistent with some disclosed embodiments, customizing location-based content presentation further includes analyzing the image data to identify a physical event, and analyzing the image data to determine the first indication of the first physical location of the wearable extended reality appliance based on the physical event. A physical event refers to any occurrence or happening that involves a change or interaction in the physical world, such as those involving objects, matter, energy, forces, and their interactions. Examples of a physical event include an object falling, a person pushing a cart, a group of people talking, or a moving car. For example, a physical event may include a person shopping for groceries. Analyzing the image data to identify a physical event refers to considering, evaluating, or otherwise using the image data to extract information from the image data and recognizing specific occurrences or interactions in the physical world. Examples of analyzing the image data to identify a physical event include image acquisition; preprocessing; feature extraction; event detection; or contextual analysis. Image acquisition may involve receiving photographs, videos, or other visual representations. Preprocessing may involve improving image quality or removing noise or artifacts, such as by noise reduction, image normalization, and image enhancements. Feature extraction may involve identifying features or patterns in an image that may be indicative of a physical event. Event detection may involve using techniques such as object detection, image classification, and deep learning to determine whether a particular event is part of an image. Contextual analysis may involve confirming whether a physical event is occurring, such as by analyzing other objects or elements in the image and their spatial relationships. For example, a processor 2000 may receive video footage from the image sensor, remove any shaking or distortion, normalize lighting conditions, identify objects that could indicate a person shopping, such as a moving shopping cart, use object detection algorithms to identify shopping carts in the video footage, apply motion detection techniques to detect a moving shopping cart in the video footage, perform contextual analysis to assess whether the behavior of the moving shopping cart aligns with stored data associated with a physical event of a person shopping, and make a determination that a person is shopping. Analyzing the image data to determine the first indication of the first physical location of the wearable extended reality appliance based on the physical event refers to considering, evaluating, or otherwise using the image data in combination with the physical event to extract or identify information associated with the first indication. The analyzing may involve identifying the first indication as an indication correlated with the image data and the physical event, or identifying the first indication as an indication sharing common characteristics with the image data and the physical event. Examples of analyzing the image data to determine the first indication of the first physical location of the wearable extended reality appliance based on the physical event refers to any of the techniques for analyzing image data discussed to determine the first indication. As an example, a processor 2000 from the previous example may extract features of background objects of physical events from the image, such as through the image analysis techniques discussed above. Processor 2000 may then compare those features to an event of a person shopping in a database correlating image features with physical events to confirm the determination. In such examples, background objects may be extracted using techniques such as image segmentation, object detection, semantic segmentation, instance segmentation, edge detection, contour detection, and template matching. By confirming the determination that the person is shopping by analyzing the image data, the processor 2000 may determine a first indication of the first physical location to be the wearable extended reality appliance's presence in a store. Processor 2000 may determine the first indication by comparing the shopping event to a database of physical events associated with physical locations. In one example, a convolution of at least part of the image data may be calculated to obtain a numerical result value. Further, when the numerical result value is a first numerical value, it may be determined that the physical event is an event of a first category of event, and when the numerical result value is a second numerical value, it may be determined that the physical event is an event of a second category of event, where the second category may differ from the first category. In some examples, the physical event may involve a physical object. In one example, the image data may be analyzed to detect the physical object involved in the physical event. Further, the determination of the first physical location may be based on the physical object involved in the physical event. For example, when the physical object is an object of a first category of objects, it may be determined that the first physical location is one physical location, and when the physical object is an object of a second category of objects, it may be determined that the first physical location is another physical location.

Some disclosed embodiments involve based on the received first indication and the accessed stored selections, causing the wearable extended reality appliance to display first location-based content at the first physical location according to the first content display mode rule. Causing the wearable extended reality appliance to display first location-based content at the first physical location according to the first content display mode rule refers to generating, inducing, producing, or initiating a visual presentation of information associated with the first location at that location depending on, in conformance with, or as required by the first content display mode rule. Examples of causing the wearable extended reality appliance to display first location-based content at the first physical location according to the first content display mode rule include showing specific information, elements, or layouts depending on certain conditions or criteria in the first content display mode rule. For example, in FIG. 20A, the first content display mode rule may require showing a chart 2020 in presentation 2012 when wearable extended reality appliance 2010 is at first physical location 2008, and processor 2000 may send a signal to wearable extended reality appliance 2010 to display chart 2020 at first physical location 2008 in conformance with the first content display mode rule. Causing the wearable extended realty appliance to display first location-based content at the first physical location according to the first content display mode rule based on the received first indication and the accessed stored selections refers to causing that display considering, combining, applying, manipulating, or otherwise using the received first indication and the accessed stored selections. Examples include displaying the content by referring to a database, linking the received first indication to the accessed stored, and mapping the received first indication to the accessed stored selections. Referring to a database may involve identifying first location-based content in stored selections correlated to the first indication in a database correlating indications of physical locations to the stored selections, then displaying that content. Linking the received first indication to the accessed stored selections may involve identifying first location-based content in stored selections that have a relationship to the first indication, then displaying that content. Mapping the first indication to the accessed stored selections may involve identifying first location-based content in stored selections that share common characteristics with the first indication, then displaying that content. For example, in FIG. 20A, a processor 2000 may access the stored selections from a database 2004 containing rows of rules and columns of locations associated with each row. For example, the accessed stored selections may associate a first display rule to display work information, such as a chart, with an office location. In this example, first location 2008 may be an office location. In the example shown in FIG. 20A, processor 2000 may compare the received first indication 2006 of the first physical location 2008 to the physical locations stored in database 2004 to determine the first content display mode associated with first physical location 2008 being an office location. Processor 2000 may then send a signal to wearable extended reality appliance 2010 to display chart 2020 at first physical location 2008 in conformance with the first content display mode rule.

Figure 21B:
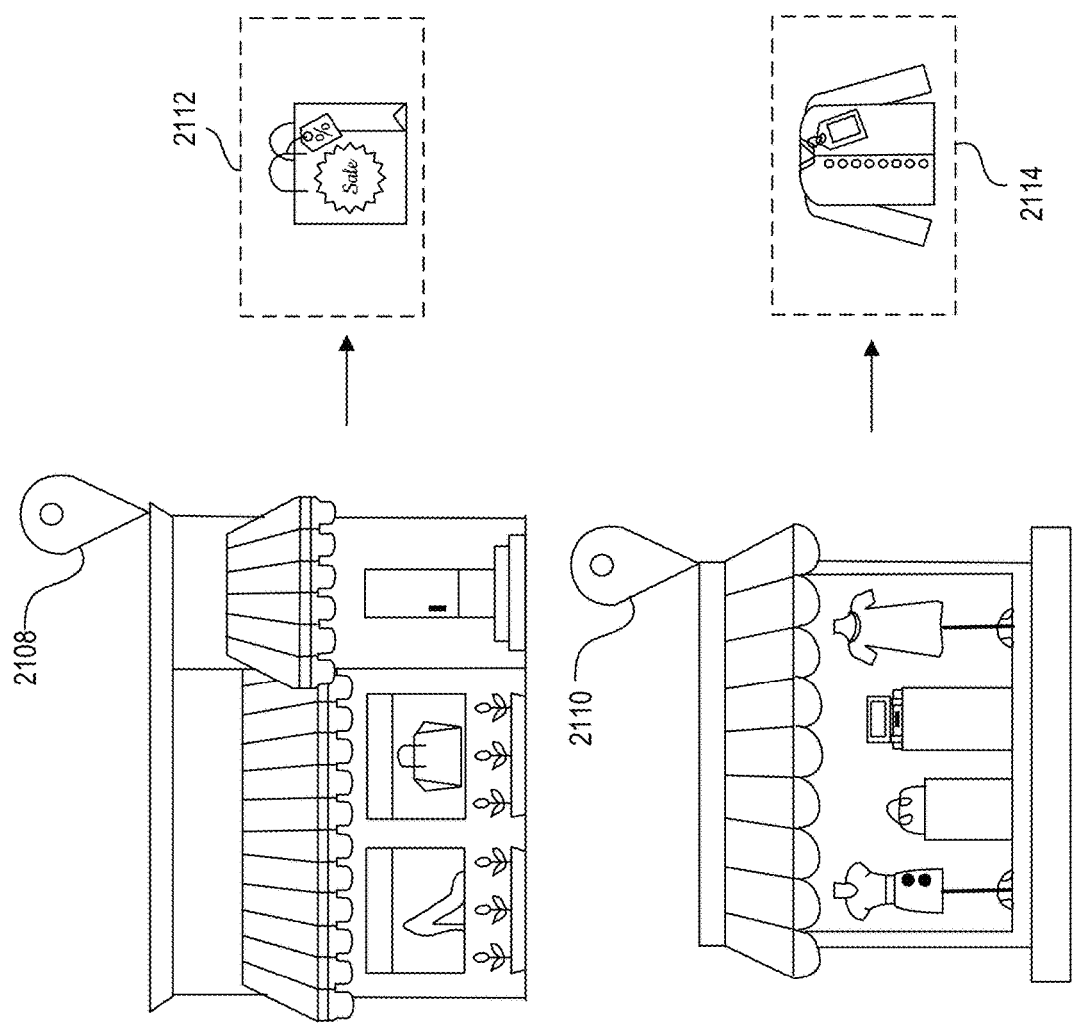
FIG. 21B illustrates examples of content presented via an extended reality appliance at a second group of physical locations, consistent with embodiments of the present disclosure.

Consistent with some disclosed embodiments, the first physical location is a group of locations sharing a common characteristic and causing the wearable extended reality appliance to display the first location-based content at the first physical location occurs when the wearable extended reality appliance is at any location of the group of locations. A group of locations sharing a common characteristic refers to a cluster, organization, or other collection of locations, such as the physical locations described herein, which have like, similar, analogous, complementary, identical, corresponding, or otherwise related features, traits, qualities, or attributes. Examples of features or attributes that may characterize a group of locations include a name, region, business, or affiliation. Examples of a group of locations sharing a common characteristic include cities in the same region, different branches or outlets of a business, a collection of parks classified as national parks, different campuses of a university, or tourist destinations within the same geographical region. For example, various hotels owned by the same organization may be a group of locations, even though they may be spread out over different cities or countries. FIG. 21A illustrates examples of content presented via an extended reality appliance at a first group of physical locations, consistent with embodiments of the present disclosure. In the example shown in FIG. 21A, a first grocery store 2100 and a second grocery store 2102 may be part of a group of locations, namely grocery stores, because they share the common characteristic of selling similar products, namely groceries. FIG. 21B illustrates examples of content presented via an extended reality appliance at a second group of physical locations, consistent with embodiments of the present disclosure. In the example shown in FIG. 21B, a boutique 2108 and a fashion store 2110 may be part of a group of locations, clothing stores, because they share the common characteristic of selling similar products, stores. The wearable extended reality appliance displaying the first location-based content at the first physical location when the wearable extended reality appliance is at any location of the group of locations refers to displaying the same or similar first location-based content at any time the wearable extended reality appliance is at one of the locations. Examples of the wearable extended reality appliance displaying the first location-based content at the first physical location when the wearable extended reality appliance is at any location of the group of locations include displaying the content in the same or different ways at any of the locations, displaying the content in the same or different positions on a virtual display at any of the locations, and displaying the content for the same or different durations or intermittent periods at any of the locations. In the example shown in FIG. 21A, the wearable extended reality appliance may display a list of groceries at grocery stores. For example, the wearable extended reality appliance may display a grocery list 2104 at first grocery store 2100 and a grocery list 2106 at second grocery store 2102. In this example, grocery list 2104 and grocery list 2106 may be the same list. Alternatively, grocery list 2104 and grocery list 2106 may both have the same style or formatting, while presenting different groceries associated with each of first grocery store 2100 and second grocery store 2102. In the example shown in FIG. 21B, the wearable extended reality appliance may display product information at clothing stores. For example, the wearable extended reality appliance may display a product with a sale sticker 2112 at boutique 2108 and a product with a price tag 2114 at fashion store 2110. In this example, sale sticker 2112 and price tag 2114 may both be first location-based content because they both show an image of a product at a clothing store with an attached tag showing information about the product.

Consistent with some disclosed embodiments, the first physical location is associated with a chain store and the first location-based content displayed according to the first content display mode rule is also associated with the chain store. A chain store may be understood as described and exemplified earlier. By way of non-limiting example, in FIG. 21A, first grocery store 2100 and second grocery store 2102 may be branches of a chain of grocery stores. The first physical location being associated with a chain store refers to the first location being proximate, near, linked, connected, or otherwise related to a chain store. Examples of the first physical location being associated with a chain store include the first physical location being inside, near, or a particular branch (as described and exemplified earlier) of a chain store. By way of non-limiting example, in FIG. 21A, the first physical location may be inside first grocery store 2100. As another example, in FIG. 21A, the first physical location may be within a certain radius of second grocery store 2102. The first location-based content displayed according to the first content display mode rule also being associated with the chain store refers to displaying the content based on the chain store or modifying the first content display mode rule based on the chain store. Examples of the first location-based content displayed according to the first content display mode rule also being associated with the chain store include showing specific information, elements, or layouts based on conditions or criteria related to the chain store. Other examples include adding, removing, or modifying elements of the first content display mode rule based on the chain store. For example, in FIG. 21A, the first content display mode rule may require showing a grocery list 2104 when wearable extended reality appliance is at a grocery store. In this example, first grocery store 2100 may be a branch of a grocery chain, and the displayed content may be specific to that chain such that grocery list 2104 may display a list of groceries sold at the grocery chain.

Consistent with some disclosed embodiments, the first physical location refers to a group of physical locations sharing a common trait, wherein customizing location-based content presentation includes enabling the wearer to store a particular selection while the wearer is located at one of the group of physical locations, and when the user is at another location of the group of physical locations, the particular selection is invoked. A group of physical locations sharing a common trait refers to a cluster or other collection of physical locations which have at least one similarity. Examples of a group of physical locations sharing a common trait include physical locations sharing a name, region, city, function, ownership, association, or identity. For example, a group of physical locations may include two stores that may share the same name "A-Mart," even though the two stores may be in different locations. A selection refers to a specific association of a content display mode rule with a physical location. Examples of a selection include an item in a list of content display mode rules associated with a physical location and a cell in a table of rows of content display mode rules and columns of physical locations. For example, a selection may be one of the display rules (such as size, color, and intensity) for a physical location. Enabling the wearer to store a particular selection while the wearer is located at one of the group of physical locations refers to allowing the wearer to insert, enter, program, input, save, or otherwise collect the selection for a portion or entire duration of when the wearer is inside, outside, near, or within a range of one of the physical locations. Examples of enabling the wearer to store a particular selection while the wearer is located at one of the group of physical locations include activating a user input ability of a device, such as a computer, keyboard, or mouse, providing a prompt to store a particular selection, and presenting a window, field, or region on an interactive display for a user to store a selection. For example, a processor 2000 may be configured to present to wearer 2024, a presentation 2012, which includes a prompt to enter a selection, such as "Please enter a selection for this group of physical locations" when the wearer 2024 enters first physical location 2008, which is one of a group of physical locations within the same region. As another example, presentation 2012 may include a list of radio boxes with various selections that a user may select by clicking on one or more of the radio boxes. In this example, the radio boxes may only be displayed on 2012 when the wearer 2024 is within a predefined range of first physical location 2008, which is one of a group of physical locations within the same name. Alternatively, the radio boxes may already be displayed on presentation 2012 at another location but the radio boxes may be disabled such that the wearer 2024 cannot click the radio boxes. In this example, the radio boxes may be activated such that the wearer 2024 can click the radio boxes when the wearer 2024 is within a predefined range of first physical location 2008, which is one of a group of physical locations within the same name. The particular selection being invoked when the user is at another location of the group of physical locations refers to referencing, using, or implementing the particular selection for a portion or entire duration of when the wearer is inside, outside, near, or within a range of one of the physical locations. Examples of the particular selection being invoked when the user is at another location of the group of physical locations include looking up a database entry of the particular selection, determining information associated with the particular selection, and causing the wearable extended reality appliance to display or continue to display location-based content at the physical location according to a content display mode rule associated with the particular selection. For example, in FIG. 20A, first location 2008 and second location 2016 may be physical locations within a group of physical locations of the same type (e.g., grocery stores). In this example, processor 2000 may be configured to present to wearer 2024, a presentation 2012, which includes a prompt to enter a selection, such as "Please enter a selection for this group of physical locations" when the wearer 2024 enters first physical location 2008. Upon this prompt, wearer 2024 may make a selection associated with a content display mode rule to display information related to a location in chart form. In this example, when wearer 2024 moves to second location 2016, the particular selection may be invoked by presenting information related to second location 2016 in a chart 2020.

Some disclosed embodiments involve receiving at a second time after the first time, a second indication that the wearable extended reality appliance is at the second physical location. A second time after the first time refers to any instance, event, point, or period that occurs after the first time. Examples of a second time after the first time include a date, day, hour, second, minute, cycle, duration, span, or term following the first time. For example, a first time may be 9 AM and a second time may be 9:20 AM. As another example, a first time may be morning and a second time may be evening. A second indication that the wearable extended reality appliance is at the second physical location refers to any sign, icon, symbol, image, text, notification, alert, or other information related to the wearable extended reality appliance being located inside, outside, within, near, or around the second physical location. Examples of a second indication that the wearable extended reality appliance is at the second physical location include a notification that the appliance is inside a region, a signal indicating that the appliance has arrived at a building, and an alert that the appliance is near an address. For example, in FIG. 20B, a second indication 2014 that the wearable extended reality appliance 2010 is at the second physical location 2016 may include a notification. Receiving at a second time after the first time, a second indication that the wearable extended reality appliance is at the second physical location refers to accepting, securing, accessing, gathering, or otherwise obtaining the second indication at the second time. The second indication may be received from any source, such as a sensor configured to sense information related to the appliance being at the second physical location or a user input related of information related to the appliance being at the second physical location. Examples of receiving at a second time, a second indication that the wearable extended reality appliance is at the second physical location include a wired or wireless (e.g., Wi-Fi, Bluetooth, or radio) transmission of the indication from a sensor (e.g., GPS sensors, magnetometers, ultrasonic sensors, visual sensors, and RFID systems) or a user input (e.g., a user typing location information into a keyboard or clicking a button associated with a specific location). For example, in FIG. 20B, processor 2000 may wirelessly, such as over a Wi-Fi network, receive at 9:20 AM (following the first time of 9 AM), a second indication 2014 in the form of a Wi-Fi notification that the wearable extended reality appliance 2010 is at the second location 2016 from an ultrasonic sensor incorporated into the wearable extended reality appliance 2010.

Some disclosed embodiments involve based on the received second indication and the accessed stored selections, causing the wearable extended reality appliance to display second location-based content at the second physical location according to the second content display mode rule. Causing the wearable extended reality appliance to display second location-based content at the second physical location according to the second content display mode rule refers to generating, inducing, producing, or initiating a visual presentation of information associated with the second location at that location depending on, in conformance with, or as required by the second content display mode rule. Examples of causing the wearable extended reality appliance to display second location-based content at the second physical location according to the second content display mode rule include showing specific information, elements, or layouts depending on certain conditions or criteria in the second content display mode rule. For example, in FIG. 20B, the second content display mode rule may require showing a document 2022 in presentation 2018 when wearable extended reality appliance 2010 is at second physical location 2016, and processor 2000 may send a signal to wearable extended reality appliance 2010 to display document 2022 at second physical location 2016 in conformance with the second content display mode rule. Causing the wearable extended realty appliance to display second location-based content at the second physical location according to the second content display mode rule based on the received second indication and the accessed stored selections refers to causing that display considering, combining, applying, manipulating, or otherwise using the received second indication and the accessed stored selections. Examples include displaying the content by referring to a database correlating indications of physical locations to the stored selections, linking the received second indication to one or more of the accessed stored selections based on a relationship of the indication to the stored selections, and mapping the received second indication to one or more of the accessed stored selections based on common characteristics of the indication to the stored selections. For example, in FIG. 20B, a processor 2000 may access the stored selections from a database 2004 containing rows of rules and columns of locations associated with each row. For example, the accessed stored selections may associate a second display rule to display personal information, such as a document, with a home location. In this example, second location 2016 may be a home location. In the example shown in FIG. 20B, processor 2000 may compare the received second indication 2014 of the second physical location 2016 to the physical locations stored in database 2004 to determine the second content display mode associated with second physical location 2016. Processor 2000 may then send a signal to wearable extended reality appliance 2010 to display document 2022 at second physical location 2016 in conformance with the second content display mode rule.

Consistent with some disclosed embodiments, the accessed stored selections associate a third content display mode rule with the first physical location, and customizing location-based content presentation further includes, based on the received first indication and the accessed stored selections, causing the wearable extended reality appliance to display the first location-based content at the first physical location according to the first content display mode rule and to display third location-based content at the first physical location according to the third content display mode rule. The accessed stored selections associating a third content display mode rule with the first physical location refers to correlating, linking, grouping, or otherwise creating or maintaining a relationship between a third content display mode rule and the first physical location. Examples of the accessed stored selections associating a third content display mode rule with the first physical location include maintaining a database of rules associated with physical locations, adding metadata or tags to files or documents associated with physical locations, and linking a rule with a physical location using foreign keys in relational databases, structured query language, and hyperlinks or cross-references. For example, a database may contain rows of rules and columns of locations associated with each row. In this example, a first rule may define a presentation of house chores while a wearer of a wearable extended reality appliance is at a home location. Additionally, a third rule may define a display of family pictures while a wearer of a wearable extended reality appliance is at a home location. The accessed stored selections associating a third content display mode rule with the first physical location may be unique to a wearer of the wearable extended reality appliance similar to stored selections unique to a wearer of the wearable extended reality appliance, as described and exemplified earlier. For example, a wearer may create a setting of selections by entering information into a database. The database may include first, second, and third content display mode rules related to the first physical locations. Causing the wearable extended reality appliance to display the first location-based content at the first physical location according to the first content display mode rule and to display third location-based content at the first physical location according to the third content display mode rule based on the received first indication and the accessed stored selections may be understood similar to causing the wearable extended reality appliance to display location-based content at a physical location according to a corresponding content display mode rule, as described and exemplified earlier. By way of non-limiting example, in FIG. 20A, a processor 2000 may access the stored selections from a database 2004 containing rows of rules and columns of locations associated with each row. In the example shown in FIG. 20A, processor 2000 may compare the received first indication 2006 of the first physical location 2008 to the physical locations stored in database 2004 to determine that the first content display mode rule and third content display mode rule are associated with first physical location 2008. Processor 2000 may then send a signal to wearable extended reality appliance 2010 to display chart 2020 in conformance with the first content display mode rule and family pictures 2026 in conformance with the third content display mode rule at first physical location 2008. In some embodiments, customizing location-based content presentation further includes enabling the wearer to set the first display mode rule and the third display mode rule following presentation of content at the first physical location. Enabling the wearer to set the first display mode rule and the third display mode rule may be understood similar to enabling the wearer to store a particular selection, as described and exemplified earlier.

Consistent with some disclosed embodiments, the first content display mode rule and the second content display mode rule are content-specific. The term "content-specific" may refer to something that is dependent on or related to a specific type of content. The first content display mode rule and the second content display mode rule being content-specific refers to the rules being tailored or customized based on a nature, characteristics, attributes, unique qualities, or context such that the treatment, presentation, or handling of the content is based on the nature, characteristics, attributes, unique qualities, or context of the content. Examples of the nature of content include the content being an image, video, or GIF. Examples of tailoring rules based on the nature of content include sizing an image, setting a playback speed for a video, or choosing a frame rate for a GIF. Examples of characteristics or attributes of content include color or font. Examples of tailoring rules based on characteristics or attributes of content include choosing a vibrance of a color or setting a font type (e.g., Times New Roman). Examples of unique qualities of content include interaction (e.g., can be interacted with by a user) or motility (i.e., an ability for movement). Examples of tailoring rules based on unique qualities of content include choosing clickable button settings and altering a speed of a moving object. Examples of a context of content include time or reason for the content. Examples of tailoring rules based on a context of content include using different visibility rules for content when the content is displayed during daytime versus nighttime, or choosing more detailed displays of information for educational content. Examples of the first content display mode rule and the second content display mode rule being content-specific include providing a specific layout for a product page, blog post, or user profile; determining font choices, text formatting, headers, and footers for text-based content; tailoring advertisements or messages for a specific product or service; and/or recommending related content based on the characteristics of the content. For example, the first content display mode rule may require displaying advertisements to include a logo for the product being advertised, since logos are specific to advertisements. As another example, the second content display mode rule may specify how long a video should be played, since such a duration may be specific to a particular portion of that video that may be of interest to the user.

Consistent with some disclosed embodiments, the first location-based content involves an interactive virtual object and the third location-based content involves an advertisement. An interactive virtual object refers to a digital representation of an entity or item that a user may engage with, manipulate, or experience within a virtual environment. In some embodiments, an interactive virtual object may be responsive to user inputs, such as gestures, movements, or commands to manipulate or influence the virtual object's behavior or appearance. In some embodiments, interactive virtual objects may resemble a real-world object. In some embodiments, an interactive virtual object may be configured to be grabbed, rotated, resized, or moved within a virtual environment. Examples of interactive virtual objects include virtual sculptures, virtual furniture, virtual smartphones, interactive maps, and filters. As an example, the first location-based content may include an interactive object such as a virtual button configured to be pressed to trigger an action. An advertisement refers to any message, image, video, or other communication configured to inform, persuade, or influence a viewer about a product, service, idea, event, or organization. Examples of advertisements include television commercials promoting a product, banners encouraging viewers to click for more information, and images showcasing fashion trends or travel destinations. For example, the third location-based content may include a video of an individual using a product to promote the sale of that product because the first physical location may be a store selling that product.

Consistent with some disclosed embodiments, displaying content according to the first content display mode rule includes presenting the content in an expanded manner and displaying the content according to the second content display mode rule includes presenting the content in a collapsed manner. Presenting the content in an expanded manner refers to any larger or more comprehensive presentation of content. In some embodiments, an expanded manner may include an increased level of detail, information, or functionality that may be configured to provide users with a more comprehensive understanding of or interaction with the content. Examples of presenting the content in an expanded manner include a mode where additional features, tools, or options of a window are available; a detailed breakdown of data points or additional charts are displayed; a display of footnotes, annotations, or supplementary materials in addition to main content; an advertisement that may be enlarged to reveal more information or interactive elements; and/or additional playback options, visualization features, or metadata that may be displayed while playing videos. For example, displaying content according to the first content display mode rule may include presenting a bar chart, such as chart 2020 in FIG. 20A, with a title, axes labels, numerical values of individual bars, and a legend. Presenting the content in a collapsed manner refers to any simplified or condensed presentation of content, especially compared to a more detailed or expanded manner. In some embodiments, a collapsed manner may include a reduction in the amount of visible information, complexity, or interaction options. Examples of presenting the content in a collapsed manner include a mode where fewer features, tools, or options are visible; showing only high-level summary information in data dashboards or visualizations; displaying a preview or summary of content; creating a compact or minimized version of a menu configured to expand when interacted with, such as by clicking; showing a smaller or less intrusive version of an advertisement; and/or providing only basic playback controls when playing videos. For example, displaying content according to the second content display mode rule may include presenting a bar chart, such as chart 2020 in FIG. 20B, with only the bars. In this example, chart 2020 may include buttons that when clicked, displays additional information, such as a title 2028 and a legend 2030.

Consistent with some disclosed embodiments, displaying content according to the first content display mode rule includes presenting the content in a visibility manner different from a visibility manner associated with the second content display mode rule. A visibility manner refers to a mode, style, process, technique, or form associated with an ability of content to be seen, viewed, hidden, or obscured. Examples of a visibility manner may include showing or hiding some or all content; blurring or clearing up some or all content; requiring passwords or other authentication to view certain content; making content opaque or transparent; distorting content; and/or changing content from colored to gray. For example, a visibility manner may include displaying content at 50% opacity. Presenting the content in a visibility manner different from a visibility manner associated with the second content display mode rule refers to showing, revealing, or otherwise displaying the content in a visibility manner that varies in at least one aspect from a visibility manner associated with the second content display mode. The first content display mode rule may have a visibility manner to display content in a particular mode, style, process, technique, or form associated with an ability of content to be seen, viewed, hidden, or obscure. Examples of presenting the content in a visibility manner different from a visibility manner associated with the second content display mode rule include obscuring versus revealing content; blurring versus clearing up content; requiring passwords or other authentication to view certain content versus displaying all content without authentication. For example, a visibility manner associated with the second content display mode rule may include displaying content at 50% opacity and a visibility manner associated with the first content display mode rule may include displaying content at 100% opacity. In this example, displaying content according to the first content display mode rule may include displaying content at 100% opacity, while displaying content according to the second content display mode rule may include displaying content at 50% opacity.

Consistent with some disclosed embodiments, displaying the first location-based content includes presenting the first location-based content at a virtual position relative to the wearable extended reality appliance, and displaying the second location-based content includes presenting the second location-based content at a virtual position relative to a physical object. A virtual position refers to a location or placement of a virtual object, entity, or other representation within a virtual environment. Examples of a virtual position include a point or region on a virtual display and the location of a virtual object. For example, a wearable extended reality appliance may present content within a window, and a virtual position may be a left side of the window. A virtual position relative to the wearable extended reality appliance refers to a location or placement of a virtual object, entity, or other representation within a virtual environment in relation or reference to the wearable extended reality appliance. Examples of a virtual position relative to the wearable extended reality appliance include a direction or orientation of a virtual position compared to the wearable extended reality appliance, a distance between a virtual position and the wearable extended reality appliance, and a spatial or directional preposition indicating a location of a person, place, or thing in relation to another person, place, or thing (e.g., above, below, to the left of, or near) describing a virtual position and a position of the wearable extended reality appliance. For example, when a user is in the first physical location, displaying the first location-based content may include presenting the first location-based content in a virtual environment at a point within five feet of the wearable extended reality appliance but not at the first physical location. A virtual position relative to a physical object refers to a location or placement of a virtual object, entity, or other representation within a virtual environment in relation or reference to a physical object. Examples of a virtual position relative to a physical object include a direction or orientation of a virtual position compared to a physical object, a distance between a virtual position and a physical object, and a spatial or directional preposition describing a virtual position and a position of a physical object. For example, displaying the second location-based content may include presenting the second location-based content 2018 in a virtual environment to the left of a physical object, such as a chair 2032, when a user is in the second physical location.

Consistent with some disclosed embodiments, displaying the first location-based content includes presenting the first location-based content in a restricted manner and displaying the second location-based content includes presenting the second location-based content in a non-restricted manner. A restricted manner refers to a presentation or representation of content that is limited, controlled, or constrained in some way. Examples of presenting content in a restricted manner include showing only essential features or options, a summary of key metrics without displaying detailed charts and graphs, only content from or associated with a particular group of individuals, limited content for children, and content with limited visibility (e.g., blurred, reduced opacity, or grayed out) of confidential or private data. For example, displaying the first location-based content may include showing work-related content, such as a document 2304, with confidential company information 2310 blurred out via a wearable extended reality appliance 2300 at a first location 2302 that is a public location, such as a park. A non-restricted manner refers to a presentation or representation of content that is not limited or constrained in any way. Examples of presenting content in a non-restricted manner include showing all available features and options, all available data points, charts, and graphs in a data visualization, all products available for purchase without any filtering or limitations, content from all friends or followers, and a mode providing users with access to all data fields or records. For example, displaying the second location-based content may include showing work-related content, such as a document 2308, with no information blurred out via the wearable extended reality appliance 2300 at a second location 2306 that is a work location, such as an office.

Figure 22B:
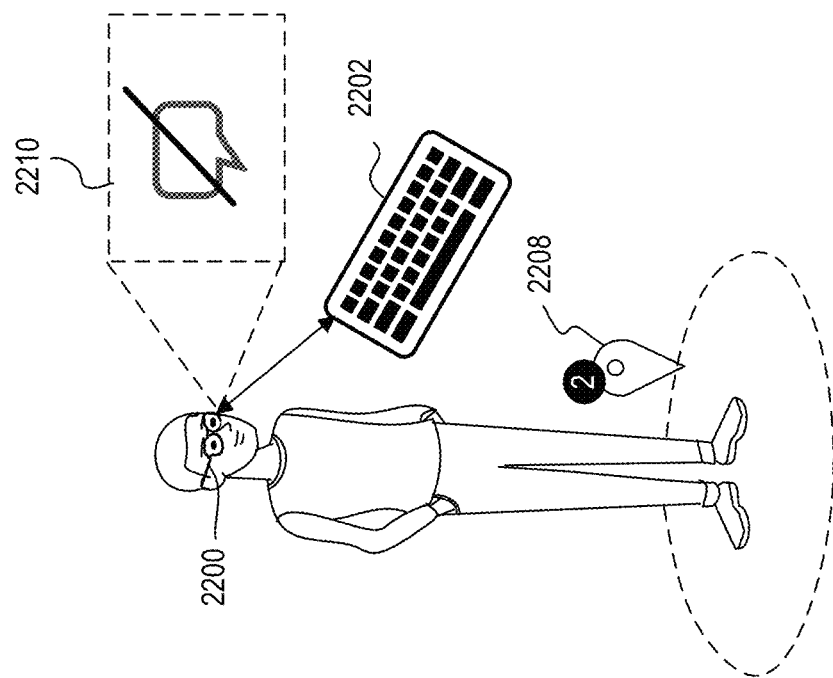
FIG. 22B illustrates an example of preventing insertion of textual content to location-based content via an external keyboard, consistent with embodiments of the present disclosure.
Figure 22A:
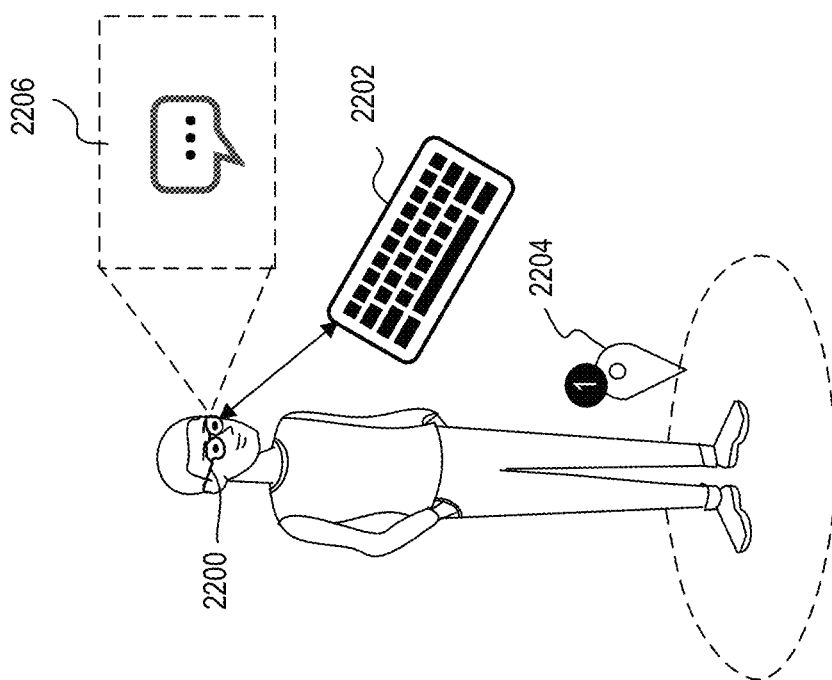
FIG. 22A illustrates an example of enabling insertion of textual content to location-based content via an external keyboard, consistent with embodiments of the present disclosure.
Figure 23B:
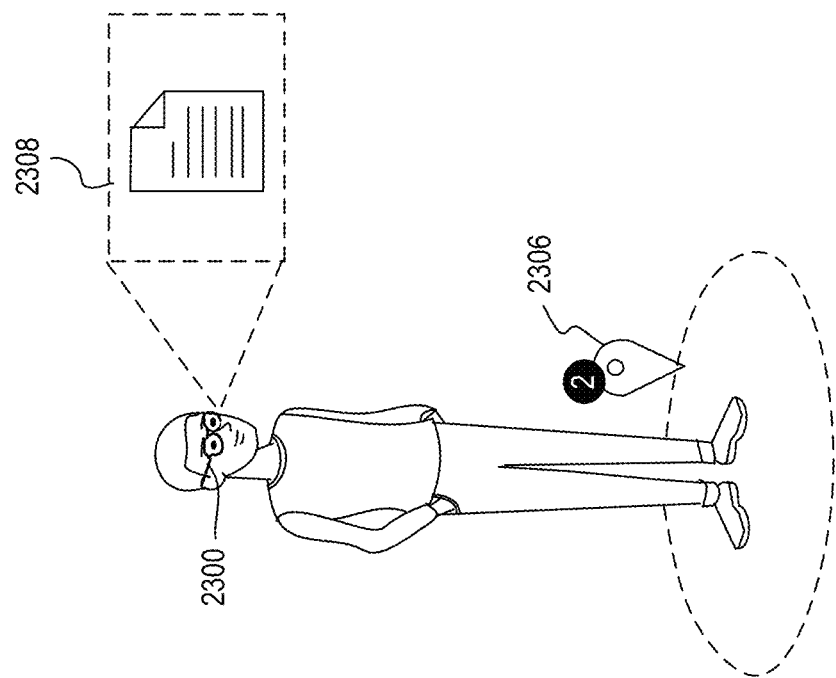
FIG. 23B illustrates an example of displaying location-based content in a non-restricted manner, consistent with embodiments of the present disclosure.
Figure 23A:
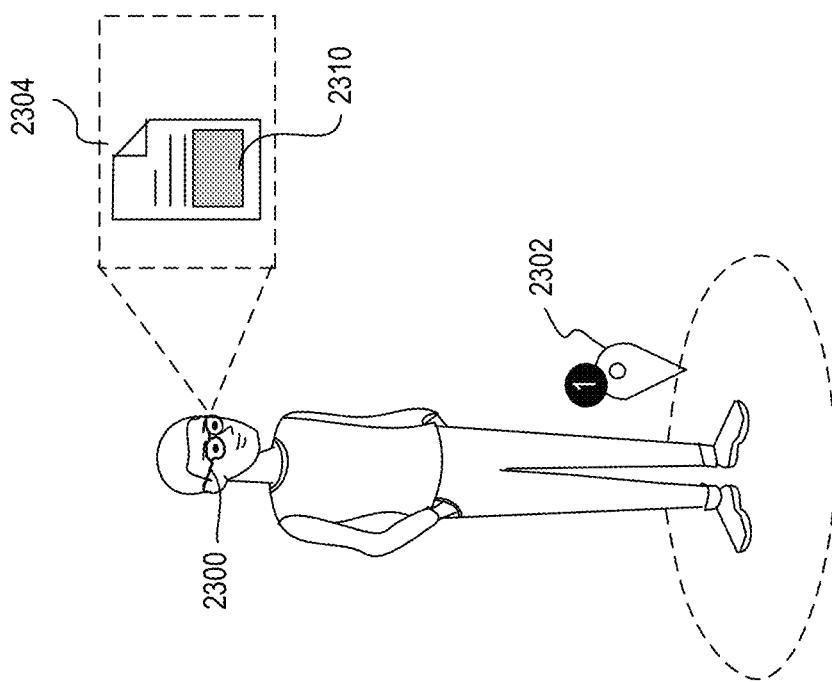
FIG. 23A illustrates an example of presenting location-based content in a restricted manner, consistent with embodiments of the present disclosure.

Consistent with some disclosed embodiments, when the wearable extended reality appliance is paired with an external keyboard, displaying the first location-based content includes enabling insertion of textual content to the first location-based content via the external keyboard, and displaying the second location-based content includes preventing insertion of textual content to the second location-based content via the external keyboard. An external keyboard refers to a physical input device configured to allow for input of text, numbers, or other commands into a computer, smartphone, tablet, or other digital device, which is extraneous, peripheral, or independent to one or more components of a system for customizing location-based content presentation. In some embodiments, an external keyboard may include a tangible input device configured for typing text and entering data. Examples of an external keyboard include a desktop keyboard, laptop keyboard, wireless keyboard, and touchscreen keyboard. For example, in FIGS. 22A and 22B, an external keyboard is shown as a wireless keyboard 2202. The wearable extended reality appliance being paired with an external keyboard refers to establishing a connection between the external keyboard and the wearable extended reality appliance such that the external keyboard is configured to input text, commands, or other inputs to the wearable extended reality appliance or associated devices or displays. Examples of the wearable extended reality appliance being paired with an external keyboard include wireless pairing techniques such as Wi-Fi and Bluetooth, and wired pairing techniques such as connecting wearable extended reality appliance being paired to an external keyboard via a cable. For example, in FIGS. 22A and 22B, pairing the wearable extended reality appliance 2200 with wireless keyboard 2202 refers to enabling a Bluetooth connectivity of wireless keyboard 2202 by pressing an associated button on wireless keyboard 2202 and selecting wireless keyboard 2202 from a list of available devices through a control of the wearable extended reality appliance 2200. Enabling insertion of textual content to the first location-based content via the external keyboard refers to facilitating, approving, or permitting an input of text to one or more aspects of the first location-based content through interaction with the external keyboard. Examples of enabling insertion of textual content to the first location-based content via the external keyboard include turning on the external keyboard or keeping the external keyboard on, creating or maintaining a connection between the external keyboard and the wearable extended reality appliance, and providing fields or other areas for entry of information in the first location-based content. For example, in FIG. 22A, displaying the first location-based content may include presenting a text input field 2206 via the wearable extended reality appliance 2200 at first location 2204. Preventing insertion of textual content to the second location-based content via the external keyboard refers to stopping, pausing, hindering, restraining, restricting, or blocking an input of text to one or more aspects of the first location-based content through interaction with the external keyboard. Examples of preventing insertion of textual content to the second location-based content via the external keyboard include turning off or putting to sleep the external keyboard, stopping or pausing a connection between the external keyboard and the wearable extended reality appliance, and removing or obscuring fields or other areas for entry of information in the second location-based content. For example, displaying the second location-based content may include presenting a blocked text input field 2210 via the wearable extended reality appliance 2200 at second location 2208.

Consistent with some disclosed embodiments, customizing location-based content presentation further includes: after causing the wearable extended reality appliance to display the first location-based content at the first physical location according to the first content display mode rule, receiving from the wearer an input for modifying the content display mode to a new content display mode; in response to the received input, causing the wearable extended reality appliance to stop displaying the first location-based content at the first physical location according to the first content display mode rule; and in response to the received input, causing the wearable extended reality appliance to display the first location-based content at the first physical location according to the new content display mode. Receiving from the wearer an input for modifying the content display mode to a new content display mode refers to accepting or processing data, commands, or information provided by the wearer to shift, transition, adjust, convert, or change the content display mode to a new content display mode. In some embodiments, an input for modifying the content display mode to a new content display mode may be received from the wearer through the wearer's interaction with an input device, which may be understood as described and exemplified earlier. Examples of receiving from the wearer an input for modifying the content display mode to a new content display mode include receiving a user interaction with a button indicating a new content display mode rule, typed information from a keyboard describing a new content display mode rule, and/or voice data from the wearer regarding a new display mode rule. For example, the wearer may click a button configured to switch from a content display mode for presenting information in a chart form to a new content display mode for presenting information in text form and a processor, such as processor 2000, may receive a signal indicative of that button being clicked. In response to the received input, causing the wearable extended reality appliance to stop displaying the first location-based content at the first physical location according to the first content display mode rule refers to inducing or provoking a pause, interruption, or end of a display the first location-based content at the first physical location according to the first content display mode rule dependent or based on, or caused by the received input. Examples of causing the wearable extended reality appliance to stop displaying the first location-based content at the first physical location according to the first content display mode rule in response to the received input include pausing a display of the first location-based content after receiving a button input, ending a display of the first location-based content upon receiving a text input from the wearer typing a command into a keyboard, and/or fading out a display of the first location-based content following the wearer speaking an instruction into a voice input device, such as a microphone. For example, the first location-based content may be a video, and in response to receiving a signal caused by the wearer pressing a button, the video may be paused or stopped. In response to the received input, causing the wearable extended reality appliance to display the first location-based content at the first physical location according to the new content display mode refers to generating, inducing, producing, or initiating a visual presentation of information associated with the first location at that location depending on, in conformance with, or as required by the new content display mode rule dependent or based on, or caused by the received input. Examples of causing the wearable extended reality appliance to display the first location-based content at the first physical location according to the new content display mode rule in response to the received input may include initiating a display of the first location-based content after receiving a button input, introducing a display of the first location-based content upon receiving a text input from the wearer typing a command into a keyboard, and/or fading in a display of the first location-based content following the wearer speaking an instruction into a voice input device, such as a microphone. Continuing from the previous example, in response to receiving a signal caused by the wearer pressing a button, the video may be paused or stopped and a video transcript of the video be displayed. For example, a first content display mode rule may cause the wearable extended reality appliance to display a video advertisement at a first location that is a retail store, since the advertisement is related to the store. The first content display mode rule may require playing the video advertisement at its normal speed. The wearer may provide an input to modify the first content display mode rule by clicking on a button that causes a display of a transcript of audio associated with the video advertisement. In response to the input by the wearer, the processor may stop playing the video advertisement and instead play the advertisement together with the audio transcript being displayed in an adjacent window.

Consistent with some disclosed embodiments, customizing location-based content presentation further includes: in response to the received input, updating the accessed stored selections; receiving at a third time after the second time, a third indication that the wearable extended reality appliance is back at the first physical location; and based on the received third indication and the accessed stored selections, causing the wearable extended reality appliance to display first location-based content at the first physical location according to the new content display mode rule. In response to the received input, updating the accessed stored selections refers to amending, adding to, removing from, altering, modifying, or otherwise revising the accessed stored selections dependent or based on, or caused by the received input. Examples of updating the accessed stored selections in response to the received input include removing, expanding, limiting, or replacing a content display mode rule after receiving a button input, a typed command into a keyboard, or a voice input. For example, in response to receiving a signal caused by the wearer pressing a button, the first content display mode rule may be replaced by the new content display mode rule. A third time after the second time refers to any instance, event, point, or period that occurs after the second time. Examples of a third time after the second time include a date, day, hour, second, minute, cycle, duration, span, or term following the second time. For example, a first time may be 9 AM, a second time may be 9:20 AM, and a third time may be 4 PM. As another example, a first time may be morning, a second time may be evening, and a third time may be nighttime. Receiving at a third time after the second time, a third indication that the wearable extended reality appliance is back at the first physical location refers to accepting, securing, accessing, gathering, or otherwise obtaining an indication that the wearable extended reality appliance has returned to inside, outside, near, or within a range of the first physical location, similar to receiving the indication of physical location as described and exemplified earlier. By way of non-limiting example, a processor 2000 may wirelessly, such as over a Wi-Fi network, receive at 4 PM (following the second time of 9:20 AM), a third indication in the form of a Wi-Fi notification that the wearable extended reality appliance 2010 has returned to the first location 2008 from an ultrasonic sensor incorporated into the wearable extended reality appliance 2010.

Based on the received third indication and the accessed stored selections, causing the wearable extended reality appliance to display first location-based content at the first physical location according to the new content display mode rule may be understood similar to causing the wearable extended reality appliance to display location-based content at a physical location according to a corresponding content display mode rule, as described and exemplified earlier. By way of non-limiting example, a processor 2000 may access the stored selections from a database 2004 containing rows of rules and columns of locations associated with each row. In this example, processor 2000 may compare the received third indication 2006 that the wearable extended reality appliance 2010 has returned to the first physical location 2008 to the physical locations stored in database 2004 to determine the new content display mode associated with first physical location 2008. Processor 2000 may then send a signal to wearable extended reality appliance 2010 to display first location-based content at first physical location 2008 in conformance with the new content display mode rule, such as the transcript displayed together with the video advertisement from the previous example.

Figure 24:
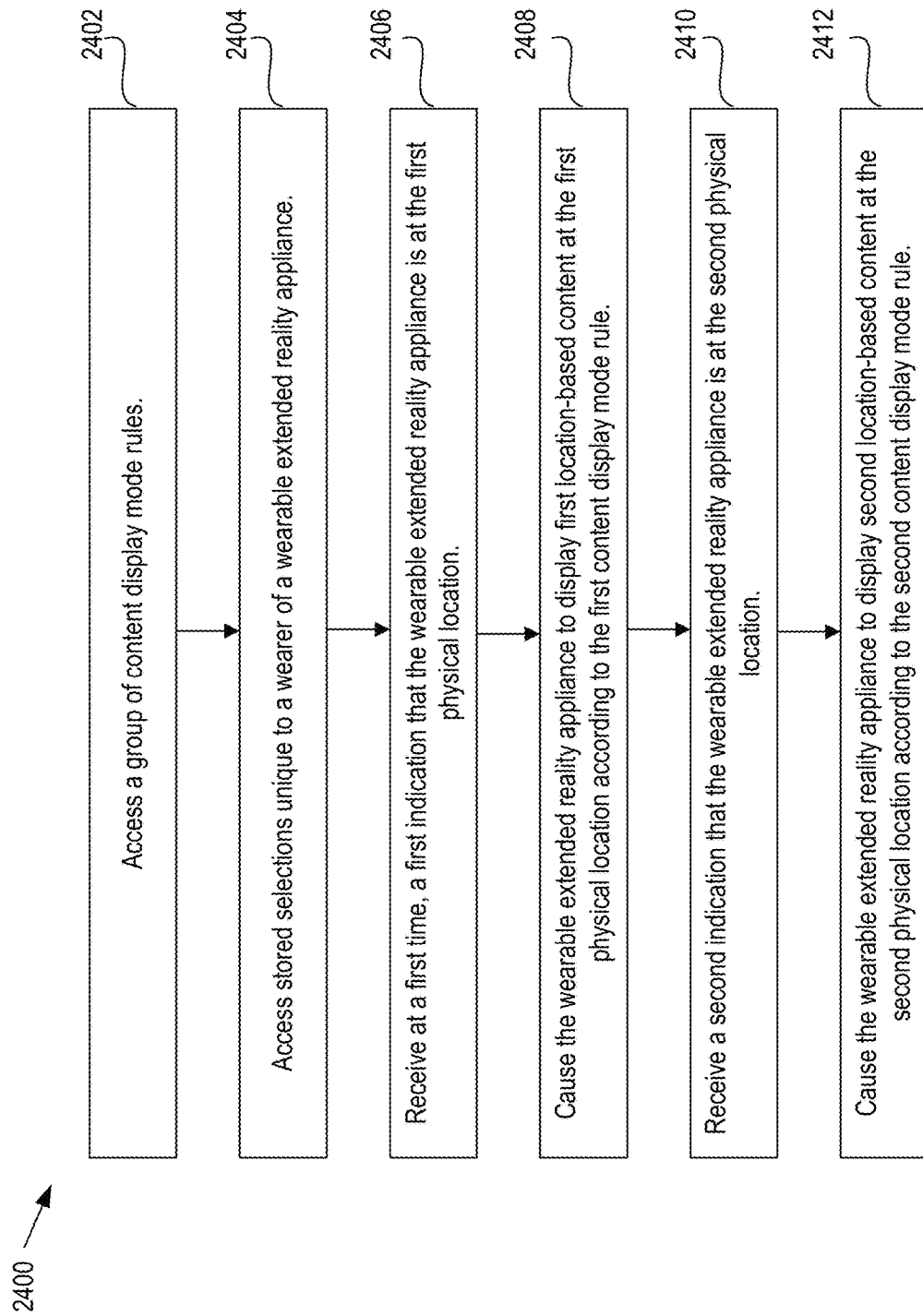
FIG. 24 illustrates a flowchart of an example process for customizing location-based content presentation, consistent with embodiments of the present disclosure.

Some disclosed embodiments involve a method for customizing location-based content presentation. FIG. 24 illustrates a flowchart of an exemplary process 2400 for customizing location-based content presentation, consistent with embodiments of the present disclosure. Consistent with some disclosed embodiments, process 2400 may be performed by at least one processor (e.g., processor 2000 shown in FIG. 20) to perform operations or functions described herein. Consistent with some disclosed embodiments, some aspects of process 2400 may be implemented as software (e.g., program codes or instructions) that are stored in a memory (e.g., memory device 311 in FIG. 3) or a non-transitory computer readable medium. Consistent with some disclosed embodiments, some aspects of process 2400 may be implemented as hardware (e.g., a specific-purpose circuit). Consistent with some disclosed embodiments, process 2400 may be implemented as a combination of software and hardware.

Referring to FIG. 24, process 2400 includes a step 2402 of accessing a group of content display mode rules, each content display mode rule in the group of content display mode rules specifying a format impacting 3D presentation. Process 2400 includes a step 2404 of accessing stored selections unique to a wearer of a wearable extended reality appliance, the stored selections associating a first content display mode rule with a first physical location and a second content display mode rule with a second physical location. Process 2400 includes a step 2406 of receiving at a first time, a first indication that the wearable extended reality appliance is at the first physical location. Process 2400 includes a step 2408 of based on the received first indication and the accessed stored selections, causing the wearable extended reality appliance to display first location-based content at the first physical location according to the first content display mode rule. Process 2410 includes a step 2410 of receiving at a second time after the first time, a second indication that the wearable extended reality appliance is at the second physical location. Process 2400 includes a step 2412 of based on the received second indication and the accessed stored selections, causing the wearable extended reality appliance to display second location-based content at the second physical location according to the second content display mode rule. It should be noted that the order of the steps illustrated in FIG. 24 is only exemplary and many variations are possible. For example, the steps may be performed in a different order, some of the illustrated steps may be omitted, combined, and/or other steps added. Furthermore, in some embodiments, process 2400 may be incorporated in another process or may be part of a larger process.

Some disclosed embodiments involve a system for customizing location-based content presentation, the system comprising: at least one processor configured to: at least one processor configured to: access a group of content display mode rules, each content display mode rule in the group of content display mode rules specifying a format impacting 3D presentation; access stored selections unique to a wearer of a wearable extended reality appliance, the stored selections associating a first content display mode rule with a first physical location and a second content display mode rule with a second physical location; receive at a first time, a first indication that the wearable extended reality appliance is at the first physical location; based on the received first indication and the accessed stored selections, cause the wearable extended reality appliance to display first location-based content at the first physical location according to the first content display mode rule; receive at a second time after the first time, a second indication that the wearable extended reality appliance is at the second physical location; and based on the received second indication and the accessed stored selections, cause the wearable extended reality appliance to display second location-based content at the second physical location according to the second content display mode rule. The terms system and processor may be interpreted as described and exemplified elsewhere in this disclosure.

The embodiments discussed above for customizing location-based content presentation may be implemented through non-transitory computer-readable medium such as software (e.g., as operations executed through code), as methods (e.g., method 2400 shown in FIG. 24), or as a system (e.g., system 200 shown in FIG. 2). When the embodiments are implemented as a system, the operations may be executed by at least one processor (e.g., remote processing unit 208 shown in FIG. 2 or processor 2000 shown in FIGS. 20A and B).

Figure 25A:
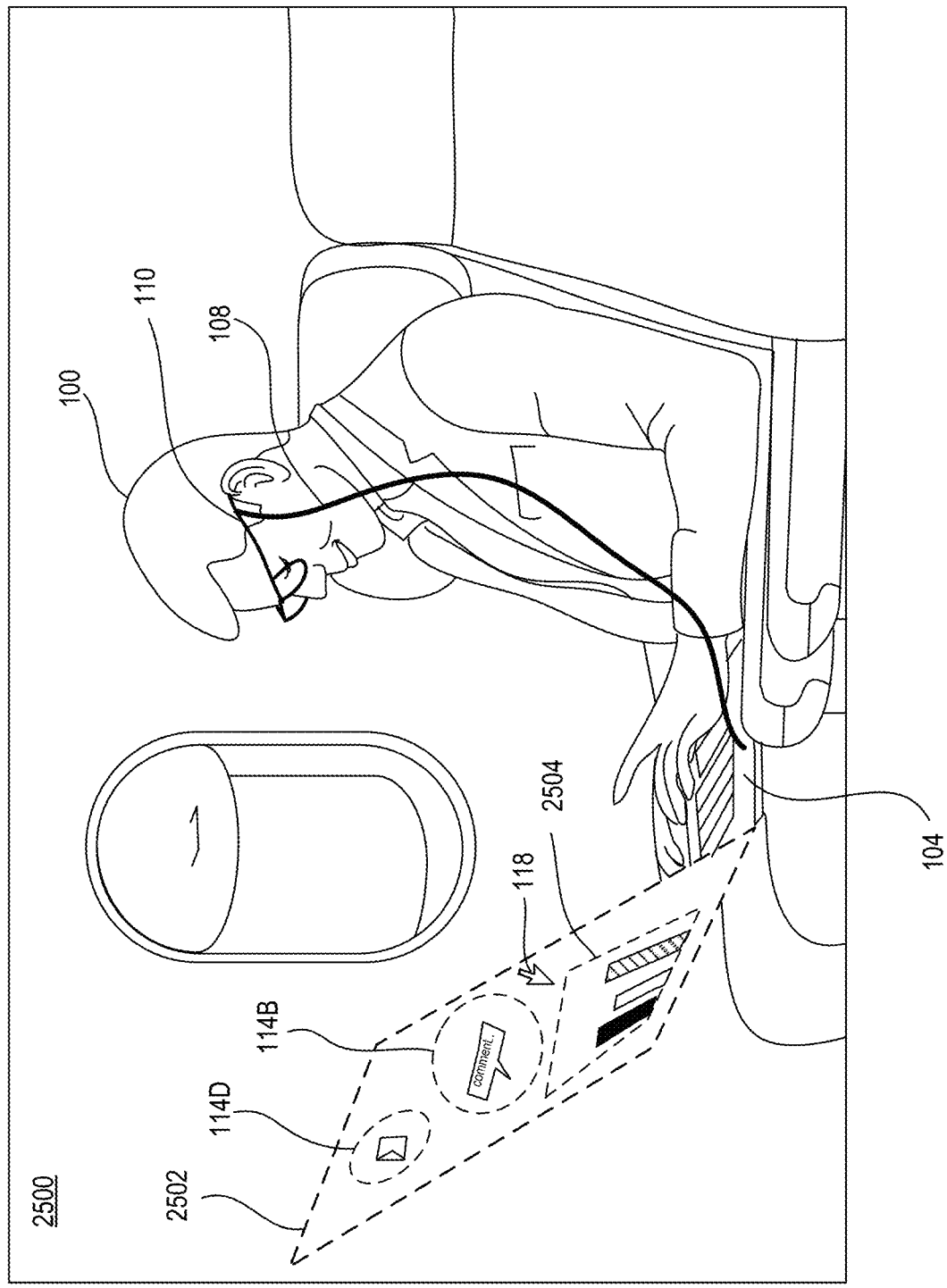
FIGS. 25A and 25B are schematic illustrations of a user operating an exemplary extended reality system in a moving airplane, consistent with some embodiments of the present disclosure.
Figure 25B:
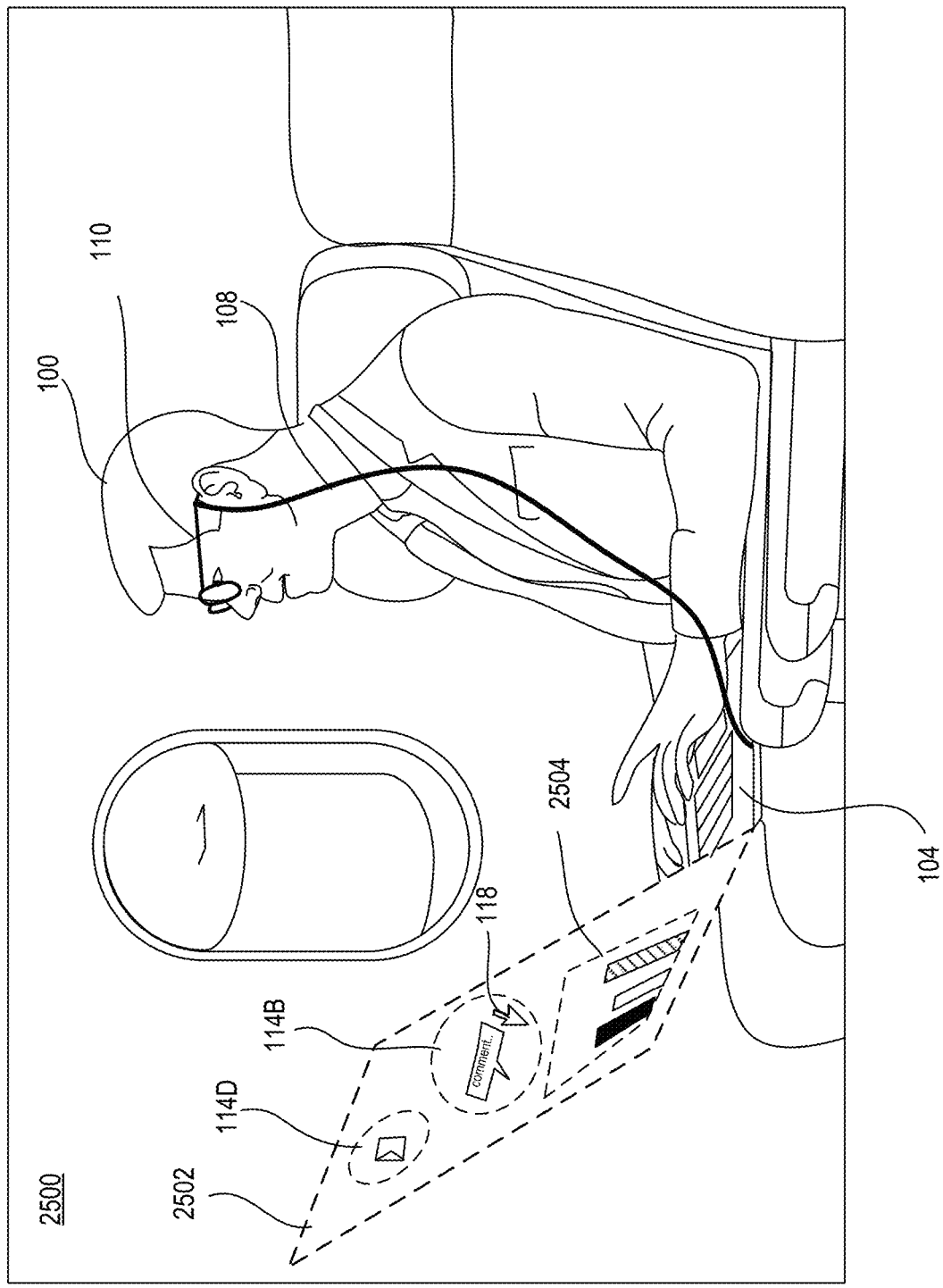

Extended reality appliances of the current disclosure may be used in different scenarios, for example, when a user is seated in a stationary workspace, seated in a moving vehicle (e.g., a car, train, airplane, boat, recreational vehicle, elevator, or any other vehicle), walking in the workspace or moving vehicle, or any other conceivable use case. For example, as described with reference to FIG. 1, user 100 may be seated at a stationary workspace while operating on virtual content displayed by wearable extended reality appliance 110 using an input device, such as, keyboard 104 and/or mouse 106. As illustrated in FIGS. 25A and 25B, a user 100 may also use extended reality appliance 110 in a moving vehicle, such as, for example, in an airplane 2500. All previous (and subsequent) descriptions of appliance 110 and its related systems, devices, and methods are applicable to the scenarios depicted in FIGS. 25A and 25B. Augmented display of virtual objects in fixed positions are challenging when a device wearer is in a moving vehicle and the wearer moves inside the vehicle (e.g., the user has the keyboard in her lap on the airplane or a train, and the user's head and head mounted display moves). In some embodiments, systems of the current disclosure may receive acceleration data both from the user's headset and from the input device. And based on the two received acceleration data sets, relative movement of the headset may be determined, and content unaffected by (or indifferent to) the movement of the vehicle may be presented to the user.

Some disclosed embodiments involve content localization in moving vehicles. The term "content" may be interpreted consistent with the previously described and exemplified term "virtual content." In other words, content refers to any type of data or information that may be displayed by an extended reality appliance to its user. For example, as used herein, content may include, among other things, a virtual object, a virtual display screen or other format for displaying information virtually, a virtual object in the virtual display, a virtual widget, a visual presentation rendered by a processing device, a virtual environment that includes a virtual display screen and a plurality of virtual objects. For example, the content may be presented in a virtual display in an extended reality environment (such as a mixed reality environment, an augmented reality environment, a virtual reality environment, etc.) using an extended reality appliance.

"Content localization" refers to the process of adapting the content to an environment. For example, content localization may refer to making the content more suitable for the environment in which it is displayed. Content localization may include making any changes necessary to the content to make it more suitable for the particular environment it will be displayed in. For example, localizing content to be displayed in the United States may include modifying the displayed data to display money in dollars, spell words consistent with US spelling, and/or make other changes suitable or relevant to a user in the US. Similarly, content localization in moving vehicles may refer to the process of adapting the content to the environment of the moving vehicle. Content localization in moving vehicles may refer to, or include, modifying or adapting the content to be displayed in a moving vehicle such that it is more convenient for a user to see or visualize. For example, content localization in this context may include content stabilization and/or other adjustments to compensate for vehicle and/or user movements and vibrations to keep the displayed virtual content aligned with the real-world environment such that the user can visualize the content comfortably and smoothly. Additionally or alternatively, content localization in moving vehicles may refer to the process of adapting and delivering relevant content to passengers based on their location, context, and preferences while they are traveling in a vehicle.

Some disclosed embodiments involve receiving, from within a moving vehicle, first acceleration data captured using a first sensor included in a wearable extended reality appliance mountable on a head of a wearer. "Receiving" refers to one or more of taking, collecting, gaining, obtaining, securing, retrieving, acquiring, or otherwise gaining access to data or information. Receiving may include reading data from memory and/or receiving data from a computing device or another device (e.g., an extended reality device or apparatus) via a wired and/or wireless communications channel using, for example, a synchronous and/or asynchronous communications protocol. As used herein, a "vehicle" refers to any conveyance used for transporting people or goods by land, air, or sea. Non-limiting examples of a vehicle may include, a car, a bus, a train, an airplane, a boat, a motorcycle, a tram, an elevator, an escalator, a moving walkway, or any other conveyance. A moving vehicle is a vehicle that is capable of movement but not necessarily moving at the time of reference. For example, receiving (e.g., data) from a moving vehicle may include both receiving data from a vehicle that is moving at the time the data is sent and/or received and receiving data from a vehicle that is movable but stationary at that particular time. Additionally, receiving (e.g., data) from "within" the vehicle does not necessarily require receiving data from the interior of an enclosed vehicle. The data may also be received from the exterior or the surface of the vehicle (e.g., from a motorcycle rider, the open deck or a boat or bus, from an occupant in an escalator or a moving walkway, or other unenclosed locations of a vehicle).

Consistent with some disclosed embodiments, the vehicle is an autonomous vehicle. An autonomous vehicle refers to a driverless vehicle. For example, a driverless vehicle is a vehicle that operates and performs its functions substantially without human intervention. An autonomous vehicle may utilize an automated driving system to respond to external conditions that a human driver would manage. The autonomous vehicle may be any type (e.g., a car, a bus, a train, an airplane, a boat, a motorcycle, an elevator, an escalator, a moving walkway, or other conveyance) of vehicle. In some disclosed embodiments, the vehicle is a train, an airplane, or a boat. And in some disclosed embodiments, the vehicle is an elevator.

As used herein, "acceleration" refers to the rate at which velocity changes with time, in terms of speed and/or direction. For example, an object moving in a straight line (e.g., constant direction) is referred as accelerating if it speeds up or slows down. Similarly, an object moving in a circle (e.g., changing direction) at the same speed is said to be accelerating because its direction is continually changing. Acceleration data refers to information indicative of the rate of change of an object's velocity over time. A "sensor" is a device, module, machine, or subsystem that detects events, parameters, or changes in, or from, its environment. A sensor may also send signals indicative of the detected event (parameter or changes) to another device, module, machine, or subsystem. In general, a sensor may detect any type of input (e.g., acceleration, motion, proximity, light, heat, pressure, moisture, or another parameter of interest) from the physical environment. A "first" sensor refers to any sensor and "first acceleration data refers to acceleration data associated with the first sensor. For example, first acceleration data may refer to the acceleration data captured or detected by the first sensor. In embodiments of the current disclosure, the first sensor may be configured to detect acceleration. First sensor may be any type of sensor that is configured to detect or capture acceleration directly or indirectly.

Consistent with some disclosed embodiments, the first sensor includes at least one of an accelerometer or a gyroscope. An accelerometer is a type of sensor that measures acceleration. An accelerometer may measure changes in speed and/or direction of an object. An accelerometer may detect and quantify movement, orientation, and vibrations in both static and dynamic systems. Any type of accelerometer (e.g., piezoelectric accelerometer, piezoresistive accelerometer, capacitive accelerometer, optical accelerometer, resonant-mass accelerometer, microelectromechanical systems (MEMS) accelerometer, surface acoustic wave (SAW) accelerometer, tilt sensor, or any other device that can measure acceleration directly or indirectly) may be used. Accelerometers of the present disclosure may include single-axis accelerometers (that measure acceleration in one dimension), dual-axis accelerometers (that measure acceleration in two dimensions), or three-axis accelerometers (that measure acceleration in three dimensions). A gyroscope is a device used for measuring orientation and/or angular velocity of an object. A gyroscope may detect and measure changes in rotational motion. Any type of gyroscope (e.g., a mechanical gyroscope, a fiber optic gyroscope, ring laser gyroscope, MEMS gyroscope, or other type of gyroscope) may be used. Unlike an accelerometer, which measures linear acceleration, a gyroscope may primarily measure angular velocity. Angular velocity is the rate of change of angular displacement over time and represents how fast an object is rotating or turning. The first sensor may also include strain gauges, inertial measurement units (IMUs), magnetic reed switches, linear variable differential transformers (LVDTs), or other sensors that directly or indirectly detect acceleration.

A wearable extended reality appliance mountable on a head of a wearer may be understood as previously described and exemplified. Consistent with previous discussions, such a device may be an extended reality appliance that may be worn on, or supported at least partly by, the head of a human being and may include, for example, smart glasses, smart contact lens, headsets, or any other device that may be worn or supported at least partly by a human head for purposes of presenting an extended reality, augmented reality (AR), virtual reality (VR), mixed reality (MR), or any immersive experience to the user. For example, as explained previously, XR unit 204 (see FIG. 4) includes a wearable extended reality appliance configured to present virtual content to a user. FIGS. 1, 25A, and 25B illustrate such a wearable extended reality apparatus 110 in the form of smart glasses mounted on a user's head. As described with reference to, e.g., FIGS. 1 and 4, XR unit 204 includes a plurality of sensors some of which are configured to detect acceleration data. For example, some of these sensors measure the acceleration and/or velocity of objects in the environment. With reference to FIGS. 25A and 25B, when airplane 2500 is moving, one or more processors (associated with the extended reality apparatus 110, the keyboard 104, or a remote processing station) may receive acceleration data from a sensor in the extended reality apparatus that is mounted on the user's head.

Consistent with some disclosed embodiments, the first acceleration data includes a first component associated with movement of the head of the wearer with respect to the vehicle and a second component associated with movement of the vehicle. A "component" refers to a part, a portion, or an element of a larger whole. For example, a component may be one portion of multiple portions that make up a composite entity. In this context, component may refer to a portion of the acceleration data. For example, the first acceleration data may have multiple portions or components, and the first component and the second component may be different portions of the first acceleration data. In some embodiments, each of the first and second component may refer to the acceleration experienced by an object in a specific direction or along a particular axis. Since acceleration is a vector quantity, it has both magnitude and direction. When an object moves in a non-linear path or is subject to forces acting in different directions, the total acceleration may be broken down into different components with each component corresponding to acceleration in a specific direction. For example, for the simple case of an object moving in a linear path in a two-dimensional plane (e.g., XY plane), its acceleration along the linear path may be resolved into two perpendicular components—one in the direction of the X-axis and the other in the direction of the Y-axis. Each of these components may represent how much acceleration the object experiences in each respective direction separately. In another example, a specific vector may be a function of two or more other vectors, for example a sum of the two or more other vectors, and each one of the two or more other vectors may be a component of the specific vector. For example, the first acceleration data may be a vector that is a function (e.g., a sum) of the first component associated with movement of the head of the wearer with respect to the vehicle and the second component associated with movement of the vehicle, and possibly of other components, such as a noise component. For more complex motion scenarios where an object undergoes combined translation in one or more directions and rotation about one or more axes, the acceleration of the object may include several components with each component corresponding to the acceleration of the object in a particular direction or rotation about a particular axis. For example, in an exemplary case where the wearer of an extended reality apparatus is seated in a moving vehicle (such as, for example, an airplane as illustrated in FIGS. 25A and 25B), the acceleration components may include, among others, a first component that is associated with movement of the wearer's head with respect to the vehicle and a second component associated with movement of the vehicle. Continuing with this example, when the wearer rotates his/her head while the vehicle is moving, one acceleration component (e.g., a first component) may be associated with the rotation of the wearer's head with respect to the vehicle and another acceleration component (e.g., a second component) may be associated with the movement of the vehicle. It should be noted that the movement of the wearer's head is considered to be synonymous with the movement of the extended reality apparatus in the description above. The first component of acceleration may also be associated with the movement of extended reality apparatus with respect to the vehicle in some embodiments. For example, in embodiments where relative motion between the wearer's head and the extended reality apparatus mounted on the wearer's head is possible (e.g., extended reality apparatus can move relative to the head), the first component may be associated with movement of the extended reality apparatus with respect to the vehicle.

Some disclosed embodiments involve receiving, from within the moving vehicle, second acceleration data captured using a second sensor included in a personal input device. "Second acceleration data" refers to acceleration data that is distinct from the first acceleration data. The types and values of the data associated with the first and second acceleration data may be the same in some cases but they are two distinct or different data sets. "Second sensor" refers to a sensor that is distinct from the first sensor. The second sensor may be the same type of sensor as the first sensor in some cases, but they are two distinct or physically different sensors. The second sensor may refer to a sensor that detects or captures the second acceleration data. In one example, the second sensor may be movable independently of the first sensor, the wearable extended reality appliance, the head of the wearer and/or the vehicle.

The term "personal input device" may be interpreted consistent with the previously described and exemplified "input device." For example, a personal input device includes any physical device configured to receive input from a user and/or an environment of the user. The "personal" input device may be an input device associated with the wearer of the extended reality appliance and/or the extended reality appliance. The personal input device may provide the data to a computational device with or without modification in a digital format and/or an analog format. In one embodiment, the personal input device may store the input received from the user and/or the environment in a memory device accessible by a processing device, and the processing device may access the stored data for analysis. In some examples, the input received by the personal input device may include key presses, tactile input data, motion data, position data, gestures based input data, direction data, or any other data for computation. Some examples of the personal input device may include a button, a key, a keyboard, a computer mouse, a touchpad, a touchscreen, a joystick, a game controller, or another mechanism from which input may be received. Another example of a personal input device may include an integrated computational interface device that includes at least one physical component for receiving input from a user. The integrated computational interface device may include at least a memory, a processing device, and the at least one physical component for receiving input from a user. In one example, the integrated computational interface device may further include a physical component for outputting information to the user. Some non-limiting examples of physical components for receiving input from users that may be included in the integrated computational interface device may include at least one of a button, a key, a keyboard, a touchpad, a touchscreen, a joystick, or any other mechanism or sensor from which computational information may be received. Some non-limiting examples of physical components for outputting information to users may include at least one of a light indicator (such as a LED indicator), a screen, a touchscreen, a beeper, an audio speaker, or any other audio, video, or haptic device that provides human-perceptible outputs. For example, in some embodiments, as illustrated in FIGS. 1, 25A, and 25B, the personal input device may include a keyboard 104. In some embodiments, keyboard 104 may also include a pointing device (such as, for example, a trackball, touchpad, trackpad, touchscreen, joystick, pointing stick, stylus, light pen, or any other input mechanism). In some embodiments, as illustrated in FIG. 1, the personal input device may also include computer mouse 106.

Consistent with some disclosed embodiments, the personal input device is a non-vehicle component configured to be paired with the wearable extended reality appliance. The phrase "personal input device is a non-vehicle component" indicates that the personal input device is not an integral part or a component of the vehicle. For example, rather than being a keyboard or another input device that is part of the vehicle (e.g., a touch screen display used to control some operation, such as, radio, navigation, or entertainment system of the vehicle), the personal input device may not be a part of the vehicle. The personal input device being "configured to be paired with the wearable extended reality appliance" indicates that the two devices (e.g., personal input device and the extended reality apparatus) are capable of establishing a wired or wireless connection or communication link between each other, for example, to exchange data or perform certain functions. The pairing process may allow the two devices to recognize and communicate with each other securely. The two devices may be configured to be paired using wireless communication protocols such as Bluetooth, Wi-Fi, or Near Field Communication (NFC). During the pairing process, the two devices may exchange information to establish a unique and secure connection between them. Once paired, the two devices may be able to communicate directly with each other without the need for a physical wired connection. Pairing may allow the two devices to work together seamlessly and perform functions (e.g., controlling or moving virtual objects in the virtual display displayed in the extended reality appliance using the personal input device). Once paired, the two devices may remember each other, so future connections may be automatic and easy. For example, when the personal input device is brought proximate to (e.g., within a predetermined distance of) the extended reality appliance, the personal input device may pair with the extended reality appliance. As one example, in FIG. 25A, keyboard 104 is a non-vehicle component and it is paired with wearable extended reality appliance 110 such that an open document 2504, widgets 114D, 114B, and virtual cursor 118 on virtual content 2502 may be controlled (opened, closed, manipulated, moved, and the like) using keyboard 104. In some embodiments, when keyboard 104 and extended reality appliance 110 are activated (e.g., turned on) and brought within a preselected distance of each other the two devices may be paired.

Consistent with some disclosed embodiments, the personal input device is connectable to the wearable extended reality appliance via at least one of a wired or a wireless connection. As explained previously, e.g., with reference to FIG. 1, keyboard 104 is connected by wire 108 to a wearable extended reality appliance 110 that displays virtual content to user 100. Alternatively or additionally to wire 108, keyboard 104 may connect to wearable extended reality appliance 110 wirelessly. Any suitable wireless connection technology including, for example, BLUETOOTH™, BLUETOOTH LE™ (BLE), Wi-Fi, near field communications (NFC), or other suitable communication methods may be to wirelessly connect keyboard 104 to extended reality appliance 110.

Some disclosed embodiments involve using the first acceleration data and the second acceleration data to segregate the second component from the first component, thereby isolating the head acceleration with respect to the vehicle from the vehicle acceleration. The term "segregate" refers to isolating, dividing, separating, or setting apart from other parts. For example, segregate may refer to separating or setting apart one or more parts from other parts. For example, segregating the second component from the first component may refer to separating the total acceleration of an object into its constituent components including the first and second components. As explained previously, the first component is associated with movement of the wearer's head with respect to the vehicle and the second component is associated with movement of the vehicle. Thus segregating the second component from the first component may result in isolating the wearer's head acceleration with respect to the vehicle from the vehicle acceleration. "Head acceleration" refers to the acceleration that results from the movement of the wearer's head relative to the vehicle.

For example, as illustrated in the exemplary embodiment illustrated of FIGS. 25A and 25B, user 100 may use a head mounted extended reality apparatus 110 with a keyboard 104 in an airplane 2500. As explained previously, extended reality appliance 100 may display virtual content 2502 in the form of a virtual screen with virtual objects, for example, a document 2504 (with a bar graph) and a plurality of virtual widgets 114B, 114D. User 100 may manipulate the document 2504 and the virtual widgets 114B, 114D using keyboard 104. For example, user 100 may enter text into the document, launch and close the virtual widgets 114B, 114D, and/or otherwise control the virtual objects in the virtual display using keyboard 104. In one example, user 100 may move virtual cursor 118 (e.g., using a trackpad on keyboard 104) to different areas of the virtual display to move to different virtual objects on the virtual screen. It is normal for a person's head to move relative to his/her body (e.g., bending the head forward towards the chest, bending the head backward, turning the head to the left or the right, and other head movements) during the course of a day. Thus, while viewing and operating the virtual display, the user's head may move relative to the keyboard 104 and the airplane 2500. For example, as illustrated in FIG. 25B, the user may rotate his/her head to look out of the window while the extended reality apparatus 110 is displaying virtual content 2502. When the user's head rotates, a sensor included in the extended reality appliance 110 (e.g., an appliance sensor) may measure acceleration data that includes a component associated with the movement of the user's head relative to the airplane 2500 (e.g., rotation of the user's head) and a component that is associated with the movement of the airplane 2500. Meanwhile, a sensor located in keyboard 104 (e.g., a keyboard sensor) may also capture acceleration data. Since the keyboard 104 is also moving with the airplane 2500, the acceleration data captured by the keyboard sensor may include a component associated with the movement of the airplane 2500. But since the keyboard 104 does not rotate with the user's head, the acceleration captured by the keyboard sensor may not include a component associated with the movement of the user's head relative to the airplane 2500. In some embodiments, the appliance sensor and/or the keyboard sensor may transmit the acceleration data captured by the respective sensors to a common location (e.g., remote processing unit 208, extended reality apparatus 110, keyboard 104) such that one or more processing devices at the common location may access and operate on the captured acceleration data. In some embodiments, these processing devices may use these acceleration data to separate the component of acceleration associated with the movement of the airplane 2500 and the component associated with the movement of the user's head relative to the airplane 2500 (e.g., head acceleration).

Some disclosed embodiments involve determining an acceleration of the head of the wearer in a frame of reference based on the first acceleration data, determining an acceleration of the vehicle in the frame of reference based the second acceleration data, and using the determined acceleration of the head in the frame of reference and the determined acceleration of the vehicle in the frame of reference for isolating the head acceleration with respect to the vehicle from the vehicle acceleration. Frame of reference refers to an arbitrary set of axes with reference to which the position or motion of an object is described. A frame of reference is a conceptual framework used to describe the position, motion, or state of an object or event relative to other objects or events in space and time. It provides a set of coordinates or points from which observations and measurements can be made. There are mainly two types of frames of reference, inertial frame of reference and non-inertial frame of reference. Inertial frame of reference will be described later. A non-inertial reference frame is a frame of reference that undergoes acceleration with respect to an inertial frame. In other words, the frame of reference will experience non-zero acceleration due to external forces (such as, for example, gravity, centrifugal or centripetal forces, or other external influences) such that an accelerometer at rest may detect a non-zero acceleration. Based on at least the detected acceleration data, the one or more processing devices may determine an acceleration of the wearer's head and the acceleration of the vehicle in a frame of reference and use the determined accelerations for isolating the head acceleration with respect to the vehicle from the vehicle acceleration. Any frame of reference may be selected. For example, in some embodiments, the selected frame of reference used to determine the accelerations may be a reference frame attached to the vehicle, a reference frame attached to an object (e.g., a seat, tray, or another object) in the vehicle.

Consistent with some disclosed embodiments, the first acceleration data includes a first time series, the second acceleration data includes a second time series, and the operations further include calculating a convolution of at least part of the first time series to obtain a first result value, calculating a convolution of at least part of the second time series to obtain a second result value, and determining the head acceleration with respect to the vehicle isolated from the vehicle acceleration based on the first result value and the second result value. Time series refers to a series of data points in time order. It may also refer to a series of values of a quantity obtained at successive times. In some embodiments, a series of values over time with equal time intervals between them. Convolution may be used to filter or process a time series with a specific filter or kernel to extract a feature. The convolution of a time series may be performed by any method. In some embodiments, calculating a convolution may be achieved using, for example, signal processing algorithms. Such algorithms are available in various software libraries, such as, for example, NumPy and SciPy in Python. By way of non-limiting example, to calculate a convolution of a time series x of length N and a kernel h of length M, the time series x may be padded to ensure that it can fully accommodate the kernel h. This typically involves adding values at the beginning and end of the time series. The kernel h may be slid over the padded time series x, multiplying corresponding elements and summing them up to get the result at each position. The result at position i will be the sum of the element-wise products of the padded time series from i to i+M−1 and the kernel h. Libraries like NumPy and SciPy provide built-in functions to perform convolutions efficiently, and one typically does not need to implement the convolution process manually. Depending on the specific circumstances, a convolution may be calculated with the aid of an FFT (Fast Fourier Transform) and/or a reverse FFT. In some embodiments, convolution of the time series acceleration data captured by the appliance sensor and the time series acceleration data captured by the keyboard sensor may be performed to extract a feature from each acceleration data and the wearer's head acceleration with respect to the vehicle may be determined at least partly based on extracted features.

Some disclosed embodiments involve using machine learning to analyze the first acceleration data and the second acceleration data to determine the head acceleration with respect to the vehicle isolated from the vehicle acceleration. The term "machine learning" may be interpreted consistent with its description elsewhere in this disclosure. In some embodiments, machine learning may refer to the use of data and algorithms to imitate the way that humans learn, gradually improving its accuracy. For example, by using algorithms and statistical models to analyze and draw inferences from patterns in data. In some embodiments, a machine language model may be trained to determine the user's head acceleration and the trained model may be used to determine the user's head acceleration with respect to the vehicle isolated from the vehicle acceleration based on the first and second acceleration data.

Some disclosed embodiments involve using the isolated head acceleration with respect to the vehicle to facilitate an augmented display of a virtual object at a fixed position in the moving vehicle via the wearable extended reality appliance. The term "augmented display" may be interpreted consistent with the description of augmented reality elsewhere in this disclosure. Augmented display may refer to an enhanced display where some information is added. For example, augmented display may improve display of the virtual content such that it improves user experience. Virtual object refers to any portion or part of the displayed virtual content. For example, the entirety of the displayed virtual content or virtual screen may be referred to as a virtual object, or individual portions (e.g., widgets, windows, or any other part) of the virtual content may be referred to as a virtual object. For example, as described with reference to FIG. 1, the virtual content displayed by extended reality appliance 110 includes a virtual screen 112 and a plurality of virtual widgets 114A-114D displayed next to virtual screen 112. These displayed objects may be collectively in individual referred to as a virtual object.

Acceleration resulting from the wearer's head movements relative to the vehicle (e.g., head acceleration) may significantly impact the user experience and immersion level with the virtual content displayed by the extended reality apparatus. In an augmented reality or enhanced reality display, virtual content and the virtual objects are typically anchored or registered to specific points in the real-world environment to ensure that they appear in the correct position relative to those points. However, as the user (e.g., the wearer of the enhanced reality apparatus) moves their head, the resulting head acceleration may cause inaccuracies and lead to misalignment between the virtual content and the real world. This misalignment can result in jittery or unstable visual experiences, making the virtual display less immersive and potentially causing discomfort to the user. For example, such head acceleration may cause the virtual objects in the virtual display to appear to move on the display. Unless tracked and properly accounted for, the head acceleration may lead to a disconnect between the virtual content and the real world thereby negatively affecting the user's perception and interaction with the virtual content. As another example, users may rely on stereoscopic depth cues to perceive the 3D nature of the virtual content. As users move their heads, the parallax effect created by the slight differences in the images seen by each eye helps their brain perceive depth accurately. Accurate tracking of head acceleration and accounting for the head acceleration in the displayed virtual contents may assist in maintaining a coherent and natural depth perception. The mismatch between the user's expected visual input of the virtual objects in the virtual content and the actual display (that may result from head acceleration) may cause also discomfort, motion sickness, and nausea in some users. Accounting for the head acceleration in the display of virtual objects in the virtual contents may enhance the wearer's perception of the virtual contents and enable smooth and intuitive interactions with the display. Therefore, in embodiments of the current disclosure, the isolated head acceleration of the wearer may be used to facilitate displaying the virtual objects in the displayed virtual contents at a fixed position in the moving vehicle. Facilitate refers to help bring about. Facilitate may also refer to make something easier, simplify, expedite, and/or assist. The wearer's isolated head acceleration may be used to facilitate displaying the virtual objects at a fixed position in the moving vehicle in any manner. In some embodiments, a negative acceleration equal to the isolated head acceleration may be imparted to the virtual objects to counter the effect of the wearer's head acceleration. In some embodiments, hardware and/or software may be used to facilitate such an augmented display. For example, in some embodiments, one or more algorithms may use the detected head acceleration at a time to adjust the display of the virtual objects on the virtual display at that time.

Some disclosed embodiments involve using the isolated head acceleration with respect to the vehicle to facilitate visual stabilization of virtual content. As described and exemplified previously, virtual content refers to any type of data representation that is displayed by the extended reality appliance to the user. Virtual content may refer to content that moves relative to the wearable extended reality appliance. In the exemplary embodiment of FIG. 1, the virtual content displayed by wearable extended reality appliance 110 includes a virtual screen 112 and a plurality of virtual widgets 114A-114D. As another example, in the embodiment illustrated in FIG. 25A, the displayed virtual content 2502 includes document 2504 a plurality of widgets 114B, 114D, and virtual cursor 118. As used herein, visual stabilization refers to techniques used to improve the stability and accuracy of the displayed virtual content. As explained above, head acceleration caused by the movement of the wearer's head may lead to misalignments between the virtual content and the real world resulting in a jittery or unstable visual appearance of the visual content. In embodiments of the current disclosure, the isolated head acceleration with respect to the vehicle may be used to facilitate visual stabilization of the virtual content. In some embodiments, hardware and/or software may be used for visual stabilization based on the isolated head acceleration.

In some disclosed embodiments, the virtual content is part of a game. In general, the extended reality appliance may display any type of virtual content. In some embodiments, the display may be associated with a game. A game refers to a physical or mental competition conducted according to rules with one or more participants. A game may refer to an activity or sport usually involving skill, knowledge, or chance, which has fixed rules. In some embodiments, the user may control the game using the keyboard 104. Additionally or alternatively, the user may use a handheld controller to interact with virtual objects (e.g., move the virtual objects) and perform other actions within the game.

Consistent with some disclosed embodiments, the operations further include moving the virtual content independently of the vehicle and independently of the wearable extended reality appliance. Moving virtual content independently of the vehicle and independently of the wearable extended reality appliance refers to a causing a movement of the virtual content that is not caused as a result of the vehicle movement or a movement of the extended reality apparatus. The displayed virtual content (including all virtual objects in the virtual display) and/or selected virtual objects in the virtual display may be moved independent of the vehicle and the extended reality apparatus. A non-limiting example of such a movement may include the user selecting the displayed virtual content (e.g., the virtual display window or a virtual object on the virtual display), for example, using a cursor and moving the selected virtual content to a new location, for example, in front of the user's face. For example, with reference to FIG. 25A, using keyboard 104 and cursor 118, user 100 may select the displayed virtual content 2502 (for example, by moving the cursor 118 to a selected location of the virtual display and clicking a button) and reposition the selected virtual content to the left or the right (or another location) of the user's face, for example, for improved visibility after opening a window. As another example, user 100 may select a desired virtual object (e.g., widget 114D) on the displayed virtual content 2502 and move the selected widget to a new location on the virtual display, for example, to make the display of document 2504 bigger.

Some disclosed embodiments involve determining a travel state of the vehicle based on the second acceleration data captured using the second sensor in the personal input device, and causing a display of specific virtual content based on the determined travel state of the vehicle. A travel state refers to a condition or mode in which the vehicle is operating. For example, an airplane may have several travel states such as, for example, at the gate before takeoff, taxiing for takeoff, ascent during takeoff, flying at cruising altitude, descent for landing, taxiing after landing, docking with an airbridge, door open, and other states related to the flight of the airplane. Travel state may also refer to conditions and events during flying. For example, flight conditions such as, for example, smooth flying, turbulence, landing in 30 minutes, and other conditions may also be part of travel state. Additionally, events during flight such as, for example, food service will begin soon, bathrooms are occupied, duty free sales will begin soon, sick traveler onboard, and other events may also be part of the travel state. The travel state of the vehicle may be determined based on the second acceleration data in any manner. For example, patterns detected in the acceleration data may indicate a particular travel state. For example, a pattern in the detected acceleration (e.g., horizontal and/or vertical components of acceleration) data may indicate, for example, that the airplane is accelerating for takeoff, is ascending after takeoff, or is in another travel state. Additionally and/or alternatively, comparison of the detected acceleration data with previous data (for example, stored in a database) may also be used to detect the travel state. In some embodiments, based on the detected travel state, a specific virtual content may be displayed on the virtual display, for example, to inform the wearer. With reference to FIG. 25A, in some embodiments, based on a pattern in the data captured by the sensor on keyboard 104, a processor may detect that the airplane is in one or more of the above described travel states (e.g., the airplane is ascending after takeoff) and cause the display of a specific virtual content (e.g., a virtual object depicting a sign to fasten seat belt) on the virtual display. In general, any travel state may be determined and virtual content relevant or suitable for the determined travel state may be displayed on the virtual display.

Some disclosed embodiments involve analyzing the second acceleration data to determine a travel state of the vehicle, and wherein segregating the second component from the first component is based on the travel state. Analyzing refers to examining. For example, examining methodically. Analyzing may refer to separating or distinguishing data so as to determine some aspect or characteristic of the data. In some embodiments, the second acceleration data captured by the sensor in the personal input device may be analyzed to determine the travel state of the vehicle. For example, if examination of acceleration data indicates that it only has a component in the vertical direction, it may indicate that the vehicle is moving vertically upward. If examination indicates only a horizontal component, it may indicate that the vehicle is moving horizontally. In some embodiments, segregating the second component from the first component may be based on the determined travel state. As explained previously, the first component is associated with movement of the wearer's head with respect to the vehicle and the second component is associated with movement of the vehicle. If the determined travel state indicates that the vehicle is, for example, moving vertically up, this information may be used in segregating the second component from the first component. For example, the vertical component of acceleration may be subtracted from the first acceleration data (recorded by the sensor in the extended reality apparatus) to isolate the wearer's head acceleration.

Some disclosed embodiments involve determining a type of the vehicle, and wherein segregating the second component from the first component is based on the type of the vehicle. A vehicle type refers to a classification based on characteristics, purpose, and/or design. Automobiles, aircraft, and trains are examples of vehicle types, as are cars, trucks, and busses. The vehicle type may be determined in any manner. In some embodiments, the vehicle type may be based on information stored in memory or received by the at least one processor. For example, the vehicle type may be information that is stored apriori in a memory location accessible by one or more processors. In some embodiments, a user may send this information to a processor via an input device. In some embodiments, the type of vehicle may be determined based on the first acceleration data captured by the first sensor and/or the second acceleration data captured by the second sensor. For example, the captured acceleration data may be compared to prerecorded data stored in a database, and based on the similarity of the captured data with one or more of the stored data, the vehicle type may be determined. As another example, in some embodiments, if the acceleration data captured by the first sensor and/or the second component indicates that the captured acceleration only has a vertical component, the type of vehicle may be determined as one that travels vertically upwards. In some embodiments, the determined vehicle type information may be used in segregating the second component from the first component. For example, if the vehicle is an elevator which moves vertically up and down, the vertical component of acceleration may be subtracted from the first acceleration data (recorded by the sensor in the extended reality apparatus) to isolate the wearer's head acceleration.

Some disclosed embodiments involve receiving third acceleration data captured using a third sensor in the vehicle, and using the first acceleration data, the second acceleration data, and the third acceleration data to segregate the second component from the first component, thereby isolating the head acceleration with respect to the vehicle from the vehicle acceleration. "Third acceleration data" refers to acceleration data that is distinct from the first and second acceleration data. The types and values of the data associated with the third acceleration data, the first acceleration data, and the second acceleration data may be the same in some cases, but they are three distinct or different data sets. "Third sensor" refers to a sensor that is distinct from the first and second sensors. The third sensor may be the same type of sensor as the first sensor and the second sensor in some cases, but they are three distinct or physically different sensors. The third sensor may refer to a sensor that detects or captures the third acceleration data. The term segregate may be interpreted consistent with its previous description and exemplification. The third sensor may be disposed at any location on the vehicle. In some embodiments, it may be incorporated in the vehicle. In some embodiments, it may be embedded in another object positioned in vehicle. In some embodiments, the third sensor may be positioned such that it accurately tracks the movement of the vehicle. As explained previously, the first acceleration data is captured using a first sensor included in the extended reality appliance and may be indicative of the acceleration of the extended reality apparatus, and the second acceleration data is captured using a second sensor included in the personal input device and may be indicative of a movement of the personal input device, for example, relative to the vehicle. The third acceleration data captured by the third sensor may be indicative of the acceleration of the vehicle. As also explained previously, the first component is associated with movement of the wearer's head (and/or the extended reality appliance) with respect to the vehicle. The second component may be associated with movement of the vehicle and/or movement of the personal input device in the vehicle. In some embodiments, the processor may use the first, second, and third acceleration data to segregate the second component from the first component and thereby isolate the wearer's head acceleration with respect to the vehicle from the vehicle acceleration. For example, with reference to FIG. 25B, an appliance sensor (included in the extended reality apparatus) records the acceleration of the extended reality apparatus (or the wearer's head) with respect to the airplane 2500, and a keyboard sensor (included in keyboard 104) may record the acceleration of the keyboard 104 with respect to the airplane 2500. Another sensor (airplane sensor) may be attached to airplane 2500 to record the acceleration data of the airplane 2500. When the wearer's head and keyboard 104 are not moving with respect to airplane 2500, the acceleration data captured by all three sensors may have the same value(s). However, when the wearer's head moves with respect to airplane 2500 (e.g., the wearer's head turns towards the window as shown in FIG. 25B), and when user 100 moves keyboard 104 with respect to airplane 2500 (e.g., the wearer lifts the keyboard, walks on the airplane with the keyboard, or moves the keyboard in another manner) the acceleration data captured by the three sensors may be different. For example, the third sensor may record vehicle acceleration, and the second sensor may record the acceleration of both the keyboard and the vehicle. Therefore, their difference may be the acceleration of the keyboard relative to vehicle. Meanwhile, the first sensor may record the acceleration resulting from the user's head movement, keyboard movement, and vehicle movement. Therefore, the difference between the acceleration data recorded by the first sensor, the third sensor, and the extracted keyboard acceleration may result in the isolated acceleration of user's head. In some embodiments, the first, second, and third acceleration data may be at, or may be sent to, a location that may be accessed by one or more processors, and these processor (s) may use the first, second, and third acceleration data to segregate the second component from the first component and thereby isolate the wearer's head acceleration with respect to the vehicle from the vehicle acceleration.

Consistent with some disclosed embodiments, the first sensor is configured to measure acceleration of the head of the wearer in an inertial frame of reference and the second sensor is configured to measure acceleration of the vehicle in the inertial frame of reference. An inertial frame of reference is a foundational reference point or coordinate system from which the motion of objects can be accurately described. It is a frame in which an object's motion remains unchanged unless a force acts on it. In practice, no actual frame of reference is entirely inertial, as there are always external influences like gravitational forces or the rotation of the Earth. However, for purposes of this disclosure frames can be considered inertial if such external influences are relatively negligible for the given analysis (i.e., where external forces are minimal (or so low) that the acceleration due to these external forces may be neglected for purposes of calculations). Thus, in embodiments of the current disclosure, the first sensor is configured to measure the acceleration of the wearer's head in an inertial frame of reference such that the effect of external forces on the measured acceleration is minimal. In other words, the measured acceleration may be primarily due to the acceleration of the wearer's head and not significantly affected by acceleration due to external forces. Similarly, the second sensor is configured to measure the acceleration of the vehicle in the inertial frame of reference such that the effect of external forces on the measured acceleration is minimal.

Consistent with some embodiments, the personal input device includes a keyboard for input of textual information and wherein the virtual object includes the textual information. "Textual information" refers to information that is conveyed through written or printed text. It may refer to any written or typed information in some embodiments. Textual information may also refer to any information that contains at least some text. Textual information may take various forms, such as books, articles, newspapers, emails, messages, websites, graphs with legends, pictures/images with annotation, and more. With reference to FIGS. 25A and 25B, as explained previously, the user 100 may input text to a document 2504 displayed in the virtual screen using keyboard 104.

Consistent with some embodiments, the personal input device includes a pointing device, and the operations further include changing the fixed position in the moving vehicle to a new fixed position in the moving vehicle based on input received via the pointing device. A pointing device refers to any input device that may be used to control the movement of a cursor or a pointer on a display, such as, for example, the virtual display of the extended reality appliance. For example, an input device that a user may use to provide input to interact with, for example, virtual content displayed by the extended reality apparatus. As explained previously, in some embodiments, a virtual cursor may be presented on a virtual display, and the virtual cursor may be controlled by a pointing device (such as, for example, a mouse, trackball, touchpad, trackpad, touchscreen, joystick, pointing stick, stylus, light pen, or any other input mechanism). In the exemplary embodiment of FIG. 25A, user 100 may use a pointing device (such as, for example, a trackball, touchpad, trackpad, touchscreen, joystick, pointing stick, stylus, light pen, or any other input mechanism) on keyboard 104 to move the position of a selected virtual object (e.g., document 2504, widgets 114B, 114D) in the displayed virtual content 2502. For example, using the pointing device, user 100 may move virtual cursor 118 to a displayed virtual object and click and drag it to a new location. For example, cursor 118 may be moved to selected location on a virtual object, and a selected key in keyboard 104 may be clicked to select the virtual object, and the cursor 118 along with the selected virtual object moved to a new location in the virtual display. As another example, the user may move the cursor 118 to a specific location in document 2504 and type in text using the keyboard 104 to, for example, change the size and/or location of bars in the displayed bar graph.

Some disclosed embodiments involve accessing a model of an interior of the vehicle and receiving image data captured using an image sensor included in the wearable extended reality appliance. Accessing information refers to an act of obtaining, reading, opening, or retrieving information stored, for example, in a digital format from a data storage location, such as, for example, a database. In the context of operations performed by one or more processors, accessing information may involve interacting with data related to the information to acquire the information for various purposes. This process may involve querying databases, interacting with the databases, reading files, and fetching information. "Model" refers to a representation or simulation of something, for example, of an object, a person, a place, or a thing. Model may refer to the representation or simulation of the structure or something at a smaller scale than the original. The representation may be three-dimensional or two-dimensional. The model of an interior of the vehicle may refer to a representation or simulation of the various components, features, and design elements found inside the vehicle's cabin and their layout. In some exemplary embodiments, one or models of the interior of different vehicles (e.g., airplane 2500 of FIG. 25A) may be stored in a database (e.g., data structure 212 of FIG. 2, database 380 of FIG. 3, database 480 of FIG. 4) accessible by one or more processors and one or more of these processors may access these stored models in the database.

Receiving may be interpreted consistent with the previous discussions of this term. For example, receiving may include retrieving, acquiring, or otherwise gaining access to, e.g., data. Receiving may include reading data from a database and/or receiving data from a computing device via a (e.g., wired and/or wireless) communications channel. The terms "image sensor" and "image data" may be interpreted consistent with their description elsewhere in this disclosure. For example, an image sensor may refer to a device used to capture visual information and convert it into an electronic signal, and image data may refer to the visual information captured by the image sensor. With reference to FIG. 25A, extended reality appliance 110 may include an image sensor that may record a digital image of what the user 100 sees (e.g., the field of view of the user). In some embodiments, signals representative of this digital image may be sent to another location. For example, in some embodiments, the image signals may be sent to keyboard 104, for example, via wire 108 or wirelessly. In some embodiments, the image signals may be transmitted to remote processing unit 208 (see FIG. 2).

Some disclosed embodiments involve using the isolated head acceleration with respect to the vehicle to select a portion of the model of the interior of the vehicle and updating the selected portion of the model of the interior of the vehicle based on the image data. "Updating" refers to amending or making something more current based on more recent or better information or data. For example, updating may refer to changing something to bring it up to date. Updating may refer to make something suitable for use now by adding current information and/or revising information. In some embodiments, the isolated head acceleration of the wearer with respect to the vehicle may be used to select a portion of the model of the interior of the vehicle (for example, stored in a database) and to update the selected portion of the model based on the received image data. For example, the isolated head acceleration may indicate the region of the vehicle that the wearer is currently looking at or turning towards, and based on this information, the portion of the model may be selected and updated.

The above described operations for content localization may occur via a system, computer readable media, or a method. For example, in some embodiments, a system (e.g., system 200 of FIG. 2) for content localization in moving vehicles may include at least one processor (e.g., processing device 360 of FIG. 3, processing device 460 of FIG. 4, processing device 560 of FIG. 5) configured to receive, from within a moving vehicle, first acceleration data captured using a first sensor included in a wearable extended reality appliance mountable on a head of a wearer, wherein the first acceleration data includes a first component associated with movement of the head of the wearer with respect to the vehicle and a second component associated with movement of the vehicle. The at least one processor may also be configured to receive, from within the moving vehicle, second acceleration data captured using a second sensor included in a personal input device, wherein the personal input device is a non-vehicle component configured to be paired with the wearable extended reality appliance. The at least one processor may also be configured to segregate the second component from the first component using the first acceleration data and the second acceleration data to thereby isolate the head acceleration with respect to the vehicle from the vehicle acceleration. The terms used with reference to the above described system may be interpreted as described and exemplified previously in this disclosure.

Figure 26:
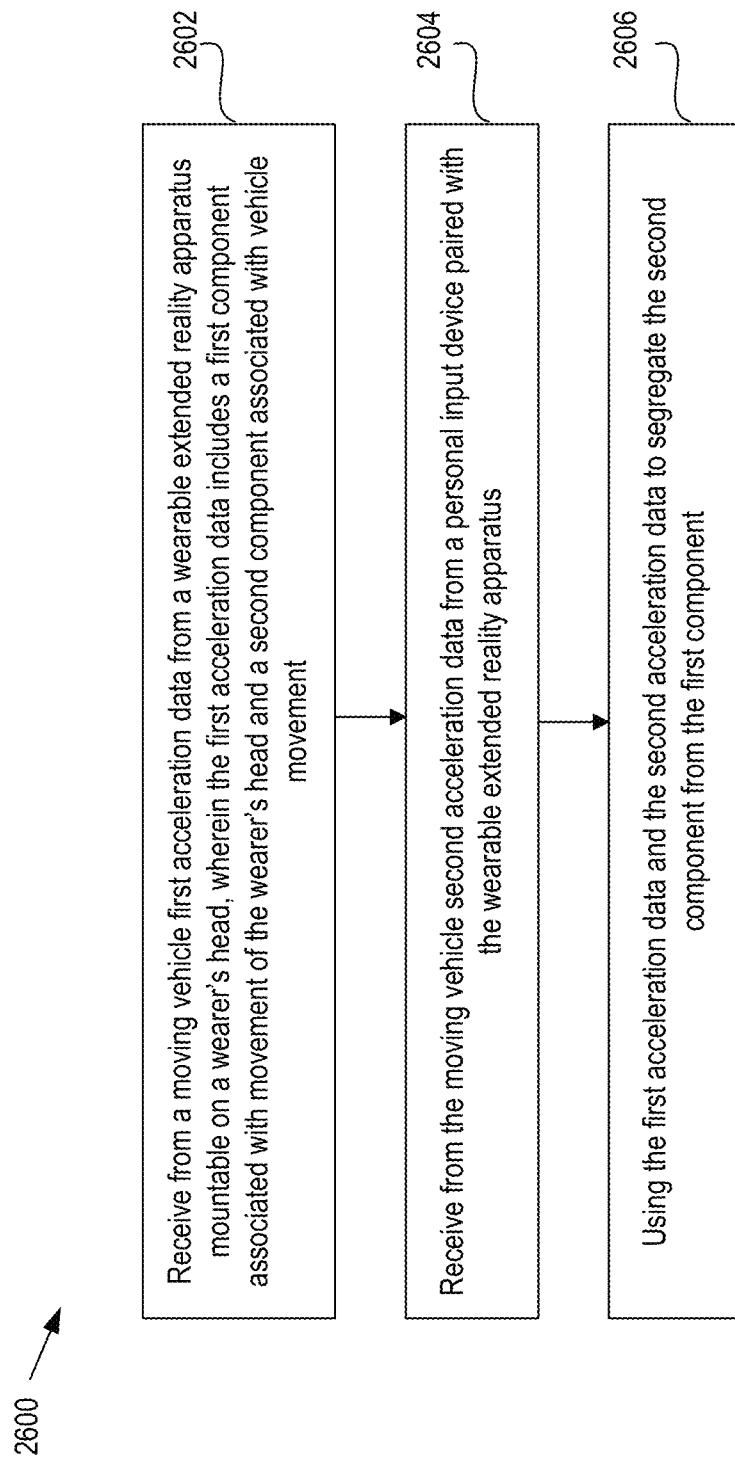
FIG. 26 is a flow chart of an exemplary method of content localization in a moving vehicle, consistent with some embodiments of the present disclosure.

Some disclosed embodiments involve a method for content localization in moving vehicles. A flow chart of an exemplary method 2600 is illustrated in FIG. 26. The method includes receiving, from within a moving vehicle, first acceleration data captured using a first sensor included in a wearable extended reality appliance mountable on a head of a wearer, wherein the first acceleration data includes a first component associated with movement of the head of the wearer with respect to the vehicle and a second component associated with movement of the vehicle (Step 2602). Method 2600 also includes receiving, from within the moving vehicle, second acceleration data captured using a second sensor included in a personal input device, wherein the personal input device is a non-vehicle component configured to be paired with the wearable extended reality appliance (Step 2604). Method 2600 also includes using the first acceleration data and the second acceleration data to segregate the second component from the first component, thereby isolating the head acceleration with respect to the vehicle from the vehicle acceleration (Step 2606). The terms used with reference to the above described method may be interpreted as described and exemplified previously in this disclosure.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A non-transitory computer readable medium containing instructions that when executed by at least one processor cause the at least one processor to perform operations for presenting content in three dimensional (3D) environments, the operations comprising:
   requesting content for virtual presentation in an environment of an extended reality appliance;
   receiving the content for the virtual presentation in the environment;
   receiving with the content, a plurality of tags, each tag of the plurality of tags being associated with a portion of the content, wherein a particular portion of the content associated with a particular tag of the plurality of tags includes an inanimate virtual object;
   capturing, using an image sensor, a layout of the environment;
   for each tag of the plurality of tags, selecting, based on the respective tag, at least one 3D placement requirement for the portion of the content associated with the respective tag; and for each portion of the content, determining, based on the layout of the environment and the at least one 3D placement requirement selected for the respective portion of the content, a location in the environment for virtual placement of the respective portion of the content.

2. The non-transitory computer-readable medium of claim 1, wherein determining the location for virtual placement includes determining a first size for a first portion of the content based on the at least one 3D placement requirement selected for the first portion of the content, and determining a second size for a second portion of the content based on the at least one 3D placement requirement selected for the second portion of the content.

3. The non-transitory computer-readable medium of claim 1, wherein determining the location for virtual placement includes determining a first virtual distance from the extended reality appliance for a first portion of the content based on the at least one 3D placement requirement selected for the first portion of the content, and determining a second virtual distance from the extended reality appliance for a second portion of the content based on the at least one 3D placement requirement selected for the second portion of the content.

4. The non-transitory computer-readable medium of claim 1, wherein the operations further include requesting visual information associated with a first portion of the content associated with a first tag of the plurality of tags from a first content provider and requesting a second portion of the content associated with a second tag of the plurality of tags from a second content provider.

5. The non-transitory computer-readable medium of claim 1, wherein the at least one 3D placement requirement selected for a particular portion of the content associated with a particular tag of the plurality of tags includes at least one of: a 3D background, a 3D visual span, virtual object placement protocols, 3D anchoring requirements, or 3D illumination requirements; and wherein the particular 3D placement requirement is associated with the particular portion of the content in a manner enabling the determination of a particular location for virtual placement of the particular portion of the content.

6. The non-transitory computer-readable medium of claim 1, wherein the operations further include: displaying different portions of the content in various locations in the environment; requesting additional content for virtual presentation in the environment of the extended reality appliance; receiving the additional content and an indication that the additional content is associated with a specific tag of the plurality of tags; selecting, based on the specific tag, a specific 3D placement requirement of the plurality of 3D placement requirements for the additional content; and based on the specific 3D placement requirement and the various locations, determining a specific location in the environment for a virtual placement of the additional content.

7. The non-transitory computer-readable medium of claim 1, wherein the operations further include capturing, using the image sensor, a change in the environment; and in response to the change in the environment, determining, for a particular portion of the content associated with a particular tag of the plurality of tags, a new location in the environment for virtual placement of the particular portion of the content.

8. The non-transitory computer-readable medium of claim 1, wherein the operations further include determining a movement of the extended reality appliance, and in response to the determined movement of the extended reality appliance, determining, for a particular portion of the content associated with a particular tag of the plurality of tags, a new location in the environment for virtual placement of the particular portion of the content.

9. The non-transitory computer-readable medium of claim 1, wherein the at least one 3D placement requirement selected for the particular portion of the content specifies that the inanimate virtual object needs to be displayed adjacent to a particular type of physical object, and the operations further includes determining the location of the inanimate virtual object based on identification of a physical object of the particular type in the environment of the extended reality appliance.

10. The non-transitory computer-readable medium of claim 1, wherein a particular portion of the content associated with a particular tag of the plurality of tags includes an animate virtual object.

11. The non-transitory computer-readable medium of claim 10, wherein the at least one 3D placement requirement selected for the particular portion of the content specifies that the animate virtual object needs to be displayed in a location with at least one illumination condition, and the operations further includes determining the location of the animate virtual object based on results of an analysis of illumination conditions in the environment of the extended reality appliance.

12. The non-transitory computer-readable medium of claim 1, wherein a particular portion of the content associated with a particular tag of the plurality of tags includes an interactive virtual object configured to respond to inputs from a wearer of the extended reality appliance.

13. The non-transitory computer-readable medium of claim 12, wherein the at least one 3D placement requirement selected for the particular portion of the content specifies at least one requirement for a virtual distance of the interactive virtual object from the wearer, and the operations further includes determining the location of the interactive virtual object based on the at least one requirement for the virtual distance.

14. The non-transitory computer-readable medium of claim 1, wherein a particular portion of the content associated with a particular tag of the plurality of tags includes a moving virtual object.

15. The non-transitory computer-readable medium of claim 14, wherein the at least one 3D placement requirement selected for the particular portion of the content specifies that the moving virtual object needs a space free of physical obstacles, and the operations further include determining an area in the environment in which the virtual object is able to move.

16. The non-transitory computer-readable medium of claim 1, wherein the operations further include capturing, using the image sensor, a physical event in the environment; and determining, for a particular portion of the content associated with a particular tag of the plurality of tags, a new location in the environment for virtual placement of the particular portion of the content based on the physical event.

17. The non-transitory computer-readable medium of claim 1, wherein a first determined location in the environment for virtual placement of a first portion of the content associated with a first tag is a first location anchored to a physical object, and a second determined location in the environment for virtual placement of a second portion of the content associated with a second tag is a second location, and the operations further include determining an impending collision between the first portion of the content and the second portion of the content due to a movement of the physical object; and using the first tag and the second tag to determine to favor the first portion of the content over the second portion of the content at the time of the impending collision.

18. A method for presenting content in three dimensional (3D) environments, the method comprising:
   requesting content for virtual presentation in an environment of an extended reality appliance;
   receiving the content for the virtual presentation in the environment;
   receiving with the content, a plurality of tags, each tag of the plurality of tags being associated with a portion of the content, wherein a particular portion of the content associated with a particular tag of the plurality of tags includes an inanimate virtual object;
   capturing, using an image sensor, a layout of the environment;
   for each tag of the plurality of tags, selecting, based on the respective tag, at least one 3D placement requirement for the portion of the content associated with the respective tag; and
   for each portion of the content, determining, based on the layout of the environment and the at least one 3D placement requirement selected for the respective portion of the content, a location in the environment for virtual placement of the respective portion of the content.

19. A system for presenting content in three dimensional (3D) environments, the system comprising:
   at least one processor configured to:
   request content for virtual presentation in an environment of an extended reality appliance;
      receive the content for the virtual presentation in the environment;
      receive with the content, a plurality of tags, each tag of the plurality of tags being associated with a portion of the content, wherein a particular portion of the content associated with a particular tag of the plurality of tags includes an inanimate virtual object;
      capture, using an image sensor, a layout of the environment;
      for each tag of the plurality of tags, select, based on the respective tag, at least one 3D placement requirement for the portion of the content associated with the respective tag; and
      for each portion of the content, determine, based on the layout of the environment and the at least one 3D placement requirement selected for the respective portion of the content, a location in the environment for virtual placement of the respective portion of the content.

20. A non-transitory computer readable medium containing instructions that when executed by at least one processor cause the at least one processor to perform operations for presenting content in three dimensional (3D) environments, the operations comprising:
   requesting content for virtual presentation in an environment of an extended reality appliance;
   receiving the content for the virtual presentation in the environment;
   receiving with the content, a plurality of tags, each tag of the plurality of tags being associated with a portion of the content, wherein a particular portion of the content associated with a particular tag of the plurality of tags includes an animate virtual object;
   capturing, using an image sensor, a layout of the environment;
   for each tag of the plurality of tags, selecting, based on the respective tag, at least one 3D placement requirement for the portion of the content associated with the respective tag; and
   for each portion of the content, determining, based on the layout of the environment and the at least one 3D placement requirement selected for the respective portion of the content, a location in the environment for virtual placement of the respective portion of the content,
   wherein the at least one 3D placement requirement selected for the particular portion of the content specifies that the animate virtual object needs to be displayed in a location with at least one illumination condition, and the operations further includes determining the location of the animate virtual object based on results of an analysis of illumination conditions in the environment of the extended reality appliance.

21. A non-transitory computer readable medium containing instructions that when executed by at least one processor cause the at least one processor to perform operations for presenting content in three dimensional (3D) environments, the operations comprising:
   requesting content for virtual presentation in an environment of an extended reality appliance;
   receiving the content for the virtual presentation in the environment;
   receiving with the content, a plurality of tags, each tag of the plurality of tags being associated with a portion of the content;
   capturing, using an image sensor, a layout of the environment;
   for each tag of the plurality of tags, selecting, based on the respective tag, at least one 3D placement requirement for the portion of the content associated with the respective tag; and
   for each portion of the content, determining, based on the layout of the environment and the at least one 3D placement requirement selected for the respective portion of the content, a location in the environment for virtual placement of the respective portion of the content,
   wherein a first determined location in the environment for virtual placement of a first portion of the content associated with a first tag is a first location anchored to a physical object, and a second determined location in the environment for virtual placement of a second portion of the content associated with a second tag is a second location, and the operations further include determining an impending collision between the first portion of the content and the second portion of the content due to a movement of the physical object; and using the first tag and the second tag to determine to favor the first portion of the content over the second portion of the content at the time of the impending collision.

* * * * *